(12) United States Patent
Tsuji

(10) Patent No.: US 7,719,714 B2
(45) Date of Patent: May 18, 2010

(54) COLOR CONVERSION DEFINITION CREATING METHOD, COLOR CONVERSION DEFINITION CREATING APPARATUS, AND COLOR CONVERSION DEFINITION CREATING PROGRAM STORAGE MEDIUM

(75) Inventor: Tetsuya Tsuji, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 497 days.

(21) Appl. No.: 11/819,350

(22) Filed: Jun. 27, 2007

(65) Prior Publication Data
US 2008/0007784 A1    Jan. 10, 2008

(30) Foreign Application Priority Data
Jul. 4, 2006 (JP) ............... 2006-184280

(51) Int. Cl.
*G06F 15/00* (2006.01)
(52) U.S. Cl. ............ 358/1.9; 358/2.1; 382/167
(58) Field of Classification Search ........ 358/2.1, 358/1.9; 382/167
See application file for complete search history.

(56) References Cited

U.S. PATENT DOCUMENTS

| | | | |
|---|---|---|---|
| 7,015,929 B2* | 3/2006 | Satomi et al. | 345/604 |
| 7,456,999 B2* | 11/2008 | Hiramatsu | 358/1.9 |
| 7,466,463 B2* | 12/2008 | Kondo | 358/504 |
| 2005/0206929 A1* | 9/2005 | Tsuji | 358/1.9 |

FOREIGN PATENT DOCUMENTS

| | | |
|---|---|---|
| JP | 9-83824 A | 3/1997 |
| JP | 2001-103329 A | 4/2001 |
| JP | 2004-7373 A | 1/2004 |
| JP | 2004-102489 A | 4/2004 |
| JP | 2005-268982 A | 9/2005 |

* cited by examiner

*Primary Examiner*—Twyler L Haskins
*Assistant Examiner*—Michael Burleson
(74) *Attorney, Agent, or Firm*—Sughrue Mion, PLLC

(57) ABSTRACT

There is disclosed technology of a color conversion definition for converting coordinate points in a color reproduction area of a printer into coordinate points in a color reproduction area of a print. This technology makes it possible to increase the degree of freedom of designation for K-plate restraint conditions of print, and also permit to widely take the color reproduction area within the range of ink total amount limitation. The vertex of K is established to be points $(C, M, Y, K)=(C_{SH}, M_{SH}, Y_{SH}, K_{SH})$ in which K-plate restraint conditions are designated. There is created a virtual device profile tracing the color reproduction area of a print on not only edge lines coupling W with C, M and Y, and edge lines coupling K with R, G and B, but also diagonals edge lines coupling W with R, G and B, and diagonals edge lines coupling K with C, M and Y.

39 Claims, 75 Drawing Sheets

| | |
|---|---|
| R→K EDGE LINE | CMYK=(0,100,100,0)→(0,100,100,K)→(0,100,100,100)→(K,100,100,100)→(100,100,100,100) |
| G→K EDGE LINE | CMYK=(100,0,100,0)→(100,0,100,K)→(100,0,100,100)→(100,K,100,100)→(100,100,100,100) |
| B→K EDGE LINE | CMYK=(100,100,0,0)→(100,100,0,K)→(100,100,0,100)→(K,100,100,100)→(100,100,100,100) |
| C→K DIAGONAL LINE | CMYK=(100,0,0,0)→(100,0,0,K)→(100,0,0,100)→(100,K,K,100)→(100,100,100,100) |
| M→K DIAGONAL LINE | CMYK=(0,100,0,0)→(0,100,0,K)→(0,100,0,100)→(K,100,K,100)→(100,100,100,100) |
| Y→K DIAGONAL LINE | CMYK=(0,0,100,0)→(0,0,100,K)→(0,0,100,100)→(K,K,100,100)→(100,100,100,100) |

Fig. 20

| COLOR | dummyR | dummyG | dummyB | C | M | Y | K | L* | a* | b* |
|---|---|---|---|---|---|---|---|---|---|---|
| W | 255 | 255 | 255 | 0 | 0 | 0 | 0 | L* 0,0,0,0 | a* 0,0,0,0 | b* 0,0,0,0 |
| ↓ | 255×9/10 | 255 | 255 | 10 | 0 | 0 | 0 | L* 10,0,0,0 | a* 10,0,0,0 | b* 10,0,0,0 |
| | 255×8/10 | 255 | 255 | 20 | 0 | 0 | 0 | L* 20,0,0,0 | a* 20,0,0,0 | b* 20,0,0,0 |
| | 255×7/10 | 255 | 255 | 30 | 0 | 0 | 0 | L* 30,0,0,0 | a* 30,0,0,0 | b* 30,0,0,0 |
| | ...... | ...... | ...... | ...... | | | | ...... | ...... | ...... |
| C | 0 | 255 | 255 | 100 | 0 | 0 | 0 | L* 100,0,0,0 | a* 100,0,0,0 | b* 100,0,0,0 |

Fig. 21

| COLOR | dummyR | dummyG | dummyB | C | M | Y | K | L* | a* | b* |
|---|---|---|---|---|---|---|---|---|---|---|
| C | 0 | 255 | 255 | 100 | 0 | 0 | 0 | L* 100, 0, 0, 0 | a* 100, 0, 0, 0 | b* 0, 0, 0, 0 |
| ↓ | 0 | 255 | 255 × 9/10 | 100 | 0 | 10 | 0 | L* 100, 0, 10, 0 | a* 100, 0, 10, 0 | b* 10, 0, 0, 0 |
|  | 0 | 255 | 255 × 8/10 | 100 | 0 | 20 | 0 | L* 100, 0, 20, 0 | a* 100, 0, 20, 0 | b* 20, 0, 0, 0 |
|  | 0 | 255 | 255 × 7/10 | 100 | 0 | 30 | 0 | L* 100, 0, 30, 0 | a* 100, 0, 30, 0 | b* 30, 0, 0, 0 |
|  | ⋯ | ⋯ | ⋯ | ⋯ | ⋯ | ⋯ | ⋯ | ⋯ | ⋯ | ⋯ |
| G | 0 | 255 | 0 | 100 | 0 | 100 | 0 | L* 100, 0, 100, 0 | a* 100, 0, 100, 0 | b* 100, 0, 0, 0 |

Fig. 22

| COLOR | dummyR | dummyG | dummyB | C M Y K | L* | a* | b* |
|---|---|---|---|---|---|---|---|
| W | 255 | 255 | 255 | 0 0 0 0 | L*0, 0, 0, 0 | a*0, 0, 0, 0 | b*0, 0, 0, 0 |
| ↓ | 255 | 255×9/10 | 255×9/10 | 0 10 10 0 | L*0, 10, 10, 0 | a*0, 10, 10, 0 | b*0, 10, 10, 0 |
| | 255 | 255×8/10 | 255×8/10 | 0 20 20 0 | L*0, 20, 20, 0 | a*0, 20, 20, 0 | b*0, 20, 20, 0 |
| | 255 | 255×7/10 | 255×7/10 | 0 30 30 0 | L*0, 30, 30, 0 | a*0, 30, 30, 0 | b*0, 30, 30, 0 |
| | ...... | ...... | ...... | ...... | ..... | ..... | ..... |
| R | 255 | 0 | 0 | 0 100 100 0 | L*0, 100, 100, 0 | a*0, 100, 100, 0 | b*0, 100, 100, 0 |

Fig. 23

| COLOR | dummyR | dummyG | dummyB | C | M | Y | K | L* | a* | b* |
|---|---|---|---|---|---|---|---|---|---|---|
| R | 255 | 0 | 0 | 0 | 100 | 100 | 0 | L* 0, 100, 100, 0 | a* 0, 100, 100, 0 | b* 0, 100, 100, 0 |
| ↓ | 255 × 9/10 | 0 | 0 | 0 | 100 | 100 | 10 | L* 0, 100, 100, 10 | a* 0, 100, 100, 10 | b* 0, 100, 100, 10 |
|  | 255 × 8/10 | 0 | 0 | 0 | 100 | 100 | 20 | L* 0, 100, 100, 20 | a* 0, 100, 100, 20 | b* 0, 100, 100, 20 |
|  | 255 × 7/10 | 0 | 0 | 0 | 100 | 100 | 30 | L* 0, 100, 100, 30 | a* 0, 100, 100, 30 | b* 0, 100, 100, 30 |
|  | ...... | ...... | ...... | ...... | ...... | ...... | ...... | ...... | ...... | ...... |
|  | Rp | 0 | 0 | 0 | 100 | 100 | Kparam | L* 0, 100, 100, Kp | a* 0, 100, 100, Kp | b* 0, 100, 100, Kp |
|  | ...... | ...... | ...... | BLANK | | | | ...... | ...... | ...... |
|  | 255 × 2/10 | 0 | 0 | $C_{SH}$ | $M_{SH}$ | $Y_{SH}$ | $K_{SH}$ | L* itp2/10 | a* itp2/10 | b* itp2/10 |
|  | 255 × 1/10 | 0 | 0 |  |  |  |  | L* itp1/10 | a* itp1/10 | b* itp1/10 |
| K | 0 | 0 | 0 |  |  |  |  | L* CSH, MSH, YSH, KSH | a* CSH, MSH, YSH, KSH | b* CSH, MSH, YSH, KSH |

Fig. 26

| COLOR | dummyR | dummyG | dummyB | C | M | Y | K | L* | a* | b* |
|---|---|---|---|---|---|---|---|---|---|---|
| C | 0 | 255 | 255 | 100 | 0 | 0 | 0 | L* 100, 0, 0, 0 | a* 100, 0, 0, 0 | b* 100, 0, 0, 0 |
| ↓ | 0 | 255 × 9/10 | 255 × 9/10 | 100 | 0 | 0 | 10 | L* 100, 0, 0, 10 | a* 100, 0, 0, 10 | b* 100, 0, 0, 10 |
|  | 0 | 255 × 8/10 | 255 × 8/10 | 100 | 0 | 0 | 20 | L* 100, 0, 0, 20 | a* 100, 0, 0, 20 | b* 100, 0, 0, 20 |
|  | 0 | 255 × 7/10 | 255 × 7/10 | 100 | 0 | 0 | 30 | L* 100, 0, 0, 30 | a* 100, 0, 0, 30 | b* 100, 0, 0, 30 |
|  | 0 ····· | ····· Rp ····· | ····· Rp ····· | 100 | 0 | 0 | ····· Kparam | L* 100, 0, 0, Kp | a* 100, 0, 0, Kp | b* 100, 0, 0, Kp |
|  | 0 | 255 × 2/10 | 255 × 2/10 | C_SH M_SH Y_SH K_SH | | BLANK | | L* itp2/10 | a* itp2/10 | b* itp2/10 |
|  | 0 | 255 × 1/10 | 255 × 1/10 | | | | | L* itp1/10 | a* itp1/10 | b* itp1/10 |
| K | 0 | 0 | 0 | | | | | L* CSH, MSH, YSH, KSH | a* CSH, MSH, YSH, KSH | b* CSH, MSH, YSH, KSH |

Fig. 28

| COLOR | dummyR | dummyG | dummyB | C | M | Y | K | L* | a* | b* |
|---|---|---|---|---|---|---|---|---|---|---|
| R | 255 | 0 | 0 | 0 | 100 | 100 | 0 | L* 0, 100, 100, 0 | a* 0, 100, 100, 0 | b* 0, 100, 100, 0 |
|   | 255×9/10 | 0 | 0 | 0 | 100 | 100 | 10 | L* 0, 100, 100, 10 | a* 0, 100, 100, 10 | b* 0, 100, 100, 10 |
|   | ..... | ..... | ..... | ..... | ..... | ..... | ..... | L* ..... | a* ..... | b* ..... |
|   | 255×6/10 | 0 | 0 | 0 | 100 | 100 | 40 | L* 0, 100, 100, 40 | a* 0, 100, 100, 40 | b* 0, 100, 100, 40 |
|   | 255×5/10 | 0 | 0 | 0 | 95 | 95 | 50 | L* 0, 95, 95, 50 | a* 0, 95, 95, 50 | b* 0, 95, 95, 50 |
|   | ..... | ..... | ..... | ..... | ..... | ..... | ..... | L* ..... | a* ..... | b* ..... |
| ↓ | Rp | ..... | ..... | 0 | (InkLimit−Kp)/2 | (InkLimit−Kp)/2 | Kp | L* 0, (IL−Kp)/2, (IL−Kp)/2, Kp | a* 0, (IL−Kp)/2, (IL−Kp)/2, Kp | b* 0, (IL−Kp)/2, (IL−Kp)/2, Kp |
|   | ..... | ..... | ..... | ..... | BLANK | ..... | ..... | L* ..... | a* ..... | b* ..... |
|   | 255×1/10 | 0 | 0 |   |   |   |   | L* itp1/10 | a* itp1/10 | b* itp1/10 |
| K | 0 | 0 | 0 | C_SH | M_SH | Y_SH | K_SH | L* CSH,MSH,YSH,KSH | a* CSH,MSH,YSH,KSH | b* CSH,MSH,YSH,KSH |

Fig. 38

EVEN INTERVAL PROCESSING

| COLOR | dummyR | dummyG | dummyB | C | M | Y | K | L* | a* | b* |
|---|---|---|---|---|---|---|---|---|---|---|
| W | 255 | 255 | 255 | 0 | 0 | 0 | 0 | L*$_{0,0,0,0}$ | a*$_{0,0,0,0}$ | b*$_{0,0,0,0}$ |
| ↓ | 255×9/10 | 255 | 255 | 0 | 0 | 0 | 0 | L*$_{itp1}$ | a*$_{itp1}$ | b*$_{itp1}$ |
| | 255×8/10 | 255 | 255 | 0 | 0 | 0 | 0 (BLANK) | L*$_{itp2}$ | a*$_{itp2}$ | b*$_{itp2}$ |
| | 255×7/10 | 255 | 255 | 0 | 0 | 0 | 0 | L*$_{itp3}$ | a*$_{itp3}$ | b*$_{itp3}$ |
| ⋯ | ⋯ | ⋯ | ⋯ | | | | | ⋯ | ⋯ | ⋯ |
| C | 0 | 255 | 255 | 100 | 0 | 0 | 0 | L*$_{100,0,0,0}$ | a*$_{100,0,0,0}$ | b*$_{100,0,0,0}$ |

Fig. 48

| COLOR | dummyR | dummyG | dummyB | C M Y K | L* | a* | b* |
|---|---|---|---|---|---|---|---|
| W | 255 | 255 | 255 | 0 0 0 0 | L*$_{0,0,0,0}$ | a*$_{0,0,0,0}$ | b*$_{0,0,0,0}$ |
| | 255 × 9/10 | 255 × 9/10 | 255 × 9/10 | BLANK | L*$_{itp9/10}$ | a*$_{itp9/10}$ | b*$_{itp9/10}$ |
| | 255 × 8/10 | 255 × 8/10 | 255 × 8/10 | | L*$_{itp8/10}$ | a*$_{itp8/10}$ | b*$_{itp8/10}$ |
| ↓ | ..... | ..... | ..... | | ..... | ..... | ..... |
| K | 0 | 0 | 0 | C$_{SH}$, M$_{SH}$, Y$_{SH}$, K$_{SH}$ | L*$_{CSH, MSH, YSH, KSH}$ | a*$_{CSH, MSH, YSH, KSH}$ | b*$_{CSH, MSH, YSH, KSH}$ |

Fig. 49

(A) INPUT RGB COLOR SPACE (B) L*a*b* SPACE (C) dummyRGB COLOR SPACE

COLOR CONVERSION DEFINITION CREATING METHOD, COLOR CONVERSION DEFINITION CREATING APPARATUS, AND COLOR CONVERSION DEFINITION CREATING PROGRAM STORAGE MEDIUM

BACKGROUND OF THE INVENTION

1. Field of the Invention

The present invention relates to a color conversion definition creating method of creating a color conversion definition for converting coordinate points in a color reproduction area of a device (for example, a printer) that mediates between an image and image data, in a three-dimensional color space (a RGB color space) wherein R (red), G (green), and B (blue) are established as axes, which depends on the device, into coordinate points in a color reproduction area of a print in a four-dimensional color space (a CMYK color space) wherein C (cyan), M (magenta), Y (yellow), and K (black) for printing are established as axes, a color conversion definition creating apparatus, and a color conversion definition creating program storage medium storing a color conversion definition creating program which causes an information processing apparatus such as a computer to operate as the color conversion definition creating apparatus as mentioned above.

2. Description of the Related Art

Hitherto, as an apparatus for applying a good quality of color processing for printing to image data representative of an image, there is known an apparatus that receives CMY data representative of a combination (coordinate points in a CMY color space) of density values of C, M, and Y, and outputs CMY data representative of a combination (coordinate points in a CMYK color space) of dot % of C, M, Y and K (for example, Japanese Patent Reference TokuKai Hei. 9-83824).

This apparatus relates an apparatus for performing processing input CMY data. With respect to such an apparatus, a technology is basically established, while there are proposed various improvements. And there exist many skilled persons who can operate such an apparatus to perform a good quality of color processing (this color processing is referred to as a "setup").

Recently, as technology of a color management has come into wide use, there is mounting necessity that CMYK data for a good quality of printing is obtained in accordance with color data other than CMY data. By way of an example, it happens that there is a need that upon receipt of RGB data representative of a combination (coordinate points in an RGB color space) of values of R, G, and B, there is printed an image that reproduces colors of a printed image obtained through printing by some printer based on the received RGB data.

When the RGB data is converted into the CMYK data, there is a need not only that the RGB data is converted into the CMYK data capable of obtaining the same colors on a calorimetric basis, but also that the RGB data is converted into the CMYK data excellent in printability. As a parameter of the printability, a K-value is raised. When the RGB data is converted into the CMYK data capable of obtaining the same colors on a calorimetric basis, it is necessary to determine the K-value in accordance with a printing company and a printing machine (K-plate restraint conditions).

Even if various technologies are used so as to convert the RGB data into CMY data that is excellent in printability and is the same colors on a calorimetric basis, a color matching between a color of an image outputted from a specific printer in accordance with the RGB data and a color of an image reproduced in printing is implemented only on an area in which a color reproduction area of the printer is overlapped with a color reproduction area of the printing. And thus, when the color reproduction area of the printer, that is, the outline of the printer profile, is greatly different from the color reproduction area of the printing, that is, the outline of the printing profile, while the outline of the printing profile is usually narrower, it is a problem as to how the color of the color reproduction area of the printer is converted into the color reproduction area of the printing so that an image, which is concerned with a color that is extremely close to the color of the image outputted from the printer in accordance with the RGB data and does not bring about a feeling of wrongness in color tone, is reproduced in printing (this is referred to as a gamut mapping).

With respect to a technology of the gamut mapping, there is proposed an excellent technology (cf. Japanese Patent Reference TokuKai 2001-103329). Japanese Patent Reference TokuKai 2001-103329 discloses a technology in which a direction of the mapping is determined on the device color space (for example, a device-dependence RGB color space) and an actual mapping is performed on the common color space such as an L*a*b* color space. The adoption of this technology makes it possible to cope with both fidelity in colorimetry in vicinity of a gray axis and expression of high coloring in vicinity of a surface of the gamut (a color reproduction area).

However, according to the technology proposed in Japanese Patent Reference TokuKai 2001-103329, the direct use of the technology makes it difficult to perform mapping of the RGB data into CMYK data including a K-value. And thus as disclosed in Japanese Patent Reference TokuKai 2004-007373 for instance, it is considered that an additional device for dealing with RGB data, which has a color reproduction area that is sufficiently coincident with a color reproduction area of printing, is interposed between input RGB data and CMYK data for printing, so that the gamut mapping according to the technology disclosed in Japanese Patent Reference TokuKai 2001-103329 is carried out between the input RGB data and RGB data of the additional device, and thereafter a color matching taking into consideration K-plate restraint conditions is carried out between the RGB data of the interposed device and the CMYK data for printing. Further, according to the technology of Japanese Patent Reference TokuKai 2004-007373, there is a need to actually prepare a device having a color reproduction area that is sufficiently coincident with a color reproduction area of printing. And thus according to a technology of Japanese Patent Reference TokuKai 2004-102489, it is proposed that there is performed an operation virtually preparing a device having a color reproduction area that is sufficiently coincident with a color reproduction area of printing, without actually preparing an additional device, so that the gamut mapping is carried out from the input RGB data to RGB data of the virtual device and a color matching is carried out between the RGB data of the virtual device and CMYK data of printing taking into consideration K-plate restraint conditions.

However, according to the technology of Japanese Patent Reference TokuKai 2004-102489, there is simply prepared for the device having a color reproduction area that is sufficiently coincident with a color reproduction area of printing. But, in the examination of the technology more in detail, the color reproduction area of RGB data, that is, (R,G,B)=(0,0,0)–(255,255,255), is concerned with a regular hexahedron, where the value 255 is the maximum. And when the RGB data is mapped to, for example, the L*a*b* color space, vertexes are eight. To the contrary, in case of CMYK data, there exist black represented by (C,M,Y,K)=(100,100,100,100) where C,M,Y,K represent dot % and the value 100 represents 100% in dot %, that is, the maximum, and in addition, around the black, black of redness, black of greenness, and black of blueness, such as (C,M,Y,K)=(0,100,100,100), (100,0,100,100), (100,100,0,100), respectively. Thus, CMYK data is concerned with many vertexes (generally 14 pieces of vertexes) more than RGB data. Accordingly, in case of a printer that deals with RGB data, it is strictly impossible to implement the same color reproduction area as the color reproduction area of printing. Thus, it is a problem how the difference is harmonized. Further, according to the technology of Japanese Patent Reference TokuKai 2004-102489, there is simply conceptually prepared a virtual device having a color reproduction area that is sufficiently coincident with a color reproduction area of printing, and there is prepared no specific profile of the virtual device. The profile of the virtual device may cause the adaptation to technology of the gamut mapping proposed in the above-mentioned Japanese Patent Reference TokuKai 2001-103329 to greatly vary. Accordingly, it is also an important problem as to how the profile of the virtual device is specifically defined.

Furthermore, with respect to the K-plate restraint conditions, according to the technology of Japanese Patent Reference TokuKai 2004-102489, the K-value is determined from the minimum value of C, M, Y, and thus it is possible to obtain a result somewhat satisfied on the gray axis or the vicinity of the gray axis. However, there is such a problem that it is impossible to represent particularly dark color of chroma saturation. It is not sufficient that the K-plate restraint conditions are simply satisfactorily kept. There is such a problem that even if a grey of color tone, in which four plates of CMYK are overlapped with one another, keeps monotone, it is difficult for an operator to accept that when there occurs the inversion of the tone on any of the plates. For this reason, there are needs to well keep the K-plate restraint conditions on the gray axis and in addition to prevent the four plates of CMYK from bringing about the inversion on the gray axis.

Japanese Patent Reference TokuKai 2005-268982 proposes a technology in which it is intended to solve the above-mentioned problems, and a profile of the virtual device is "suitably" defined, so that a virtual device having a color reproduction area close to the color reproduction area of printing is prepared on an algorithm basis and the K-plate restraint conditions are properly reflected on the gray axis. According to the technology disclosed in Japanese Patent Reference TokuKai 2005-268982, a combination of the technology disclosed in Japanese Patent Reference TokuKai 2001-103329 for instance makes it possible to make a color conversion definition from the RGB color space to the CMYK color space, which is faithful in colorimetry and is free from a tone fault, wherein the K-plate restraint conditions are faithfully reflected on the gray axis.

However, the technology disclosed in Japanese Patent Reference TokuKai 2005-268982 involves a problem that the tolerance to the K-plate restraint conditions is not necessarily enough. More in detail, in the event that there is set up K-plate restraint condition in which the amount of K-plate rises rapidly from a bright color to a dark color, there is a possibility that the value of K of K>0 is allotted to the point that corresponds to the high brightness color that can be reproduced only with K=0 in the color reproduction area as a result of the interpolation, and the high brightness color originally intended can not be reproduced in the print.

In order to solve such an inconvenience that the high brightness color can not be reproduced in the print, Japanese Patent Application Serial No. 2005-131936 proposes technology that the value of K of K>0 is allotted for an area near the white (W) of a surface of the color reproduction area to perform an interpolation operation taking as boundary conditions this allocation.

However, according to the technology proposed in Japanese Patent Application Serial No. 2005-131936, ink total amount limitation (sum total of the dot % of C, M, Y, and K of each point) is not considered. Therefore, it is difficult to apply such technology to the CMYK device that is severe in the ink total amount limitation, such as printers that especially print the newspaper as it is. Moreover, according to the technology proposed in Japanese Patent Application Serial No. 2005-131936, it is also difficult to arbitrarily designate CMYK value of a black spot. Therefore, it doesn't become an enough answer for the user who wants to follow CMYK values of a black spot of printing conditions conventionally used as it is, and wanting remove the color balance of the shadow from a neutral gray intentionally.

SUMMARY OF THE INVENTION

In view of the foregoing, it is an object of the present invention to provide a color conversion definition creating method of creating a color conversion definition for converting coordinate points (RGB data) in a color reproduction area of a device (for example, a printer) that mediates between an image and image data, in an RGB color space, which depends on the device, into coordinate points (CMYK data) in a color reproduction area of a print in a CMYK color space, the color conversion definition creating method being capable of increasing the degree of freedom of designation for K-plate restraint conditions of print, and also permitting to widely take the color reproduction area within the range of ink total amount limitation, a color conversion definition creating apparatus, and a color conversion definition creating program storage medium storing a color conversion definition creating program which causes an information processing apparatus such as a computer to operate as the color conversion definition creating apparatus as mentioned above.

To achieve the above-mentioned objects, the present invention provides a color conversion definition creating method of creating a color conversion definition for converting coordinate points in a color reproduction area of a first device that mediates between an image and image data, in a first RGB color space, which depends on the first device, into coordinate points in a color reproduction area of a print in a CMYK color space for printing, the color conversion definition creating method comprising:

a virtual device profile creating process of creating a virtual device profile between a predetermined common color space and a second RGB color space depending on a virtual second device that mediates an image and image data, the virtual device profile having a color reproduction area tracing the color reproduction area for printing;

a first link profile creating process of creating a first link profile for converting coordinate points in the color reproduction area of the second device in the second RGB color space into coordinate points in the color reproduction area for printing in the CMYK color space;

a virtual device profile correcting process of correcting the virtual device profile that is created in the virtual device profile creating process by referring to the printing profile and the first link profile that is created in the first link profile creating process; and a second link profile creating process of creating a second link profile for converting coordinate points in the color reproduction area of the first device in the first RGB color space into coordinate points in the color reproduction area of the second device in the second RGB color space, using the device profile of the first device and the virtual device profile that is corrected in the virtual device profile correcting process, wherein the virtual device profile creating process comprises a color reproduction area definition process in which the color reproduction area of the second device is defined in such a manner that vertexes of W, C, M, Y, R, G, B of the color reproduction area of the second device are coincident with vertexes of associated W, C, M, Y, R, G, B of the color reproduction area for printing, respectively, and edge lines for connecting the vertexes of W, C, M, Y, R, G, B of the color reproduction area of the second device with one another are coincident with the associated edge lines of the color reproduction area for printing, respectively, and with respect to the vertex of K of the color reproduction area of the second device, the vertex of K is coincident with points (C, M, Y, K)=($C_{SH}$, $M_{SH}$, $Y_{SH}$, $K_{SH}$) of K of K-plate restraint conditions for printing, and with respect to the way between the vertex of K and the respective vertexes of R, G and B of the color reproduction area of the second device, when they start from the respective vertexes of R, G and B, up to $K_{param}$ ($K_{param} < K_{SH}$) of a predetermined K value in mid way, they are tracing edge lines directed to the vertexes of points (C, M, Y, K)=(0, 100, 100, 100), (C, M, Y, K)=(100, 0, 100, 100), and (C, M, Y, K)=(100, 100, 0, 100), respectively, and after they reach the value $K_{param}$, they swerve away from the respective edge lines to construct edge lines RK, GK, and BK up to (C, M, Y, K)=($C_{SH}$, $M_{SH}$, $Y_{SH}$, $K_{SH}$), which is the vertex of K, and three edge lines connecting vertexes of R, G, B of the color reproduction area of the second device with the vertex of K are associated with the edge lines RK, GK, and BK of the color reproduction area for printing, respectively, and with respect to the way between the vertex of K and the respective vertexes of R, G and B of the color reproduction area of the second device, when they start from the respective vertexes of R, G and B, up to $K_{param}$ ($K_{param} < K_{SH}$) of a predetermined K value in mid way, they are tracing diagonal lines directed to the vertexes of points (C, M, Y, K)=(100, 0, 0, 100), (C, M, Y, K)=(0, 100, 0, 100), and (C, M, Y, K)=(0, 0, 100, 100), respectively, and after they reach the value $K_{param}$, they swerve away from the respective diagonal lines to construct diagonal lines CK, MK, and YK up to (C, M, Y, K)=($C_{SH}$, $M_{SH}$, $Y_{SH}$, $K_{SH}$), which is the vertex of K, and three diagonal lines connecting vertexes of C, M, Y of the color reproduction area of the second device with the vertex of K are associated with the diagonal lines CK, MK, and YK of the color reproduction area for printing, respectively.

According to the color conversion definition creating method of the present invention, there is adopted points (C, M, Y, K)=($C_{SH}$, $M_{SH}$, $Y_{SH}$, $K_{SH}$) of K of K-plate restraint conditions of a print on vertex of K. This feature makes it possible for a user to freely determine K-plate restraint conditions, and thereby reflecting it on creation of the color conversion definition.

Further, according to the color conversion definition creating method of the present invention as mentioned above, the edge lines RK, GK, and BK of the color reproduction area for printing, and the diagonal lines CK, MK, and YK are defined as mentioned above. This feature makes it possible to make sure of wide color reproduction area within ink total amount limitation even if the ink total amount limitation is concerned.

Further more, according to the color conversion definition creating method of the present invention as mentioned above, the virtual device profile correcting process is used to correct the virtual device profile created in the virtual device profile creating process. This feature makes it possible that the virtual device profile suits the ink total amount limitation.

In the color conversion definition creating method according to the present invention as mentioned above, it is preferable that in the virtual device profile creating process, when the ink total amount limitation is involved in construction of edge lines RK, GK, and BK, values of M and Y, Y and C, and C and M are subtracted so that the edge lines RK, GK, and BK are within the ink total amount limitation, and thereby constructing the edge lines RK, GK, and BK keeping the ink total amount below the ink total amount limitation.

There is a need to reduce an ink amount (value) of any of M, Y and K so as to satisfy the ink total amount limitation when the ink total amount limitation is involved. For example, reduction of values of M and Y on RK edge line makes it possible to satisfy the ink total amount limitation and construct the tractable color reproduction area.

In the color conversion definition creating method according to the present invention as mentioned above, it is preferable that the virtual device profile creating process further comprises:

a segment profile creating process of creating a segment profile that associates coordinate points in the second RGB color space with coordinate points in the common color space, with respect to the segments, in such a manner that when pluralities of dots are determined at even intervals on individual segments each consisting of: nine edge lines coupling vertexes of W, C, M, Y, R, G and B on the second RGB color space representative of the color reproduction area of the second device; three diagonal lines coupling the vertex of W with vertexes of R, G and B; three edge lines coupling vertexes of R, G and B with the vertex of K; and three diagonal lines coupling vertexes of C, M and Y with vertex of K, so as to map the pluralities of dots onto the common color space, the pluralities of dots mapped on the common color space are disposed on the individual segments on the common color space associated with individual segments on the second RGB color space, of segments each consisting of the diagonal lines and the edge lines on the common color space defining the color reproduction area of the second device defined in the color reproduction area definition process, and are also disposed at even intervals;

a gray axis profile creating process of creating a gray axis profile that associates coordinate points in the second RGB color space with coordinate points in the common color space, with respect to the gray axis, in such a manner that when pluralities of dots are determined at even intervals on a gray axis connecting two vertexes of W and K with one another in the color reproduction area of the second device in the second RGB color space to map the pluralities of dots onto the common color space, the pluralities of dots mapped on the common color space are disposed on the gray axis connecting two vertexes of W and K with one another defined in the color reproduction area definition process, and are also disposed at even intervals; and a profile computing process of computing a profile of a surface other than the segment lines of the color reproduction area of the second device and a profile of the interior other than the gray axis, through an interpolation operation taking as boundary conditions both the segment profile created in the segment profile creating process and the gray axis profile created in the gray axis profile creating process.

As mentioned above, the segment profile creating process and the gray axis profile creating process are used to rearrange coordinates on the edge lines and the diagonal lines in the common color space to coordinates on the edge lines and the diagonal lines in the second RGB color space so that pluralities of dots on the edge lines and the diagonal lines and pluralities of dots on the gray axis offer mutually even intervals (it is referred to "RGB liner), and determine coordinates on the gray axis. And the profile computing process is used to compute a profile of a surface other than the segment lines of the color reproduction area of the second device and a profile of the interior other than the gray axis, through an interpolation operation both the segment profile created in the segment profile creating process and the gray axis profile created in the gray axis profile creating process. This feature makes it possible to enhance adaptability to the gamut mapping technology disclosed in Japanese Patent Reference TokuKai 2001-103329, and thereby performing the gamut mapping with greater accuracy.

In the color conversion definition creating method according to the present invention as mentioned above, it is preferable that the first link profile creating process comprises:

a K-value definition process of determining K-values on points on the gray axis, a WMRY plane that is encircled by edge lines sequentially coupling W-M-R-Y-W, a WYGC plane that is encircled by edge lines sequentially coupling W-Y-G-C-W, a WCBM plane that is encircled by edge lines sequentially coupling W-C-B-M-W, the RK edge line, the GK edge line, BK edge line, the CK diagonal line, the MK diagonal line, and the YK diagonal line, of the color reproduction area of the second device in such a manner that with respect to the gray axis there is adopted a K-value that is determined by K-plate restraint conditions for printing, and with respect to the WMRY plane, the WYGC plane, and the WCBM plane, there are adopted K-value of $K \leqq 0$, and with respect to the RK edge line, the GK edge line, BK edge line, the CK diagonal line, the MK diagonal line, and the YK diagonal line, there are adopted the K-value of $0 \leqq K \leqq K_{SH}$;

a first CMYK values computing process of computing CMYK-values representative of coordinate points on the CMYK color spaces of individual points by referring to the printing profile taking as restraint conditions K-values of individual points with respect to individual points on the gray axis, the WMRY plane, the WYGC plane, the WCBM plane, the RK edge line, the GK edge line, BK edge line, the CK diagonal line, the MK diagonal line, and the YK diagonal line;

a first value adjustment process in which the value is adjusted so as to be within the ink total amount limitation value on points wherein a value of C+M+Y+K, which is an ink total amount, exceeds the ink total amount limitation value, of individual points wherein CMYK-values are computed in the first CMYK values computing process;

a K-value computing process of computing K-values of the points wherein K-values are not yet defined throughout the color reproduction area of the second device including its interior, through an interpolation operation taking as boundary conditions K-values of points which are defined in the K-value definition process, and with respect to points exceeding the ink total amount limitation value, K-values of points which are adjusted in the first value adjustment process;

a second CMYK values computing process of computing CMYK values representative of coordinate points on the CMYK color spaces of individual points by referring to the printing profile taking as restraint conditions K-values of individual points wherein K-values are newly computed in the K-value computing process; and a second value adjustment process in which the value is adjusted so as to be within the ink total amount limitation value on points wherein a value of C+M+Y+K, which is an ink total amount, exceeds the ink total amount limitation value, of individual points wherein CMYK-values are computed in the second CMYK values computing process.

Here, in a similar fashion to that of technology disclosed in Japanese Patent Reference TokuKai 2005-268982, values of K of $K \leqq 0$ are allocated to points on the WMRY plane, the WYGC plane, and the WCBM plane, and there is performed an interpolation operation taking as boundary conditions K-values of points which are defined in the K-value definition process. Accordingly, even if there is set up the K-plate restraint condition in which values of K abruptly rise from bright color to dark color, it is possible to create a color conversion definition capable of "beautifully" reproducing a high brightness color on the printing.

Further, here, according to the color conversion definition creating method of the present invention as mentioned above, values of K are defined on not only the RK edge line, the GK edge line, and BK edge line, but also the CK diagonal line, the MK diagonal line, and the YK diagonal line, which are not disclosed in Japanese Patent Reference TokuKai 2005-268982. This feature makes it possible to keep a dark high chroma color of chroma saturation too high on the printing image.

Furthermore, according to the color conversion definition creating method of the present invention as mentioned above, CMYK values of individual points are determined assuming the value of K of each point to be a restraint condition and it is judged whether the ink total amount limitation is satisfied, and with respect to the point to have exceeded the ink total amount limitation, the values are adjusted so as to satisfy the ink total amount limitation. This feature makes it possible to create the color conversion definition that satisfies the ink total amount limitation in all the points in the color reproduction area.

In the color conversion definition creating method according to the present invention as mentioned above, it is preferable that in the K-value definition process, with respect to individual points on the WMRY plane, the WYGC plane, and the WCBM plane, K-value is allotted with 0 (that is, K=0), when Chroma as set forth below is the maximum value, $$\text{Chroma}=\text{Max}(R,G,B)-\text{Min}(R,G,B)$$

where Max (R, G, B) denotes the maximum value of individual values of R, G, and B of the associated point, and Min (R, G, B) denotes the minimum value of individual values of R, G, and B of the associated point and K-value is allotted with a negative value that is larger in the absolute value as Chroma is away from the maximum value.

This feature makes it possible that with respect to an area inside of the color reproduction area and near W point on the surface of the color reproduction area, the value of $K \leqq 0$ is surely allocated by the interpolation operation and, in addition, K=0 is allocated in each vertex of R, G, B, C, M, and Y. Thus, continuousness with K>0 in the area starting from individual vertexes of those R, G, B, C, M, and Y for the K point is secured.

In the color conversion definition creating method according to the present invention as mentioned above, it is preferable that in the K-value definition process, with respect to individual points on RK edge line, the GK edge line, BK edge line, the CK diagonal line, the MK diagonal line, and the YK diagonal line, wherein K-value is established between $K_{param}$ and $K_{SH}$, K-value is allotted with a value that is determined by an interpolation operation, and with respect to the point wherein K-value, which exceeds $K_{SH}$, is determined, K-value is allotted with a value wherein K-value of the associated point is replaced by $K_{SH}$.

According to the present invention as mentioned above, with respect to individual points wherein K-value is established between $K_{param}$ and $K_{SH}$, K-value is allotted with a value that is determined by an interpolation operation. This feature makes it possible to almost certainly prevent the tone fault of K-plate. Moreover, because $K_{SH}$ is assumed to be the upper limit, K-plate restraint conditions of the user designation are faithfully kept.

In the color conversion definition creating method according to the present invention as mentioned above, it is preferable that in the first value adjustment process, on the points wherein a value of C+M+Y+K, which is an ink total amount, exceeds the ink total amount limitation value, of individual points wherein CMYK-values are computed in the first CMYK values computing process, the printing profile is referred to taking as restraint conditions K-value of the associated point, which is increased by a predetermined increment, so that CMYK-values of the associated point are determined over again.

Increment of the K-value makes it possible to adjust CMYK-values of the associated point so as to satisfy the ink total amount limitation.

In the color conversion definition creating method according to the present invention as mentioned above, it is preferable that in the first value adjustment process, on the points wherein a value of C+M+Y+K, which is an ink total amount, exceeds the ink total amount limitation value, of individual points wherein CMYK-values are computed in the first CMYK values computing process, coordinate points on the common color space of the associated point are shifted by a predetermined distance in a direction of low chroma saturation and high brightness, so that the coordinate points on the common color space after the translation are mapped on the CMYK color space by referring to the printing profile, and whereby the CMYK-values representative of coordinate points on the CMYK color space are determined over again.

Shifting coordinate points on the common color space of the associated point by a predetermined distance in a direction of low chroma saturation and high brightness makes it possible to adjust CMYK-values of the associated point so as to satisfy the ink total amount limitation.

It is acceptable to adjust CMYK-values of the associated point so as to satisfy the ink total amount limitation by applying both the increment of the K-value of the associated point and shifting coordinate points on the common color space of the associated point by a predetermined distance in a direction of low chroma saturation and high brightness.

In the color conversion definition creating method according to the present invention as mentioned above, it is preferable that in the K-value computing process, there are computed K-values of the points wherein K-values are not yet defined throughout the color reproduction area of the second device including its interior, through an interpolation operation wherein stronger weight is fixed to individual points on the gray axis as compared with individual points on the WMRY plane, the WYGC plane, the WCBM plane, the RK edge line, the GK edge line, BK edge line, the CK diagonal line, the MK diagonal line, and the YK diagonal line.

According to the present invention, there is performed an interpolation operation wherein stronger weight is fixed to individual points on the gray axis as compared with individual points on the WMRY plane, the WYGC plane, the WCBM plane, the RK edge line, the GK edge line, BK edge line, the CK diagonal line, the MK diagonal line, and the YK diagonal line. Thus, K-plate restraint conditions are faithfully kept not only on the gray axis but also in the vicinity of the gray axis. Accordingly, even if there is "discrepancy" on the gray axis between the first printer that is an existing printer and the second printer that is an imaginary printer, it is possible to maintain the K-plate restraint conditions on the first printer that is an existing printer too.

In the color conversion definition creating method according to the present invention as mentioned above, it is preferable that in the second value adjustment process, on points wherein a value of C+M+Y+K, which is an ink total amount, exceeds the ink total amount limitation value, of individual points wherein CMYK-values are computed in the second CMYK values computing process, the printing profile is referred to taking as restraint conditions K-value of the associated point, which is increased by a predetermined increment, so that CMYK-values of the associated point are determined over again.

In the color conversion definition creating method according to the present invention as mentioned above, it is preferable that in the second value adjustment process, on points wherein a value of C+M+Y+K, which is an ink total amount, exceeds the ink total amount limitation value, of individual points wherein CMYK-values are computed in the second CMYK values computing process, coordinate points on the common color space of the associated point are shifted by a predetermined distance in a direction of low chroma saturation and high brightness, so that the coordinate points on the common color space after the translation are mapped on the CMYK color space by referring to the printing profile, and whereby the CMYK-values representative of coordinate points on the CMYK color space are determined over again.

To achieve the above-mentioned objects, the present invention provides a color conversion definition creating apparatus for creating a color conversion definition for converting coordinate points in a color reproduction area of a first device that mediates between an image and image data, in a first RGB color space, which depends on the first device, into coordinate points in a color reproduction area of a print in a CMYK color space for printing, the color conversion definition creating apparatus comprising:

a virtual device profile creating section that creates a virtual device profile between a predetermined common color space and a second RGB color space depending on a virtual second device that mediates an image and image data, the virtual device profile having a color reproduction area tracing the color reproduction area for printing;

a first link profile creating section that creates a first link profile for converting coordinate points in the color reproduction area of the second device in the second RGB color space into coordinate points in the color reproduction area for printing in the CMYK color space;

a virtual device profile correcting section that corrects the virtual device profile that is created in the virtual device profile creating process by referring to the printing profile and the first link profile that is created in the first link profile creating section; and a second link profile creating section that creates a second link profile for converting coordinate points in the color reproduction area of the first device in the first RGB color space into coordinate points in the color reproduction area of the second device in the second RGB color space, using the device profile of the first device and the virtual device profile that is corrected in the virtual device profile correcting section, wherein the virtual device profile creating section comprises a color reproduction area definition section in which the color reproduction area of the second device is defined in such a manner that vertexes of W, C, M, Y, R, G, B of the color reproduction area of the second device are coincident with vertexes of associated W, C, M, Y, R, G, B of the color reproduction area for printing, respectively, and edge lines for connecting the vertexes of W, C, M, Y, R, G, B of the color reproduction area of the second device with one another are coincident with the associated edge lines of the color reproduction area for printing, respectively, and with respect to the vertex of K of the color reproduction area of the second device, the vertex of K is coincident with points (C, M, Y, K)=($C_{SH}$, $M_{SH}$, $Y_{SH}$, $K_{SH}$) of K of K-plate restraint conditions for printing, and with respect to the way between the vertex of K and the respective vertexes of R, G and B of the color reproduction area of the second device, when they start from the respective vertexes of R, G and B, up to $K_{param}$ ($K_{param}<K_{SH}$) of a predetermined K value in mid way, they are tracing edge lines directed to the vertexes of points (C, M, Y, K)=(0, 100, 100, 100), (C, M, Y, K)=(100, 0, 100, 100), and (C, M, Y, K)=(100, 100, 0, 100), respectively, and after they reach the value $K_{param}$, they swerve away from the respective edge lines to construct edge lines RK, GK, and BK up to (C, M, Y, K)=($C_{SH}$, $M_{SH}$, $Y_{SH}$, $K_{SH}$), which is the vertex of K, and three edge lines connecting vertexes of R, G, B of the color reproduction area of the second device with the vertex of K are associated with the edge lines RK, GK, and BK of the color reproduction area for printing, respectively, and with respect to the way between the vertex of K and the respective vertexes of R, G and B of the color reproduction area of the second device, when they start from the respective vertexes of R, G and B, up to $K_{param}$ ($K_{param}<K_{SH}$) of a predetermined K value in mid way, they are tracing diagonal lines directed to the vertexes of points (C, M, Y, K)=(100, 0, 0, 100), (C, M, Y, K)=(0, 100, 0, 100), and (C, M, Y, K)=(0, 0, 100, 100), respectively, and after they reach the value $K_{param}$, they swerve away from the respective diagonal lines to construct diagonal lines CK, MK, and YK up to (C, M, Y, K)=($C_{SH}$, $M_{SH}$, $Y_{SH}$, $K_{SH}$), which is the vertex of K, and three diagonal lines connecting vertexes of C, M, Y of the color reproduction area of the second device with the vertex of K are associated with the diagonal lines CK, MK, and YK of the color reproduction area for printing, respectively.

In the color conversion definition creating apparatus according to the present invention as mentioned above, it is preferable that in the virtual device profile creating section, when the ink total amount limitation is involved in construction of edge lines RK, GK, and BK, values of M and Y, Y and C, and C and M are subtracted so that the edge lines RK, GK, and BK are within the ink total amount limitation, and thereby constructing the edge lines RK, GK, and BK keeping the ink total amount below the ink total amount limitation.

In the color conversion definition creating apparatus according to the present invention as mentioned above, it is preferable that the virtual device profile creating section further comprises:

a segment profile creating section that creates a segment profile that associates coordinate points in the second RGB color space with coordinate points in the common color space, with respect to the segments, in such a manner that when pluralities of dots are determined at even intervals on individual segments each consisting of: nine edge lines coupling vertexes of W, C, M, Y, R, G and B on the second RGB color space representative of the color reproduction area of the second device; three diagonal lines coupling the vertex of W with vertexes of R, G and B; three edge lines coupling vertexes of R, G and B with the vertex of K; and three diagonal lines coupling vertexes of C, M and Y with vertex of K, so as to map the pluralities of dots onto the common color space, the pluralities of dots mapped on the common color space are disposed on the individual segments on the common color space associated with individual segments on the second RGB color space, of segments each consisting of the diagonal lines and the edge lines on the common color space defining the color reproduction area of the second device defined in the color reproduction area definition section, and are also disposed at even intervals;

a gray axis profile creating section that creates a gray axis profile that associates coordinate points in the second RGB color space with coordinate points in the common color space, with respect to the gray axis, in such a manner that when pluralities of dots are determined at even intervals on a gray axis connecting two vertexes of W and K with one another in the color reproduction area of the second device in the second RGB color space to map the pluralities of dots onto the common color space, the pluralities of dots mapped on the common color space are disposed on the gray axis connecting two vertexes of W and K with one another defined in the color reproduction area definition section, and are also disposed at even intervals; and a profile computing section that computes a profile of a surface other than the segment lines of the color reproduction area of the second device and a profile of the interior other than the gray axis, through an interpolation operation taking as boundary conditions both the segment profile created in the segment profile creating section and the gray axis profile created in the gray axis profile creating section.

In the color conversion definition creating apparatus according to the present invention as mentioned above, it is preferable that the first link profile creating section comprises:

a K-value definition section that determines K-values on points on the gray axis, a WMRY plane that is encircled by edge lines sequentially coupling W-M-R-Y-W, a WYGC plane that is encircled by edge lines sequentially coupling W-Y-G-C-W, a WCBM plane that is encircled by edge lines sequentially coupling W-C-B-M-W, the RK edge line, the GK edge line, BK edge line, the CK diagonal line, the MK diagonal line, and the YK diagonal line, of the color reproduction area of the second device in such a manner that with respect to the gray axis there is adopted a K-value that is determined by K-plate restraint conditions for printing, and with respect to the WMRY plane, the WYGC plane, and the WCBM plane, there are adopted K-value of K≦0, and with respect to the RK edge line, the GK edge line, BK edge line, the CK diagonal line, the MK diagonal line, and the YK diagonal line, there are adopted the K-value of $0 \leq K \leq K_{SH}$;

a first CMYK values computing section that computes CMYK-values representative of coordinate points on the CMYK color spaces of individual points by referring to the printing profile taking as restraint conditions K-values of individual points with respect to individual points on the gray axis, the WMRY plane, the WYGC plane, the WCBM plane, the RK edge line, the GK edge line, BK edge line, the CK diagonal line, the MK diagonal line, and the YK diagonal line;

a first value adjustment section in which the value is adjusted so as to be within the ink total amount limitation value on points wherein a value of C+M+Y+K, which is an ink total amount, exceeds the ink total amount limitation value, of individual points wherein CMYK-values are computed in the first CMYK values computing section;

a K-value computing section that computes K-values of the points wherein K-values are not yet defined throughout the color reproduction area of the second device including its interior, through an interpolation operation taking as boundary conditions K-values of points which are defined in the K-value definition section, and with respect to points exceeding the ink total amount limitation value, K-values of points which are adjusted in the first value adjustment section;

a second CMYK values computing section that computes CMYK values representative of coordinate points on the CMYK color spaces of individual points by referring to the printing profile taking as restraint conditions K-values of individual points wherein K-values are newly computed in the K-value computing section; and a second value adjustment section in which the value is adjusted so as to be within the ink total amount limitation value on points wherein a value of C+M+Y+K, which is an ink total amount, exceeds the ink total amount limitation value, of individual points wherein CMYK-values are computed in the second CMYK values computing section.

In the color conversion definition creating apparatus according to the present invention as mentioned above, it is preferable that in the K-value definition section, with respect to individual points on the WMRY plane, the WYGC plane, and the WCBM plane, K-value is allotted with 0 (that is, K=0), when Chroma as set forth below is the maximum value, Chroma=Max($R,G,B$)−Min($R,G,B$)

where Max (R, G, B) denotes the maximum value of individual values of R, G, and B of the associated point, and Min (R, G, B) denotes the minimum value of individual values of R, G, and B of the associated point and K-value is allotted with a negative value that is larger in the absolute value as Chroma is away from the maximum value.

In the color conversion definition creating apparatus according to the present invention as mentioned above, it is preferable that in the K-value definition section, with respect to individual points on RK edge line, the GK edge line, BK edge line, the CK diagonal line, the MK diagonal line, and the YK diagonal line, wherein K-value is established between $K_{param}$ and $K_{SH}$, K-value is allotted with a value that is determined by an interpolation operation, and with respect to the point wherein K-value, which exceeds $K_{SH}$, is determined, K-value is allotted with a value wherein K-value of the associated point is replaced by $K_{SH}$.

In the color conversion definition creating apparatus according to the present invention as mentioned above, it is preferable that in the first value adjustment section, on the points wherein a value of C+M+Y+K, which is an ink total amount, exceeds the ink total amount limitation value, of individual points wherein CMYK-values are computed in the first CMYK values computing section, the printing profile is referred to taking as restraint conditions K-value of the associated point, which is increased by a predetermined increment, so that CMYK-values of the associated point are determined over again.

In the color conversion definition creating apparatus according to the present invention as mentioned above, it is preferable that in the first value adjustment section, on the points wherein a value of C+M+Y+K, which is an ink total amount, exceeds the ink total amount limitation value, of individual points wherein CMYK-values are computed in the first CMYK values computing section, coordinate points on the common color space of the associated point are shifted by a predetermined distance in a direction of low chroma saturation and high brightness, so that the coordinate points on the common color space after the translation are mapped on the CMYK color space by referring to the printing profile, and whereby the CMYK-values representative of coordinate points on the CMYK color space are determined over again.

In the color conversion definition creating apparatus according to the present invention as mentioned above, it is preferable that in the K-value computing section, there are computed K-values of the points wherein K-values are not yet defined throughout the color reproduction area of the second device including its interior, through an interpolation operation wherein stronger weight is fixed to individual points on the gray axis as compared with individual points on the WMRY plane, the WYGC plane, the WCBM plane, the RK edge line, the GK edge line, BK edge line, the CK diagonal line, the MK diagonal line, and the YK diagonal line.

In the color conversion definition creating apparatus according to the present invention as mentioned above, it is preferable that in the second value adjustment section, on points wherein a value of C+M+Y+K, which is an ink total amount, exceeds the ink total amount limitation value, of individual points wherein CMYK-values are computed in the second CMYK values computing section, the printing profile is referred to taking as restraint conditions K-value of the associated point, which is increased by a predetermined increment, so that CMYK-values of the associated point are determined over again.

In the color conversion definition creating apparatus according to the present invention as mentioned above, it is preferable that in the second value adjustment section, on points wherein a value of C+M+Y+K, which is an ink total amount, exceeds the ink total amount limitation value, of individual points wherein CMYK-values are computed in the second CMYK values computing section, coordinate points on the common color space of the associated point are shifted by a predetermined distance in a direction of low chroma saturation and high brightness, so that the coordinate points on the common color space after the translation are mapped on the CMYK color space by referring to the printing profile, and whereby the CMYK-values representative of coordinate points on the CMYK color space are determined over again.

To achieve the above-mentioned objects, the present invention provides a color conversion definition creating program storage medium storing a color conversion definition creating program which causes an information processing apparatus to operate as a color conversion definition creating apparatus, when the color conversion definition creating program is executed in the information processing apparatus, wherein the color conversion definition creating apparatus creates a color conversion definition for converting coordinate points in a color reproduction area of a first device that mediates between an image and image data, in a first RGB color space, which depends on the first device, into coordinate points in a color reproduction area of a print in a CMYK color space for printing, the color conversion definition creating apparatus comprising:

a virtual device profile creating section that creates a virtual device profile between a predetermined common color space and a second RGB color space depending on a virtual second device that mediates an image and image data, the virtual device profile having a color reproduction area tracing the color reproduction area for printing;

a first link profile creating section that creates a first link profile for converting coordinate points in the color reproduction area of the second device in the second RGB color space into coordinate points in the color reproduction area for printing in the CMYK color space;

a virtual device profile correcting section that corrects the virtual device profile that is created in the virtual device profile creating process by referring to the printing profile and the first link profile that is created in the first link profile creating section; and a second link profile creating section that creates a second link profile for converting coordinate points in the color reproduction area of the first device in the first RGB color space into coordinate points in the color reproduction area of the second device in the second RGB color space, using the device profile of the first device and the virtual device profile that is corrected in the virtual device profile correcting section, wherein the virtual device profile creating section comprises a color reproduction area definition section in which the color reproduction area of the second device is defined in such a manner that vertexes of W, C, M, Y, R, G, B of the color reproduction area of the second device are coincident with vertexes of associated W, C, M, Y, R, G, B of the color reproduction area for printing, respectively, and edge lines for connecting the vertexes of W, C, M, Y, R, G, B of the color reproduction area of the second device with one another are coincident with the associated edge lines of the color reproduction area for printing, respectively, and with respect to the vertex of K of the color reproduction area of the second device, the vertex of K is coincident with points (C, M, Y, K)=($C_{SH}$, $M_{SH}$, $Y_{SH}$, $K_{SH}$) of K of K-plate restraint conditions for printing, and with respect to the way between the vertex of K and the respective vertexes of R, G and B of the color reproduction area of the second device, when they start from the respective vertexes of R, G and B, up to $K_{param}$ ($K_{param}$<$K_{SH}$) of a predetermined K value in mid way, they are tracing edge lines directed to the vertexes of points (C, M, Y, K)=(0, 100, 100, 100), (C, M, Y, K)=(100, 0, 100, 100), and (C, M, Y, K)=(100, 100, 0, 100), respectively, and after they reach the value $K_{param}$, they swerve away from the respective edge lines to construct edge lines RK, GK, and BK up to (C, M, Y, K)=($C_{SH}$, $M_{SH}$, $Y_{SH}$, $K_{SH}$), which is the vertex of K, and three edge lines connecting vertexes of R, G, B of the color reproduction area of the second device with the vertex of K are associated with the edge lines RK, GK, and BK of the color reproduction area for printing, respectively, and with respect to the way between the vertex of K and the respective vertexes of R, G and B of the color reproduction area of the second device, when they start from the respective vertexes of R, G and B, up to $K_{param}$ ($K_{param}$<$K_{SH}$) of a predetermined K value in mid way, they are tracing diagonal lines directed to the vertexes of points (C, M, Y, K)=(100, 0, 0, 100), (C, M, Y, K)=(0, 100, 0, 100), and (C, M, Y, K)=(0, 0, 100, 100), respectively, and after they reach the value $K_{param}$, they swerve away from the respective diagonal lines to construct diagonal lines CK, MK, and YK up to (C, M, Y, K)=($C_{SH}$, $M_{SH}$, $Y_{SH}$, $K_{SH}$), which is the vertex of K, and three diagonal lines connecting vertexes of C, M, Y of the color reproduction area of the second device with the vertex of K are associated with the diagonal lines CK, MK, and YK of the color reproduction area for printing, respectively.

In the color conversion definition creating program storage medium according to the present invention as mentioned above, it is preferable that in the virtual device profile creating section, when the ink total amount limitation is involved in construction of edge lines RK, GK, and BK, values of M and Y, Y and C, and C and M are subtracted so that the edge lines RK, GK, and BK are within the ink total amount limitation, and thereby constructing the edge lines RK, GK, and BK keeping the ink total amount below the ink total amount limitation.

In the color conversion definition creating program storage medium according to the present invention as mentioned above, it is preferable that the virtual device profile creating section further comprises:

a segment profile creating section that creates a segment profile that associates coordinate points in the second RGB color space with coordinate points in the common color space, with respect to the segments, in such a manner that when pluralities of dots are determined at even intervals on individual segments each consisting of: nine edge lines coupling vertexes of W, C, M, Y, R, G and B on the second RGB color space representative of the color reproduction area of the second device; three diagonal lines coupling the vertex of W with vertexes of R, G and B; three edge lines coupling vertexes of R, G and B with the vertex of K; and three diagonal lines coupling vertexes of C, M and Y with vertex of K, so as to map the pluralities of dots onto the common color space, the pluralities of dots mapped on the common color space are disposed on the individual segments on the common color space associated with individual segments on the second RGB color space, of segments each consisting of the diagonal lines and the edge lines on the common color space defining the color reproduction area of the second device defined in the color reproduction area definition section, and are also disposed at even intervals;

a gray axis profile creating section that creates a gray axis profile that associates coordinate points in the second RGB color space with coordinate points in the common color space, with respect to the gray axis, in such a manner that when pluralities of dots are determined at even intervals on a gray axis connecting two vertexes of W and K with one another in the color reproduction area of the second device in the second RGB color space to map the pluralities of dots onto the common color space, the pluralities of dots mapped on the common color space are disposed on the gray axis connecting two vertexes of W and K with one another defined in the color reproduction area definition section, and are also disposed at even intervals; and a profile computing section that computes a profile of a surface other than the segment lines of the color reproduction area of the second device and a profile of the interior other than the gray axis, through an interpolation operation taking as boundary conditions both the segment profile created in the segment profile creating section and the gray axis profile created in the gray axis profile creating section.

In the color conversion definition creating program storage medium according to the present invention as mentioned above, it is preferable that the first link profile creating section comprises:

a K-value definition section that determines K-values on points on the gray axis, a WMRY plane that is encircled by edge lines sequentially coupling W-M-R-Y-W, a WYGC plane that is encircled by edge lines sequentially coupling W-Y-G-C-W, a WCBM plane that is encircled by edge lines sequentially coupling W-C-B-M-W, the RK edge line, the GK edge line, BK edge line, the CK diagonal line, the MK diagonal line, and the YK diagonal line, of the color reproduction area of the second device in such a manner that with respect to the gray axis there is adopted a K-value that is determined by K-plate restraint conditions for printing, and with respect to the WMRY plane, the WYGC plane, and the WCBM plane, there are adopted K-value of K≦0, and with respect to the RK edge line, the GK edge line, BK edge line, the CK diagonal line, the MK diagonal line, and the YK diagonal line, there are adopted the K-value of $0 \leq K \leq K_{SH}$;

a first CMYK values computing section that computes CMYK-values representative of coordinate points on the CMYK color spaces of individual points by referring to the printing profile taking as restraint conditions K-values of individual points with respect to individual points on the gray axis, the WMRY plane, the WYGC plane, the WCBM plane, the RK edge line, the GK edge line, BK edge line, the CK diagonal line, the MK diagonal line, and the YK diagonal line;

a first value adjustment section in which the value is adjusted so as to be within the ink total amount limitation value on points wherein a value of C+M+Y+K, which is an ink total amount, exceeds the ink total amount limitation value, of individual points wherein CMYK-values are computed in the first CMYK values computing section;

a K-value computing section that computes K-values of the points wherein K-values are not yet defined throughout the color reproduction area of the second device including its interior, through an interpolation operation taking as boundary conditions K-values of points which are defined in the K-value definition section, and with respect to points exceeding the ink total amount limitation value, K-values of points which are adjusted in the first value adjustment section;

a second CMYK values computing section that computes CMYK values representative of coordinate points on the CMYK color spaces of individual points by referring to the printing profile taking as restraint conditions K-values of individual points wherein K-values are newly computed in the K-value computing section; and a second value adjustment section in which the value is adjusted so as to be within the ink total amount limitation value on points wherein a value of C+M+Y+K, which is an ink total amount, exceeds the ink total amount limitation value, of individual points wherein CMYK-values are computed in the second CMYK values computing section.

In the color conversion definition creating program storage medium according to the present invention as mentioned above, it is preferable that in the K-value definition section, with respect to individual points on the WMRY plane, the WYGC plane, and the WCBM plane, K-value is allotted with 0 (that is, K=0), when Chroma as set forth below is the maximum value, $$\text{Chroma}=\text{Max}(R,G,B)-\text{Min}(R,G,B)$$

where Max (R, G, B) denotes the maximum value of individual values of R, G, and B of the associated point, and Min (R, G, B) denotes the minimum value of individual values of R, G, and B of the associated point and K-value is allotted with a negative value that is larger in the absolute value as Chroma is away from the maximum value.

In the color conversion definition creating program storage medium according to the present invention as mentioned above, it is preferable that in the K-value definition section, with respect to individual points on RK edge line, the GK edge line, BK edge line, the CK diagonal line, the MK diagonal line, and the YK diagonal line, wherein K-value is established between $K_{param}$ and $K_{SH}$, K-value is allotted with a value that is determined by an interpolation operation, and with respect to the point wherein K-value, which exceeds $K_{SH}$, is determined, K-value is allotted with a value wherein K-value of the associated point is replaced by $K_{SH}$.

In the color conversion definition creating program storage medium according to the present invention as mentioned above, it is preferable that in the first value adjustment section, on the points wherein a value of C+M+Y+K, which is an ink total amount, exceeds the ink total amount limitation value, of individual points wherein CMYK-values are computed in the first CMYK values computing section, the printing profile is referred to taking as restraint conditions K-value of the associated point, which is increased by a predetermined increment, so that CMYK-values of the associated point are determined over again.

In the color conversion definition creating program storage medium according to the present invention as mentioned above, it is preferable that in the first value adjustment section, on the points wherein a value of C+M+Y+K, which is an ink total amount, exceeds the ink total amount limitation value, of individual points wherein CMYK-values are computed in the first CMYK values computing section, coordinate points on the common color space of the associated point are shifted by a predetermined distance in a direction of low chroma saturation and high brightness, so that the coordinate points on the common color space after the translation are mapped on the CMYK color space by referring to the printing profile, and whereby the CMYK-values representative of coordinate points on the CMYK color space are determined over again.

In the color conversion definition creating program storage medium according to the present invention as mentioned above, it is preferable that in the K-value computing section, there are computed K-values of the points wherein K-values are not yet defined throughout the color reproduction area of the second device including its interior, through an interpolation operation wherein stronger weight is fixed to individual points on the gray axis as compared with individual points on the WMRY plane, the WYGC plane, the WCBM plane, the RK edge line, the GK edge line, BK edge line, the CK diagonal line, the MK diagonal line, and the YK diagonal line.

In the color conversion definition creating program storage medium according to the present invention as mentioned above, it is preferable that in the second value adjustment section, on points wherein a value of C+M+Y+K, which is an ink total amount, exceeds the ink total amount limitation value, of individual points wherein CMYK-values are computed in the second CMYK values computing section, the printing profile is referred to taking as restraint conditions K-value of the associated point, which is increased by a predetermined increment, so that CMYK-values of the associated point are determined over again.

In the color conversion definition creating program storage medium according to the present invention as mentioned above, it is preferable that in the second value adjustment section, on points wherein a value of C+M+Y+K, which is an ink total amount, exceeds the ink total amount limitation value, of individual points wherein CMYK-values are computed in the second CMYK values computing section, coordinate points on the common color space of the associated point are shifted by a predetermined distance in a direction of low chroma saturation and high brightness, so that the coordinate points on the common color space after the translation are mapped on the CMYK color space by referring to the printing profile, and whereby the CMYK-values representative of coordinate points on the CMYK color space are determined over again.

BRIEF DESCRIPTION OF THE DRAWINGS

FIG. 20 is a view showing paths of individual edge lines and diagonal lines from starting individual vertexes of R, G, B, C, M, and Y to vertex of K wherein it is not subjected to ink total amount limitation.

FIG. 21 is a view showing tables defining edge lines connecting W and C.

FIG. 22 is a view showing tables defining edge lines connecting C and G.

FIG. 23 is a view showing tables defining diagonal lines connecting W and R.

FIG. 26 is a view showing tables defining an edge line between a vertex of R and a vertex of K.

FIG. 28 is a view showing tables defining diagonal lines connecting C and K.

FIG. 38 is a view showing CMYK values and L*a*b* values of RK edge lines where an ink total amount limitation value is 240%.

FIG. 48 is a view showing a table defining segments connecting W and C after the even interval processing.

FIG. 49 is a view showing a table representative of a gray-axis profile.

DETAILED DESCRIPTION OF PREFERRED EMBODIMENTS

Embodiments of the present invention will be described with reference to the accompanying drawings.

Figure 1:
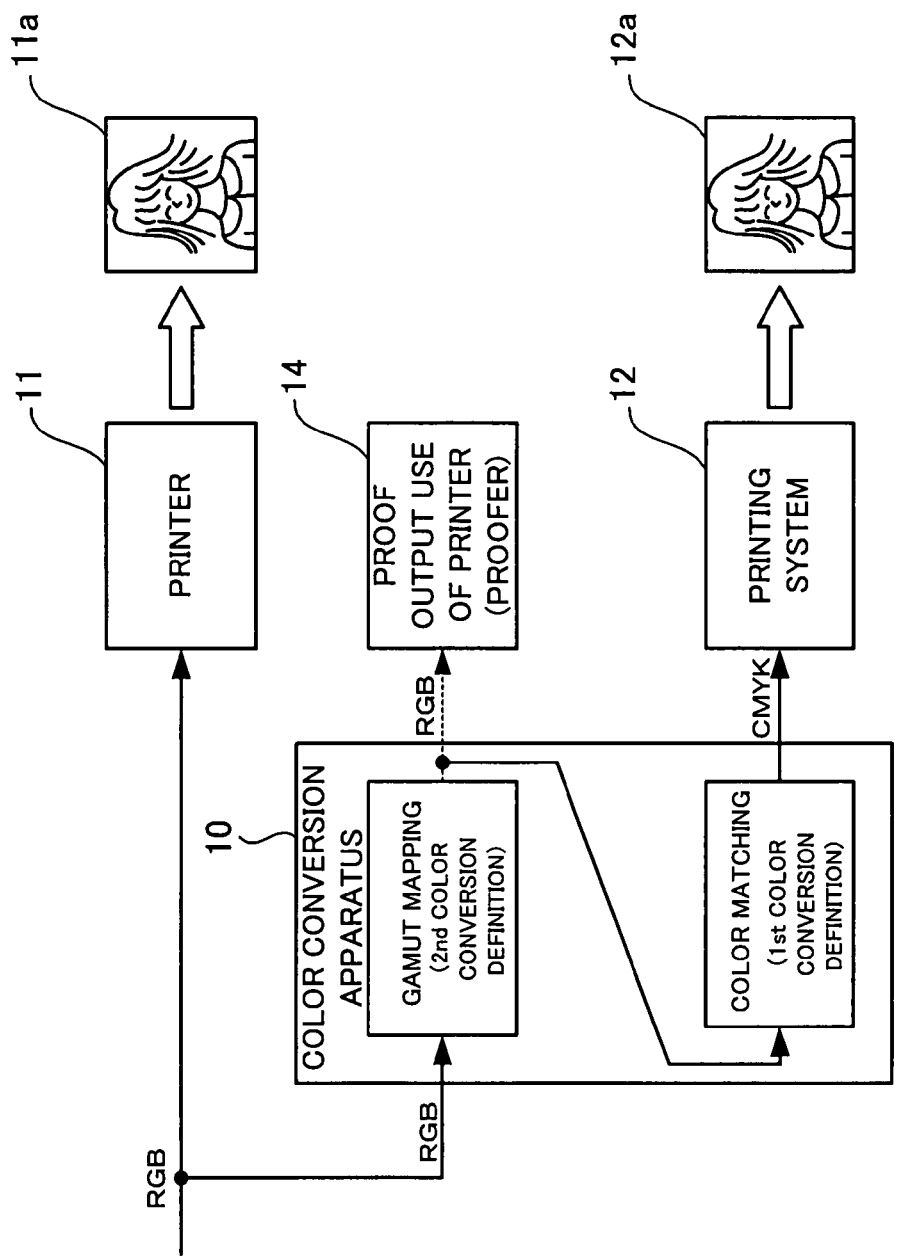
FIG. 1 is a view of a system wherein a color conversion definition, which is created in accordance with the present invention, is adopted.

FIG. 1 is a view of a system wherein a color conversion definition, which is created in accordance with the present invention, is adopted. First, there will be explained the background of the present invention.

A printer 11 receives RGB data representative of an image and outputs a printed image 11a based on the entered RGB data. Here, it is intended that a printed image 12a, in which the same color as the printed image 11a is reproduced, is created. In this case, the RGB data is fed to a color conversion apparatus 10. While details of the color conversion apparatus 10 will be described later, the color conversion apparatus 10 stores a second link profile for converting RGB data of input side (RGB data suitable for the printer 11) into RGB data suitable for a virtual proof-output use of printer (a proofer) 14, and a first link profile for converting RGB data after conversion using the second link profile into CMYK for printing, the second link profile and the first link profile being created beforehand in accordance with an embodiment of the present invention, which will be described later. The color conversion apparatus 10 performs a color conversion in accordance with the second link profile (this is referred as the gamut mapping) and also performs a color conversion in accordance with the first link profile (this is referred as the color matching), so that the RGB data of input side is converted into the CMYK data for printing. Incidentally, here, for the sake of convenience, the color conversion according to the second link profile (that is, the gamut mapping) and the color conversion according to the first link profile (that is the color matching) are separately performed. However, actually, when the RGB data of input side is converted into the CMYK data for printing, in order to perform the color conversion at high speed, the second link profile is combined with the first link profile to create a single color conversion, so that the RGB data of input side is converted into the CMYK data for printing in accordance with the combined single color conversion.

The thus created CMYK data is fed to a printing system 12. The printing system 12 creates a film original plate in accordance with the CMYK data for instance, and creates a machine plate in accordance with the film original plate to perform a printing, so that the printed image 12a is created.

When the printing system 12 is used to create the printed image 12a, it happens that a previous confirmation is carried out, for the purpose of a prediction of the finish of the printed image 12a, prior to obtaining the printed image 12a through printing by the printing system 12, since the printing system 12 is a large scale system. In this case, it is general that a proofer, which is capable of printing out a proof image that is closely similar to the printed image 12a in color, is used to perform the previous confirmation, and thus the printed image 12a is created upon previous confirmation of the finish of the printed image 12a through the proof image.

To the contrary, while it is assumed that the previous confirmation is completed in the printer 11, according to the embodiments of the present invention, which will be described later, instead of the actual proofer to be used for the previous confirmation of the printed image 12a, there is imagined the virtual proofer 14 of which the color reproduction area is sufficiently coincident with the color reproduction area of the printing system 12. The above-mentioned second link profile is for converting the RGB data of input side into RGB data suitable for the virtual proofer 14. The virtual proofer 14 is defined by a color reproduction property (a proofer profile) that is created so that the color reproduction area is sufficiently coincident with the color reproduction area of the printing system 12. The method of creating the proofer profile will be described later.

Hereinafter, for the purpose of distinction, it may happen that the RGB data of the input side is referred to as input RGB data or input RGB, and the RGB data suitable for the virtual proofer 14 is referred to as dummy RGB data or dummy RGB.

It is noted that the "proper" conversion of the input RGB data into the CMYK data by the color conversion apparatus 10 makes it possible that the printed image 12a has the same color as the printed image 11a in impression, so that the previous confirmation is completed in the printer 11.

In order that the color conversion apparatus 10 "properly" converts the input RGB data into the CMYK data, in view of the difference between the color reproduction property (a printer profile) of the printer 11 and the color reproduction property (a printing profile) of the printing system 12, it is necessary not only to implement a "well" color conversion, but also that the CMYK data obtained through the color conversion is data that is suitable for the printing system 12, that is, data that has an aptitude for printing.

When it is intended to create a color conversion definition for converting RGB data into CMYK data representative of the same color as the RGB data on a calorimetric basis in accordance with the color reproduction property (a printer profile) of the printer 11 and the color reproduction property (a printing profile) of the printing system 12, there is raised such a problem that it is unequivocally impossible to convert the RGB data into the CMYK data, by a reason that while the RGB data is concerned with three variables of R, G and B, the CMYK data is concerned with four variables of C, M, Y and K, and thus many CMYK data representative of the same color as the RGB data on a colorimetric basis exist to one RGB data. Further, there is raised such a problem that simply selecting an arbitrary one from among many CMYK data which are the same on a calorimetric basis does not secure that the CMYK data, which has an aptitude for printing, is selected.

On the other hand, in the event that RGB data is converted into data (CMY data) representative of CMY, such as block CMY and the like, and the CMY data is converted into CMYK data through inputting the CMY data to a color conversion apparatus adjusted by a person skilled in the art so as to adapt to the printing system 12, it is possible to obtain CMYK data having an aptitude for printing for the printing system 12. In this case, however, it is not ensured that the RGB data is converted into CMYK data representative of the same color as the original RGB data. Thus, there is raised such a problem that the RGB data is inadvertently converted into CMYK data representative of colors involved in "taste" of the person who perform the color adjustment and the printing company.

Further, as mentioned above, there is the difference between the color reproduction property (a printer profile) of the printer 11 and the color reproduction property (a printing profile) of the printing system 12, and there is a need to "well" absorb the difference.

Hereinafter, there will be described a technology of creating color conversion definitions (the first link profile and the second link profile shown in FIG. 1) capable of converting RGB data (coordinate points in an RGB color space) for a printer, which is suitable for the printer 11, into CMYK data (coordinate points in a CMYK color space) having an aptitude for printing for the printing system 12 and being capable of creating a printed image, which is closely in color in impression coincident with the printed image 11a that is obtained through printing output by the printer 11 according to the RGB data even if the color reproduction property (a printer profile) of the printer 11 is different from the color reproduction property (a printing profile) of the printing system 12, wherein the color conversion definitions are set up in the color conversion apparatus 10 shown in FIG. 1.

Figure 2:
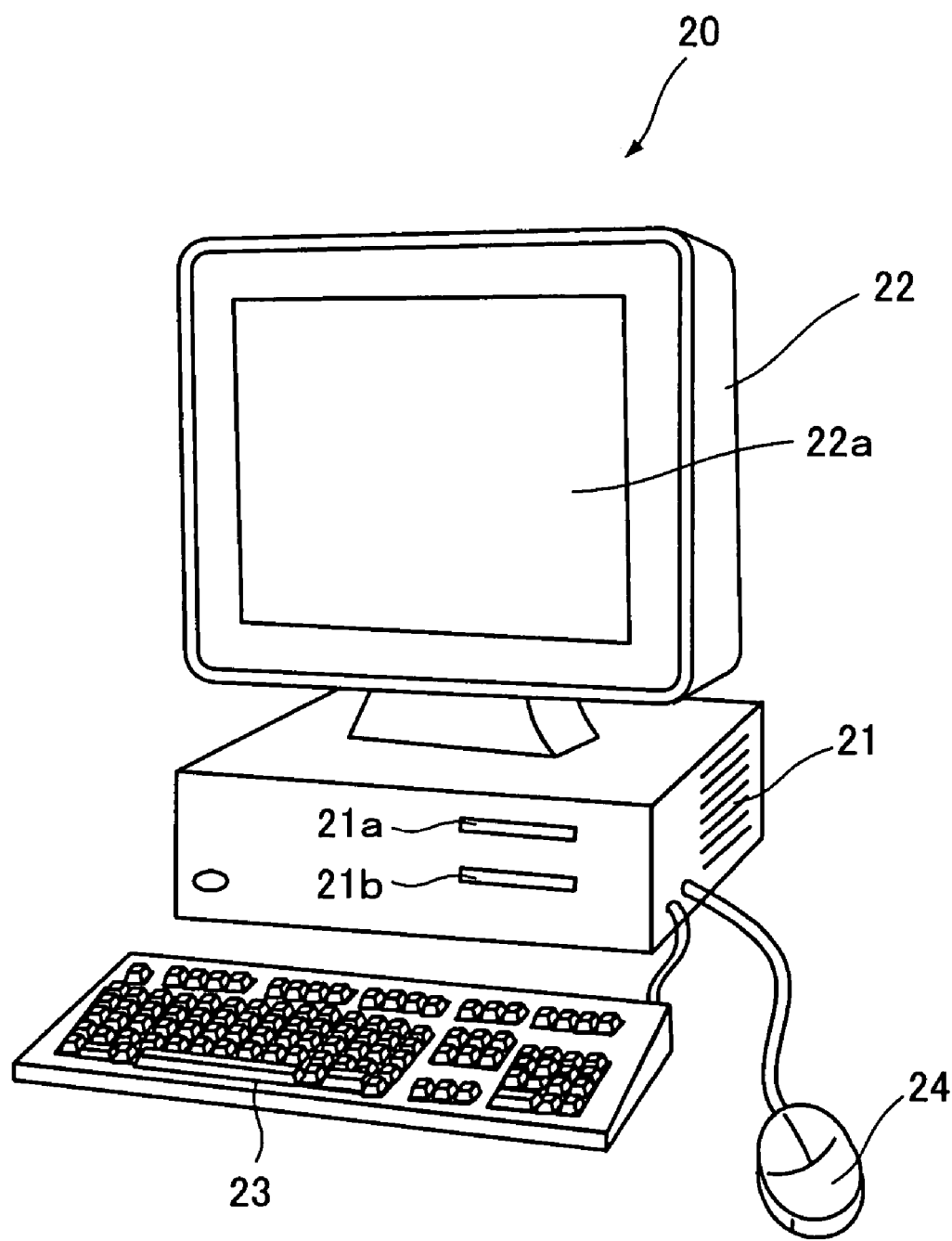
FIG. 2 is a perspective view of a personal computer constituting an embodiment of a color conversion definition creating apparatus of the present invention.
Figure 3:
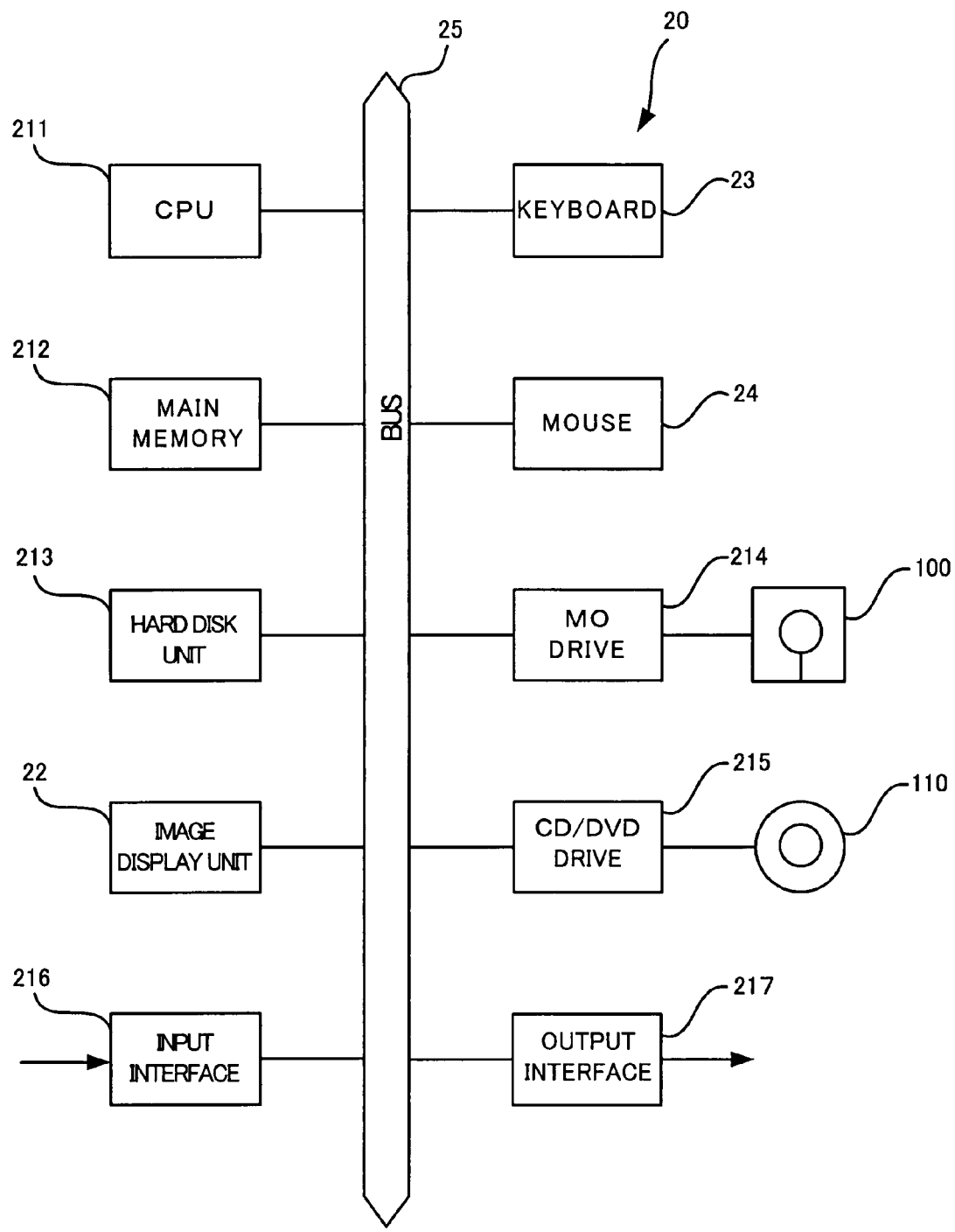
FIG. 3 is a hardware structural view of the personal computer.

FIG. 2 is a perspective view of a personal computer constituting an embodiment of a color conversion definition creating apparatus of the present invention. FIG. 3 is a hardware structural view of the personal computer.

An embodiment of a color conversion definition creating apparatus of the present invention comprises hardware and OS (an operation system) of a personal computer 20 and a color conversion definition creating program to be executed in the personal computer 20.

It is noted that the color conversion apparatus 10 shown in FIG. 1 may also be implemented on the personal computer 20, and according to the present embodiment, the personal computer 20 shown in FIG. 2 and FIG. 3, which constitutes the color conversion definition creating apparatus of the present embodiment, also serves as the color conversion apparatus 10 shown in FIG. 1 on a hardware basis. However, it is acceptable that the personal computer, which constitutes the color conversion definition creating apparatus, is a personal computer that is different from the personal computer constituting the color conversion apparatus 10 shown in FIG. 1, and a color conversion definition, which is created by the color conversion definition creating apparatus, is installed in the color conversion apparatus 10 shown in FIG. 1.

Hereinafter, first, there will be explained the hardware of the personal computer 20 shown in FIG. 2 and FIG. 3, and then there will be explained an embodiment of a color conversion definition creating method, which is implemented using the personal computer 20.

The personal computer 20 comprises, as shown in FIG. 2, on an external appearance, a main frame unit 21, an image display unit 22 for displaying an image on a display screen 22a in accordance with an instruction from the main frame unit 21, a keyboard 23 for inputting various sorts of information to the main frame unit 21 in accordance with a key operation, and a mouse 24 for inputting an instruction according to, for example, an icon and the like, through designation of an optional position on the display screen 22a, the icon and the like being displayed on the position on the display screen 22a. The main frame unit 21 has a magneto-optical disk (MO) mounting slot 21a for mounting a magneto-optical disk (MO), and a CD/DVD mounting slot 21b for mounting CD and DVD.

The main frame unit 21 comprises, as shown in FIG. 3, a CPU 211 for executing a various types of program, a main memory 212 in which a program stored in a hard disk unit 213 is read out and developed for execution by the CPU 211, the hard disk unit 213 for saving various types of programs and data, a magneto-optical disk (MO) drive 214 for accessing a magneto-optical disk (MO) 100 mounted thereon, a CD/DVD (here it is represented by a CD-ROM 110) drive 215 for accessing the CD-ROM 110 mounted thereon, an input interface 216 that receives RGB data from the exterior, where the personal computer 20 serves as the color conversion apparatus 10 shown in FIG. 1, and an output interface 217 that transmits CMYK data to the printing system 12. These various types of elements are connected via a bus 25 to the image display unit 22, the keyboard 23 and the mouse 24.

The CD-ROM 110 stores therein a color conversion definition creating program for causing the personal computer 20 to operate as a color conversion definition creating apparatus of the present invention. The CD-ROM 110 is mounted on the CD-ROM drive 215 so that the color conversion definition creating program, which is stored in the CD-ROM 110, is up-loaded on the personal computer 20 and is stored in the hard disk unit 213.

Figure 4:
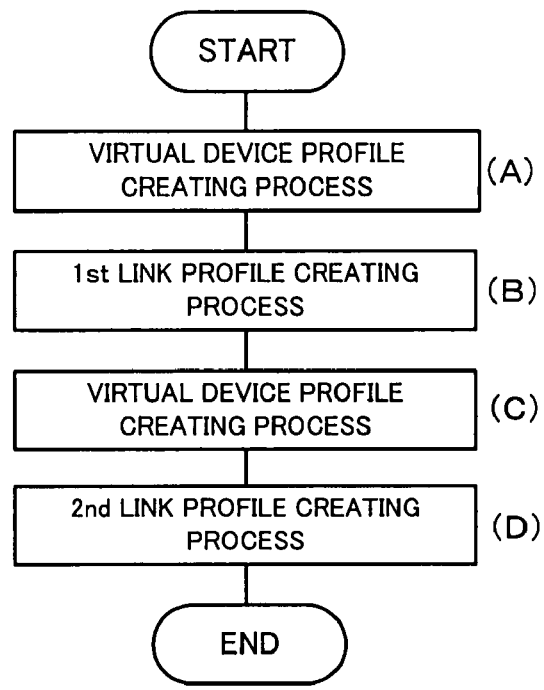
FIG. 4 is a flowchart useful for understanding an embodiment of a color conversion definition creating method of the present invention.

FIG. 4 is a flowchart useful for understanding an embodiment of a color conversion definition creating method of the present invention.

This color conversion definition creating method is of creating a color conversion definition for converting coordinate points of a color reproduction area of a first device (here, the printer 11 in FIG. 1) for mediating between an image and image data in a first RGB color space depending on the first device into coordinate points of a color reproduction area of printing in the CMYK color space for printing in the printing system 12 shown in FIG. 1. This color conversion definition creating method comprise: a virtual device profile creating process (a step (A)); a first link profile creating process (a step (B)); a virtual device profile correcting process (a step (C)); and a second link profile creating process (a step (D)).

The virtual profile creating process (a step (A)) is of creating a virtual device profile (a proofer profile) between a predetermined common color space (here L*a*b* color space) and a dummy RGB color space depending on a virtual second device (for example, the proofer 14 shown in FIG. 1) that mediates an image and image data, the virtual device profile, that is, the proofer profile, having a color reproduction area tracing the color reproduction area for printing.

The first link profile creating process (a step (B)) is of creating a first link profile for converting coordinate points in the color reproduction area of the second device (the proofer 14) in the dummy RGB color space into coordinate points in the color reproduction area for printing in the CMYK color space.

The virtual device profile correcting process (a step (C)) is of correcting the virtual device profile (a proofer profile) that is created in the virtual device profile creating process of the step (A) by referring to the printing profile and the first link profile that is created in the first link profile creating process of the step (B).

The second link profile creating process (a step (D)) is of creating the second link profile for converting coordinate points in the color reproduction area of the first device (the printer 11) in the input RGB color space into coordinate points in the color reproduction area of the second device (the proofer 14) in the dummy RGB color space, using the device profile (the printer profile) of the first device (the printer 11) and the virtual device profile (a proofer profile) that is corrected in the virtual device profile correcting process of the step (C)).

Details of the color conversion definition creating method shown in FIG. 4 will be described later.

Figure 5:
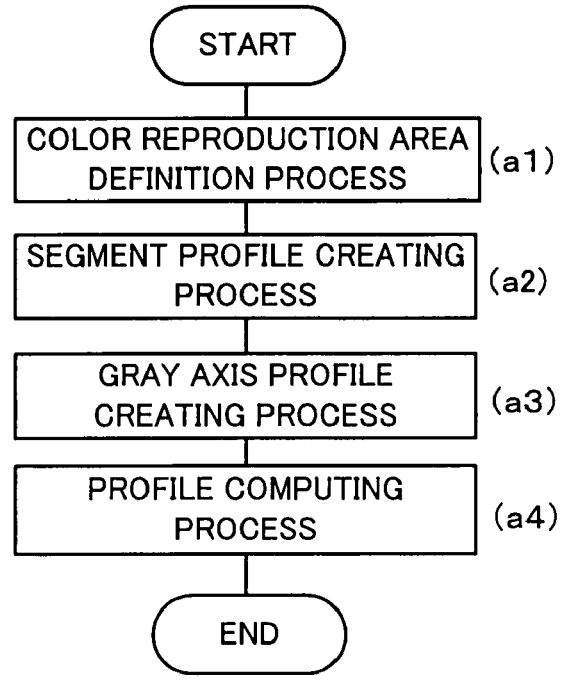
FIG. 5 is a flowchart useful for understanding details of a virtual device profile creating process of the color conversion definition creating method shown in FIG. 4.

FIG. 5 is a flowchart useful for understanding details of a virtual device profile creating process (the step (A) of the color conversion definition creating method shown in FIG. 4.

The virtual device profile creating process shown in FIG. 5 is a profile creating method of creating a virtual device profile (a proofer profile) between a predetermined common color space (here L*a*b* color space) and an RGB color space (the dummy RGB color space) depending on a virtual device (the proofer 14 shown in FIG. 1) that mediates an image and image data, the virtual device profile, that is, the proofer profile, having a color reproduction area tracing the color reproduction area for printing. The virtual device profile creating process comprises a color reproduction area definition process (a step (a1)), a segment profile creating process (a step (a2)), a gray axis profile creating process (a step (a3)), and a profile computing process (a step (a4)).

According to the color reproduction area definition process of the step (a1), the color reproduction area of the second device (the proffer 14) is defined in such a manner that vertexes of W, C, M, Y, R, G, B of the color reproduction area of the second device (the proffer 14) are coincident with vertexes of associated W, C, M, Y, R, G, B of the color reproduction area for printing, respectively, and edge lines for connecting the vertexes of W, C, M, Y, R, G, B of the color reproduction area of the second device (the proffer 14) with one another are coincident with the associated edge lines of the color reproduction area for printing, respectively, and with respect to the vertex of K of the color reproduction area of the second device (the proffer 14), the vertex of K is coincident with points (C, M, Y, K)=($C_{SH}$, $M_{SH}$, $Y_{SH}$, $K_{SH}$) of K of K-plate restraint conditions for printing, and with respect to the way between the vertex of K and the respective vertexes of R, G and B of the color reproduction area of the second device (the proffer 14), when they start from the respective vertexes of R, G and B, up to $K_{param}$ ($K_{param}$<$K_{SH}$) of a predetermined K value in mid way, they are tracing edge lines directed to the vertexes of points (C, M, Y, K)=(0, 100, 100, 100), (C, M, Y, K)=(100, 0, 100, 100), and (C, M, Y, K)=(100, 100, 0, 100), respectively, and after they reach the value $K_{param}$, they swerve away from the respective edge lines to construct edge lines RK, GK, and BK up to (C, M, Y, K)= ($C_{SH}$, $M_{SH}$, $Y_{SH}$, $K_{SH}$), which is the vertex of K, and three edge lines connecting vertexes of R, G, B of the color reproduction area of the second device (the proffer 14) with the vertex of K are associated with the edge lines RK, GK, and BK of the color reproduction area for printing, respectively, and with respect to the way between the vertex of K and the respective vertexes of R, G and B of the color reproduction area of the second device (the proffer 14), when they start from the respective vertexes of R, G and B, up to $K_{param}$ ($K_{param}$<$K_{SH}$) of a predetermined K value in mid way, they are tracing diagonal lines directed to the vertexes of points (C, M, Y, K)=(100, 0, 0, 100), (C, M, Y, K)=(0, 100, 0, 100), and (C, M, Y, K)=(0, 0, 100, 100), respectively, and after they reach the value $K_{param}$, they swerve away from the respective diagonal lines to construct diagonal lines CK, MK, and YK up to (C, M, Y, K)=($C_{SH}$, $M_{SH}$, $Y_{SH}$, $K_{SH}$), which is the vertex of K, and three diagonal lines connecting vertexes of C, M, Y of the color reproduction area of the second device (the proffer 14) with the vertex of K are associated with the diagonal lines CK, MK, and YK of the color reproduction area for printing, respectively.

According to the color reproduction area definition process of the step (a1), when there is the ink total amount limitation in construction of edge lines RK, GK, and BK, values of M and Y, Y and C, and C and M are subtracted so that the edge lines RK, GK, and BK are within the ink total amount limitation. Thus, there is constructed the edge lines RK, GK, and BK keeping the ink total amount below the ink total amount limitation.

According to the segment profile creating process of the step (a2), there is created a segment profile that associates coordinate points in the dummy RGB color space with coordinate points in the common color space (L*a*b* color space), with respect to the segments, in such a manner that when pluralities of dots are determined at even intervals on individual segments each consisting of: nine edge lines coupling vertexes of W, C, M, Y, R, G and B on the dummy RGB color space representative of the color reproduction area of the second device (the proffer 14); three diagonal lines coupling the vertex of W with vertexes of R, G and B; three edge lines coupling vertexes of R, G and B with the vertex of K; and three diagonal lines coupling vertexes of C, M and Y with vertex of K, so as to map the pluralities of dots onto the common color space (L*a*b* color space), the pluralities of dots mapped on the common color space (L*a*b* color space) are disposed on the individual segments on the common color space (L*a*b* color space) associated with individual segments on the dummy RGB color space, of segments each consisting of the diagonal lines and the edge lines on the common color space (L*a*b* color space) defining the color reproduction area of the second device (the proffer 14) defined in the color reproduction area definition process of the step (a1), and are also disposed at even intervals.

According to the gray axis profile creating process of the step (a3), there is created a gray axis profile that associates coordinate points in the dummy RGB color space with coordinate points in the common color space (L*a*b* color space), with respect to the gray axis, in such a manner that when pluralities of dots are determined at even intervals on a gray axis connecting two vertexes of W and K with one another in the color reproduction area of the device (the proffer 14) in the RGB color space (the second RGB color space) to map the pluralities of dots onto the common color space (L*a*b* color space), the pluralities of dots mapped on the common color space are disposed on the gray axis connecting two vertexes of W and K with one another defined in the color reproduction area definition process of the step (a1), and are also disposed at even intervals.

According to the profile computing process of the step (a4), there are computed a profile of a surface other than the segment lines of the color reproduction area of the second device (the proofer 14) and a profile of the interior other than the gray axis, through an interpolation operation taking as boundary conditions both the segment profile created in the segment profile creating process of the step (a2) and the gray axis profile created in the gray axis profile creating process of the step (a3).

Detailed explanation for the virtual device profile creating process of the step (A) in FIG. 4 will also be made later.

Next, there will be explained the first link profile creating process (step (B)) of the color conversion definition creating method shown in FIG. 4.

Figure 6:
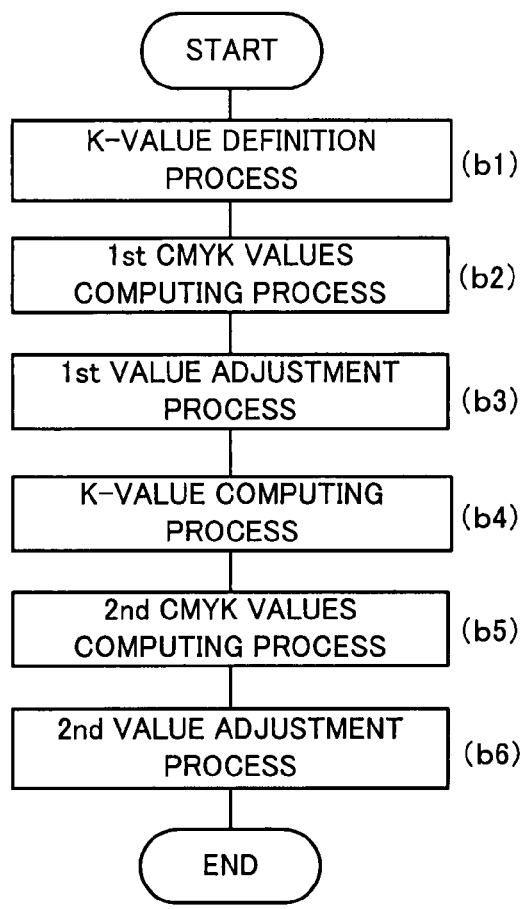
FIG. 6 is a flowchart useful for understanding details of a first link profile creating process of the color conversion definition creating method shown in FIG. 4.

FIG. 6 is a flowchart useful for understanding details of a first link profile creating process of the color conversion definition creating method shown in FIG. 4.

The first link profile creating process (the step (B) in FIG. 4), which is shown in FIG. 6, is a process of creating a first link profile for converting coordinate points in the color reproduction area of the device (the proofer 14 shown in FIG. 1) in an RGB color space (the dummy RGB color space) depending on the device (the proofer 14 shown in FIG. 1) that mediates an image and image data into coordinate points in the color reproduction area for printing in a CMYK color space for printing. The first link profile creating process (step (B) in FIG. 4) comprises a K-value definition process (a step (b1)), a first CMYK values computing process (a step (b2)), a first value adjustment process (a step (b3)), a K-value computing process (a step (b4)), a second CMYK values computing process (a step (b5)), and a second value adjustment process (a step (b6)).

According to the K-value definition process of the step (b1), there are determined K-values on points on the gray axis, a WMRY plane that is encircled by edge lines sequentially coupling W-M-R-Y-W, a WYGC plane that is encircled by edge lines sequentially coupling W-Y-G-C-W, a WCBM plane that is encircled by edge lines sequentially coupling W-C-B-M-W, the RK edge line, the GK edge line, BK edge line, the CK diagonal line, the MK diagonal line, and the YK diagonal line, of the color reproduction area of the second device (the proofer 14) in such a manner that with respect to the gray axis there is adopted a K-value that is determined by K-plate restraint conditions for printing, and with respect to the WMRY plane, the WYGC plane, and the WCBM plane, there are adopted K-value of K≦0, and with respect to the RK edge line, the GK edge line, BK edge line, the CK diagonal line, the MK diagonal line, and the YK diagonal line, there are adopted the K-value of $0 \leqq K \leqq K_{SH}$.

Specifically, according to the K-value definition process of the step (b1), with respect to individual points on the WMRY plane, the WYGC plane, and the WCBM plane, K-value is allotted with 0 (that is, K=0), when Chroma as set forth below is the maximum value, Chroma=Max(R,G,B)−Min(R,G,B)

where Max (R, G, B) denotes the maximum value of individual values of R, G, and B of the associated point, and Min (R, G, B) denotes the minimum value of individual values of R, G, and B of the associated point and K-value is allotted with a negative value that is larger in the absolute value as Chroma is away from the maximum value.

Moreover, according to the K-value definition process of the step (b1), with respect to individual points on RK edge line, the GK edge line, BK edge line, the CK diagonal line, the MK diagonal line, and the YK diagonal line, wherein K-value is established between $K_{param}$ and $K_{SH}$, K-value is allotted with a value that is determined by an interpolation operation, and with respect to the point wherein K-value, which exceeds $K_{SH}$, is determined, K-value is allotted with a value wherein K-value of the associated point is replaced by $K_{SH}$.

According to the first CMYK values computing process (the step (b2)) of the first link profile creating process (the step (B) in FIG. 4), which is shown in FIG. 6, there are computed CMYK-values representative of coordinate points on the CMYK color spaces of individual points by referring to the printing profile taking as restraint conditions K-values of individual points with respect to individual points on the gray axis, the WMRY plane, the WYGC plane, the WCBM plane, the RK edge line, the GK edge line, BK edge line, the CK diagonal line, the MK diagonal line, and the YK diagonal line.

According to the first value adjustment process of the step (b3), the value is adjusted so as to be within the ink total amount limitation value on points wherein a value of C+M+Y+K, which is an ink total amount, exceeds the ink total amount limitation value, of individual points wherein CMYK-values are computed in the first CMYK values computing process of the step (b2) of the first link profile creating process (the step (B) in FIG. 4).

More in detail, according to the first value adjustment process of the step (b3), on the points wherein a value of C+M+Y+K, which is an ink total amount, exceeds the ink total amount limitation value, of individual points wherein CMYK-values are computed in the first CMYK values computing process of the step (b2), the printing profile is referred to taking as restraint conditions K-value of the associated point, which is increased by a predetermined increment, so that CMYK-values of the associated point are determined over again. According to the present embodiment, when the value of C+M+Y+K, which is an ink total amount, exceeds the ink total amount limitation value, even if this operation is repeated by some times, the coordinate points on the common color space (L*a*b* color space) of the associated point are shifted by a predetermined distance in a direction of low chroma saturation and high brightness, so that the coordinate points on the L*a*b* color space after the translation are mapped on the CMYK color space by referring to the printing profile. As a result, the CMYK-values representative of coordinate points on the CMYK color space are determined over again. This operation makes it possible that the CMYK-values of the associated point are adjusted so as to be within the ink total amount limitation value.

According to the K-value computing process of the step (b4), there are computed K-values of the points wherein K-values are not yet defined throughout the color reproduction area of the second device (the proofer 14) including its interior, through an interpolation operation taking as boundary conditions K-values of points which are defined in the K-value definition process of the step (b1), and with respect to points exceeding the ink total amount limitation value, K-values of points which are adjusted in the first value adjustment process of the step (b3).

According to the K-value computing process of the step (b4), when K-values of individual points are computed by the interpolation operation, there are computed K-values of the points wherein K-values are not yet defined throughout the color reproduction area of the second device (the proofer 14) including its interior, through an interpolation operation wherein stronger weight is fixed to individual points on the gray axis as compared with individual points on the WMRY plane, the WYGC plane, the WCBM plane, the RK edge line, the GK edge line, BK edge line, the CK diagonal line, the MK diagonal line, and the YK diagonal line.

According to the second CMYK values computing process of the step (b5), there are computed CMYK values representative of coordinate points on the CMYK color spaces of individual points by referring to the printing profile taking as restraint conditions K-values of individual points wherein K-values are newly computed in the K-value computing process of the step (b4).

According to the second value adjustment process of the step (b6), the value is adjusted so as to be within the ink total amount limitation value on points wherein a value of C+M+Y+K, which is an ink total amount, exceeds the ink total amount limitation value, of individual points wherein CMYK-values are computed in the second CMYK values computing process of the step (b5) of the second link profile creating process (the step (D) in FIG. 4).

According to the second value adjustment process of the step (b6), in a similar fashion to that of the first value adjustment process of the step (b3), the CMYK-values of the point are adjusted so as to be within the ink total amount limitation value. More in detail, according to the second value adjustment process of the step (b6), on the points wherein a value of C+M+Y+K, which is an ink total amount, exceeds the ink total amount limitation value, of individual points wherein CMYK-values are computed in the second CMYK values computing process of the step (b5), the printing profile is referred to taking as restraint conditions K-value of the associated point, which is increased by a predetermined increment, so that CMYK-values of the associated point are determined over again. According to the present embodiment, when the value of C+M+Y+K, which is an ink total amount, exceeds the ink total amount limitation value, even if this operation is repeated by some times, the coordinate points on the common color space (L*a*b* color space) of the associated point are shifted by a predetermined distance in a direction of low chroma saturation and high brightness, so that the coordinate points on the L*a*b* color space after the translation are mapped on the CMYK color space by referring to the printing profile. As a result, the CMYK-values representative of coordinate points on the CMYK color space are determined over again. This operation makes it possible that the CMYK-values of the associated point are adjusted so as to be within the ink total amount limitation value.

Thus, according to the first link profile creating process of the step (B) of the color conversion definition creating method shown in FIG. 4, as shown in FIG. 6, there are determined CMYK-values throughout the color reproduction area, which satisfy the ink total amount limitation value. Detailed explanation for the first link profile creating process will also be made later.

FIG. 5 and FIG. 6 are concerned with detailed flowcharts of the virtual device profile creating process of the step (A) and the first link profile creating process of the step (B), respectively, of the steps (A) to (D) shown in FIG. 4. With respect to the virtual device profile correcting process of the step (C), there is no need to show the detailed flowchart, and thus detailed explanation for the step (C) will be omitted. Detailed explanation for the second link profile creating process of the step (D) will be made later.

According to the present embodiment, the color conversion definition creating method shown in FIG. 4 is implemented when a color conversion definition creating program related to the present invention is installed and executed in the personal computer 20 shown in FIG. 2 and FIG. 3.

Figure 7:
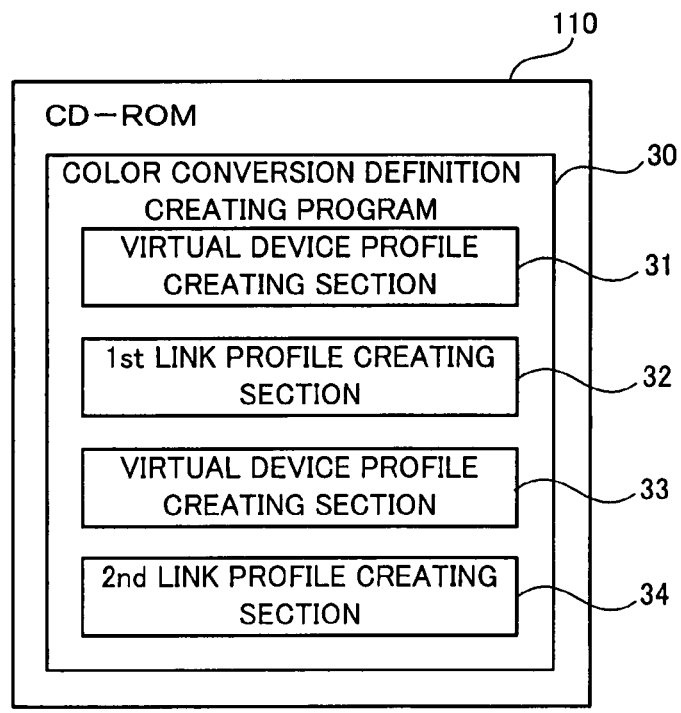
FIG. 7 is a typical structural view useful for understanding an embodiment of a color conversion definition creating program stored in a color conversion definition creating program storage medium of the present invention.

FIG. 7 is a typical structural view useful for understanding an embodiment of a color conversion definition creating program stored in a color conversion definition creating program storage medium of the present invention.

A color conversion definition creating program 30 shown in FIG. 7, which is stored in the CD-ROM 110 that is also shown in FIG. 3, causes the personal computer 20 shown in FIG. 3 to operate as a color conversion definition creating apparatus that creates a color conversion definition for converting coordinate points in a color reproduction area of a first device (the printer 11) that mediates between an image and image data, in a first RGB color space, which depends on the first device, into coordinate points in a color reproduction area of a print in a CMYK color space for printing, when the color conversion definition creating program is installed from the CD-ROM 110 into the personal computer 20 shown in FIG. 2 and FIG. 3 and executed in the personal computer 20.

The color conversion definition creating program 30 comprises a virtual profile creating section 31, a first link profile creating section 32, a virtual device profile correcting process 33, and a second link profile creating section 34.

The virtual profile creating section 31, the first link profile creating section 32, the virtual device profile correcting process 33, and the second link profile creating section 34 serve as program parts which cause the personal computer 20 shown in FIG. 2 and FIG. 3 to implement the virtual profile creating process of the step (A), the first link profile creating process of the step (B), the virtual device profile correcting process of the step (C), and the second link profile creating process of the step (D), of the color conversion definition creating method shown in FIG. 4, when the color conversion definition creating program 30 shown in FIG. 7 is installed in the personal computer 20 and is executed. Detailed explanation for the virtual profile creating section 31, the first link profile creating section 32, the virtual device profile correcting process 33, and the second link profile creating section 34 will be made later.

Figure 8:
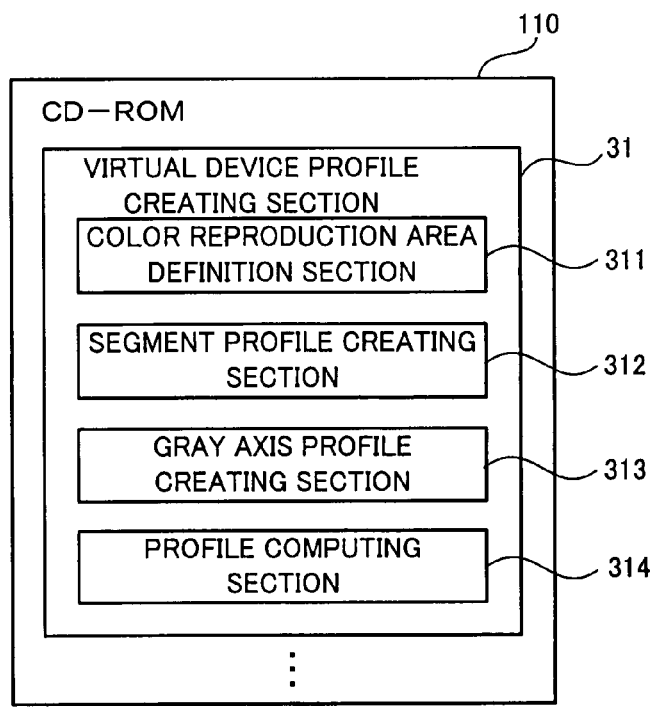
FIG. 8 is a typical structural view useful for understanding a virtual device profile creating section which is one program part of the color conversion definition creating program shown in FIG. 7.

FIG. 8 is a typical structural view useful for understanding the virtual device profile creating section 31 which is one program part of the color conversion definition creating program 30 shown in FIG. 7.

The virtual device profile creating section 31 shown in FIG. 8 comprises a color reproduction area definition section 311, an edge line profile creating section 312, a gray axis profile creating section 313, and a profile computing section 314.

The color reproduction area definition section 311, the edge line profile creating section 312, the gray axis profile creating section 313, and the profile computing section 314 serve as program parts which cause the personal computer 20 shown in FIG. 2 and FIG. 3 to implement the color reproduction area definition process of the step (a1), the segment profile creating process of the step (a2), the gray axis profile creating process of the step (a3), and the profile computing process of the step (a4), of the profile creating method shown in FIG. 5, when the virtual device profile creating program 31 shown in FIG. 8 is installed in the personal computer 20 and is executed. Detailed explanation for the color reproduction area definition section 311, the segment profile creating section 312, the gray axis profile creating section 313, and the profile computing section 314 will be made later.

Figure 9:
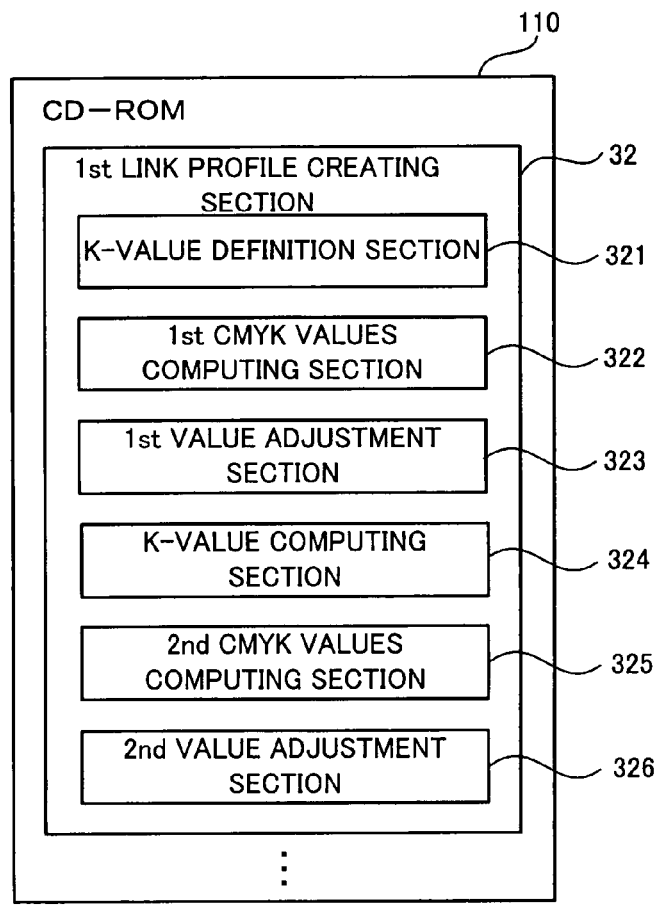
FIG. 9 is a typical structural view useful for understanding a first link profile creating section which is one program part of the color conversion definition creating program shown in FIG. 7.

FIG. 9 is a typical structural view useful for understanding the first link profile creating section 32 which is one program part of the color conversion definition creating program 30 shown in FIG. 7.

The first link profile creating section 32 shown in FIG. 9 comprises a K-value definition section 321, a first CMYK values computing section 322, a first value adjustment section 323, a K-value computing section 324, a second CMYK values computing section 325, and a second value adjustment section.

The K-value definition section 321, the first CMYK values computing section 322, the first value adjustment section 323, the K-value computing section 324, the second CMYK values computing section 325, and the second value adjustment section 326 serve as program parts which cause the personal computer 20 shown in FIG. 2 and FIG. 3 to implement the K-value definition process (a step (b1)), the first CMYK values computing process (a step (b2)), the first value adjustment process (a step (b3)), the K-value computing process (a step (b4)), the second CMYK values computing process (a step (b5)), and the second value adjustment process (a step (b6)), of the first link profile creating process shown in FIG. 6, when the first link profile creating section as the program parts shown in FIG. 9 is installed in the personal computer 20 and is executed. The K-value definition section 321, the first CMYK values computing section 322, the first value adjustment section 323, the K-value computing section 324, the second CMYK values computing section 325, and the second value adjustment section 326 also serve as program parts which implement the first link profile creating process of the step (B) of the color conversion definition creating method in FIG. 4 in its entirety. Detailed explanation for the K-value definition section 321, the first CMYK values computing section 322, the first value adjustment section 323, the K-value computing section 324, the second CMYK values computing section 325, and the second value adjustment section 326 will be made later.

Figure 10:
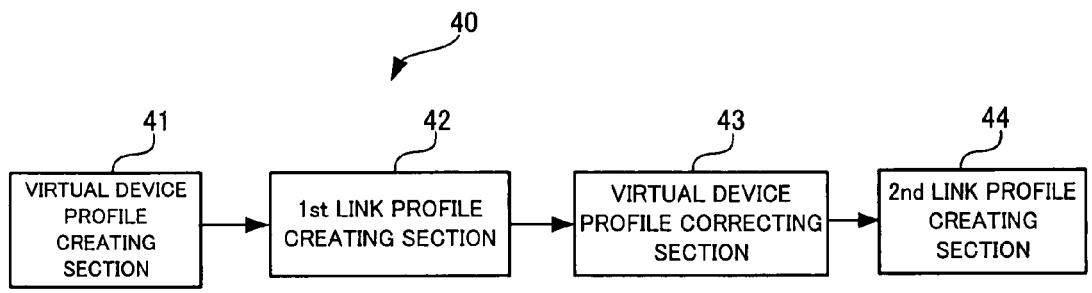
FIG. 10 is a functional structural view useful for understanding an embodiment of a color conversion definition creating apparatus of the present invention.

FIG. 10 is a functional structural view useful for understanding an embodiment of a color conversion definition creating apparatus of the present invention.

A color conversion definition creating apparatus 40 shown in FIG. 10 is constructed in the personal computer 20 shown in FIG. 2 and FIG. 3 when the color conversion definition creating program 30 shown in FIG. 7 is installed from the CD-ROM 110 shown in FIG. 7 into the personal computer 20 and executed in the personal computer 20. The color conversion definition creating apparatus 40 comprises a virtual device profile creating section 41, a first link profile creating section 42, a virtual device profile correcting section 43, and a second link profile creating section 44. The virtual device profile creating section 41, the first link profile creating section 42, the virtual device profile correcting section 43, and the second link profile creating section 44 are implemented when the virtual profile creating section 31, the first link profile creating section 32, the virtual device profile correcting process 33, and the second link profile creating section 34, of the color conversion definition creating program 30 shown in FIG. 7 are executed in the personal computer 20. Detailed explanation of those sections will be made later.

Figure 11:
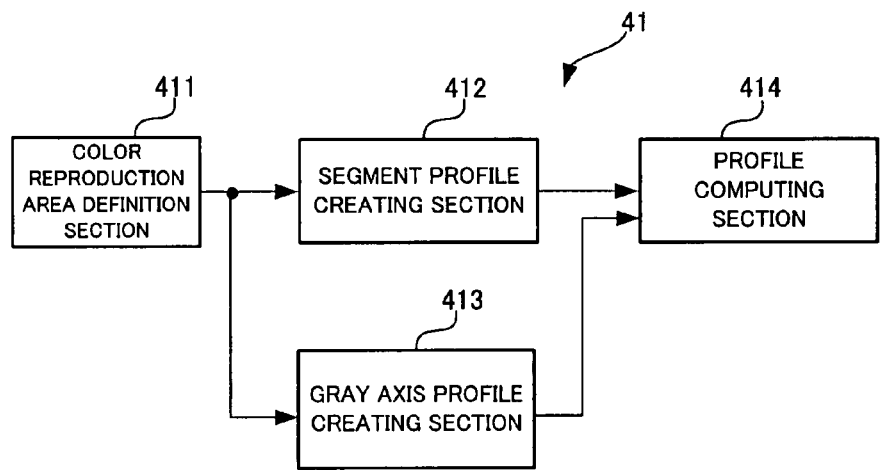
FIG. 11 is a functional structural view useful for understanding a virtual device profile creating section of the color conversion definition creating apparatus.

FIG. 11 is a functional structural view useful for understanding the virtual device profile creating section 41 of the color conversion definition creating apparatus 40.

A virtual device profile creating section 41 shown in FIG. 11 comprises a color reproduction area definition section 411, a segment profile creating section 412, a gray axis profile creating section 413, and a profile computing section 414. The color reproduction area definition section 411, the segment profile creating section 412, the gray axis profile creating section 413, and the profile computing section 414 are implemented when the color reproduction area definition section 311, the segment profile creating section 312, the gray axis profile creating section 313, and the profile computing section 314, of the virtual device profile creating section 31 as the program parts shown in FIG. 8, are executed in the personal computer 20. Detailed explanation of those sections will be made later.

Figure 12:
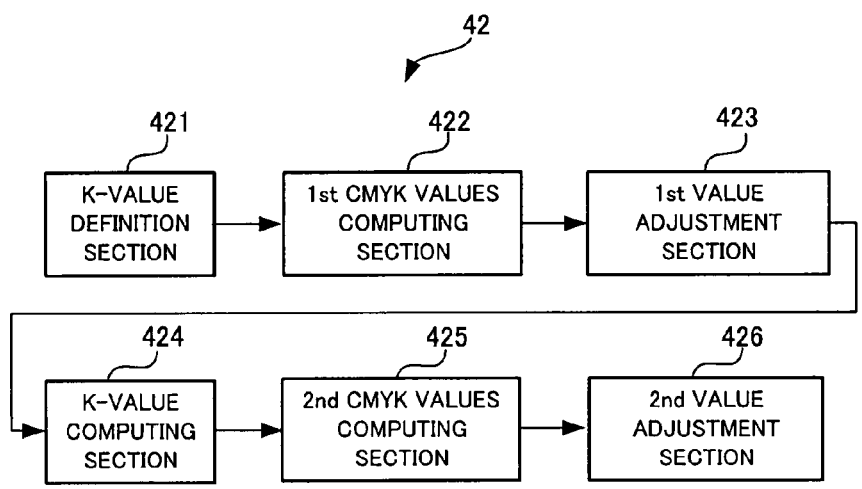
FIG. 12 is a functional structural view useful for understanding a first link profile creating section of the color conversion definition creating apparatus.

FIG. 12 is a functional structural view useful for understanding the first link profile creating section 42 of the color conversion definition creating apparatus 40 shown in FIG. 10.

The first link profile creating section 42 shown in FIG. 12 comprises a K-value definition section 421, a first CMYK values computing section 422, a first value adjustment section 423, a K-value computing section 424, a second CMYK values computing section 425, and a second value adjustment section 426.

The K-value definition section 421, the first CMYK values computing section 422, the first value adjustment section 423, the K-value computing section 424, the second CMYK values computing section 425, and the second value adjustment section 426 are implemented when the K-value definition section 321, the first CMYK values computing section 322, the first value adjustment section 323, the K-value computing section 324, the second CMYK values computing section 325, and the second value adjustment section 326, of the second color conversion definition creating section 32 as the program parts shown in FIG. 9, are executed in the personal computer 20. Detailed explanation will be made later.

Hereinafter, there will be explained together the color conversion definition creating method shown in FIG. 4, the color conversion definition creating program 30 shown in FIG. 7, and the color conversion definition creating apparatus 40 shown in FIG. 10, and there will be separately explained more in detail the virtual device profile creating process (the virtual device profile creating section 31 in FIG. 7, and the virtual device profile creating section 41 in FIG. 10) of the step (A) in FIG. 4, the first link profile creating process (the first link profile creating section 32 in FIG. 7, and the first link profile creating section 42 in FIG. 10) of the step (B) in FIG. 4, the virtual device profile correcting process (the virtual device profile correcting section 33 in FIG. 7, and the virtual device profile correcting section 43 in FIG. 10) of the step (C) in FIG. 4, and the second link profile creating process (the second link profile creating section 34 in FIG. 7, and the second link profile creating section 44 in FIG. 10) of the step (D) in FIG. 4.

Hereinafter, the explanation of the present invention will be made with reference to the color conversion definition creating method of FIG. 4 to FIG. 6. It is noted that the explanation for those methods is applicable also to the program and the apparatus.

Here, on condition that the color conversion definition creating method of FIG. 4 is implemented, it is assumed that a printer profile, a printing profile, and K-plate restraint conditions, which will be described later, are already obtained.

Figure 13:
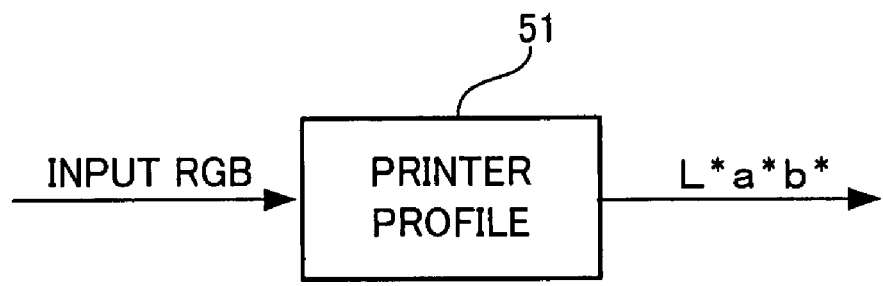
FIG. 13 is a conceptual view of a printer profile.

FIG. 13 is a conceptual view of a printer profile.

A printer profile 51 shown in FIG. 13 is a profile for the printer 11 shown in FIG. 1. The printer profile 51 associates RGB data (here, as mentioned above, it is noted as input RGB), which is fed to the printer 11, with colors (here, L*a*b* values) on the image 11a to be printed out from the printer 11. Here, the printer profile 51 is available in form of LUT (look up table).

With respect to a method of creating the printer profile 51, colorimetric values (L*a*b* values) of color patches are obtained in such a manner that the input RGB data, which is obtained when values of R, G and B are varied, is fed to the printer 11 to print out a color chart consisting of a large number of color patches, so that the color patches constituting the color chart are measured by a colorimeter. Basically, the association of the input RGB values with the colorimetric values (L*a*b* values) thus obtained is the printer profile 51. A method of creating the printer profile 51 is well known and thus the detailed explanation will be omitted.

Figure 14:
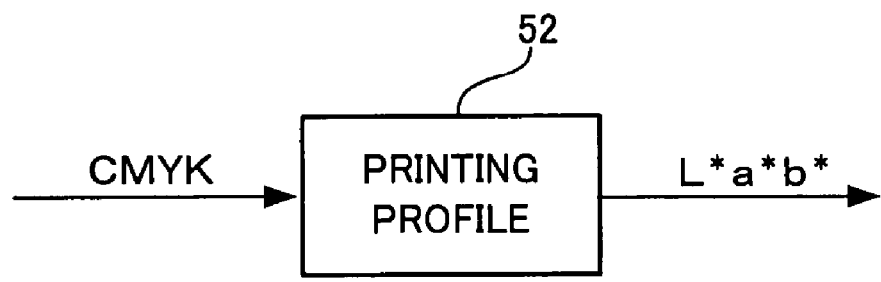
FIG. 14 is a conceptual view of a printing profile.

FIG. 14 is a conceptual view of a printing profile.

A printing profile 52 shown in FIG. 14 is a profile of the printing system 12 shown in FIG. 1. And in a similar fashion to that of the printer profile 51 shown in FIG. 13, the printing profile 52 associates CMYK data fed to the printing system 12 with colors (here, L*a*b* values) on the image 12a on the printed matter printed by the printing system 12. The printing profile 52 is also available in form of LUT (look up table). A method of creating the printing profile 52 is principally also similar to the method of creating the printer profile 51, and it is well known and thus the detailed explanation will be omitted.

The printing profile 52 is not coincident with the printer profile 51 in the color reproduction area, and has such characteristics that the color reproduction area of the printing profile 52 is narrower as compared with the printer profile 51 of a printer that prints a proof sample of printing. While the printer profile 51 in FIG. 13 is a profile (LUT) that associates three-dimensional data of the input RGB with three-dimensional data of L*a*b* (LUT), the printing profile 52 in FIG. 14 is a profile (LUT) that associates four-dimensional data of CMYK with three-dimensional data of L*a*b* (LUT).

Figure 15:
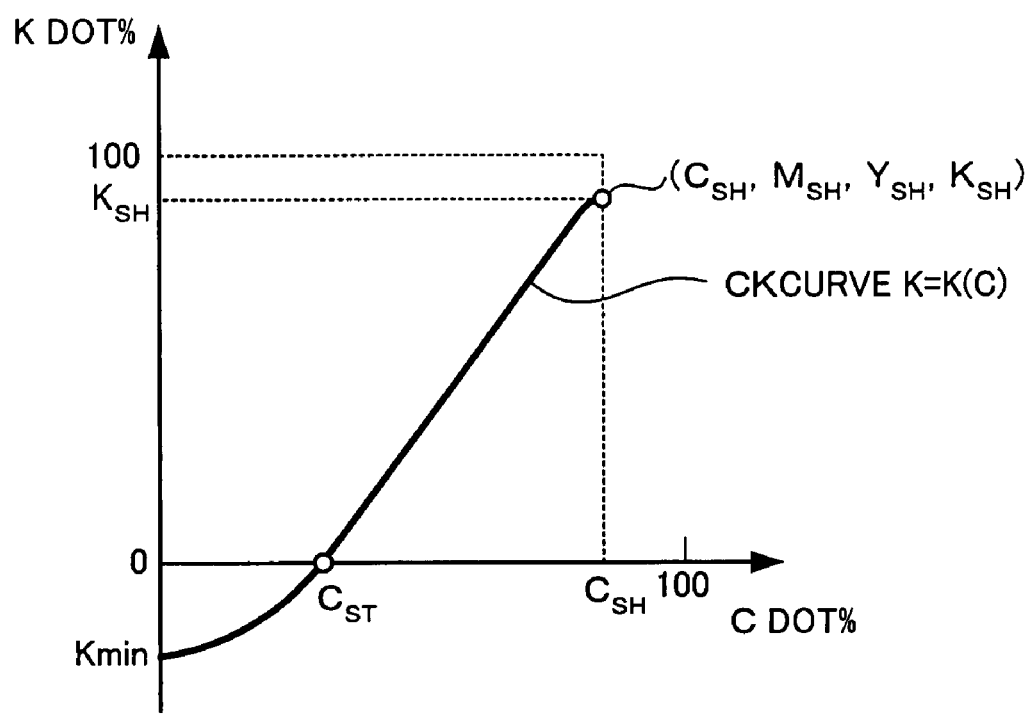
FIG. 15 is a view useful for understanding K-plate restraint conditions shown by way of example.

FIG. 15 is a view useful for understanding K-plate restraint conditions shown by way of example.

According to the example shown here, the K-value is defined in form of a function (CK curve: K=K(C)) in which a value of C (cyan) is variable. For example, as shown in FIG. 15, in an area wherein a value of C is small, K<0, and in the overall area, it is a function wherein K is monotonously increased. The K-plate restraint condition is determined in accordance with way of thinking and taste for printing of the printing company. And with respect to the gray axis, it is requested to faithfully keep the K-plate restraint condition. However, there cannot realistically be K<0, and when the value of K finally allocated about each point in the color reproduction area (The boundary is included) is K<0, the value of K of the respect is changed to K=0.

The user can specify the details for the K-plate restraint condition. That is, a value of C of the start point of K: $C_{ST}$, CMYK values of the black spot: $C_{SH}M_{SH}Y_{SH}K_{SH}$, and CK curve K=K(C) can be freely adjusted. Moreover, when CMYK values of the black spot: $C_{SH}M_{SH}Y_{SH}K_{SH}$ are designated, the ink total amount limitation value is designated to $C_{SH}+M_{SH}+Y_{SH}+K_{SH}$. For instance, when $C_{SH}=86$, $M_{SH}=85$, $Y_{SH}=84$, and $K_{SH}=89$ are designated for CMYK value of a black spot, ink total amount limitation values: $C_{SH}+M_{SH}+Y_{SH}+K_{SH}=86+85+84+89=344$ are designated at the same time. It is noted that individual values of C, M, Y, and K are expressed by dot %, and are within the range of 0-100. Therefore, when the ink total amount is not limited, the ink total amount becomes 400 or less.

Figure 16:
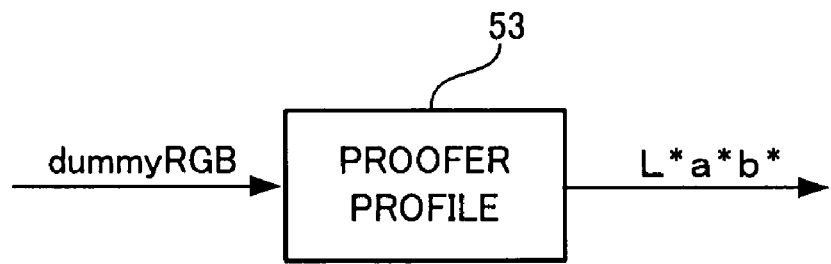
FIG. 16 is a conceptual view of a proofer profile.

FIG. 16 is a conceptual view of a proofer profile that is a profile created in the profile creating process of the step (A) of the color conversion definition creating method of FIG. 4.

A proofer profile 53 shown in FIG. 16 is a profile for the proofer 14, which is a virtual printer, as shown in FIG. 1. The proofer profile 53 is a LUT that associates RGB data (as mentioned above, here, it is denoted as dummy RGB for the purpose of distinction from the RGB data to be entered into the printer 11 shown in FIG. 1), which is fed to the proofer 14, with colors (L*a*b* values) on the image to be printed out from the proofer 14. The proofer profile 53 is a profile for the virtual proofer 14, and is theoretically created in the manner as will be described hereinafter.

Figure 17:
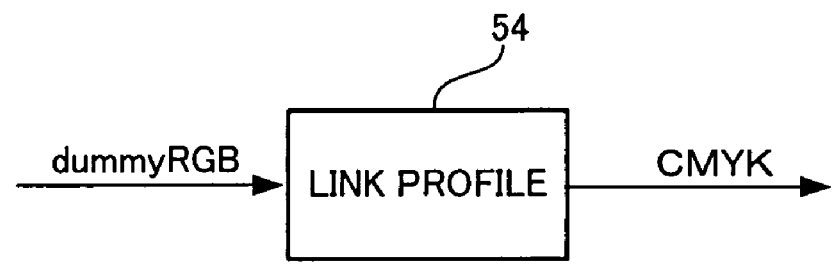
FIG. 17 is a conceptual view of a link profile.

FIG. 17 is a conceptual view of a link profile that is a profile created in the first link profile creating process of the step (B) of the color conversion definition creating method of FIG. 4.

A link profile 54 shown in FIG. 17 corresponds to the first link profile of the color conversion definition creating method of the present invention. The link profile 54 is a LUT that indicates an association between dummy RGB values, that is, values of RGB data to be entered into the proofer 14 in FIG. 1, and CMYK values, that is, values of CMYK data to be entered into the printing system 12 in FIG. 1.

According to the virtual device profile creating process of the step (A) of the color conversion definition creating method of FIG. 4, there is created the proofer profile 53 shown in FIG. 16 when the color reproduction area definition process (the step (a1)), the segment profile creating process (the step (a2)), the gray axis profile creating process (the step (a3)), and the profile computing process (the step (a4)), of the profile creating method in FIG. 5, are sequentially executed. Detailed explanation will be made hereinafter.

According to the color reproduction area definition process (the step (a1) of FIG. 5), with respect to vertexes of W (white), C (cyan), M (magenta), Y (yellow), R (red), G (green), and B (blue), of the color reproduction area of the proofer 14 in FIG. 1, that is, vertexes excepting K (black), those vertexes are coincident with vertexes of the associated W, C, M, Y, R, G, and B, of the color reproduction area of printing, respectively, edge lines connecting the vertexes of W, C, M, Y, R, G, and B, of the color reproduction area of the proofer 14 with one another are coincident with the associated edge lines of the color reproduction area of printing, respectively, and three diagonal lines connecting the vertex of W of the color reproduction area with vertexes of R, G and B one another are coincident with the associated diagonal lines of the color reproduction area of printing, respectively.

Further, according to the color reproduction area definition process (the step (a1)), the color reproduction area of the proffer 14 is defined in such a manner that with respect to the vertex of K of the color reproduction area of the proffer 14, the vertex of K is coincident with points $(C, M, Y, K)=(C_{SH}, M_{SH}, Y_{SH}, K_{SH})$ of K of K-plate restraint conditions for printing, and with respect to the way between the vertex of K and the respective vertexes of R, G and B of the color reproduction area of the second device (the proffer 14), when they start from the respective vertexes of R, G and B, up to $K_{param}$ ($K_{param}<K_{SH}$) of a predetermined K value in mid way, they are tracing edge lines directed to the vertexes of points (C, M, Y, K)=(0, 100, 100, 100), (C, M, Y, K)=(100, 0, 100, 100), and (C, M, Y, K)=(100, 100, 0, 100), respectively, and after they reach the value $K_{param}$, they swerve away from the respective edge lines to construct edge lines RK, GK, and BK up to $(C, M, Y, K)=(C_{SH}, M_{SH}, Y_{SH}, K_{SH})$, which is the vertex of K, and three edge lines connecting vertexes of R, G, B of the color reproduction area of the second device (the proffer 14) with the vertex of K are associated with the edge lines RK, GK, and BK of the color reproduction area for printing, respectively, and with respect to the way between the vertex of K and the respective vertexes of R, G and B of the color reproduction area of the second device (the proffer 14), when they start from the respective vertexes of R, G and B, up to $K_{param}$ ($K_{param}<K_{SH}$) of a predetermined K value in mid way, they are tracing diagonal lines directed to the vertexes of points (C, M, Y, K)=(100, 0, 0, 100), (C, M, Y, K)=(0, 100, 0, 100), and (C, M, Y, K)=(0, 0, 100, 100), respectively, and after they reach the value $K_{param}$, they swerve away from the respective diagonal lines to construct diagonal lines CK, MK, and YK up to $(C, M, Y, K)=(C_{SH}, M_{SH}, Y_{SH}, K_{SH})$, which is the vertex of K, and three diagonal lines connecting vertexes of C, M, Y of the color reproduction area of the second device (the proffer 14) with the vertex of K are associated with the diagonal lines CK, MK, and YK of the color reproduction area for printing, respectively.

Thus, the color reproduction area of the proffer 14 is defined in the manner as mentioned above. Vertexes of the color reproduction area of printing, and positions on the L*a*b* color space associated with the points (C, M, Y, K) on the edge lines and the diagonal lines can be determined in accordance with the printing profile shown in FIG. 14. With respect to the edge lines and the diagonal lines coupling K with R, G, B, C, M and Y, there will occur a section that is not determined at this stage. However, there is no problem in this respect. Details will be described later.

Next, there will be described the color reproduction area of printing with reference to the figures.

Figure 18:
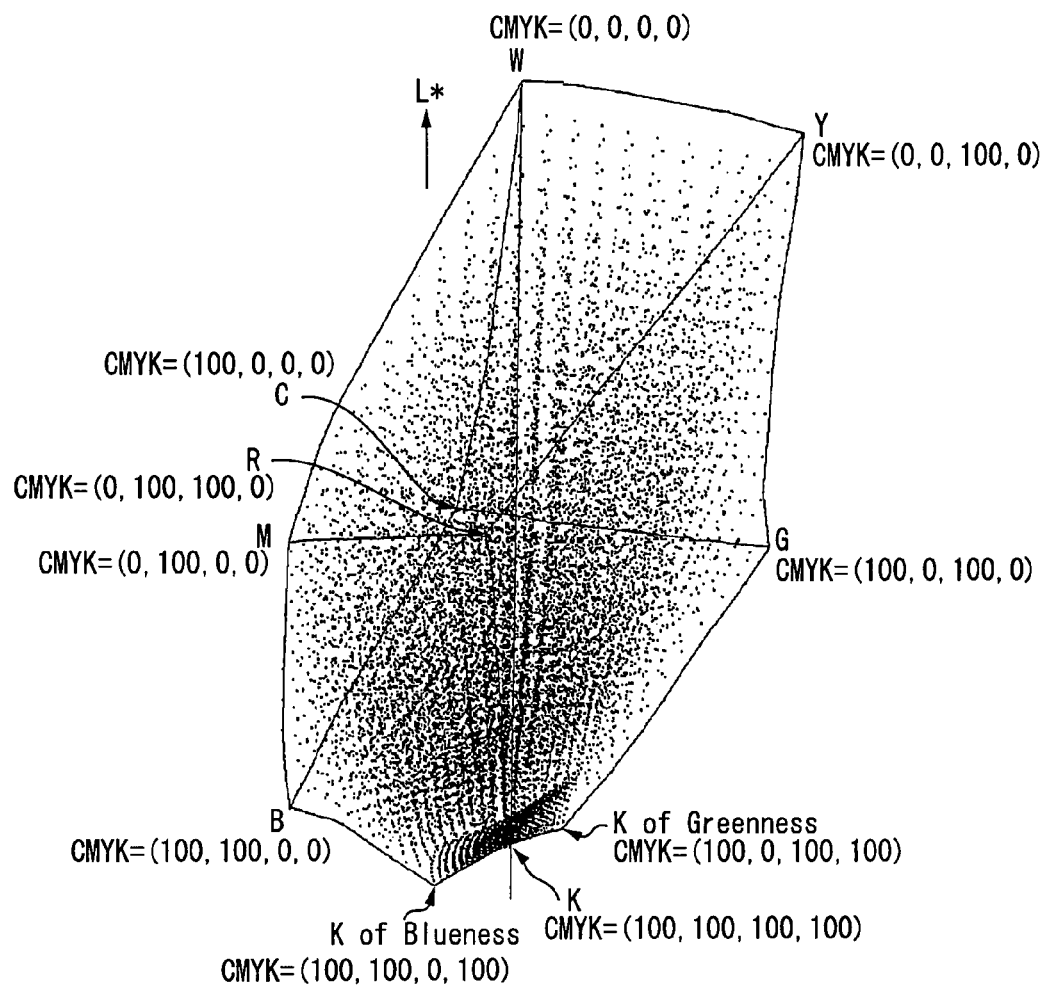
FIG. 18 is a view useful for understanding a color reproduction area of printing shown by way of example.
Figure 19:
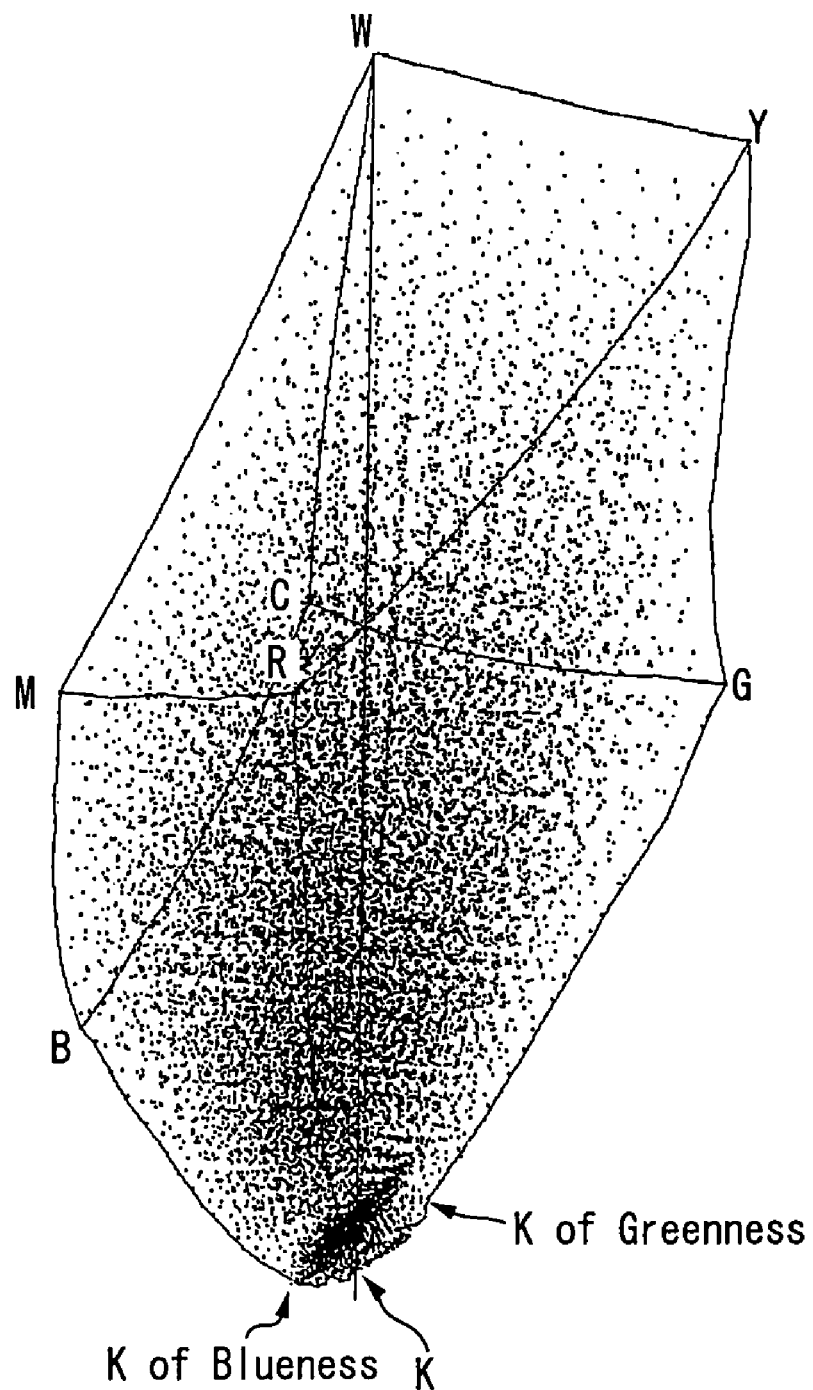
FIG. 19 is a view useful for understanding a color reproduction area of printing shown by way of example.

FIG. 18 and FIG. 19 are each a view useful for understanding a color reproduction area of printing shown by way of example.

FIG. 18 and FIG. 19 can be conceptually determined in accordance with the printing profile 52 shown in FIG. 14, but actually determined in accordance with a different type of printing profile which is different in the internal definition (an association between CMYK and L*a*b*).

FIG. 18 and FIG. 19 show each a color reproduction area of printing on the L*a*b* color space. In those figures, dots denote lattice points of the LUT which defines the printing profile, and solid lines surrounding the dots denote edge lines that connect vertexes with one another.

Each of the color reproduction areas of printing of FIG. 18 and FIG. 19 has a "squashed" configuration. Vertexes of W, C, M, Y, R, G and B are each established by one, but in vicinity of K there are concentrated some vertexes as well as vertexes (C, M, Y, K)=(100, 100, 100, 100).

FIG. 20 is a view showing paths of individual edge lines and diagonal lines from starting individual vertexes of R, G, B, C, M, and Y to vertexes of K (C, M, Y, K)=(100, 100, 100, 100) wherein it is not subjected to ink total amount limitation.

In FIG. 20, K is a variable of 0<K<100. On the path starting from the vertex of R to the vertex of K, there exists the vertex of K of redness ((C, M, Y, K)=(0, 100, 100, 100). On the path starting from the vertex of G to the vertex of K, there exists the vertex of K of greenness ((C, M, Y, K)=(100, 0, 100, 100). On the path starting from the vertex of B to the vertex of K, there exists the vertex of K of blueness ((C, M, Y, K)=(100, 100, 0, 100).

Likely, on the path starting from the vertex of C to the vertex of K, there exists the vertex of K of cyan ((C, M, Y, K)=(100, 0, 0, 100). On the path starting from the vertex of M to the vertex of K, there exists the vertex of K of magenta ((C, M, Y, K)=(0, 100, 0, 100). On the path starting from the vertex of Y to the vertex of K, there exists the vertex of K of yellowness ((C, M, Y, K)=(0, 0, 100, 100).

Here, it is possible to determine the color reproduction area of the proffer 14 wherein a plurality of vertexes of K is "well" absorbed, in the manner as set forth below.

According to the color reproduction area definition process (the step (a1) of FIG. 5), first, the vertex (the white point) of W in the color reproduction area of the proofer 14, that is, (R, G, B)=(255, 255, 255) (here the value 255 is the maximum value in the color reproduction area of the proofer 14 in the dummy RGB color space), is associated with a paper color of the printed matter, that is, (C, M, Y, K)=(0, 0, 0, 0).

As the vertex (the black point) of K in the color reproduction area of the proofer 14, that is, (R, G, B)=(0, 0, 0) (here the value 0 is the minimum value in the color reproduction area of the proofer 14 in the dummy RGB color space), in the manner as mentioned above, there is adopted the point $(C, M, Y, K)=(C_{SH}, M_{SH}, Y_{SH}, K_{SH})$ of K in the K-plate restraint condition K=K(C) shown in FIG. 15.

Vertexes other than W and K, that is, vertexes of C, M, Y, R, G and B, are coincident with vertexes C, M, Y, R, G and B in the color reproduction area for printing on the L*a*b* color space. Further, three edge lines connecting W to C, M and Y, three diagonal lines connecting W to R, G and B, and six edge lines connecting C to G and B, M to B and R, and Y to R and G, are also coincident with the associated edge lines and diagonal lines in the color reproduction area for printing on the L*a*b* color space.

FIG. 21 is a view showing tables defining edge lines connecting W and C. FIG. 22 is a view showing tables defining edge lines connecting C and G. FIG. 23 is a view showing tables defining diagonal lines connecting W and R.

In FIG. 21, (R, G, B)=(255, 255, 255) is associated with a white point (C, M, Y, K)=(0, 0, 0, 0). The L*a*b* values of the white point are denoted by $L^*_{0,0,0,0}$, $a^*_{0,0,0,0}$, $b^*_{0,0,0,0}$, representative of white of a sheet.

The table of FIG. 21 shows an association table in which CMYK values are varied by 10 (here specifically values of C vary by 10), and (R, G, B)=(255×(9/10), 255, 255) is associated with (C, M, Y, K)=(10, 0, 0, 0). The associated L*a*b* values are denoted by $L^*_{10,0,0,0}$ $a^*_{10,0,0,0}$ $b^*_{10,0,0,0}$. Hereinafter, in a similar fashion, there is established an association tracing the edge line connecting W to C, in which the vertex of C: (R, G, B)=(0, 255, 255) is associated with (C, M, Y, K)=(100, 0, 0, 0). The associated L*a*b* values are denoted by $L^*_{100,0,0,0}$ $a^*_{100,0,0,0}$ $b^*_{100,0,0,0}$.

An association between values of dummy RGB and values of C, M, Y, K establishes an association of an edge line connecting W to C, and an association between CMYK and L*a*b* is determined from the printing profile 52 shown in FIG. 14.

In the highest stage of the table in FIG. 22, in a similar fashion to the lowest stage of the table in FIG. 21, the vertex of C: (R, G, B)=(0, 255, 255) is associated with the vertex of C: (C, M, Y, K)=(100, 0, 0, 0). The associated L*a*b* values are denoted by $L^*_{10,0,0,0}$ $a^*_{10,0,0,0}$ $b^*_{10,0,0,0}$. A point of (R, G, B)=(0, 255, 255×(9/10)) is associated with (C, M, Y, K)=(100, 0, 10, 0) from the vertex of C to the vertex of G. The associated L*a*b* values are denoted by $L^*_{100,0,10,0}$ $a^*_{10,0,10,0}$ $b^*_{10,0,10,0}$. Hereinafter, in a similar fashion, there is established an association tracing the edge line connecting C to G, in which the vertex of G: (R, G, B)=(0, 255, 0) is associated with the vertex of G: (C, M, Y, K)=(100, 0, 100, 0). The associated L*a*b* values are denoted by $L^*_{100,0,100,0}$ $a^*_{100,0,100,0}$ $b^*_{100,0,100,0}$.

In the highest stage of the table in FIG. 23, in a similar fashion to the highest stage of the table in FIG. 21, the vertex of W: (R, G, B)=(255, 255, 255) is associated with (C, M, Y, K)=(0, 0, 0, 0). The associated L*a*b* values are denoted by $L^*_{0,0,0,0}$ $a^*_{0,0,0,0}$ $b^*_{0,0,0,0}$.

A point of (R, G, B)=(255, 255×(9/10), 255×(9/10)) is associated with (C, M, Y, K)=(0, 10, 10, 0) from the vertex of W to the vertex of R. The associated L*a*b* values are denoted by $L^*_{0,10,10,0}$ $a^*_{0,10,10,0}$ $b^*_{0,10,10,0}$. Hereinafter, in a similar fashion, there is established an association on the diagonal line connecting W to R, in which the vertex of R: (R, G, B)=(255, 0, 0) is associated with (C, M, Y, K)=(0, 100, 100, 0). The associated L*a*b* values are denoted by $L^*_{0,100,100,0}$ $a^*_{0,100,100,0}$ $b^*_{0,100,1000,0}$.

In the manner as mentioned above, three edge lines connecting W to C, M and Y, three diagonal lines connecting W to R, G and B, and six edge lines connecting C to G and B, M to B and R, and Y to R and G, are defined.

In the manner, which will be described hereinafter, there are defined RK edge line, GK edge line, and BK edge line, which couple between individual vertexes of R, G and B and the vertexes of K: (C, M, Y, K)=($C_{SH}$, $M_{SH}$, $Y_{SH}$, $K_{SH}$), that are derived from the K-plate restraint conditions of printing, and CK diagonal line, MK diagonal line, and YK diagonal line, which couple between individual vertexes of C, M and Y and the vertexes of K: (C, M, Y, K)=($C_{SH}$, $M_{SH}$, $Y_{SH}$, $K_{SH}$).

Hereinafter, as to how to define RK edge line, GK edge line, BK edge line, CK diagonal line, MK diagonal line, and YK diagonal line, the RK edge line is typically taken up and there will be explained the details further.

Figure 24:
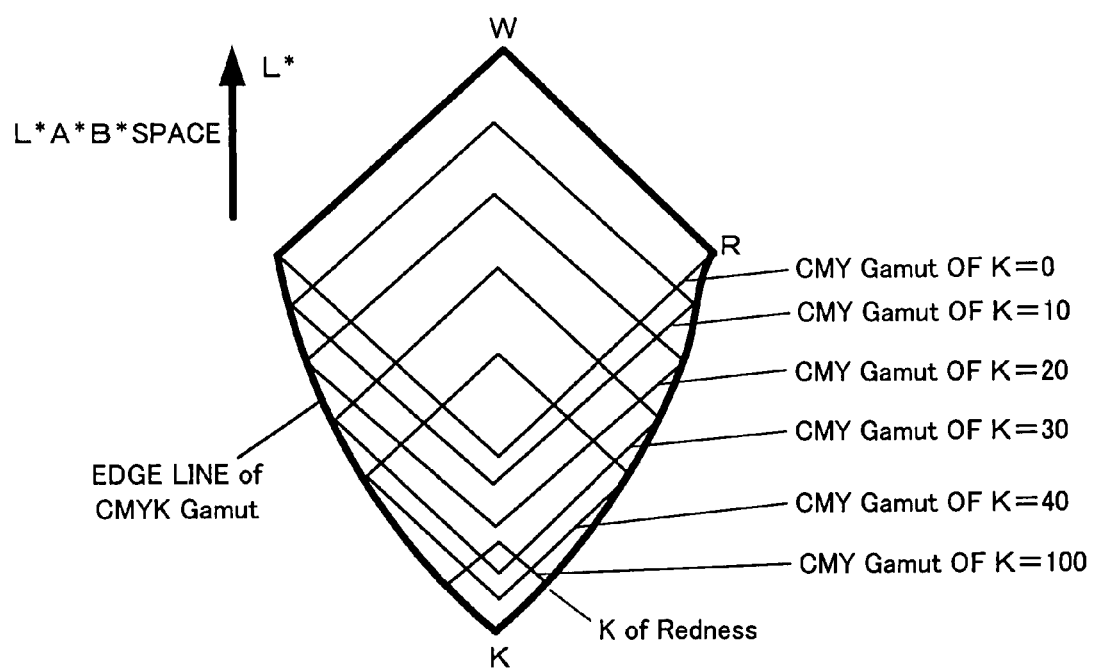
FIG. 24 is a typical illustration showing CMY gamut where K value is fixed to K=0, 10, 20, . . . , 100, in printing profile.

FIG. 24 is a typical illustration showing CMY gamut where K value is fixed to K=0, 10, 20, . . . , 100, in printing profile. Although individual gamut is shown here in a two-dimensional quadrangle for the convenience of illustration, actually it is three-dimensional hexahedron.

With respect to CMY gamut where K value is fixed to K=0, vertexes of W and R are expressed. This is the same regarding individual vertexes of G, B, C, M and Y too. Here, typically, there will be explained R. It is noted however that CMY gamut of K=0 cannot represent colors on a side near the vertex of K. CMY gamut of K=10 cannot represent the vertexes of W and R. On the other hand, the CMY gamut of K=10 can represents colors on the side near the vertex of K a little as compared with CMY gamut of K=0.

Thus, it approaches the vertex side of K in order of CMY gamut of K=0, 10, and 20, . . . , and the vertex of K and K of redness are represented on CMY gamut of K=100.

R-K edge line of the CMYK gamut shown in FIG. 20 follows the tracks of the vertex (C, M, Y, K)=(0, 100, 100, K) of R of CMY gamut in individual K-value up to (C, M, Y, K)=(0, 100, 100, 100) that is R of CMY gamut (this R is referred to as "K of redness") from R of saturated color (C, M, Y, K)=(0, 100, 100, 0) to K=100, and then starts for K from R in CMY gamut of K=100 to K from "K of redness". That is, R-K edge line of the CMYK gamut starts for K (C, M, Y, K)=(100, 100, 100, 100) of CMY gamut maintaining K=100 from "K of redness". This is the same as to G-K edge line, B-K edge line, C-K diagonal line, M-K diagonal line, and Y-K diagonal line.

From the above, it would be understood that vertexes of CMY gamut are of total 14 colors of 8 ($2^3$) colors of W, R, G, B, C, M, Y and K, which are vertexes of RGB gamut, and 6 colors of K of redness, K of greenness, K of blueness, K of cyan, K of magenta, and K of yellowness, which are vertexes of CMY gamut of K=100.

It is important as to how edge lines and diagonal lines of dummy RGB are allocated to edge lines and diagonal lines of CMYK gamut having vertexes of such numbers.

To define gamut geometries of individual segments (individual edge lines and individual diagonal lines) coupling individual vertexes of R, G, B, C, M, and Y with vertex of K, there is a need to take into consideration ink total limitation value for a value that is smaller than 300% on the boundary of the ink total limitation value 300%.

In the following, there will be explained as to how edge lines and diagonal lines of dummy RGB are allocated to CMYK gamut dividing by the ink total limitation.

(In a case where the ink total amount limitation is 300% or more)

When the edge line of K (RK edge line) is defined from R of dummy RGB, there is a possibility that smoothness in the gradation might be lost though the ink total amount limitation is satisfied when the ink total amount limitation is 300% or more in a case where the edge line of R-K of CMYK gamut is faithfully traced starting from the saturated color of R to K of redness. Accordingly, even K of redness is traced to the point of K=K param on the way without tracing it.

Figure 25:
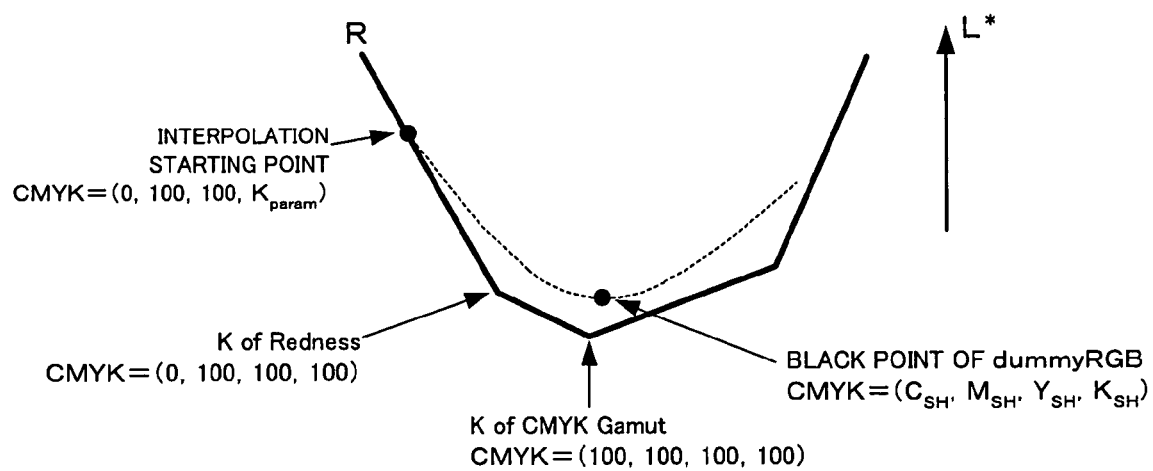
FIG. 25 is an explanatory view for a definition of an edge line between a vertex of R and a vertex of K.

FIG. 25 is an explanatory view for a definition of an edge line between a vertex of R and a vertex of K.

To state conceptually, there is defined an edge line starting from the vertex of R and going toward K of redness up to the half way, and swerving away from the edge line connecting R to K of redness at the point of (C, M, Y, K)=(0, 100, 100, $K_{param}$) in mid way, and going toward the vertex of K designated by the K-plate restraint conditions, that is, (C, M, Y, K)=($C_{SH}$, $M_{SH}$, $Y_{SH}$, $K_{SH}$).

FIG. 26 is a view showing tables defining an edge line between a vertex of R and a vertex of K.

First, with respect to the vertex of R, (R, G, B)=(255, 0, 0) is associated with the vertex of C: (C, M, Y, K)=(0, 100, 100, 0). The associated L*a*b* values are denoted by $L^*_{0,100,100,0}$, $a^*_{0,100,100,0}$, $b^*_{0,100,100,0}$. A point of (R, G, B)=(255×(9/10), 0, 0) is associated with (C, M, Y, K)=(0, 100, 100, 0) tracing an edge line from R to K of redness. The associated L*a*b* values are denoted by $L^*_{0,100,100,10}$, $a^*_{0,100,100,10}$, $b^*_{0,100,100,10}$. Hereinafter, in a similar fashion, up to the point K=$K_{param}$, there is established an association tracing the edge line connecting R to K of redness, in which (R, G, B)=(Rp, 0, 0) is associated with (C, M, Y, K)=(0, 100, 100, $K_{param}$). The associated L*a*b* values are denoted by $L^*_{0,100,100,kp}$, $a^*_{0,100,100,kp}$, $b^*_{0,100,100,kp}$.

Incidentally, while FIG. 26 shows as if $K_{param}$ is a multiple of 10, this is simply made for the sake of convenience, and there is no need that $K_{param}$ is a multiple of 10.

At the point of K=$K_{param}$ on an edge line going from R toward K of redness, it swerves away from the edge line and goes toward the vertex of the defined K: (C, M, Y, K)=($C_{SH}$, $M_{SH}$, $Y_{SH}$, $K_{SH}$). The point on the curve, which swerves away from the edge line and goes toward the vertex of K, can be determined in accordance with the interpolation operation such as quasi-Hermitian interpolation. Here, what is a point to notice is that on the edge line going from R toward K of redness, dummy RGB are associated with CMYK, and on the vertex of K, (R, G, B)=(0, 0, 0) is associated with (C, M, Y, K)=($C_{SH}$, $M_{SH}$, $Y_{SH}$, $K_{SH}$) and the associated L*a*b* are associated with $L^*_{CSH, MSH, YSH, KSH}$ $a^*_{CSH, MSH, YSH, KSH}$ $b^*_{CSH, MSH, YSH, KSH}$, but after it swerves away from R and goes toward K of redness, and up to reaching the vertex of K, dummy RGB are directly associated with L*a*b* without any association with the values of CMYK. In this respect, there occurs no problem by applying processing, which will be described later. In view of the fact that the values of CMYK are used for the purpose of associating the edge lines with the edge lines in the color reproduction area for printing, the values of CMYK are unnecessary after the edge lines are determined in the manner as mentioned above. This is the same as to the diagonal line too.

Figure 27:
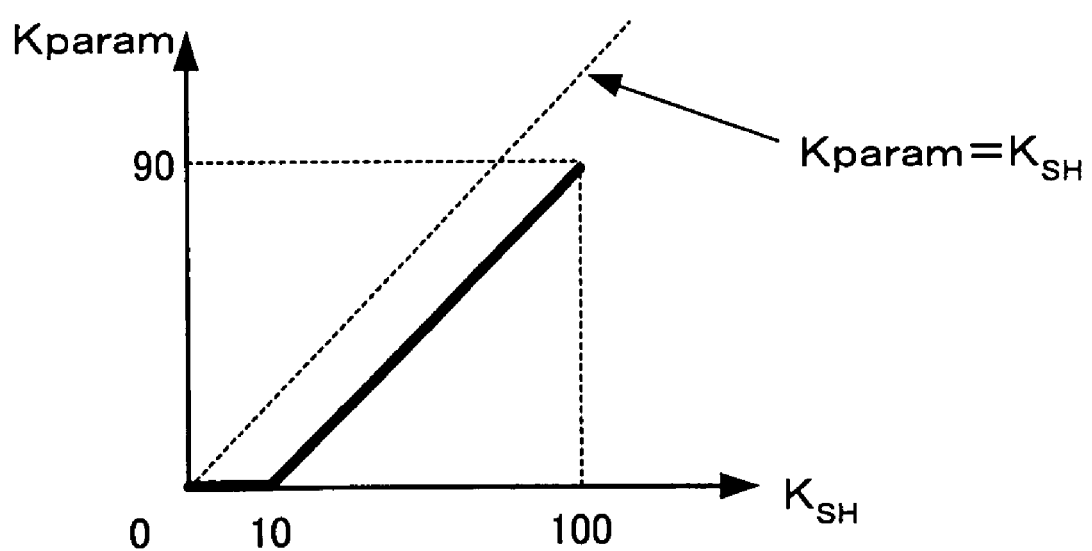
FIG. 27 is a graph showing a relation between $K_{SH}$ and $K_{param}$.

FIG. 27 is a graph showing a relation between $K_{SH}$ and $K_{param}$.

Here, there is a need that K=$K_{param}$, where it swerves away from the edge line going from R toward K of redness, is smaller than the maximum value $K_{SH}$ of K in the K-plate restraint conditions K=K (C), that is, $K_{param}$<$K_{SH}$. In the event that $K_{param}$ is larger than $K_{SH}$, K-value around the gray axis is larger than K-value of the gray axis. On the other hand, the black point on the profile of the proofer 14 is fixed to $K_{SH}$, as mentioned above, and thus there is a possibility that an inversion of K-plate will occur on the shadow portion of the gray axis of the proofer profile. An occurrence of the inversion of K-plate may cause an inversion of the remaining plates of C, M and Y. Thus, as mentioned above, there is a high possibility that an operator of printing does not accept this aspect.

Further, the gray axis of the profile (the printer profile 13 in FIG. 13) of the printer 11 that is the input device shown in FIG. 1 is not always coincident with the gray axis of the proofer profile now creating, and usually, there is a discrepancy somewhat between the two gray axes. On the other hand, what is to keep the K-plate restraint condition K=K(C) in FIG. 15 is the printer 11, but not the virtual proofer 14. Accordingly, there is a need to keep the K-plate restraint condition K=K(C) not only on the gray axis of the proofer profile now creating, but also on the periphery of the gray axis. As mentioned above, however, in the event that $K_{param}$ is larger than $K_{SH}$, even if the K-plate restraint condition K=K (C) is satisfied on the gray axis of the proofer profile now creating, there is a possibility that the K-plate restraint condition K=K(C) is not satisfied on the periphery of the gray axis, for example, on the gray axis of the printer 11.

For the reason as mentioned above, here, it is always set up to satisfy $K_{param}$<$K_{SH}$. However, if $K_{param}$ is set up to be smaller too much than $K_{SH}$, the dark high chroma color of the color reproduction area of dummy RGB becomes small. Therefore, according to the present embodiment, there is adopted the value of $K_{param}$=$K_{SH}$−10, for instance, as shown in FIG. 27.

While there has been explained the edge line connecting the vertex of R with the vertex of K, this explanation is applicable to a case where edge lines connecting vertexes of G and B with the vertex of K are created. In this case, it is acceptable that the value of $K_{param}$ is common on three edge lines connecting vertexes of R, G and B with the vertex of K, or alternatively, it is acceptable that the value of $K_{param}$ is different values for the three edge lines.

With respect to the diagonal line (CK diagonal line) starting from C to K, the diagonal line (MK diagonal line) starting from M to K, and the diagonal line (YK diagonal line) starting from Y to K too, in a similar fashion to that of the RK edge line, GK edge line, and BK edge line, those diagonal lines are defined avoiding K of cyan, K of magenta, and K of yellowness, respectively.

FIG. 28 is a view showing tables defining diagonal lines connecting C and K.

First, with respect to the vertex of C, (R, G, B)=(0, 255, 255) is associated with the vertex of C: (C, M, Y, K)=(0, 100, 100, 0). The associated L*a*b* values are denoted by $L^*_{100,0,0,0}$ $a^*_{100,0,0,0}$ $b^*_{100,0,0,0}$. A point of (R, G, B)=(0, 255× (9/10), 255×(9/10)) is associated with (C, M, Y, K)=(100, 0, 0, 10) starting from the vertex of C for K of cyan. The associated L*a*b* values are denoted by $L^*_{100,0,0,10}$ $a^*_{100,0,0,10}$ $b^*_{100,0,0,10}$.

Hereinafter, in a similar fashion, there is established an association in which a point of (R, G, B)=(0, Rp, Rp) is associated with (C, M, Y, K)=(100, 0, 0, $K_{param}$), and at the point following the tracks by an interpolation operation apart from the diagonal line starting from C for K of redness, (R, G, B)=(0, 0, 0) is associated with (C, M, Y, K)=($C_{SH}$, $M_{SH}$, $Y_{SH}$, $K_{SH}$). The associated L*a*b* are associated with $L^*_{CSH, MSH, YSH, KSH}$ $a^*_{CSH, MSH, YSH, KSH}$ $b^*_{CSH, MSH, YSH, KSH}$.

In the above, there are explained CK diagonal lines. The explanation is also applicable to MK diagonal lines and YK diagonal lines.

Figure 29:
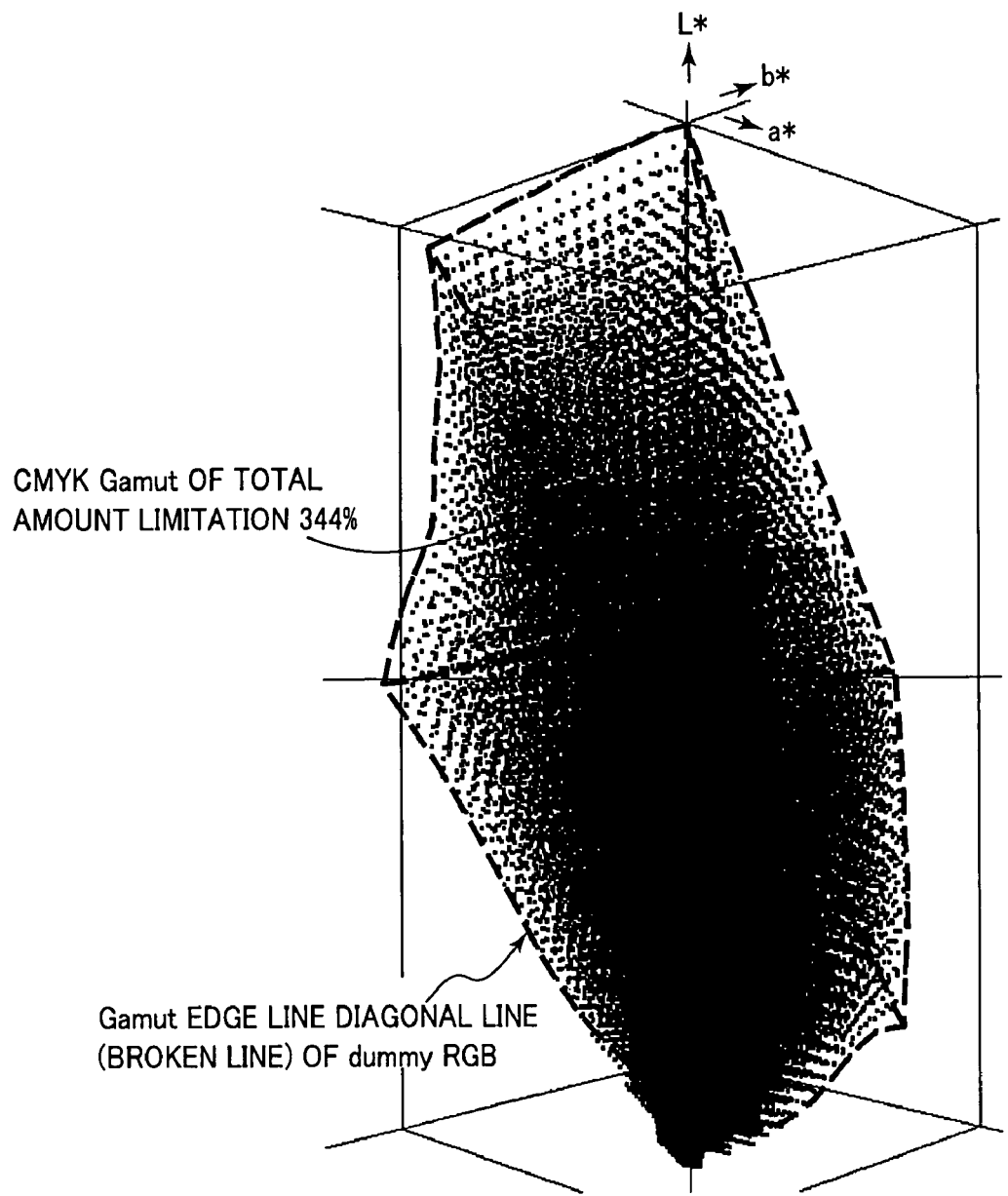
FIG. 29 is a view showing a color reproduction area of the proofer (dummy RGB) created through tracing the color reproduction area of printing.

FIG. 29 is a view showing a color reproduction area of the proofer (dummy RGB) created through tracing the color reproduction area of printing.

Figure 30:
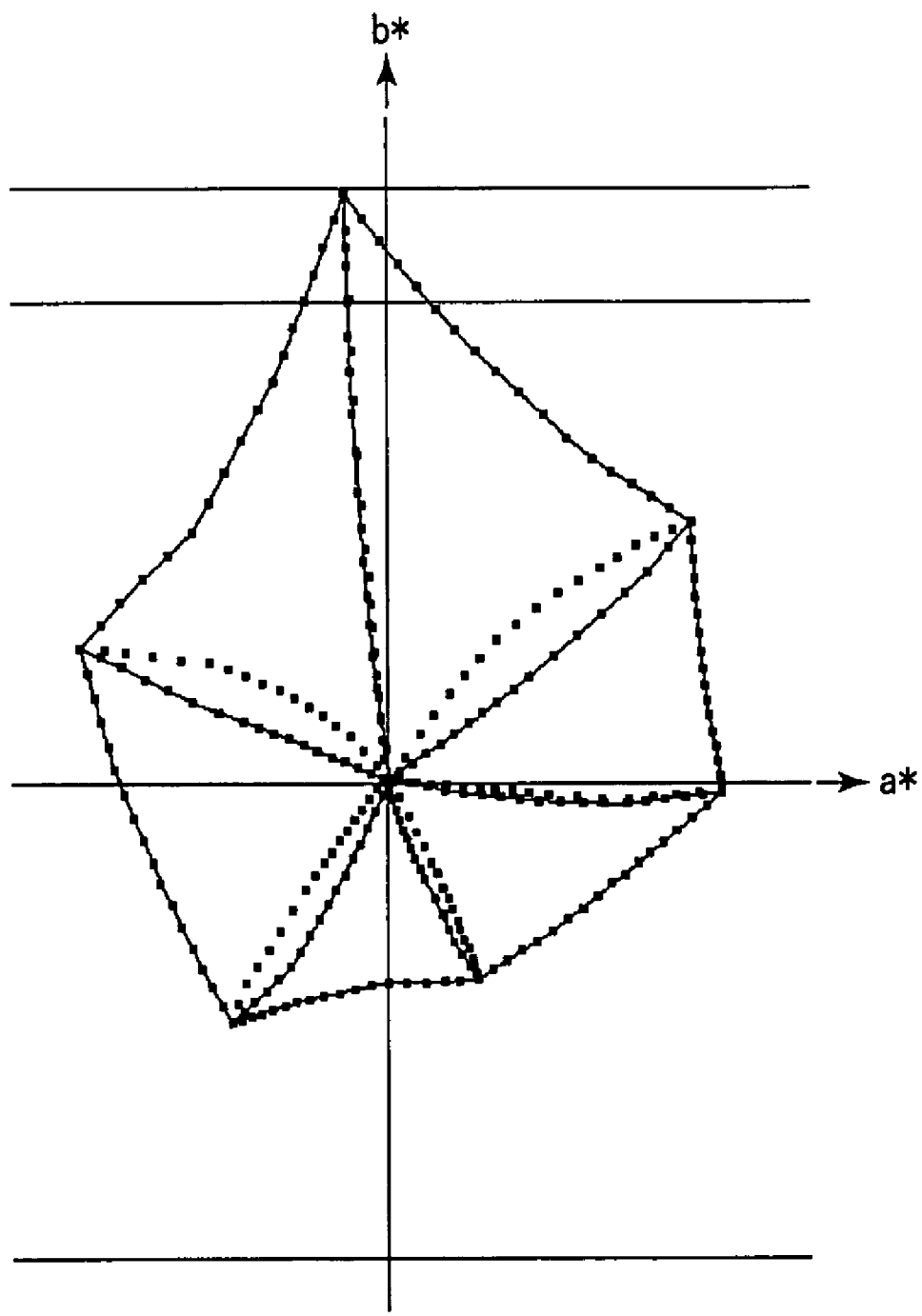
FIG. 30 is a view showing edge lines and diagonal lines of dummy RGB depicted with a broken line in FIG. 29 looking in L* axis direction.
Figure 31:
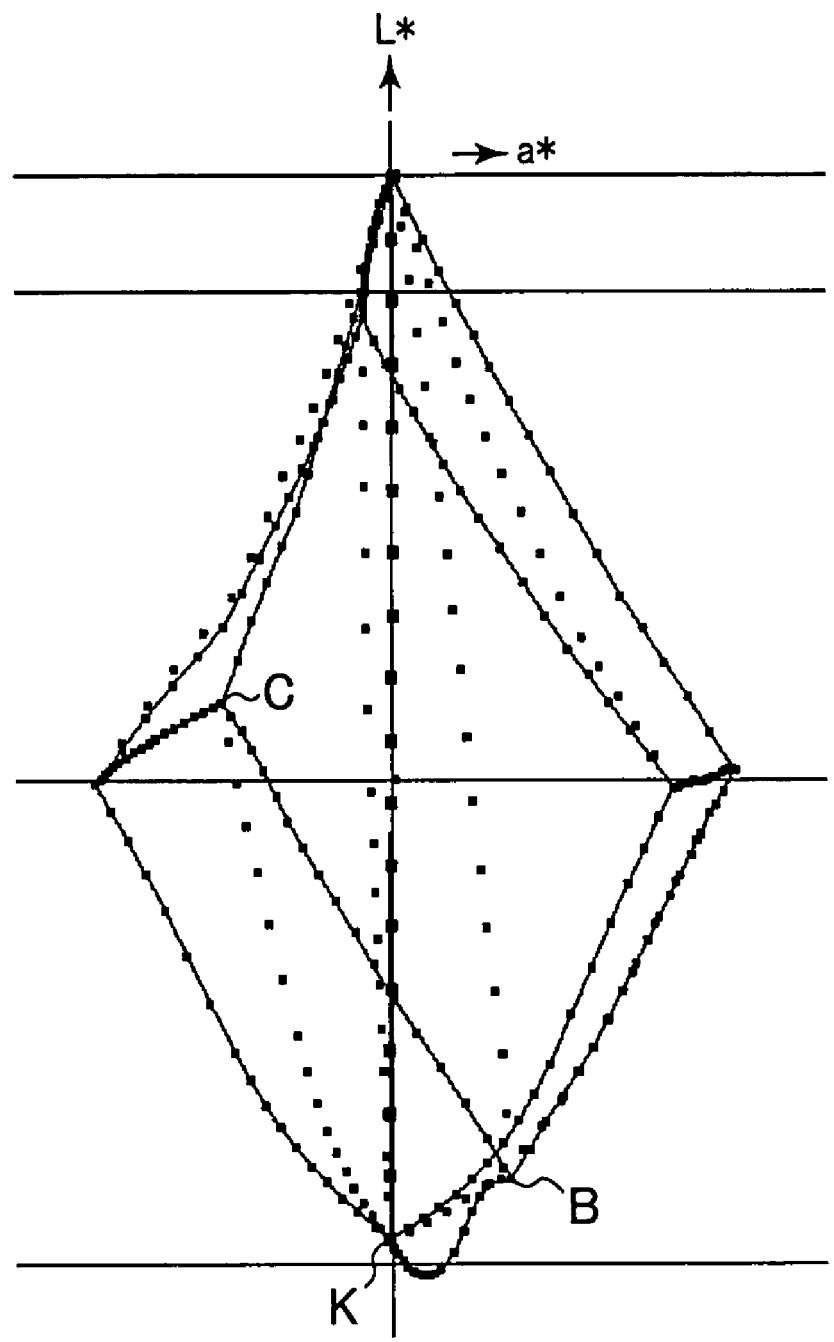
FIG. 31 is a view showing edge lines and diagonal lines of dummy RGB depicted with a broken line in FIG. 29 looking in b* axis direction.
Figure 32:
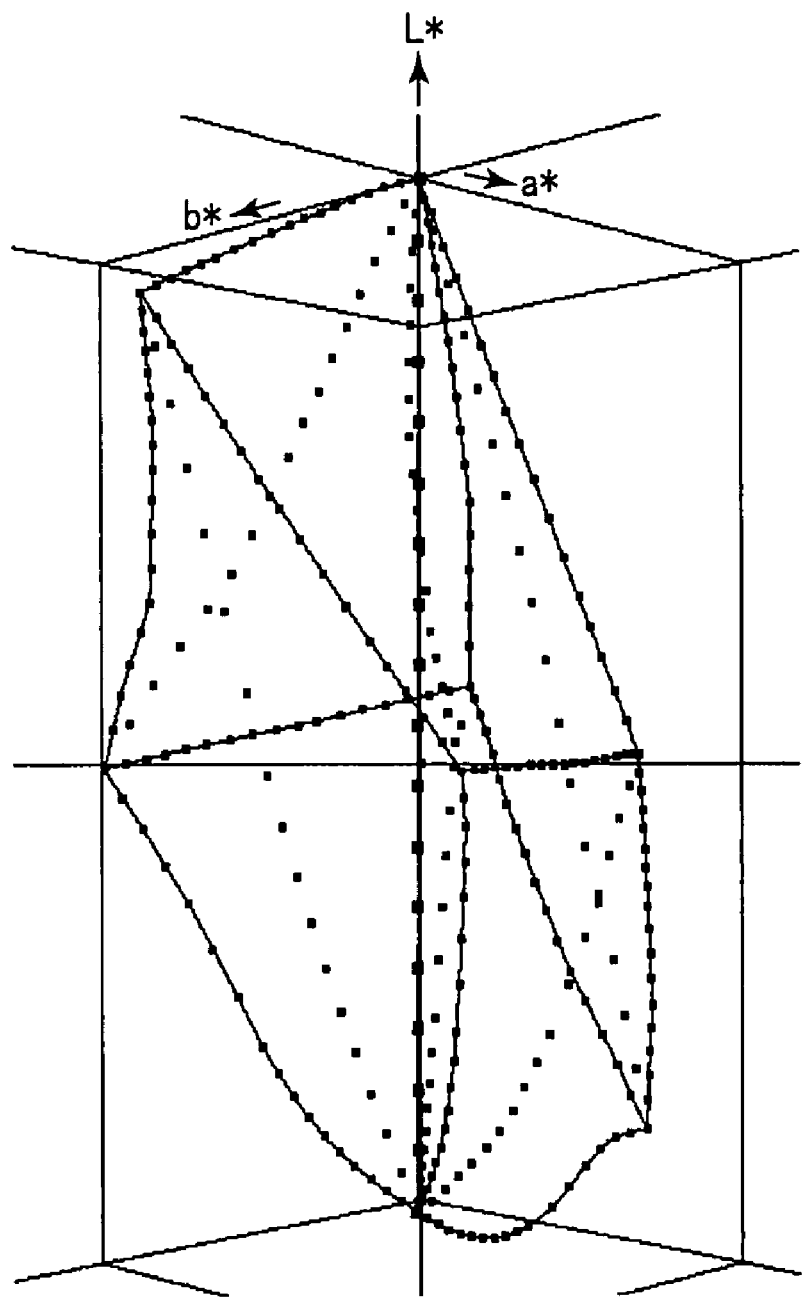
FIG. 32 is a view showing edge lines and diagonal lines of dummy RGB depicted with a broken line in FIG. 29 looking on a three-dimensional basis.
Figure 33:
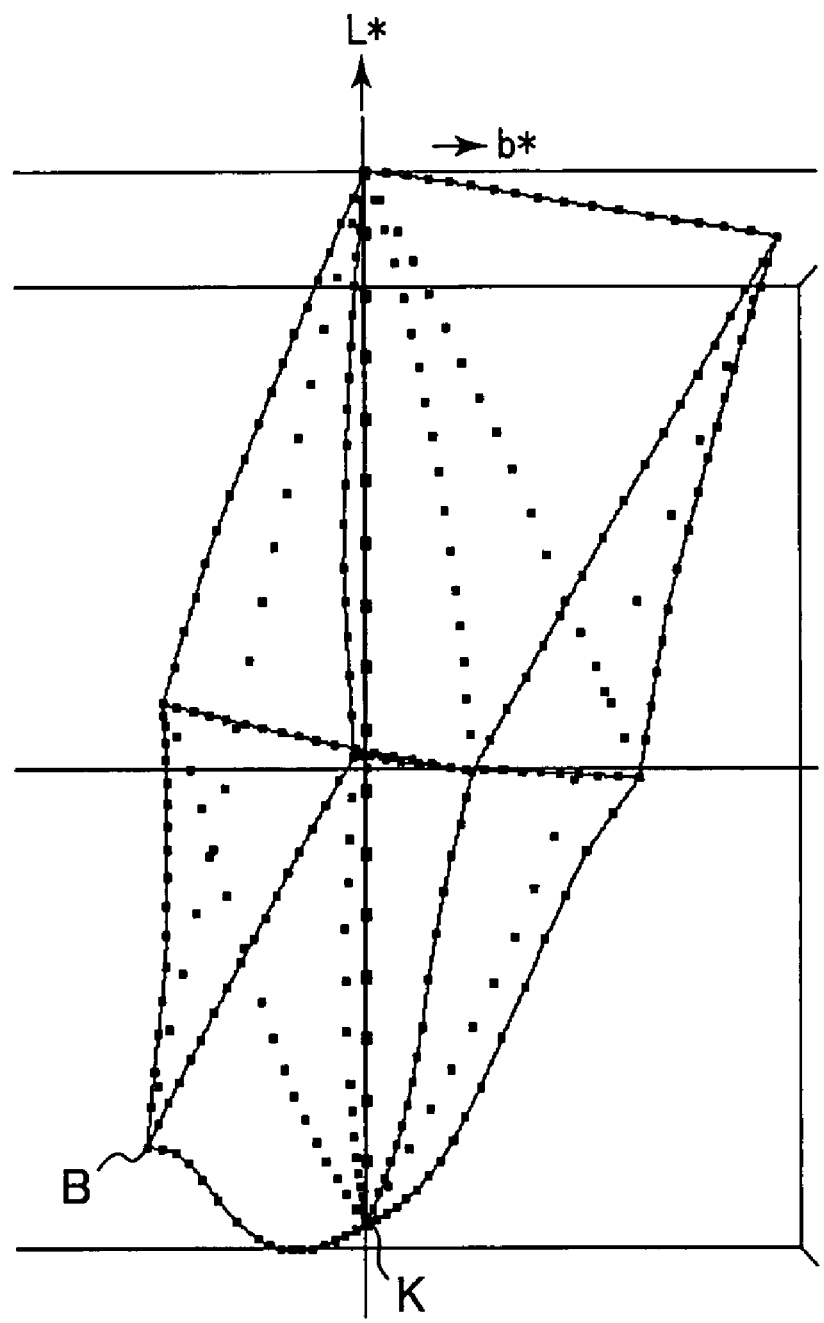
FIG. 33 is a view showing edge lines and diagonal lines of dummy RGB depicted with a broken line in FIG. 29 looking in a* axis direction.

FIG. 30 is a view showing edge lines and diagonal lines of dummy RGB depicted with a broken line in FIG. 29 looking in L* axis direction. FIG. 31 is a view showing edge lines and diagonal lines of dummy RGB depicted with a broken line in FIG. 29 looking in b* axis direction. FIG. 32 is a view showing edge lines and diagonal lines of dummy RGB depicted with a broken line in FIG. 29 looking on a three-dimensional basis. FIG. 33 is a view showing edge lines and diagonal lines of dummy RGB depicted with a broken line in FIG. 29 looking in a* axis direction.

Dots shown in FIG. 29 represent CMYK gamut of total amount limitation 344%. Broken lines represent edge lines and diagonal lines of dummy RGB tracing it. Where $K_{SH}$=89.

As seen from FIG. 29, it would be understood that edge lines and diagonal lines of dummy RGB thus defined faithfully trace the outline of the CMYK gamut excepting the vicinity of the black spot. In the vicinity of the black spot, edge lines and diagonal lines of dummy RGB do not trace the outline of the CMYK gamut and enter the inside of the CMYK gamut. However, $K_{SH}$ is designated by a user, and it is a user's view that K-plate is not set up to be over the designated value of $K_{SH}$. Thus, there is no need that the gamut of dummy RGB is coincident with the printing profile even the part where the gamut of dummy RGB exceeded $K_{SH}$.

(In a case where the ink total amount limitation is from 200% to less than 300%)

In a case where the ink total amount limitation is 300% or more, when the edge line and the diagonal line from R, G, B, C, M, and Y to K are defined, the influence of the gamut reduction by the ink total limitation need not be considered. However, in a case where the ink total amount limitation is less than 300%, there is a need to consider the influence of the gamut reduction by the ink total limitation. The reason why this is to do so is as follows: In case of RK edge line where the ink total amount limitation is 300% or more, as shown in FIG. 26, at the point (R, G, B)=(Rp, 0, 0), there is established (C, M, Y, K)=(0, 100, 100, $K_{param}$), and the ink total amount of this point is C+M+Y+K=0+100+100+$K_{param}$=200+$K_{param}$. In a case where the ink total amount limitation is less than 300%, dummy RGB might exceed the ink total amount limitation in a point from (R, G, B)=(Rp, 0, 0) to (R, G, B)=(0, 0, 0) on the way. As for the GK edge line and the BK edge line, it is similar. However, with respect to the CK diagonal line, the MK diagonal line, and the YK diagonal line, as the CK diagonal line is shown in FIG. 28, there is established (C, M, Y, K)=(100, 0, 0, $K_{param}$) at the point of (R, G, B)=(0, Rp, Rp) too, and the ink total amount is C+M+Y+K=100+0+0+$K_{param}$=100+$K_{param}$. Thus, if the ink total amount is 200% or more even if K is K=100, it is within the ink total amount. Practically, the ink total amount is 200% or more. Accordingly, here, there will consider a case where the ink total amount limitation is from 200% to less than 300%.

Figure 34:
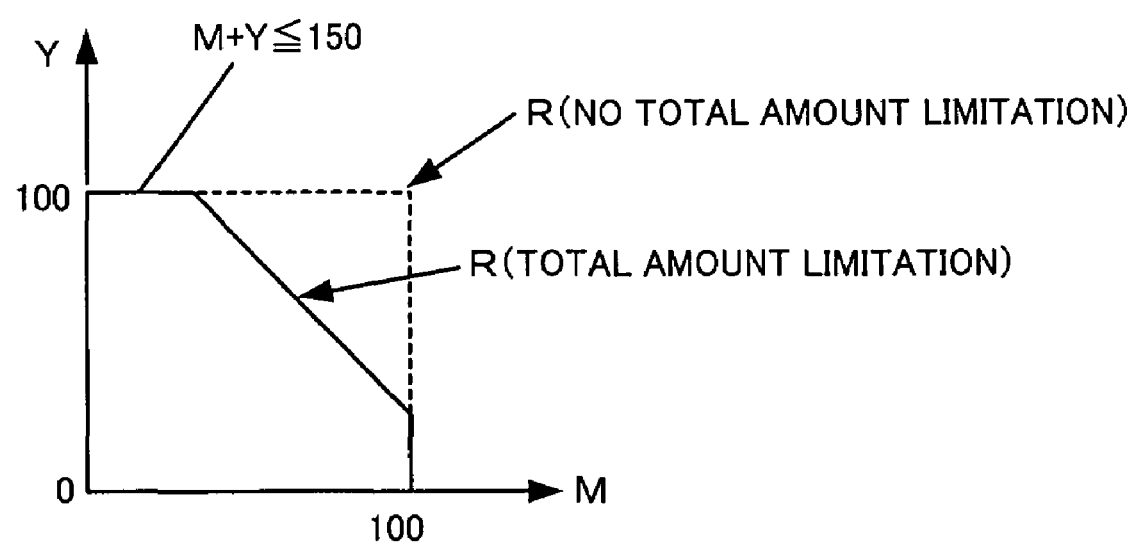
FIG. 34 is a typical illustration in which a mechanism of gamut reduction by the ink total amount limitation is expressed on a two-dimensional basis.

FIG. 34 is a typical illustration in which a mechanism of gamut reduction by the ink total amount limitation is expressed on a two-dimensional basis.

FIG. 34 is useful for understanding as to what restriction occurs on gamut in conditions that C and K are fixed, and M-plate and Y-plate are limited in ink total amount.

Here, for the sake of simplification, now let us consider two colors of M and Y. It is assumed that the maximum ink amount is M+Y=100+100=200% where no ink total amount limitation is involved. Here, a case where no ink total amount limitation is involved is compared with a case where the ink total amount limitation is M+Y=150%.

In case of the ink total amount limitation is M+Y≦150, a secondary color of R, which is the mixed color of M and Y, shifts to the boundary of area of the solid line that is capable of representing M and Y when the ink total amount limitation is taken into consideration, addressed as M+Y≦150, but not a square vertex in the area of the dotted line wherein no ink total amount limitation is involved, addressed as 0≦M≦100 and 0≦Y≦100.

FIG. 34 is one wherein a view where ink total amount limitation is involved, is shown on a two-dimensional plane of M and Y in which C-plate and K-plate are fixed. Next, it is considered by generalizing.

Now, let us consider the ink total amount limitation in the CMYK gamut wherein K-plate is fixed. This case is also similar to the case of FIG. 34. In a case where ink total amount limitation is involved, the darkest point in the CMYK gamut where no ink total amount limitation is involved, that is, a partial area in the CMYK gamut where no ink total amount limitation is involved, including the gamut vertex of C=M=Y=100%, is cut by the plane on the CMY space as set forth below.

$$C+M+Y=\text{InkLimit}-K$$

Where, InkLimit denotes the ink total amount limitation value, and is a value from 200% to less than 300%.

Figure 35:
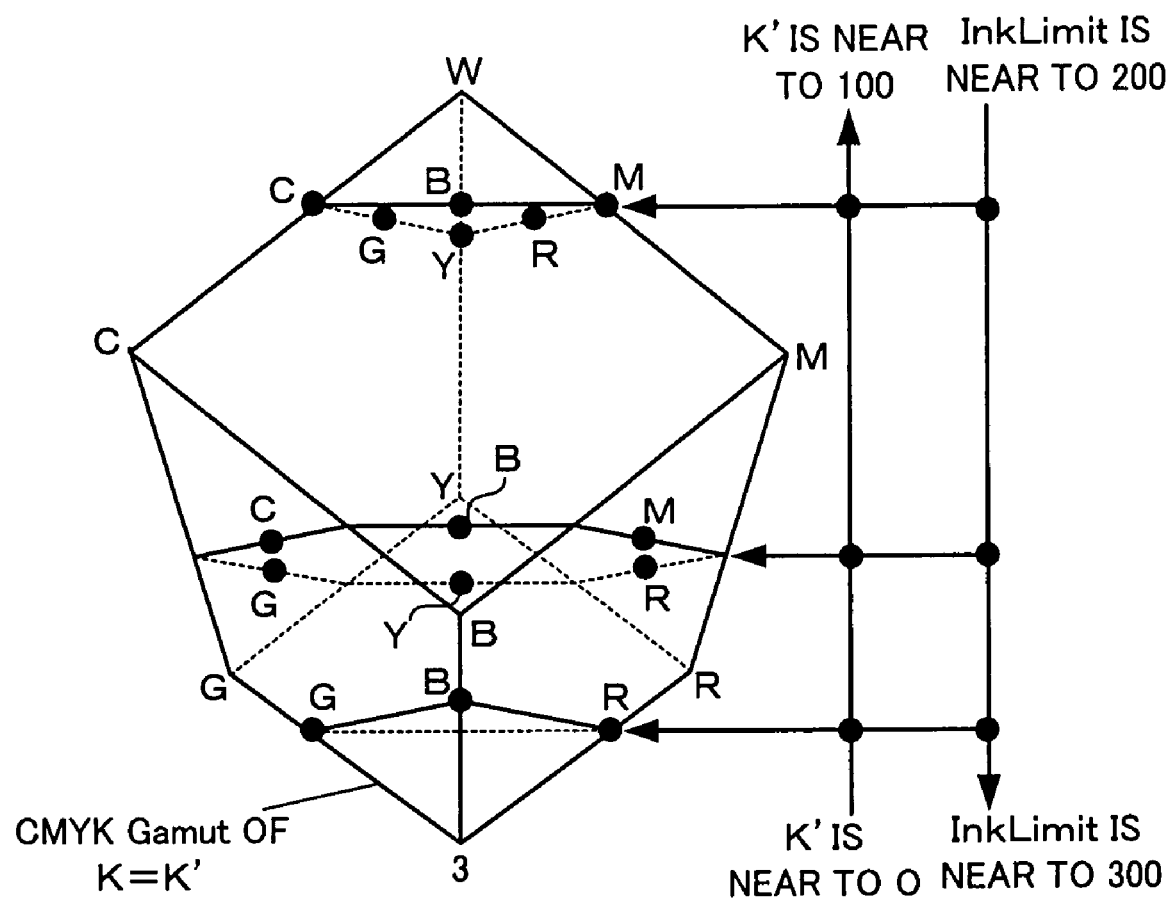
FIG. 35 is a typical illustration showing CMY gamut where K value is K' and is not subjected to ink total amount limitation, and a section of the CMY gamut where K is subjected to ink total amount limitation.

FIG. 35 is a typical illustration showing CMY gamut where K value is K' and is not subjected to ink total amount limitation, and a section of a plane, which is represented by C+M+Y=InkLimit−K, of the CMY gamut where K is subjected to ink total amount limitation.

As seen from FIG. 35, when it is assumed that the ink total amount limitation value InkLimit is fixed, in a case where K' is near 100, it is possible to use only a part of the upper portion of CMY gamut where K value is K' and is not subjected to the ink total amount limitation, and in a case where K' is near 0, it is impossible to use only a part of the lower portion of CMY gamut where K value is K' and is not subjected to the ink total amount limitation.

When it is assumed that K-value is fixed to K=K', in a case where the ink total amount limitation is not strict (the ink total amount limitation value InkLimit is near 300), it is possible to use only a part of the lower portion of CMY gamut where K value is K', and in a case where the ink total amount limitation is strict (the ink total amount limitation value InkLimit is near 200), it is possible to use only a part of the upper portion of CMY gamut where K value is K'.

The cut that is the plane of the expression (1) receives both the ink total amount and K value influences, and thus, the cut becomes a triangle and becomes a hexagon in accordance with the ink total amount and K value.

Figure 36:
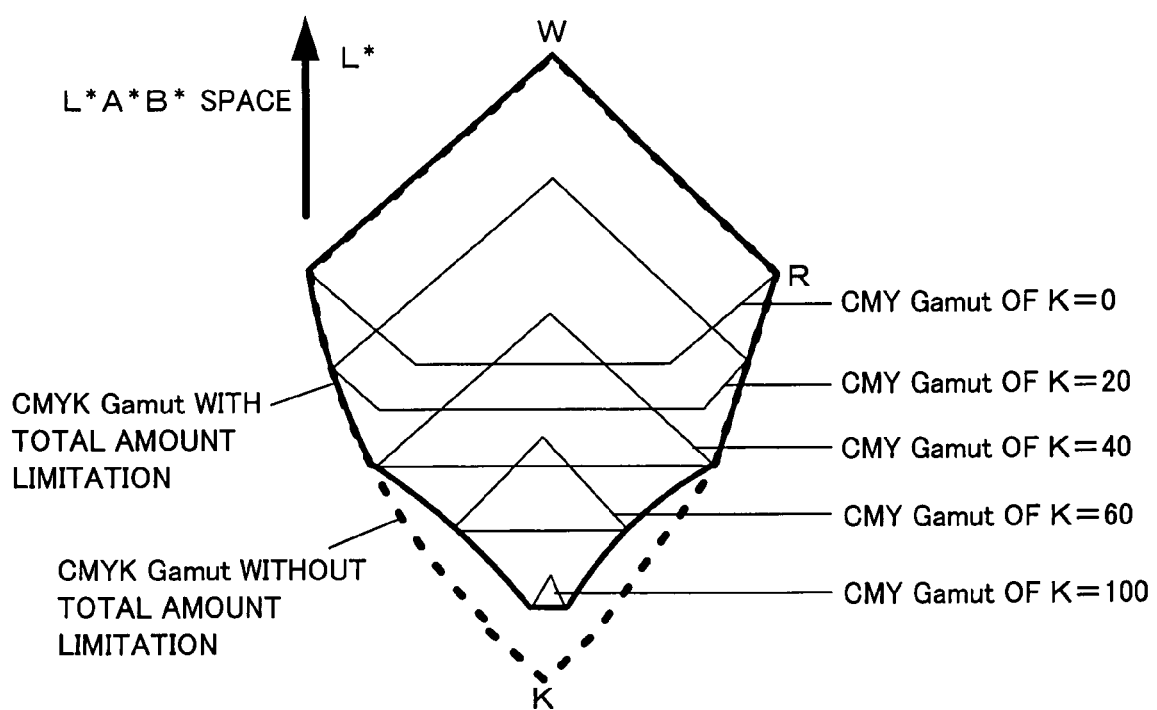
FIG. 36 is a typical illustration showing CMY gamut of K=0, 10, 20, . . . , 100, where K value is subjected to ink total amount limitation.

FIG. 36 is a typical illustration showing CMY gamut of K=0, 10, 20, . . . , 100, where K value is subjected to ink total amount limitation. FIG. 36 corresponds to FIG. 24 in which K value is not subjected to ink total amount limitation.

It typically explains R in FIG. 36 as well as the case of FIG. 24.

As understood from FIG. 36, the set of CMY gamut where ink total amount limitation is involved becomes shape that a dark high chroma color is scooped out internally as compared with the case where the ink total amount limitation, shown in the dotted line, is not involved.

Figure 37:
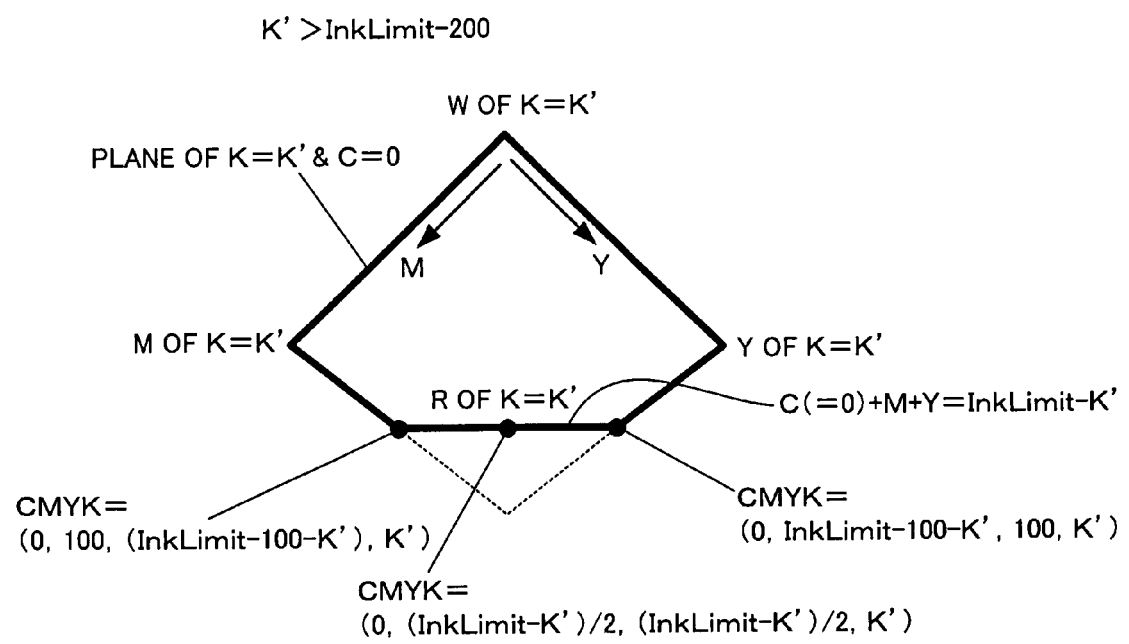
FIG. 37 is a typical illustration showing edge lines coupling R with K where it is subjected to ink total amount limitation.

FIG. 37 is a typical illustration showing edge lines coupling R with K where it is subjected to ink total amount limitation.

Here, it explains how to define the RK edge line where ink total amount limitation is involved referring to FIG. 37.

As R in CMY gamut at K=K' when the ink total amount limitation is considered, according to the present embodiment, there is adopted the middle point in the segment of C=0 in the section by the plane of C+M+Y=InkLimit−K' of CMY gamut that is not subjected to the ink total amount limitation in K=K'. If it is expressed by the CMYK value, it becomes (C,M,Y,K)=(0, (InkLimit−K')/2, (InkLimit−K')/2, K'). However, this CMYK value is effective only the case when (InkLimit−K')/2 is 100 or less.

Condition of such K' is expressed by $$K' > \text{InkLimit} - 200$$

FIG. 38 is a view showing CMYK values and L*a*b* values of RK edge lines where an ink total amount limitation value is 240%. FIG. 38 corresponds to FIG. 26 in which ink total amount limitation is not involved.

CMYK values and L*a*b* values of the point of (R, G, B)=(255, 0, 0) that is vertex of R are the same as that of FIG. 26. Hereinafter, starting for K up to (R, G, B)=(255×(9/10), 0, 0), CMYK values and L*a*b* values are the same as that of FIG. 26. However, on the point of (R, G, B)=(255×(5/10), 0, 0), the ink total amount limitation is involved, so that the associated CMYK values become (C, M, Y, K)=(0, 95, 95, 50). In FIG. 26, CMYK values of the associated point are (C, M, Y, K)=(0, 100, 100, 50). In this case, the ink total amount is C+M+Y+K=0+100+100+50=250. This value exceeds the ink total amount limitation value (here 240%). Thus, here, M and Y are decreased by the same quantity so that the CMYK values become (C, M, Y, K)=(0, 95, 95, 50). Thus, the ink total amount limitation value 240% is satisfied. The associated L*a*b* values are denoted by $L^*_{0,95,95,50}$ $a^*_{0,95,95,50}$ $b^*_{0,95,95,50}$ in accordance with the printing profile of FIG. 14.

Hereinafter, starting for K while ink total amount limitation is involved, on (R,G,B)=(Rp,0,0) there are established (C,M,Y,K)=(0, (InkLimit−Kp)/2, (InkLimit−Kp)/2,Kp). The associated L*a*b* values are denoted by $(L^*a^*b^*)=(L^*_{0,(IL-KP)/2, (IL-KP)/2, KP}, a^*_{0,(IL-KP)/2, (IL-KP)/2, KP}, b^*_{0, (IL-KP)/2, (IL-KP)/2, KP})$. It is defined by the interpolation operations such as Hermitian interpolation between (R,G,B)=(Rp,0,0) and the vertex (R,G,B)=(0,0,0) of K. Dummy RGB is directly associated with L*a*b* values. For instance, regarding (R, G, B)=(255×(1/10), 0, 0), there is established $(L^*a^*b^*)=(L^*_{itp1/10}, a^*_{itp1/10}, b^*_{itp1/10})$. Regarding (R, G, B)=(0, 0, 0), that is, the vertex of K, it is associated with (C,M,Y,K)=($C_{SH}$, $M_{SH}$, $Y_{SH}$, $K_{SH}$). The associated L*a*b* values are denoted by $(L^*a^*b^*)=(L^*_{CSH,MSH,YSH,KSH}, a^*_{CSH,MSH,YSH,KSH}, b^*_{CSH,MSH,YSH,KSH})$.

Here, the interpolation start point $K_P$ (simple expression of the above-mentioned $K_{param}$) is determined, in a similar fashion to that of the case where the ink total amount limitation is 300% or more, as the value that does not exceed K-value: $K_{SH}$ of (C,M,Y,K)=($C_{SH}$, $M_{SH}$, $Y_{SH}$, $K_{SH}$) which are CMYK values of the designated black spot (cf. FIG. 27).

According to the present embodiment, it s assumed that the ink total amount limitation InkLimit is 200% or more. Thus, also regarding (C,M,Y,K)=(100, 0, 0, $K_{param}$) at the point of (R,G,B)=(0,Rp, Rp) in CK diagonal line shown in FIG. 28, in a case where the ink total amount limitation is 300% or more, the ink total amount limitation is denoted by C+M+Y+K=100+0+0+$K_{param}$=100+$K_{param}$<200. Therefore, CK diagonal line is independent of the ink total amount limitation. This is applicable to MK diagonal line and YK diagonal line too. MK diagonal line and YK diagonal line are also independent of the ink total amount limitation. It is the same as a case where the ink total amount limitation is 300% or more.

Figure 39:
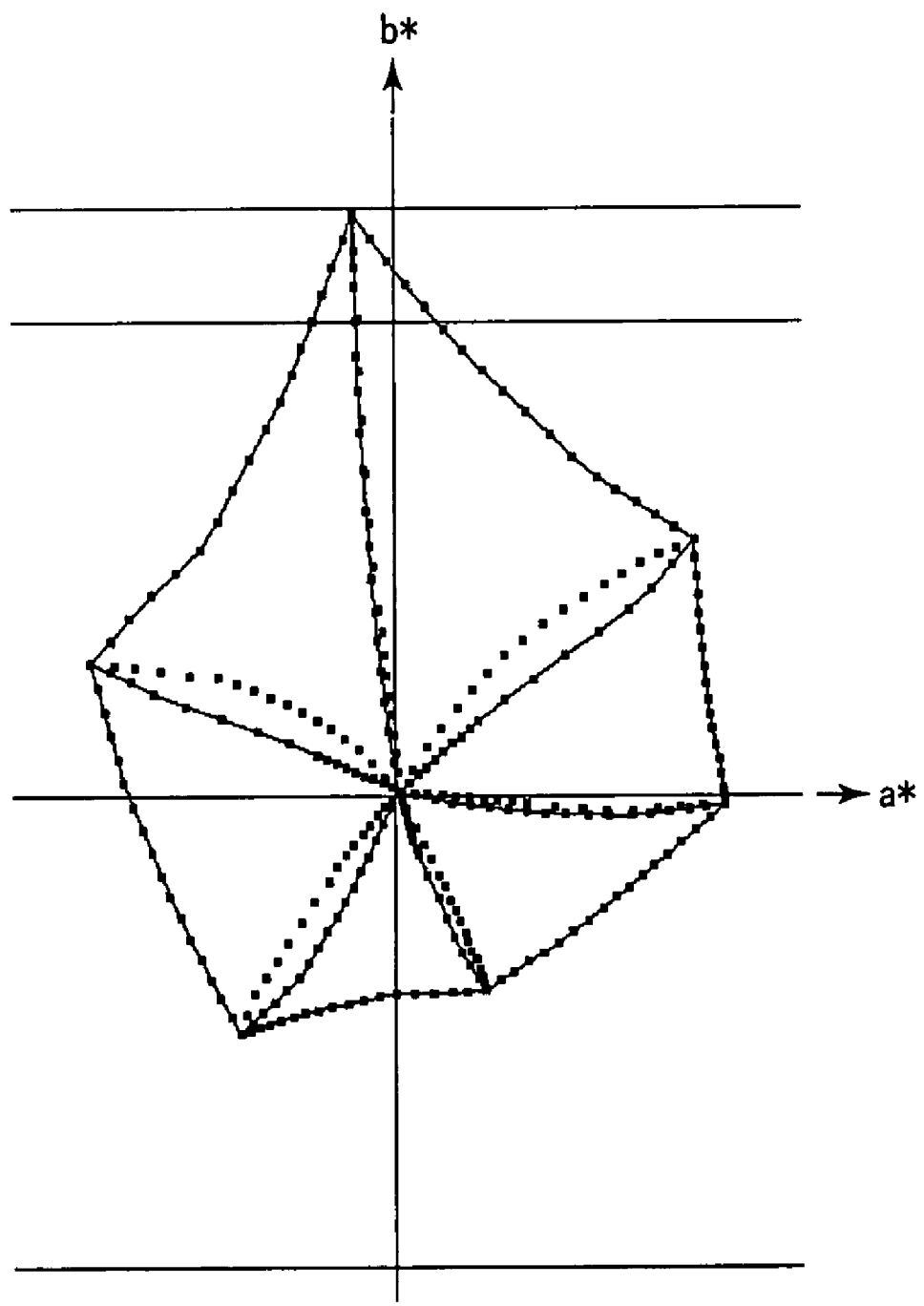
FIG. 39 is a view showing edge lines and diagonal lines where a printing paper is a standard printing art paper, an ink total amount limitation value is 234%, and the maximum value $K_{SH}$ of K is 91%, looking in L* axis direction.
Figure 40:
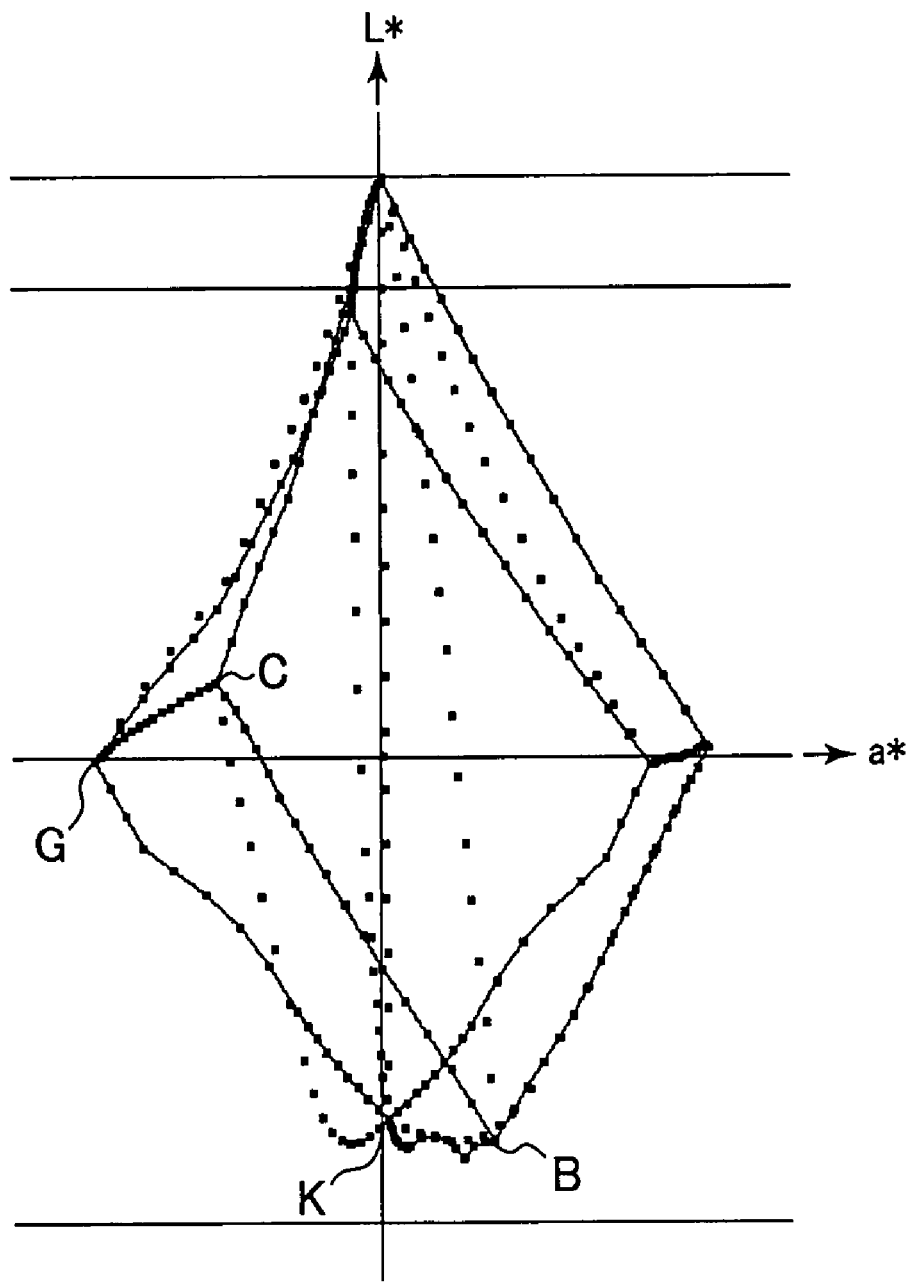
FIG. 40 is a view showing edge lines and diagonal lines where a printing paper is a standard printing art paper, an ink total amount limitation value is 234%, and the maximum value $K_{SH}$ of K is 91%, looking in b* axis direction.
Figure 41:
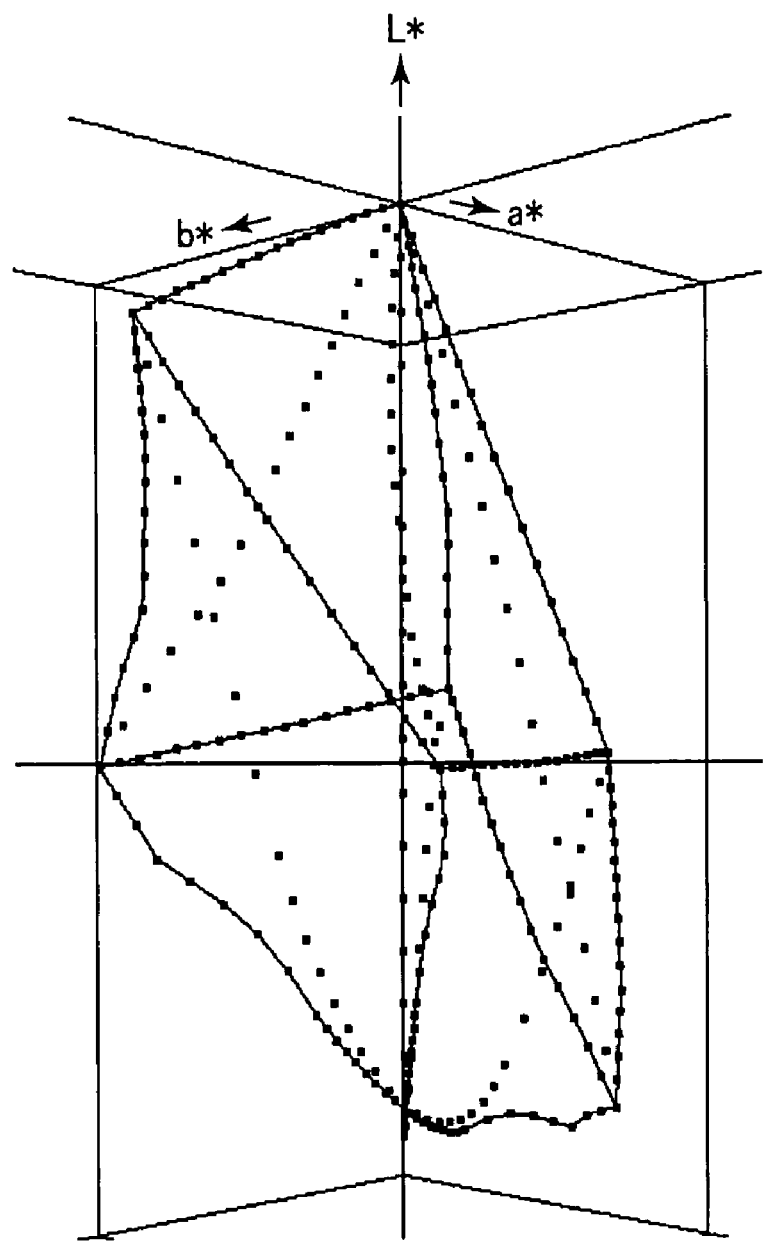
FIG. 41 is a view showing edge lines and diagonal lines where a printing paper is a standard printing art paper, an ink total amount limitation value is 234%, and the maximum value $K_{SH}$ of K is 91%, looking on a three-dimensional basis.
Figure 42:
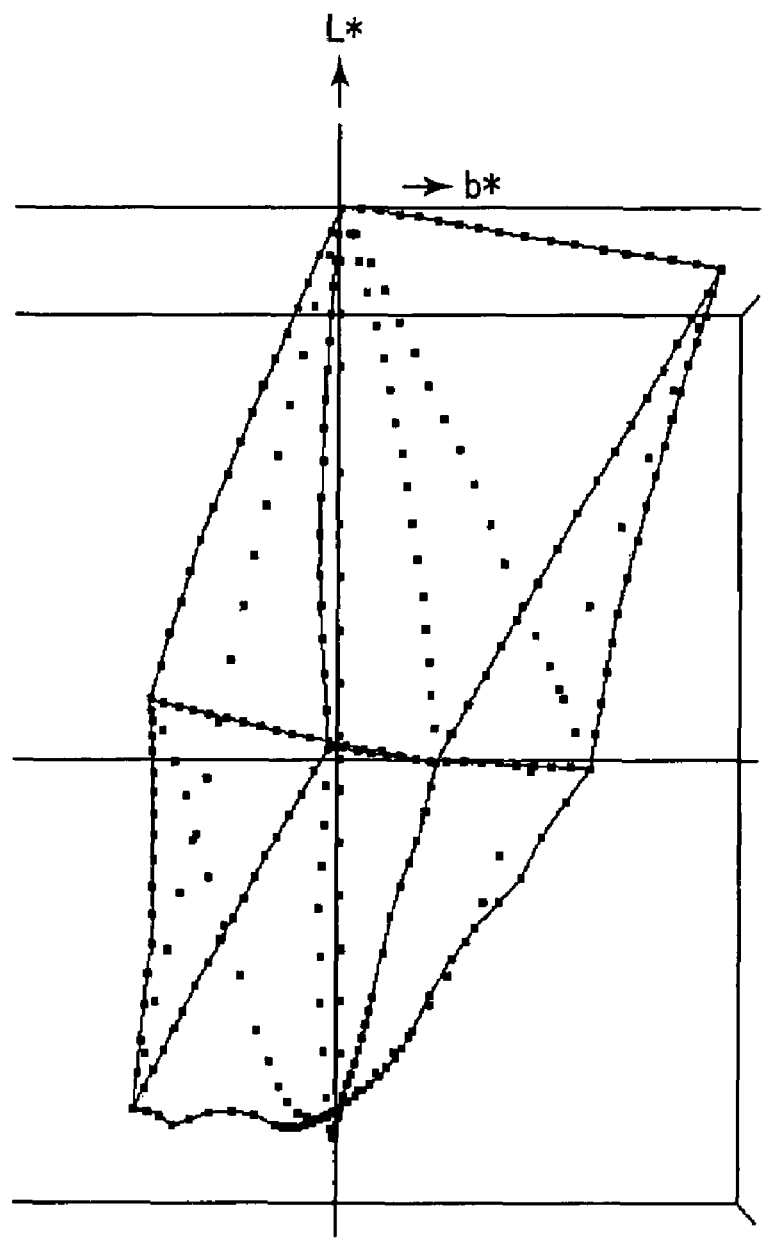
FIG. 42 is a view showing edge lines and diagonal lines where a printing paper is a standard printing art paper, an ink total amount limitation value is 234%, and the maximum value $K_{SH}$ of K is 91%, looking in a* axis direction.

FIG. 39 is a view showing edge lines and diagonal lines where a printing paper is a standard printing art paper, an ink total amount limitation value is 234%, and the maximum value $K_{SH}$ of K is 91%, looking in L* axis direction. FIG. 40 is a view showing edge lines and diagonal lines where a printing paper is a standard printing art paper, an ink total amount limitation value is 234%, and the maximum value $K_{SH}$ of K is 91%, looking in b* axis direction. FIG. 41 is a view showing edge lines and diagonal lines where a printing paper is a standard printing art paper, an ink total amount limitation value is 234%, and the maximum value $K_{SH}$ of K is 91%, looking on a three-dimensional basis. FIG. 42 is a view showing edge lines and diagonal lines where a printing paper is a standard printing art paper, an ink total amount limitation value is 234%, and the maximum value $K_{SH}$ of K is 91%, looking in a* axis direction.

As seen from a comparison of FIG. 30 to FIG. 33 representative of edge lines and diagonal lines of dummy RGB where an ink total amount limitation value is 334%, with FIG. 39 to FIG. 42 where an ink total amount limitation value is 234%, diagonal lines from C, M, and Y to K are not subjected to an ink total amount limitation, so that chroma improvement effect for dark C, M, and Y, where an ink total amount limitation is severe, is enhanced.

However, as mentioned above, when the edge lines from R, G, and B to K and the diagonal lines from C, M, and Y to K are defined, the interpolation operation is included. Therefore, there is the possibility that L*a*b* value determined by the interpolation operation exceeds the ink total amount limitation value when converting it into the CMYK value. This problem will be described later.

Figure 43:
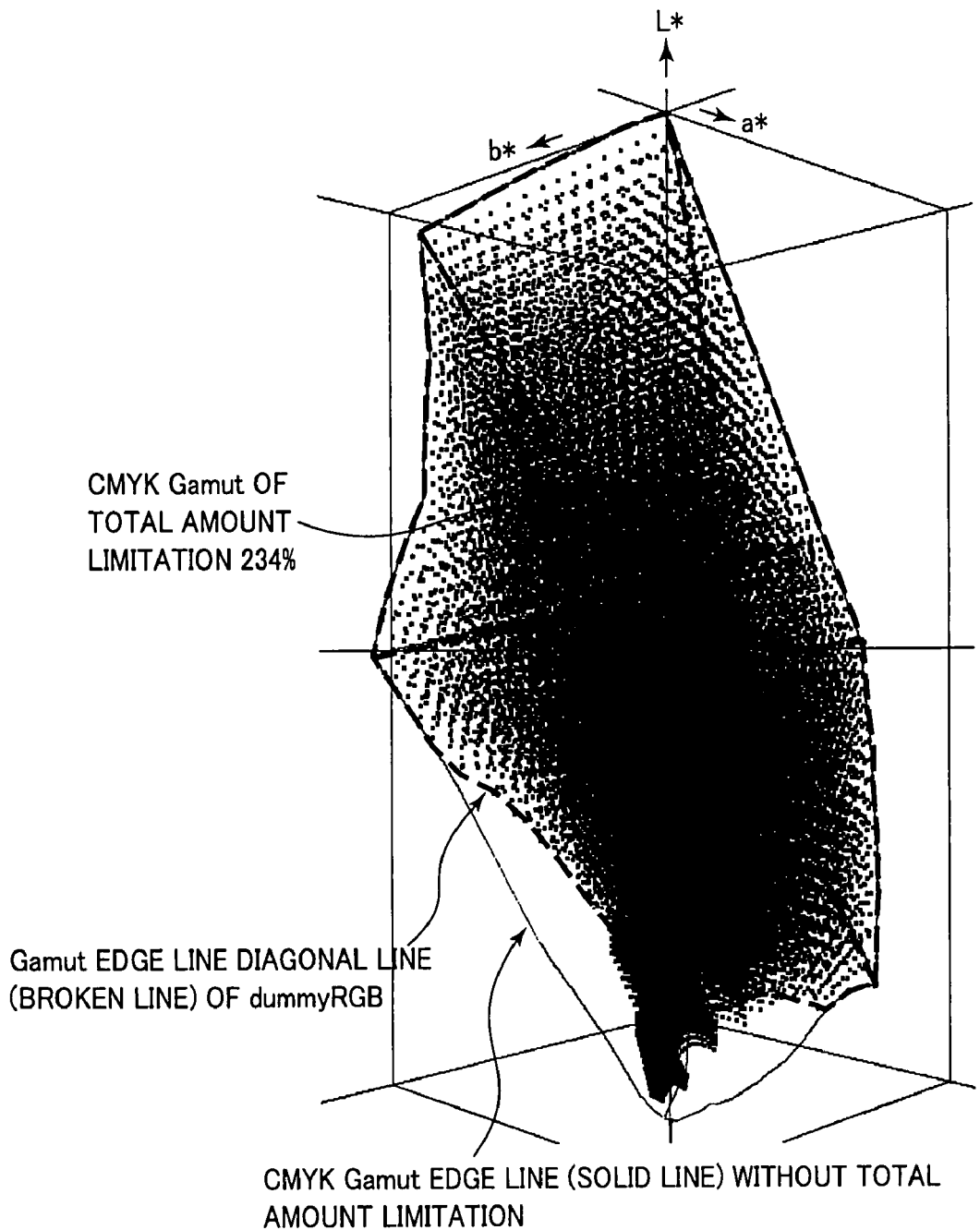
FIG. 43 is a view showing edge lines and diagonal lines of dummy RGB (where a printing paper is a standard printing art paper, an ink total amount limitation value is 234%, and the maximum value $K_{SH}$ of K is 91%), and CMYK gamut of ink total amount limitation value 234%.

FIG. 43 is a view showing edge lines and diagonal lines of dummy RGB (where a printing paper is a standard printing art paper, an ink total amount limitation value is 234%, and the maximum value $K_{SH}$ of K is 91%), and CMYK gamut of ink total amount limitation value 234%.

From FIG. 43 it is understood that edge lines and diagonal lines of dummy RGB faithfully trace the outline of the CMYK gamut of ink total amount limitation value excepting the vicinity of the black spot.

The above description is concerned with processing in the color reproduction area definition process (the step (a1)) of FIG. 5.

Next there will be explained processing in the segment profile creating process (the step (a2)) of FIG. 5.

Here, there is created a new segment profile in which values of dummy RGB are re-associated with values of L*a*b* so that pluralities of dots, which are determined at even intervals on edge lines and diagonal lines of the dummy RGB color space, or segments consisting of sides and diagonal lines of a regular hexahedron in the dummy RGB color space, are arranged at even intervals on individual segment consisting of edge lines and diagonal lines of a L*a*b* color space too.

Figure 44:
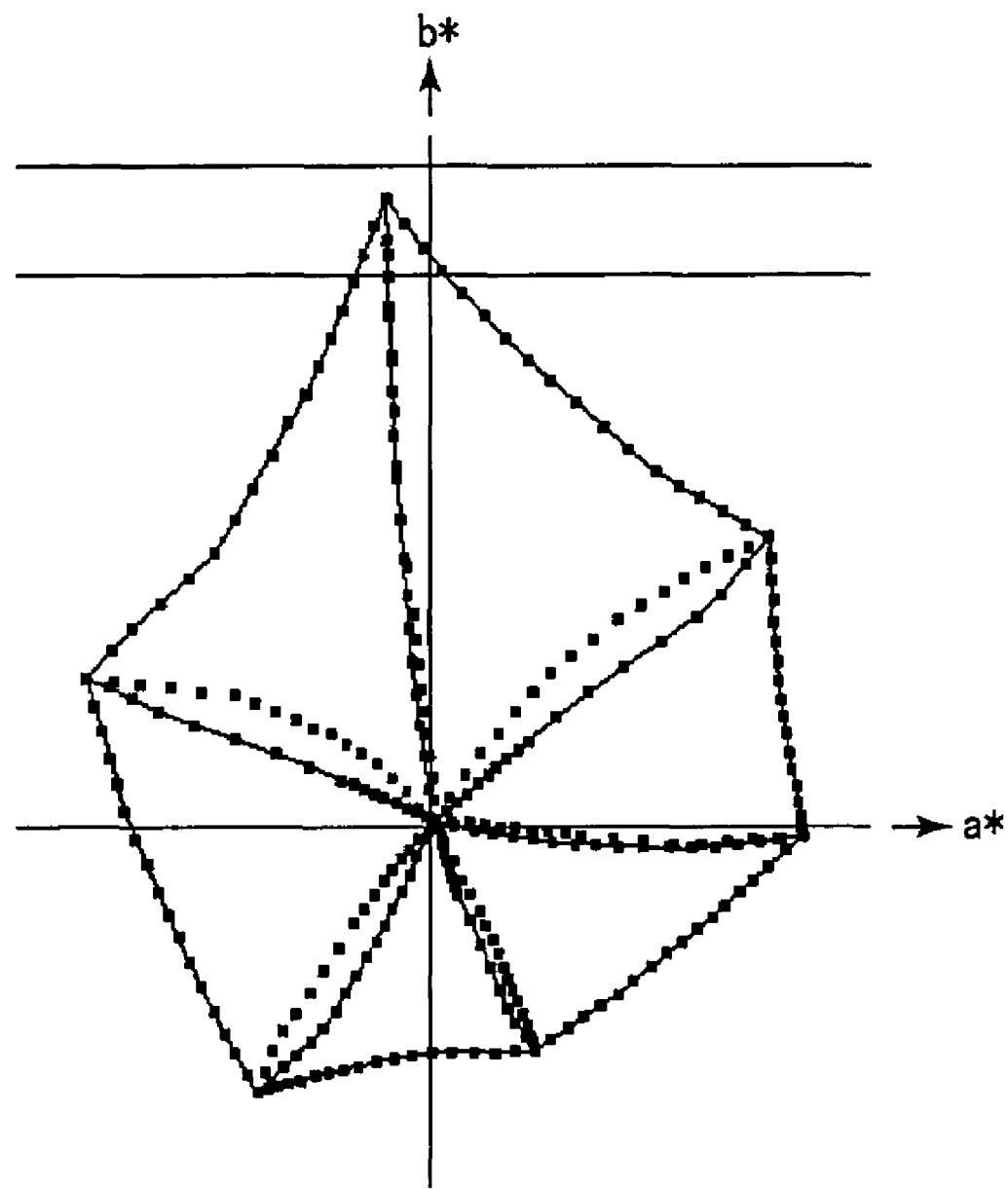
FIG. 44 is a view wherein individual segments each consisting of edge lines and diagonal lines before the even interval processing are projected on a*b* plane.
Figure 45:
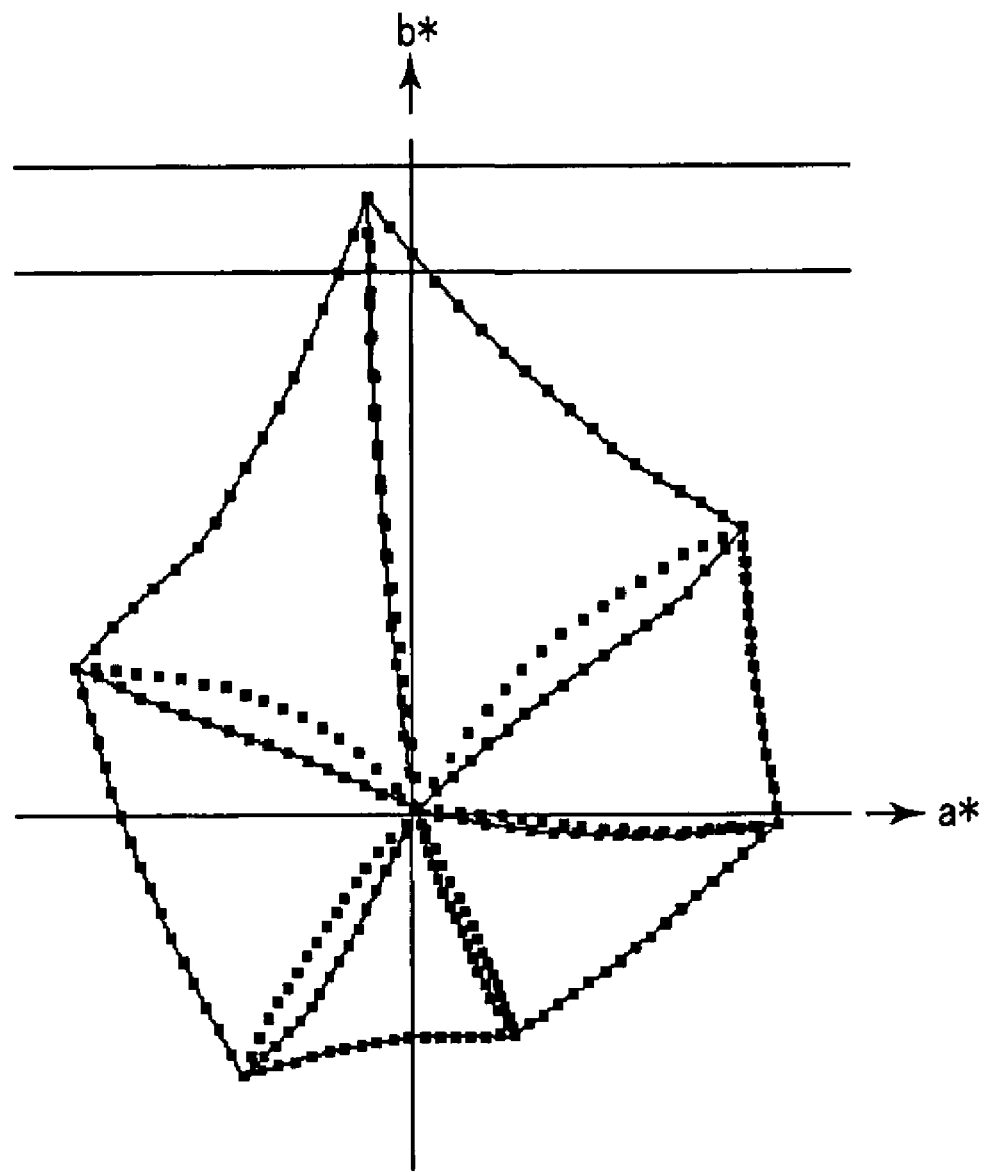
FIG. 45 is a view wherein individual segments each consisting of edge lines and diagonal lines after the even interval processing are projected on a*b* plane.

FIG. 44 is a view wherein individual segments each consisting of edge lines and diagonal lines before the even interval processing are projected on a*b* plane. FIG. 45 is a view wherein individual segments each consisting of edge lines and diagonal lines after the even interval processing are projected on a*b* plane.

Dots on individual segment shown in FIG. 44 are arranged, when one segment is taken up, at uneven intervals in the one segment. However, those dots are arranged at even intervals on individual segment on dummy RGB color space, though it is different at intervals in each segment. Here, as shown in FIG. 45, L*a*b* values are re-defined so that dots, which are arranged at even intervals on dummy RGB color space, are arranged at even intervals on L*a*b* color space too. This is necessary processing for performing gamut conversion free from tone fault.

As shown in FIG. 21 to FIG. 23, FIG. 26, FIG. 28, and FIG. 38 (here, typically referring to FIG. 21), in dummy RGB color space, pluralities of dots: (R, G, B)=(255, 255, 255), (255×(9/10), 255, 255), (255×(8/10), 255, 255), . . . , (0, 255, 255) are arranged at even intervals. When the pluralities of dots are mapped into the L*a*b* color space, those dots are expressed by $(L^*, a^*, b^*)=(L^*_{0,0,0,0} a^*_{0,0,0,0} b^*_{0,0,0,0})$, $(L^*_{10,0,0,0} a^*_{10,0,0,0}, b^*_{10,0,0,0})$, $(L^*_{20,0,0,0} a^*_{20,0,0,0} b^*_{20,0,0,0}, \ldots, (L^*_{100,0,0,0} a^*_{100,0,0,0} b^*_{100,0,0,0})$. Those dots are not arranged at even intervals in the L*a*b* color space, but generally at irregular intervals as shown in FIG. 44. For this reason, the values of L*a*b* are defined over again (cf. FIG. 45) so that the pluralities of dots on the dummy RGB color space are arranged at even intervals on the L*a*b* color space without swerving away from the segment (the edge line and the diagonal line) when the intervals are measured on the same edge line. It is acceptable that intervals along the respective edge lines on the L*a*b* color space are different from one another for each edge line.

Here, specifically, algorithm as set forth below are adopted to perform the even interval processing.

(a) On one segment, there are computed color differences (ΔE_neighbor, i (i=1 to n)) between the adjacent lattice points on the segment, where n denotes (the number of lattice points−1).

(b) Next, there are computed accumulated color difference sequences (ΔE_ruiseki, i (i=0 to n)) from one end of the segment.

(c) There is created one-dimensional look-up table (1DLUT) wherein individual accumulated color difference sequences (ΔE_ruiseki, i (i=0 to n)) are input, and L* values of individual lattice points on the segment are output.

(d) Likely, also with respect to a* values and b* values, there are created the associated one-dimensional look-up tables (1DLUT) wherein individual accumulated color differences (ΔE_ruiseki, i (i=0 to n)) are input, and L* values of individual lattice points on the segment are output. Thus, 1DLUT×3 on L*a*b* are created for accumulated color differences (ΔE_ruiseki, i (i=0 to n)).

(e) Output values L*a*b*, where values of (ΔE_ruiseki, n×i/n (i=0 to n)) are inputted to 1DLUT×3, are established as new lattice points on the segment.

(f) The above-mentioned operation processing are carried out on individual segments.

Figure 46:
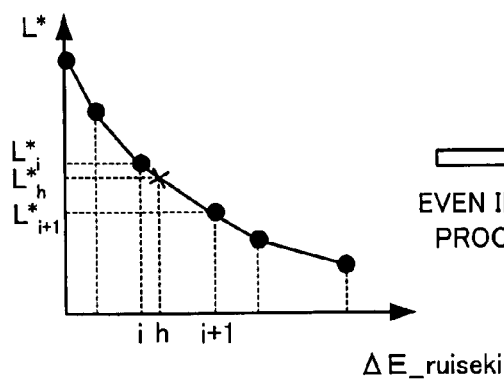
FIG. 46A and FIG. 46B are explanatory views useful for understanding the even interval processing.
Figure 46:
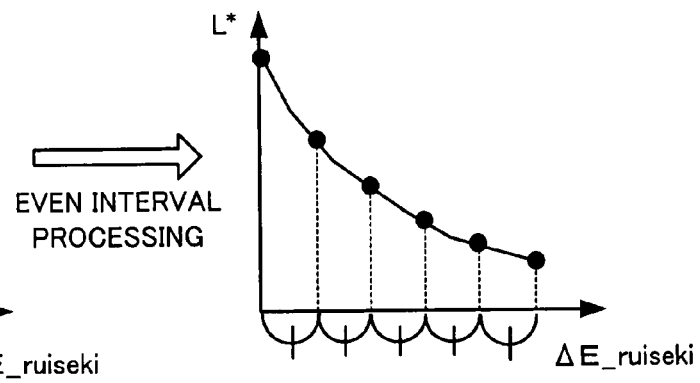

FIGS. 46A, 46B are explanatory views useful for understanding the even interval processing using 1DLUT wherein accumulated color differences are inputted, and L* values are outputted. The 1DLUT describes an association between ΔE_ruiseki and L* values on individual points shown in FIG. 46A by a black round sign.

When L* value ($L^*_h$) corresponding to ΔE_ruiseki of h point is determined for instance by using the 1DLUT, $L^*_h$ is obtained by reading L* values ($L_i^*$ and $L_{i+1}^*$) of two points (i point and i+1 point here) on 1DLUT placing the h point, and making a linear interpolation between those.

L* value of each point that lines up at equal intervals on the axis of ΔE_ruiseki shown in FIG. 46A is determined by such an interpolation operation here. Similar operation processing is done about a* value and b* value.

Figure 47:
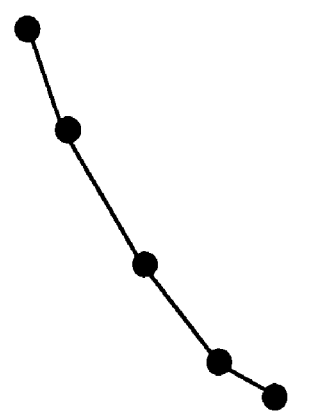
FIG. 47A and FIG. 47B are conceptual views useful for understanding lattice points on the segments before and after the even interval processing.
Figure 47:
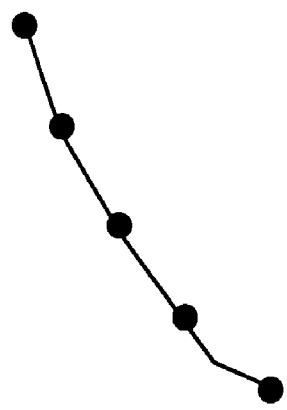

FIGS. 47A, 47B are conceptual views useful for understanding lattice points on the segments before and after the even interval processing.

Before the even interval processing, the lattice points line up in one segment at uneven intervals as shown in FIG. 47A, and the lattice points that queue up at equal intervals on the distance along the segment are arranged on the one segment by applying the above mentioned equal intervals processing to this.

FIG. 45 shows individual lattice points after the above mentioned equal intervals processing on individual segments.

FIG. 48 is a view showing a table defining segments connecting W and C after the even interval processing.

(R, G, B)=(255, 255, 255), (255×(9/10), 255, 255), (255×(8/10), 255, 255), . . . , (0, 255, 255) as shown in FIG. 48 are the same as one before the even interval processing as shown in FIG. 21, and are arranged at even intervals on the dummy RGB color space. However, with respect to L*a*b*, it is different from the case of FIG. 21, (L*, a*, b*)=(L*$_{0,0,0,0}$ a*$_{0,0,0,0}$b*$_{0,0,0,0}$), (L*$_{itp1}$, a*$_{itp1}$, b*$_{itp1}$), (L*$_{itp2}$, a*$_{itp2}$, b*$_{itp2}$), . . . , (L*$_{100,0,0,0}$, a*$_{100,0,0,0}$, b*$_{100,0,0,0}$) are also arranged at even intervals on the L*a*b* color space. Here, values of CMYK are not defined. With respect to CMYK, they are associated after determination of K-plate restraint conditions for the overall area of the color reproduction areas in the manner, which will be described later.

While FIG. 48 shows, by way of example, edge lines between W and C, there is performed re-association between L*a*b* values and dummy RGB values on the segment as to all edge lines and diagonal lines defined as mentioned above.

Implementing such a re-association makes it possible to perform a gamut mapping free from a tone fault through adopting a gamut mapping algorithm, which will be described later.

The above-mentioned description is concerned with the processing in the edge line profile creating process (the step (a2)) in FIG. 5.

Next, there will be described the processing in the gray axis profile creating process (the step (a3)) in FIG. 5.

Here, there is created a gray axis profile in which coordinate points in a dummy RGB color space are associated with coordinate points in a L*a*b* color space, with respect to the gray axis in the color reproduction area of the proofer 14 in such a manner that pluralities of dots are determined at even intervals on a gray axis connecting with one another two vertexes of W and K in the color reproduction area of the proofer 14 in the dummy RGB color space, and when the pluralities of dots are mapped on the L*a*b* color space, the pluralities of dots mapped on the L*a*b* color space are arranged at even intervals on the gray axis connecting with one another two vertexes of W and K, which are defined in the color reproduction area definition process (the step (a1)).

FIG. 49 is a view showing a table representative of a gray-axis profile.

Here, vertex of W: (R, G, B)=(255, 255, 255) is associated with W point (L*, a*, b*)=(L*$_{0,0,0,0}$a*$_{0,0,0,0}$ b*$_{0,0,0,0}$) on L*a*b*, which is associated with (C, M, Y, K)=(0, 0, 0, 0), vertex of K: (R, G, B)=(0, 0, 0) is associated with K point (L*, a*, b*)=(L*$_{CSH, MSH, YSH, KSH}$ a*$_{CSH, MSH, YSH, KSH}$ b*$_{CSH, MSH, YSH, KSH}$) on L*a*b*, which is associated with vertex of K (C, M, Y, K)=($C_{SH}$, $M_{SH}$ $Y_{SH}$ $K_{SH}$), and pluralities of points: (R, G, B)=(255, 255, 255), (255×(9/10), 255×(9/10), 255×(9/10)), . . . , (0, 0, 0), which are arranged at even intervals on a gray axis connecting with one another two vertexes of W and K on a dummy RGB color space, are associated with pluralities of points: (L*, a*, b*)=(L*$_{0,0,0,0}$a*$_{0,0,0,0}$b*$_{0,0,0,0}$), (L*$_{itp9/10}$ a*$_{itp9/10}$ b*$_{itp9/10}$), (L*$_{itp8/10}$a*$_{itp8/10}$b*$_{itp8/10}$), . . . , (L*$_{CSH, MSH, YSH, KSH}$ a*$_{CSH, MSH, YSH, KSH}$ b*$_{CSH, MSH, YSH, KSH}$), which are arranged at even intervals on a gray axis connecting with one another two vertexes of W and K on a L*a*b* color space.

Here, since it is unnecessary to compute CMYK values, there are provided for CMYK. L*$_{itp9/10}$ and the like are expressed by the following equations.

$$L^*_{itpi/10} = L^*_{0,0,0,0} \times i/10 + L^*_{CSH, MSH, YSH, KSH} \times (10-i)/10$$

$$a^*_{itpi/10} = a^*_{0,0,0,0} \times i/10 + a^*_{CSH, MSH, YSH, KSH} \times (10-i)/10$$

$$b^*_{itpi/10} = b^*_{0,0,0,0} \times i/10 + b^*_{CSH, MSH, YSH, KSH} \times (10-i)/10$$

The reason why there is provided such an association that an arrangement of pluralities of dots at even intervals on the gray axis in the dummy RGB color space is implemented on the gray axis in the L*a*b* color space too is that there is implemented a gamut mapping free from a tone fault, in a similar fashion to the re-association on the edge lines as mentioned above.

According to the profile computing process (the step (a4)) in FIG. 5, there are computed a profile of a surface other than the edge lines and the diagonal lines of the color reproduction area of the proofer 14 and a profile of the interior other than the gray axis, through an interpolation operation taking as boundary conditions both the segment profile created in the segment profile creating process of the step (a2) and the gray axis profile created in the gray axis profile creating process of the step (a3).

Here, with respect to L*a*b*, quadratic expressions as set forth below are used to determine factors of $a_0$-$a_9$, $b_0$-$b_9$, $c_0$-$c_9$, taking as sample points the associated dots between dummy RGB values and L*a*b* values, of the segment profile and the gray axis profile which are created in the manner as mentioned above.

$$L^* = a_0 R_2^2 + a_1 G_2^2 + a_2 B_2^2 + a_3 R_2 G_2 + a_4 G_2 B_2 + a_5 B_2 R_2 + a_6 R_2 + a_7 G_2 + a_8 B_2 + a_9$$

$$a^* = b_0 R_2^2 + b_1 G_2^2 + b_2 B_2^2 + b_3 R_2 G_2 + b_4 G_2 B_2 + b_5 B_2 R_2 + b_6 R_2 + b_7 G_2 + b_8 B_2 + b_9$$

$$b^* = c_0 R_2^2 + c_1 G_2^2 + c_2 B_2^2 + c_3 R_2 G_2 + c_4 G_2 B_2 + c_5 B_2 R_2 + c_6 R_2 + c_7 G_2 + c_8 B_2 + c_9$$

The thus determined factors are substituted for the quadratic expression set forth above to perform the association between the dummy RGB values and the L*a*b* values on overall area of the color reproduction area of the proofer 14.

Figure 50:
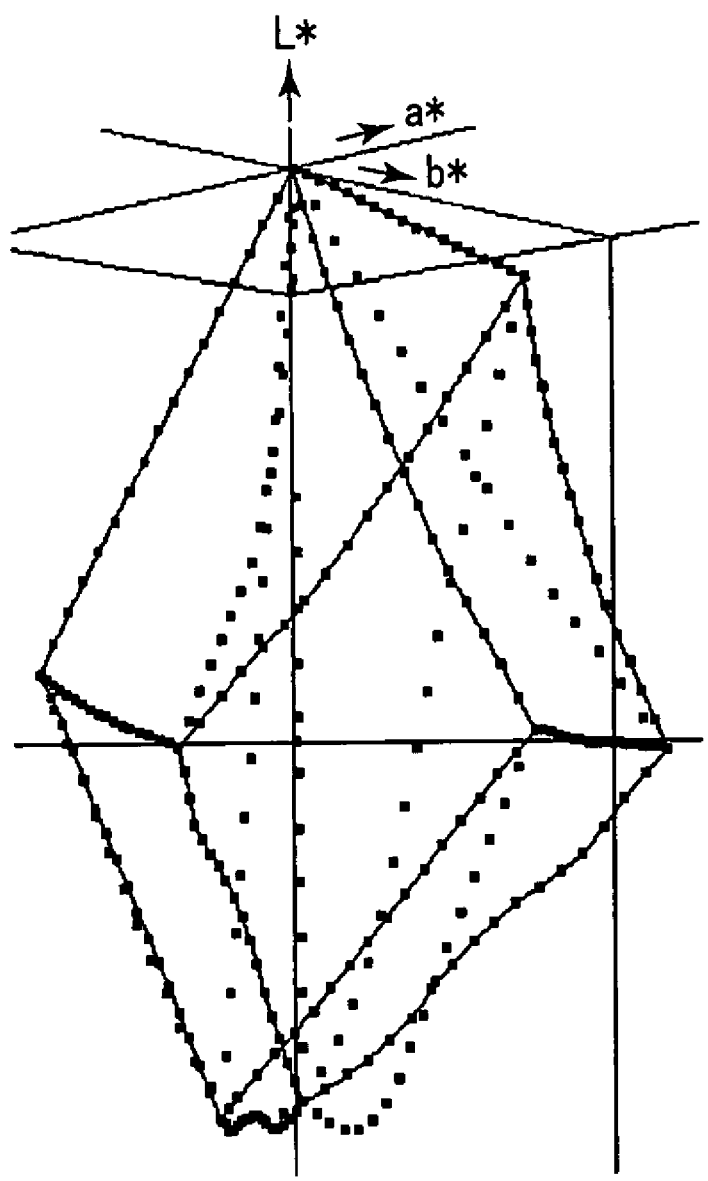
FIG. 50 is a conceptual view showing color reproduction characteristic (a proofer profile) which is created by applying an association to the color reproduction area of the proofer in its entirety.
Figure 51:
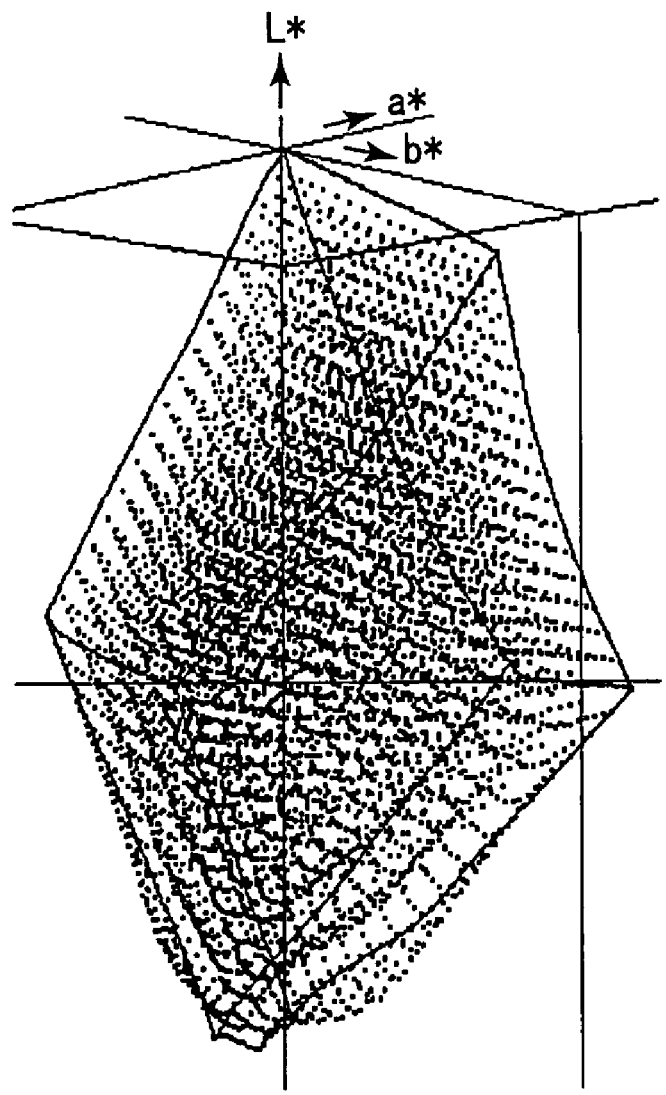
FIG. 51 is a conceptual view showing color reproduction characteristic (a proofer profile) which is created by applying an association to the color reproduction area of the proofer in its entirety.
Figure 52:
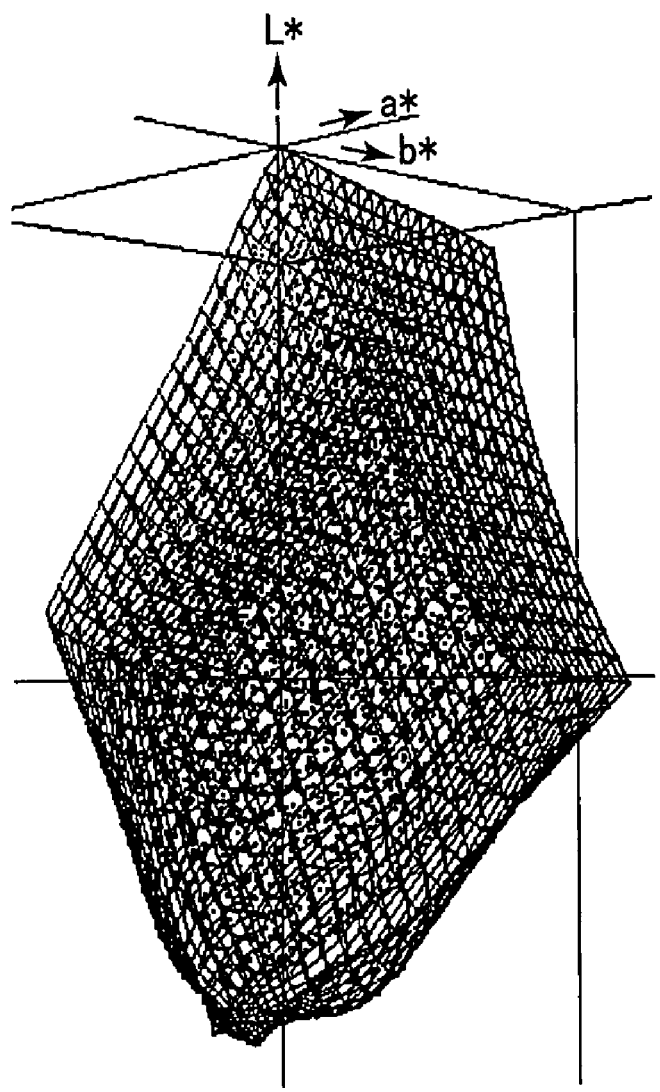
FIG. 52 is a conceptual view showing color reproduction characteristic (a proofer profile) which is created by applying an association to the color reproduction area of the proofer in its entirety.

FIG. 50 to FIG. 52 are each a conceptual view showing color reproduction characteristic (a proofer profile) which is created by applying an association to the color reproduction area of the proofer in its entirety.

FIG. 50 is an illustration showing sample points before computation. FIG. 51 is an illustration showing L*a*b* values after computation by dots. FIG. 51 is an illustration showing L*a*b* values after computation by meshes.

According to the virtual device profile creating process (cf. FIG. 5) of the step (A) of the color conversion definition creating method of FIG. 4, the proofer profile of the virtual proofer 14 shown in FIG. 1 is determined in the manner as mentioned above.

As mentioned above, there is a possibility that L*a*b* values, which are obtained through the computation by the interpolation, fail to satisfy the ink total amount limitation at the present stage. This problem will be described latter.

Next, there will be explained processing of the first link profile creating process (the step (B)) of FIG. 4.

In the first link profile creating process (the step (B)) of FIG. 4, individual processes of FIG. 6, that is, the K-value definition process (the step (b1)), the first CMYK values computing process (the step (b2)), the first value adjustment process (the step (b3)), the K-value computing process (the step (b4)), the second CMYK values computing process (the step (b5)), and the second value adjustment process (the step (b6)), are carried out, and the proofer profile (cf. FIG. 16), which is created in the virtual device profile creating process (the step (A)) of FIG. 4, is associated with CMYK values, so that there is determined the link profile 54 (cf. FIG. 17) in which the CMYK values are associated with the coordinate points (the dummy RGB values) of the dummy RGB color space.

First, in the K-value definition process (the step (b1)), with respect to the color reproduction area of the proofer 14 determined in the virtual device profile creating process of the step (A) in FIG. 4, there are defined values of K as to the respective points on the gray axis, WMRY plane, WYGC plane, WCBM plane, RK edge line, GK edge line, BK edge line, CK diagonal line, MK diagonal line, and YK diagonal line, of the color reproduction area of the second device in such a manner that with respect to the gray axis there are adopted values of K determined by the K-plate restraint condition K=K(C) (cf. FIG. 15), with respect to WMRY plane encircled by the edge lines that sequentially couple W-M-R-Y-W with one another, WYGC plane encircled by the edge lines that sequentially couple W-Y-G-C-W with one another, and WCBM plane encircled by the edge lines that sequentially couple W-C-B-M-W with one another, there are adopted values of K of K≦0, and with respect to RK edge line coupling R-K with one another, GK edge line coupling G-K with one another, BK edge line coupling B-K with one another, CK diagonal line coupling C-K with one another, MK diagonal line coupling M-K with one another, and YK diagonal line coupling Y-K with one another, there are adopted values of K of K≧0.

Specifically, it is as follows.

Figure 53:
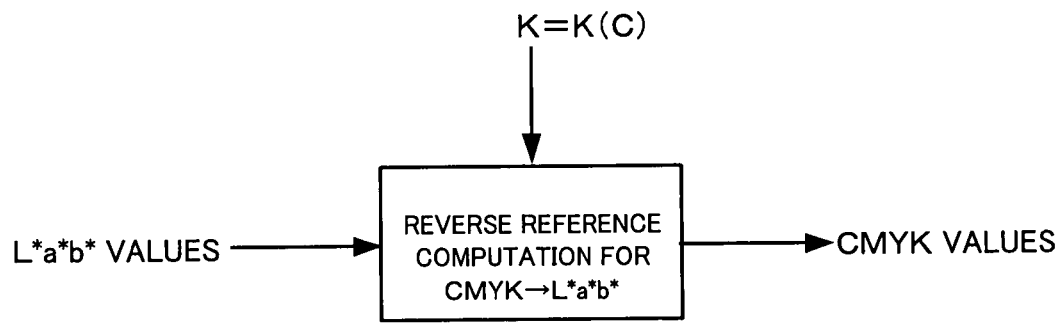
FIG. 53 is an explanatory view useful for understanding how to determine CMYK values associated with individual points of the color reproduction area of dummy RGB.

FIG. 53 is a conceptual view useful for understanding the computation in which CMYK values are determined from L*a*b* values as to the gray axis.

First, with respect to the gray axis of R=G=B, there is used the K-plate restraint condition K=K(C) to allot values of K to the points on the gray axis.

More in detail, CMYK values of individual points on the gray axis are determined from L*a*b* values of individual points on the gray axis, referring to the printing profile for determining L*a*b* values from CMYK values in the reverse direction under the K-plate restraint condition K=K(C).

Figure 54:
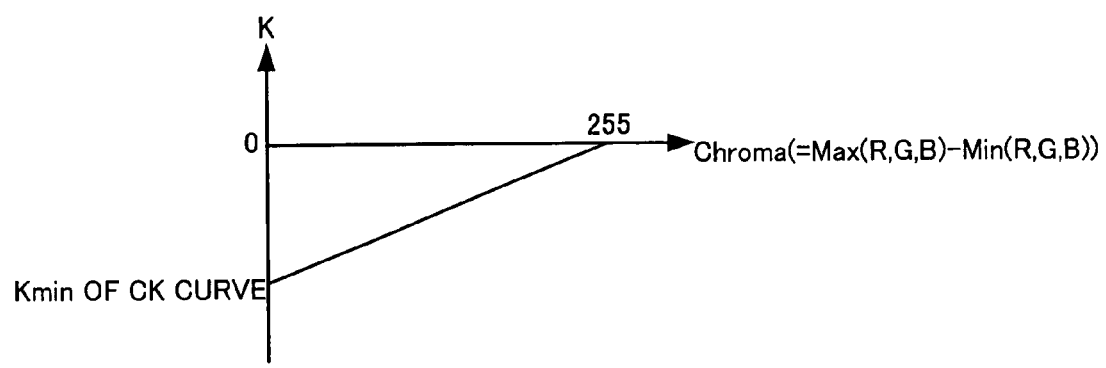
FIG. 54 is a view showing an example of K values to be allotted to individual points on WMRY plane, WYGC plane, and WCBM plane, which is expressed in form of a function.

FIG. 54 is a view showing an example of K values to be allotted to individual points on WMRY plane, WYGC plane, and WCBM plane, which is expressed in form of a function.

The value of K should be K=0 to reproduce by the print the color of each point on three surfaces (including nine edge lines of the remainder except the WMRY plane, the WYGC plane, and the WCBM plane; the RK edge line, the GK edge line and the BK edge line) which come in contact with white point W on the color reproduction area. It is easy for an area near W on those three surfaces (the WMRY plane, the WYGC plane, and the WCBM plane) to be affected by K value (the K-plate restraint condition (Refer to FIG. 15)) on the gray axis since the distance with the gray axis short. Accordingly, in the event that there is provided a K-plate restraint condition where K value suddenly increases starting for K point from W point, it is feared that the value of K of the part near the WMRY plane, the WYGC plane, and the WCBM plane in the color reproduction area becomes K>0.

Thus, with respect to individual points on three planes of the WMRY plane, the WYGC plane, and the WCBM plane, as shown in FIG. 54, K value, wherein the following equation is determined as variable, is allocated.

Chroma=Max(R,G,B)−Min(R,G,B)

Where Max (R,G,B) denotes the maximum value of individual values of R,G,B of the associated point, and Min (R,G,B) denotes the minimum value of individual values of R,G,B of the associated point.

In FIG. 54, there are adopted functions wherein when it is Chroma=0, Kmin of CK curve (K=K(C) shown in FIG. 15 is adopted, and when it is Chroma=255 (here, the maximum value of individual values of R,G,B is 255), K=0 is adopted. As values of K, the negative values, which are large in absolute value, are allocated to points (points near W) which are low in chroma saturation on the WMRY plane, the WYGC plane, and the WCBM plane, and it approaches K=0 as it starts for a high chroma, and K=0 is allocated at individual vertexes of R, G, B, C, M, and Y. Thus, there is secured the continuousness of K with the area that comes near to K from individual vertexes of R, G, B, C, M, and Y where K>0 is allocated.

Figure 55:
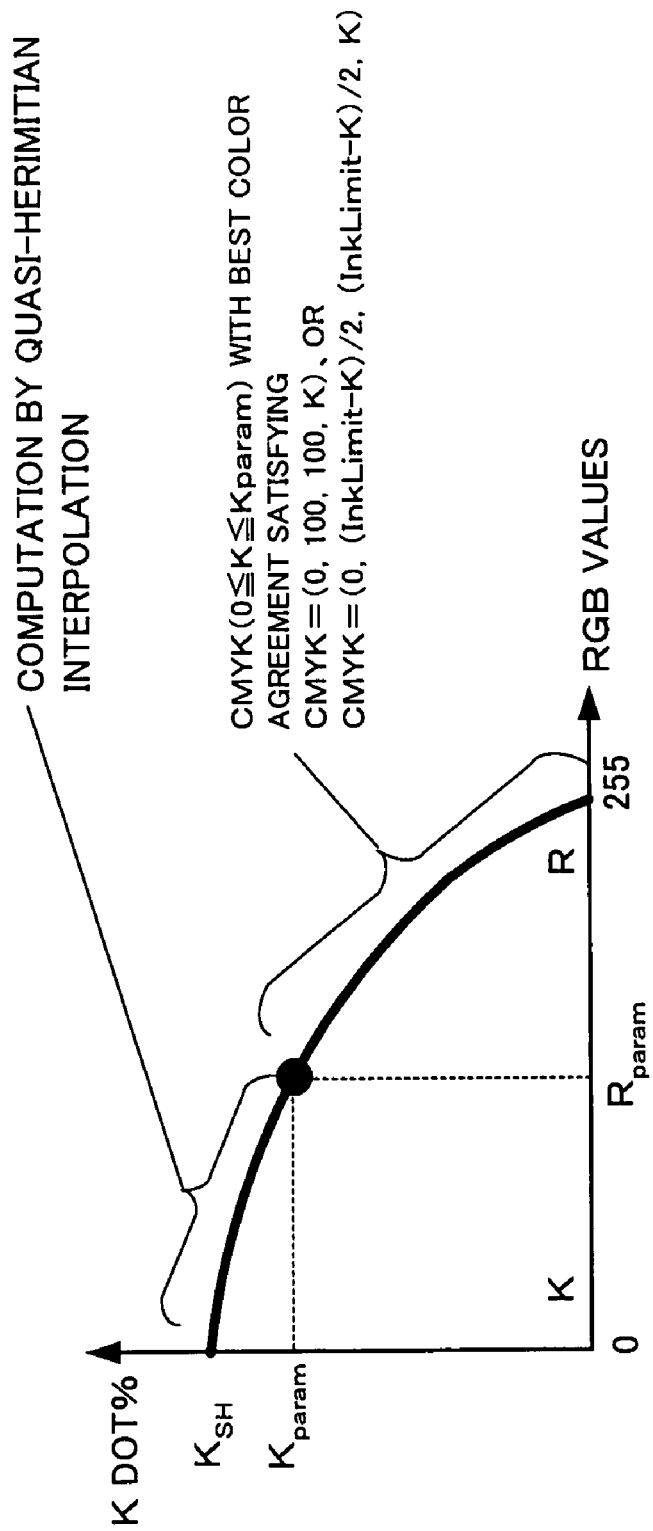
FIG. 55 is a view showing an example of K values to be allotted to individual points on RK edge lines, which is expressed in form of a function.

FIG. 55 is a view showing an example of K values to be allotted to individual points on RK edge lines, which is expressed in form of a function. The horizontal axis denotes R values, and the vertical axis denotes K values.

Here, though the RK edge line is taken up and it is explained, the GK edge line, the BK edge line, the CK diagonal line, the MK diagonal line, and the YK diagonal line are similar it.

The vertex of R is R=255, it becomes K=0 in this respect, and it is coincident with value (K=0) of K obtained from vertex (Chroma=255) of R obtained from the function shown in FIG. 54.

When it leaves vertex (CMYK=(0,100,100,0)) of this R and it advances on the edge line toward K(CMYK=(0,100,100,100)) of Redness shown in FIG. 25, the value of K increases by decreasing one by one according to it, and the value of R reaches interpolation start point (CMYK=(0,100,100,Kparam)) shown in FIG. 25. Up to here, it comes to trace the surface of the print profile (Refer to FIG. 14) and K value (0≦K≦$K_{param}$) with the best color agreement that satisfies CMYK=(0,100,100,K) or CMYK=(0,(InkLimit−K)/2,(InkLimit−K)/2,K) according to R value is unequivocally determined as for the value of K.

It advances on the edge line (Refer to FIG. 25) starting from vertex (CMYK=(0,100,100,0)) of R for K(CMYK=(0,100,100,100)) of Redness, and it leaves the edge line and it advances to CMYK=($C_{SH}$, $M_{SH}$, $Y_{SH}$, $K_{SH}$) that is the black point of dummy RGB after it reaches CMYK=(0,100,100,$K_{param}$). The value of K can take the arbitrary value between the minimum value and the maximum value of each point because it leaves the edge line of the print profile between these and it advances internally. Then, the value of K is increased from $K_{param}$ to $K_{SH}$ here in proportion to a decrease of the value of R (increase in the value of C) according to the curve obtained by the quasi-Hermitian interpolation operation between $K_{param}$ and $K_{SH}$.

Since the quasi-Hermitian interpolation uses a higher-order polynomial, an interpolation value may be bigger than $K_{SH}$, and it reverse. In that case, the interpolation value, which is bigger than $K_{SH}$, is clipped to $K_{SH}$.

Thus, there are determined K values of individual points on the RK edge line starting from the vertex of R via the point of CMYK=(0,100,100,$K_{param}$) to CMYK=($C_{SH}$, $M_{SH}$, $Y_{SH}$, $K_{SH}$).

Here, though the RK edge line is taken up and it is explained, the GK edge line, the BK edge line, the CK diagonal line, the MK diagonal line, and the YK diagonal line are similar it.

In the K-value definition process (the step (b1)) of FIG. 6, there are defined values of K as to the respective points on the gray axis, WMRY plane, WYGC plane, WCBM plane, RK edge line, GK edge line, BK edge line, CK diagonal line, MK diagonal line, and YK diagonal line.

In the first CMYK values computing process (the step (b2)) of FIG. 6, with respect to individual points wherein values of K are defined in the K-value definition process (the step (b1)), CMYK values of those individual points are determined by reversely referring to the printing profile shown in FIG. 14, and CMYK values of those individual points are determined together with K values that are defined in the step b1.

FIG. 14 shows the printing profile for converting from the CMYK values into the L*a*b* values. To the contrary, here, L*a*b* values of individual points are converted into CMYK values by referring to the printing profile in the opposite direction assuming that K values of individual points are to be a restraint condition, on the condition that K value of the associated point is satisfied. However, because the area of K<0 (Refer to FIG. 15) doesn't exist in the print profile, K value of the point with K value of K<0 at the stage before this printing profile is referred is replaced by K=0.

Next, there will be explained the first value regulation process of step (b3) in FIG. 6. In the first value regulation process (step (b3)), it is examined whether the CMYK values of individual points that are determined in the manner as mentioned above satisfy the ink total amount limitation, and as the point not satisfied, the associated value is adjusted as follows.

Figure 56:
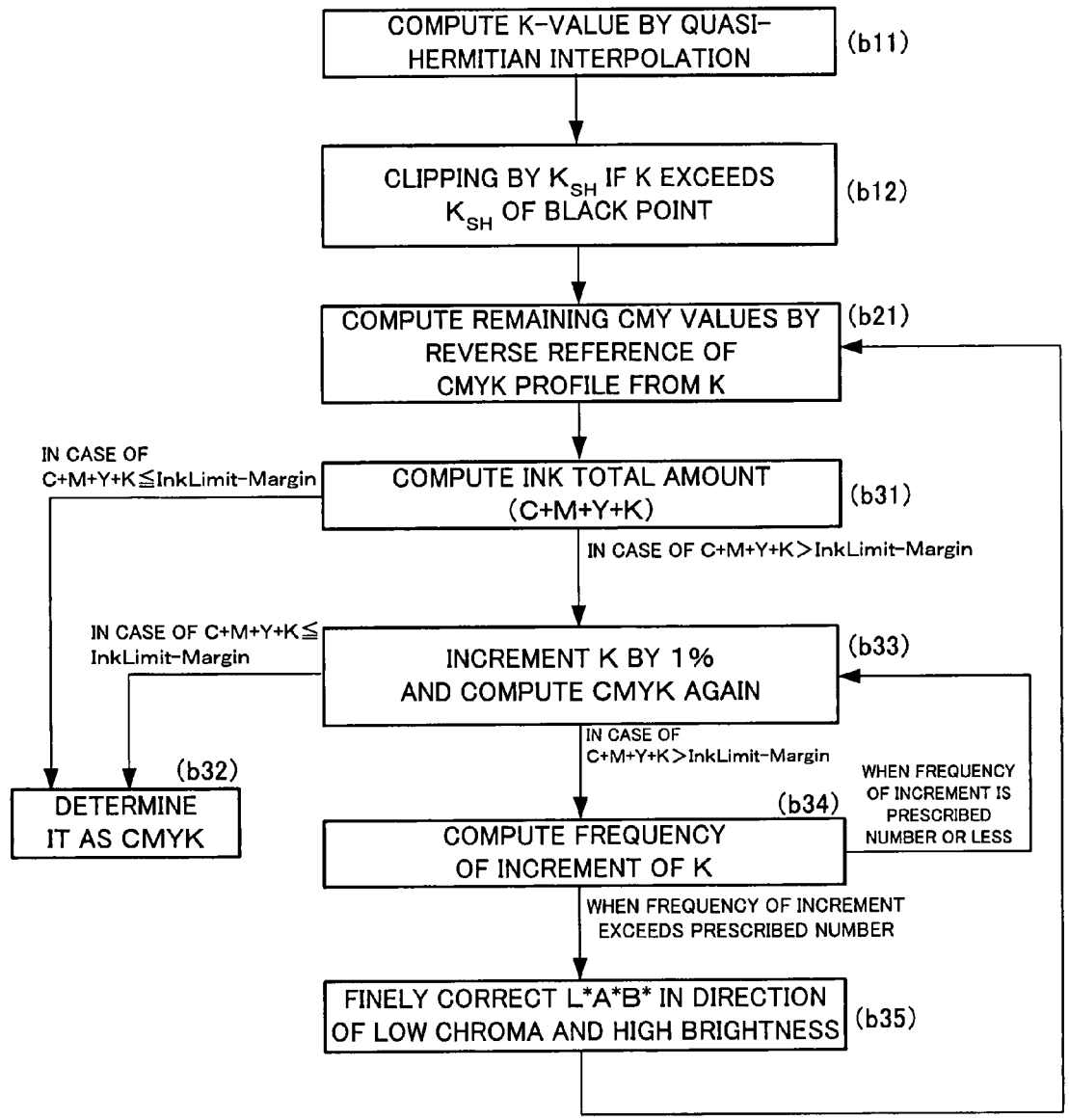
FIG. 56 is a flowchart useful for understanding a first value regulation process.

FIG. 56 is a flowchart useful for understanding the first value regulation process (step (b3)).

FIG. 56 shows not only the first value regulation process (step (b3)), but also the K-value definition process (the step (b1)) and a part of the first CMYK values computing process as mentioned above. A possibility that the first CMYK values obtained in the manner as mentioned above exceed the ink total amount limitation is concerned with points, which are located at RK edge line, GK edge line, BK edge line, CK diagonal line, MK diagonal line, and YK diagonal line, where L*a*b* values are determined by the interpolation operation explained referring to FIG. 53. Accordingly, FIG. 56 shows the processing since interpolation operation with the possibility that the CMYK values exceed the ink total amount limitation.

Of the steps of FIG. 56, step (b11) and step (b12) correspond to a portion of the interpolation operation by the quasi-Hermitian interpolation, which is a portion of the K-value definition process of the step (b1) of FIG. 6. The step (b21) of FIG. 56 corresponds to a portion wherein CMYK values are determined on individual portion in which K value is determined by the quasi-Hermitian interpolation, in the first CMYK values computing process of the step (b2) of FIG. 6. With respect to the remaining steps (b31) to (b35) of FIG. 56, a combination of those steps corresponds to first value regulation process of the step (b3)) of FIG. 6.

The K value is defined by the quasi-Hermitian interpolation operation in the manner as mentioned above, and an ink total amount (C+M+Y+K) is computed on individual portions in which CMYK values are determined by reversely referring to the CMYK profile (step (b31)). It is decided as to whether the ink total amount (C+M+Y+K) is the ink total amount limitation InkLimit or less. Here, margin value Margin to some degree (about several %) is introduced never to exceed the ink total amount limitation value when smoothing is processed after CMYK is converted, and it is decided whether it is concerned with $C+M+Y+K \leq \text{InkLimit}-\text{Margin}$ or, $C+M+Y+K > \text{InkLimit}-\text{Margin}$.

When it is decided that it is concerned with C+M+Y+K≦InkLimit−Margin, CMYK values, which are determined in step (b21), are adopted as it is (step (c32)).

On the other hand, when it is decided that it is concerned with C+M+Y+K>InkLimit−Margin, the value of K is incremented by 1% to determine CMYK values according to the incremented K-value re-referring to the CMYK profile (Refer to FIG. 14) of printing assuming that the incremented K-value is the restraint condition. Thus, in step (b33), it is decided whether the CMYK values consisting of the thus determined incremented K and CMY values are concerned with $C+M+Y+K \leq \text{InkLimit}-\text{Margin}$ or, $C+M+Y+K > \text{InkLimit}-\text{Margin}$.

When the value of K is incremented, the ink total amount (C+M+Y+K) is decreased by the correspondence. Accordingly, here, the value of K is incremented slightly.

When it is decided that the thus re-computed CMYK values are concerned with C+M+Y+K≦InkLimit−Margin, the thus re-computed CMYK values are adopted.

On the other hand, when it is decided that the thus re-computed CMYK values are concerned with C+M+Y+K>InkLimit−Margin, again, the number of times for increment of K is computed (step (b34). In the event that the number of times of the increment is a prescribed number or less, the process returns to the step (b33) to increment the value of K again only by 1%. A great alteration of the value of K brings about the inversion of K-plate. Thus, according to the present embodiment, the maximum number (the above-mentioned prescribed number) of the increment of the value of K is set to three times.

When the frequency of the increment of K calculated in step (b34) exceeds a prescribed number, the process proceeds to step (b35) this time, and L*a*b* value of the respect is finely corrected in the direction of a low chroma and high brightness.

Here, there will be described the method of correcting the above-mentioned L*a*b* value in a low chroma and the direction of high brightness. It should be corrected that the tone property with a surrounding color is maintained as a correction method to say nothing of the direction where the ink total amount becomes small. It is effective to finely correct any color in the direction of the center of gamut uniformly, and it is corrected for that concretely as follows.

Figure 57:
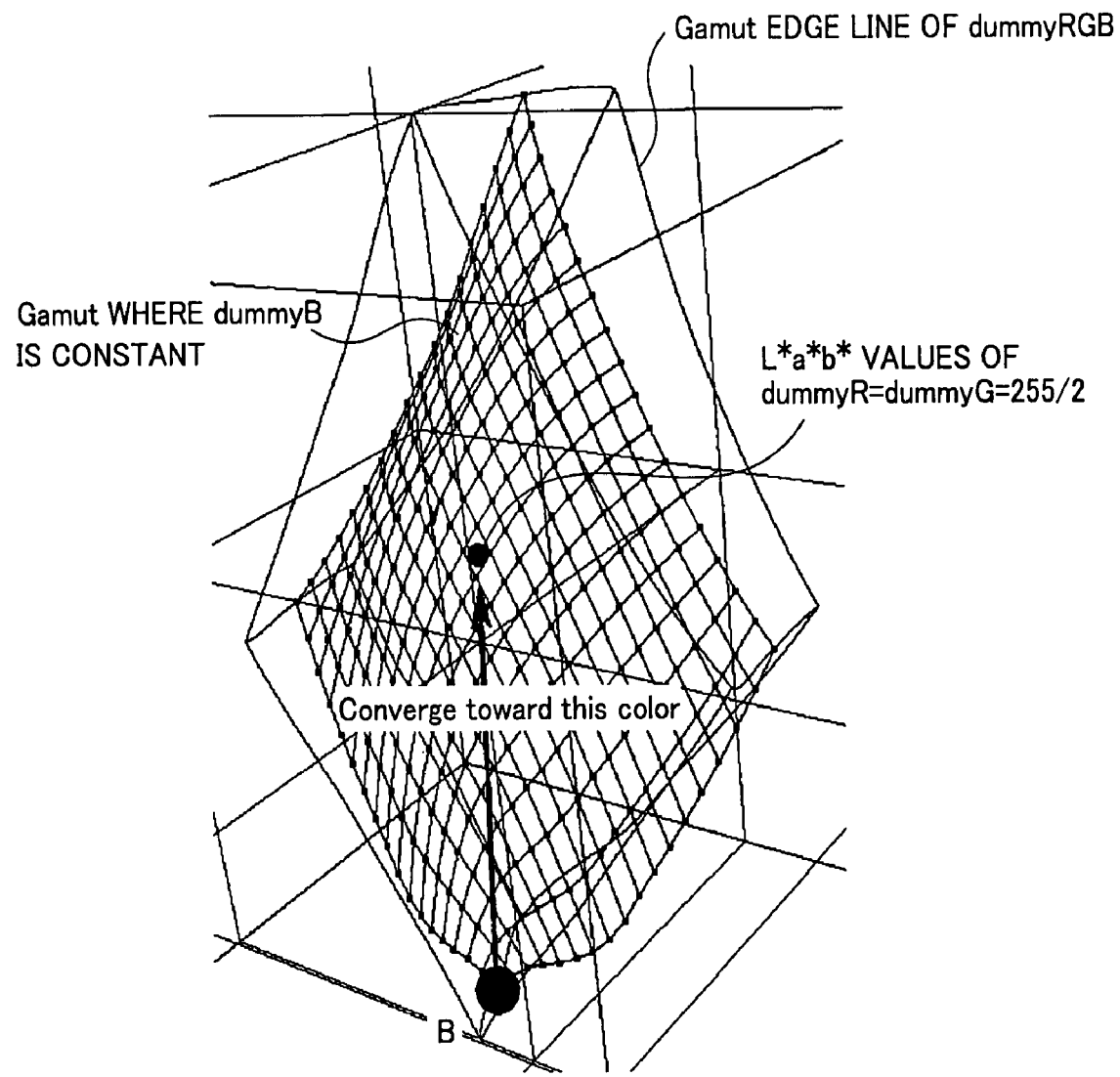
FIG. 57 is an explanatory view useful for understanding fine correction of L*a*b*.

FIG. 57 is an explanatory view useful for understanding fine correction of L*a*b*.

Here, when the maximum value, mean value, and minimum value of dummyR, dummyG, and dummyB are assumed to be L, M, and S respectively, while L is preserved, M and S are corrected by the prescribed color difference toward a low chroma named M=S=255/2 and the color in the direction of high brightness. In other words, the chroma is decreased by enlarging the value of Min(R,G,B) without changing the value of Max(R,G,B) among Max(R,G,B)−Min(R,G,B) representative of chroma saturation. For instance, when L*a*b* value of dummyRGB(0,0,120) on the BK edge line is finely corrected, as shown in FIG. 57, only the prescribed color difference (for instance, color difference 0.5) converges toward L*a*b* value of the point of dummyRGB= (255/2,255/2,120).

The fine correction of L*a*b* value in such a direction makes it possible to lower the ink total amount after the distortion with a surrounding lattice point is suppressed to the minimum.

Thus, there are determined CMYK values in the gray axis, three planes contacting with W, the RK edge line, the GK edge line, the BK edge line, the CK diagonal line, the MK diagonal line, and the YK diagonal line.

According to the K-value computing process of the step (b4) of FIG. 6, there are computed K-values of the points wherein K-values are not yet defined, on the surfaces and the interior of the color reproduction area of the proofer 14 (dummy RGB), through an interpolation operation taking as boundary conditions K-values of points on the gray axis, the WMRY plane, the WYGC plane, the WCBM plane, the RK edge line, the GK edge line, BK edge line, the CK diagonal line, the MK diagonal line, and the YK diagonal line. With respect to points wherein minus values of K are defined in the K-value definition process of the step (b1) of FIG. 6, as to the interpolation operation, the minus values of K-values are adopted as it is.

Specifically, there is a quadratic expression as set forth below is adopted to compute $d_0$-$d_9$, taking as sample points the points of the WMRY plane, the WYGC plane, the WCBM plane, the RK edge line, the GK edge line, BK edge line, the CK diagonal line, the MK diagonal line, the YK diagonal line, and the gray axis of the color reproduction area.

$$K=d_0R^2+d_1G^2+d_2B^2+d_3RG+d_4GB+d_5BR+d_6R+d_7G+d_8B+d_9$$

However, regarding the points on the gray axis, the computation is performed with 1000 times weighting for instance. Thus, in the vicinity of the gray axis, K values are strongly affected by K values of the points on the gray axis, so that the K values around the gray axis become substantially the same values as the values on the gray axis. This feature makes it possible to faithfully keep the K-plate restraint condition K=K(C) on the gray axis of the printer 11, even if there is somewhat discrepancy between the gray axis of the virtual proofer 14 now computed and the gray axis of the printer 11 shown in FIG. 1.

According to the second CMYK values computing process of the step (b5), there are computed CMY values on individual points wherein K-values are newly computed in the K-value computing process of the step (b4), by reversely referring to the CMYK profile of printing in a similar fashion to that of the step (b2). Thus obtained CMY values are combined with the K-values computed in the K-value computing process of the step (b4) so that CMYK values are determined on their individual points.

However, there is a possibility that the CMYK values obtained in the manner as mentioned above exceed the ink total amount limitation, because the thus obtained CMYK values include the interpolation operation in the process. Thus, in the second value adjustment process of the step (b6) of FIG. 6, in a similar fashion to that of the explanation made referring to FIG. 6, there are determined CMYK values free from a tone fault, wherein an ink total amount limitation is satisfied and K-plate is smooth.

Figure 58:
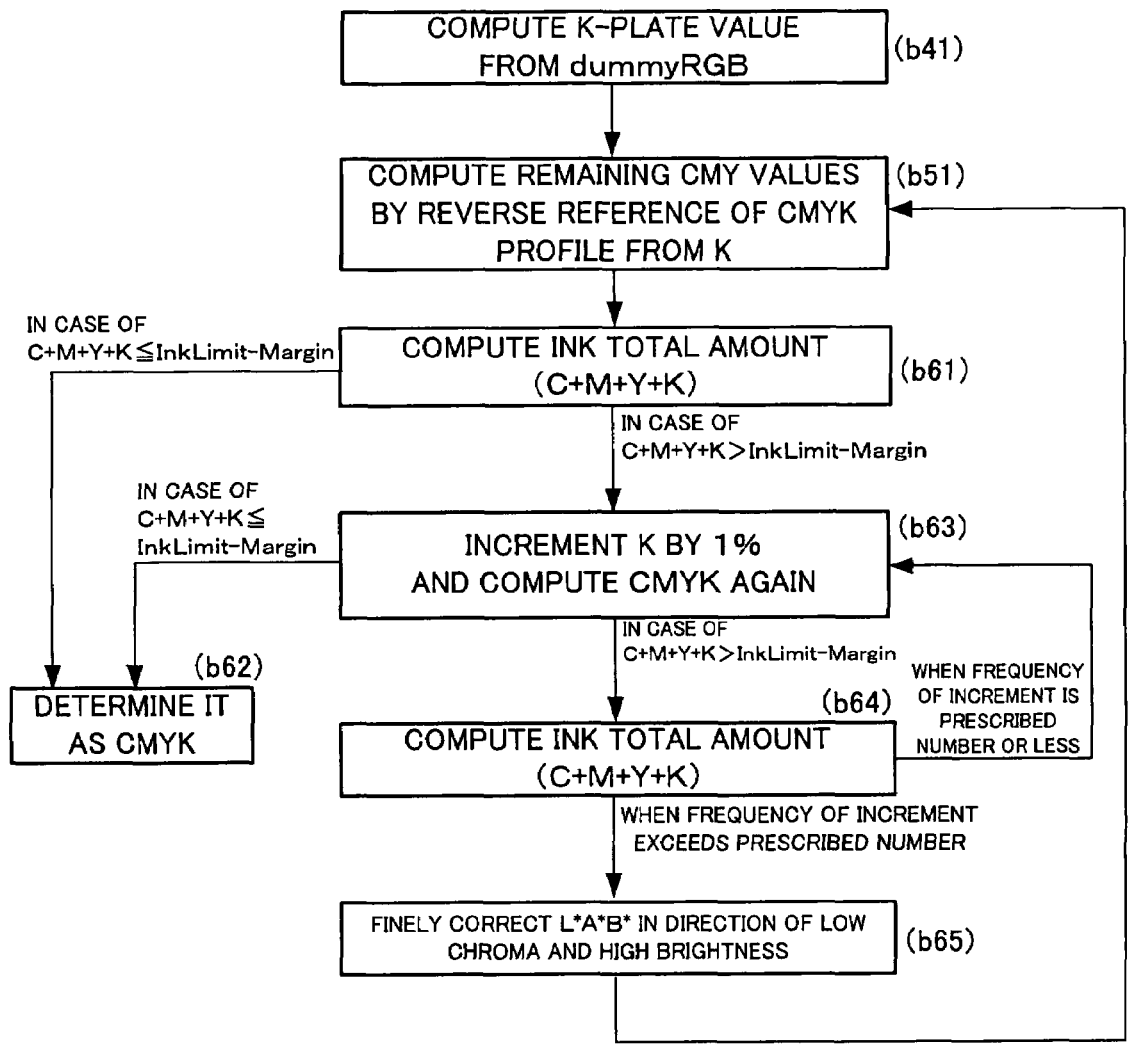
FIG. 58 is a flowchart useful for understanding a second value regulation process.

FIG. 58 is a flowchart useful for understanding a second value regulation process.

FIG. 58 shows also processing of step (b4) and step (b5) of FIG. 6 to couple it to processing of the second value adjustment process of the step (b6) of FIG. 6. Step (b41) and step (b51) of FIG. 58 correspond to the step (b4) and the step (b5) of FIG. 6, respectively. Step (b61) to step (b65) of FIG. 58 correspond in their combination to the step (b6) of FIG. 6.

The step (b61) to the step (b65) of FIG. 58 correspond to the step (b31) to the step (b35) of FIG. 56, respectively. FIG. 56 shows the processing on the points in which K-value is defined in the K value definition process in the step (b1) in FIG. 6, and FIG. 58 shows the processing on the points in which the K-value is newly computed in the K value definition process in the step (b1) in FIG. 6. Thus, the steps (b61) to (b65) in FIG. 58 are different only in the target point for processing as compared with the steps (b31) to (b35) in FIG. 56 and are same in the content of processing, and then redundant explanation will be omitted here.

An implementation of individual steps of (b1) to (b6) of FIG. 6 makes it possible to create a link profile between dummy RGB and CMYK on all lattice points in the color reproduction area of dummy RGB (refer to FIG. 17).

In other words, in the virtual device profile creating process of FIG. 4, there is created the profile (proofer profile 53 (refer FIG. 16)) of the proofer 14 in the manner as mentioned above. More in detail, dummy RGB values which depend on the proofer 14, and L*a*b* values which are independent of the proofer 14 are allocated to individual points of the color reproduction area of the proofer 14 in its entirety, and in addition, CMYK values are allocated to the color reproduction area of the proofer 14 in its entirety. As a result, there is created the link profile 54 (cf. FIG. 17) wherein the dummy RGB values which depend on the proofer 14 are associated with CMYK values which depend on the printing system. The link profile 54 is used for an interpolation operation that is adopted for the color matching (the first link profile) in the color conversion apparatus 10 shown in FIG. 1.

Next, there will be explained the virtual device profile creating process of the step (C) of FIG. 4.

A profile for coupling dummy RGB, which is created in the virtual device profile creating process of the step (C) of FIG. 4, with L*a*b* value, is computed by the interpolation. That profile does not always satisfy the ink total amount limitation on all the lattice points. Thus, in the first link profile creating process of the step (B) of FIG. 4, when the link profile between dummy RGB and CMYK is created, the L*a*b* value of the dummy RGB profile indicative of a relation between dummy RGB and L*a*b* is corrected so as to satisfy the ink total amount limitation. Hence, in the virtual device profile correcting process of the step (C) of FIG. 4, there is re-created the dummy RGB profile indicative of a relation between dummy RGB and L*a*b* in order to create a profile of dummy RGB that reflects the correction in the first link profile creating process of the step (B) of FIG. 4, in such a manner that CMYK values are determined from dummy RGB values referring to a link profile indicative of a relation between dummy RGB and CMYK, and L*a*b* values are determined from the thus determined CMYK values referring to the CMYK profile of print (refer to FIG. 14), so that the dummy RGB values are associated with the L*a*b* values.

Figure 59:
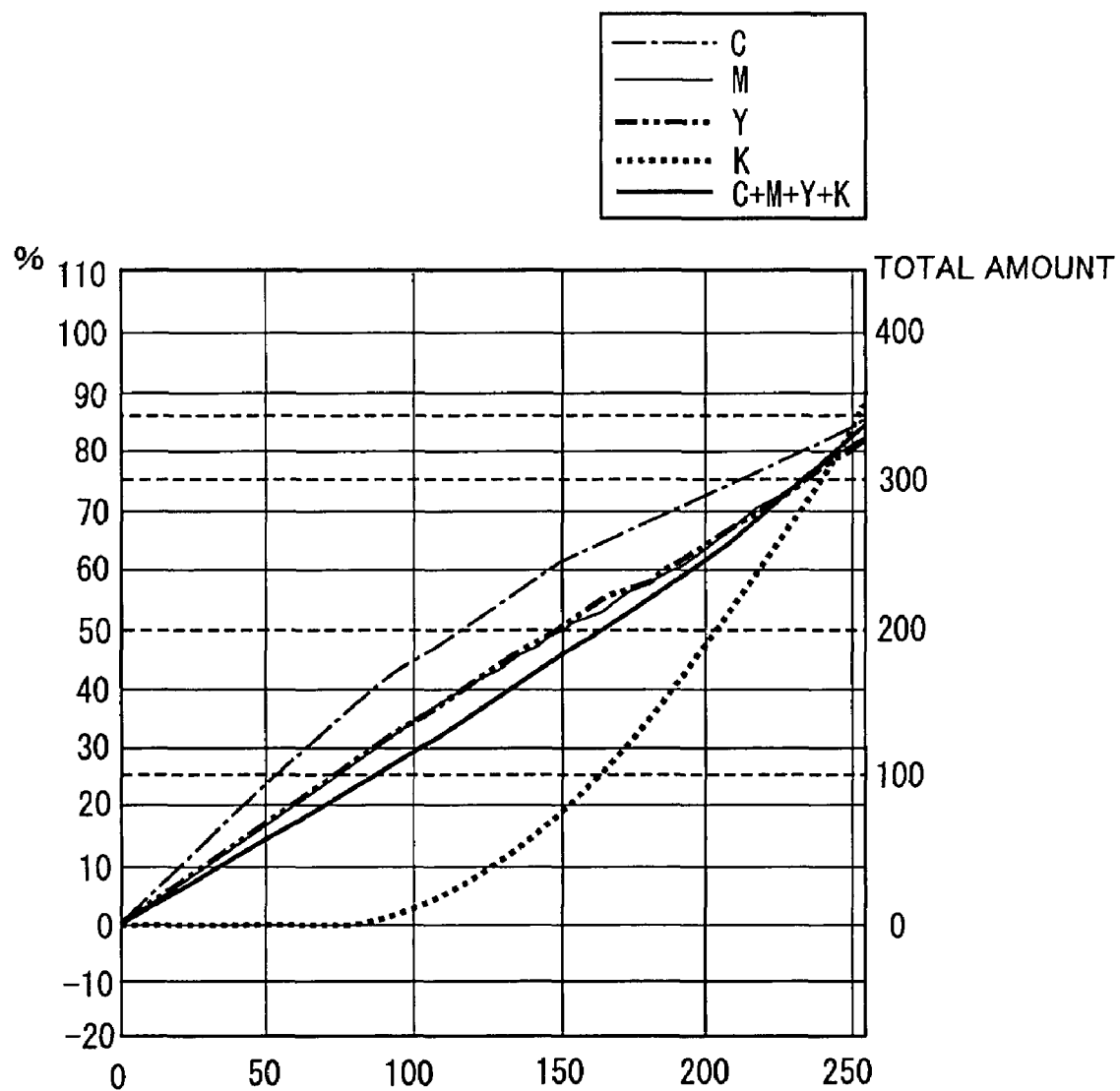
FIG. 59 is a view showing individual curves of C, M, Y, and K, and a curve of ink total amount to individual values on the gray axes of the dummy RGB.

FIG. 59 is a view showing individual curves of C, M, Y, and K to individual values (R=G=B=0 to 255) on the gray axes of the dummy RGB, and a curve of ink total amount of C+M+Y+K.

FIG. 59 is concerned with ink total amount limitation value 344%. The ink total amount of C+M+Y+K satisfies the ink total amount limitation on any point on the gray axes, and is used for the ink total amount limitation very limit limitation in the point of K (point of R=G=B=255).

Figure 60:
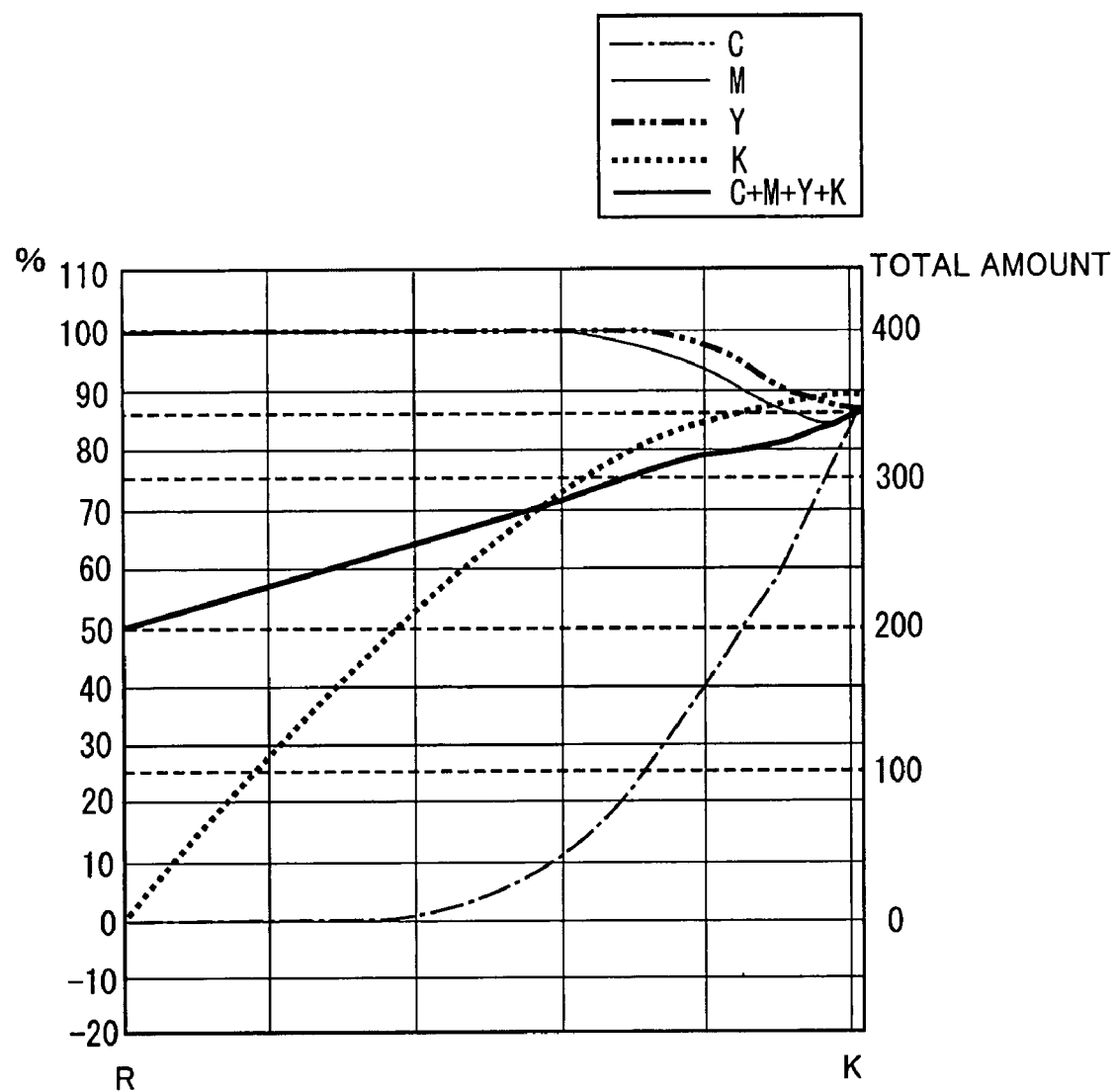
FIG. 60 is a view showing individual curves of C, M, Y, and K, and a curve of ink total amount of C+M+Y+K, on the RK edge lines from the vertex of R to the vertex of K where an ink total amount limitation value is 344%.

FIG. 60 is a view showing individual curves of C, M, Y, and K, and a curve of ink total amount of C+M+Y+K, on the RK edge lines from the vertex of R to the vertex of K where an ink total amount limitation value is 344%.

The ink total amount of C+M+Y+K satisfies the ink total amount limitation on any point on the RK edge line, and is used for the ink total amount limitation very limit limitation in the point of K.

Here, though the RK edge line is explained, it is similar in the GK edge line, the BK edge line, the CK diagonal line, the MK diagonal line, and the YK diagonal line. Moreover, the ink total amount limitation is satisfied not only on the gray axis, the edge line, and the diagonal line, but also all the points in the color reproduction area of dummy RGB.

Figure 61:
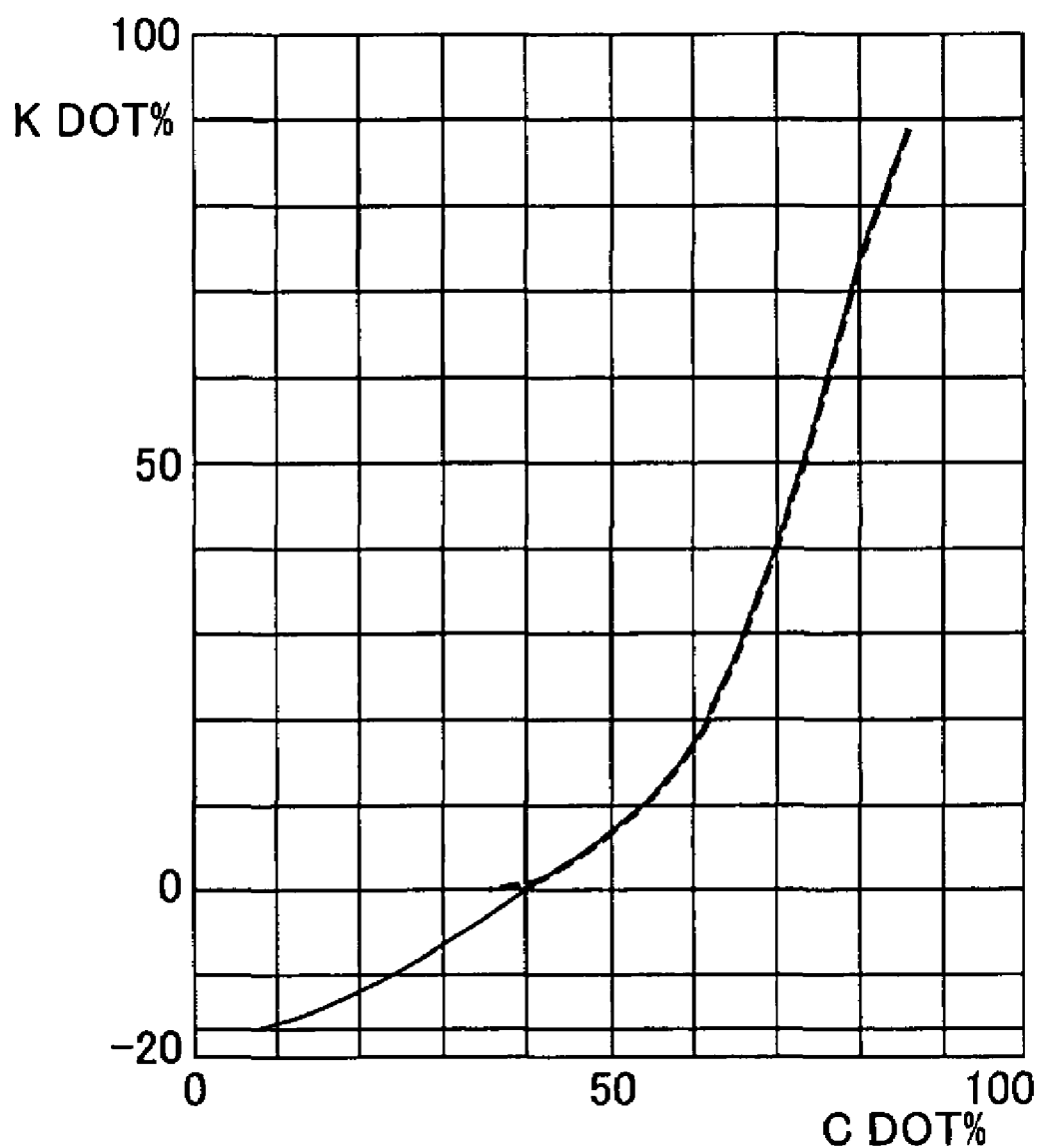
FIG. 61 is a view showing individual a curve (solid line) of the designated K-plate restraint condition (K=K(C)) and curves (broken lines) of realized K=K(C) where an ink total amount limitation value is 344%.

FIG. 61 is a view showing individual a curve (solid line) of the designated K-plate restraint condition (K=K(C)) and a curve (broken line) of K=K(C) finally realized the above mentioned operation, where an ink total amount limitation value is 344%, K start point is 40%, and black point CMYK= (86, 85, 84, 89).

From FIG. 61, it may be understood that there is created a profile which faithfully reflects K-plate restraint condition.

Figure 62:
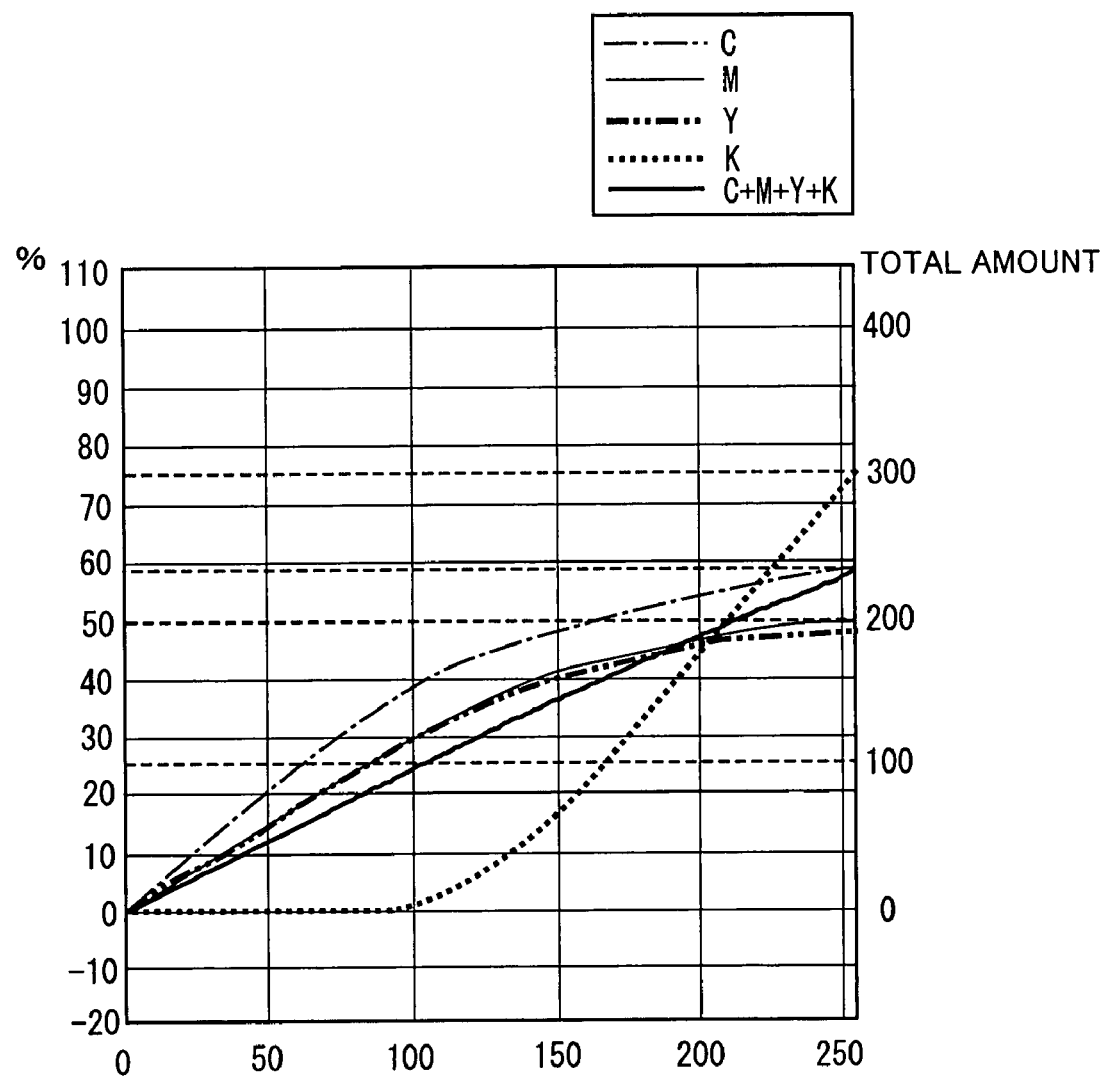
FIG. 62 is a view showing individual curves of C, M, Y, and K, and a curve of ink total amount to individual values on the gray axes of the dummy RGB, where an ink total amount limitation value is 237%.
Figure 63:
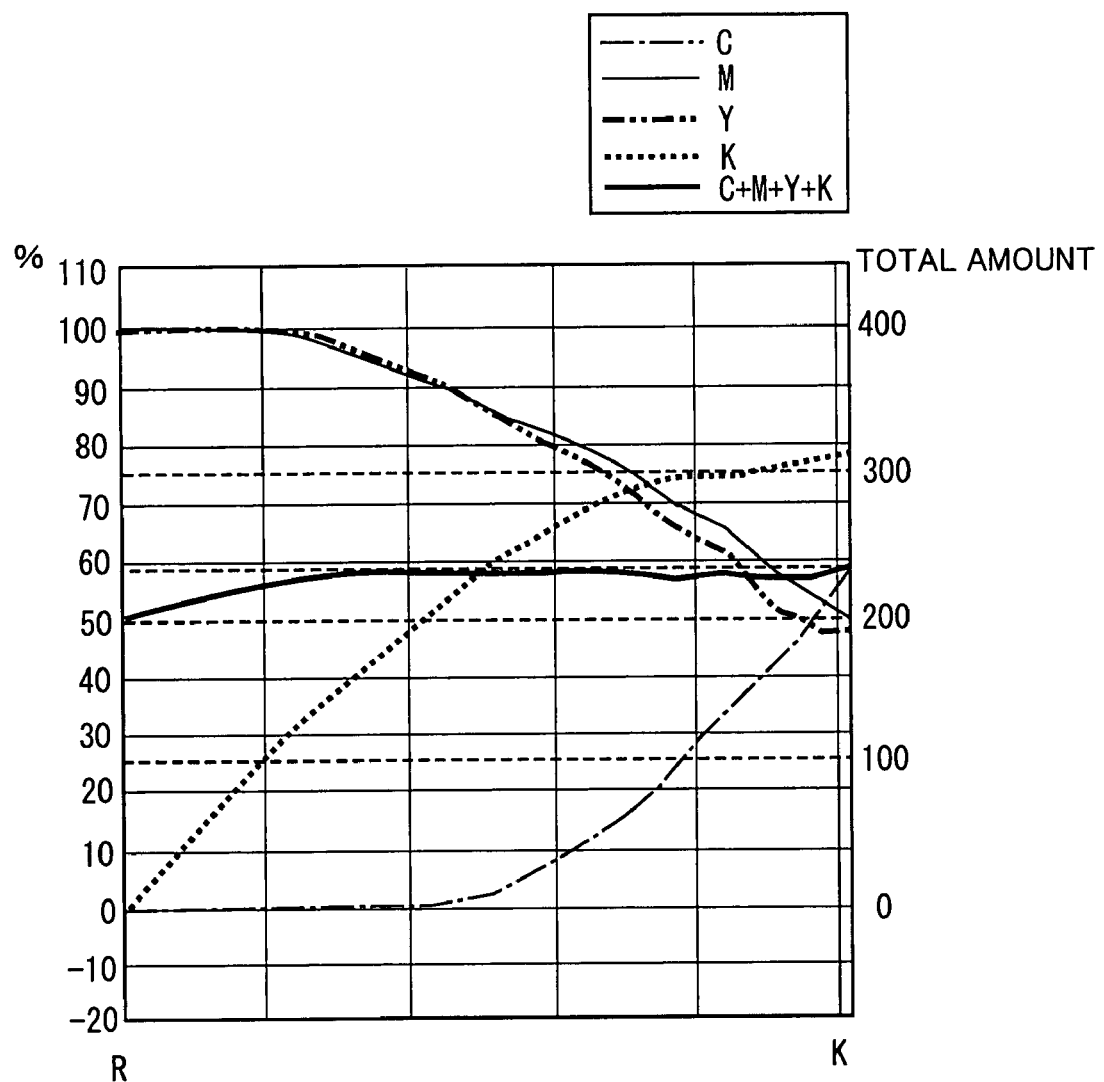
FIG. 63 is a view showing individual curves of C, M, Y, and K, and a curve of ink total amount of C+M+Y+K, on the RK edge lines from the vertex of R to the vertex of K where an ink total amount limitation value is 237%.
Figure 64:
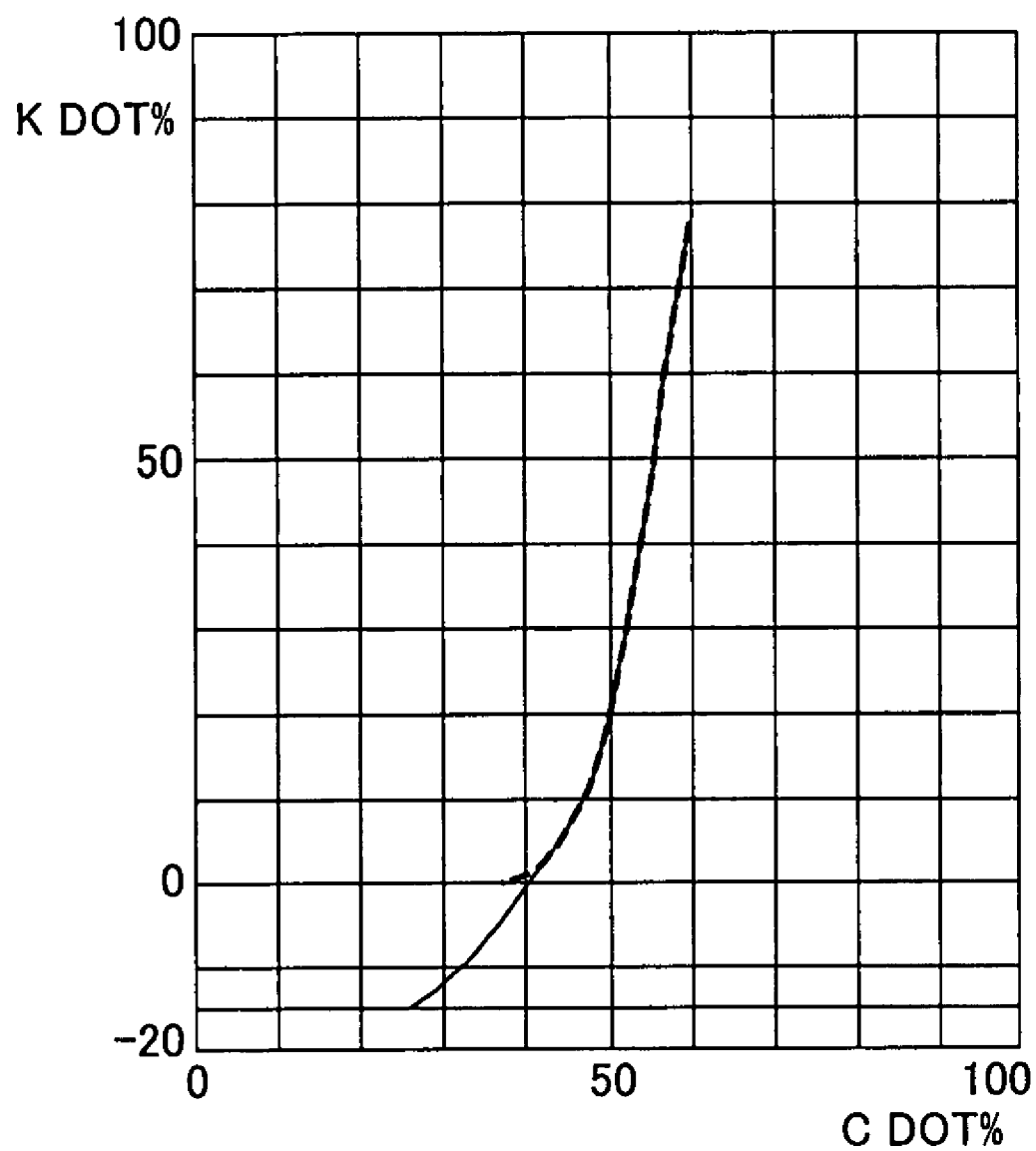
FIG. 64 is a view showing individual a curve (solid line) of the designated K-plate restraint condition (K=K(C)) and curves (broken lines) of realized K=K(C) where an ink total amount limitation value is 237%.

FIG. 62 is a view showing individual curves of C, M, Y, and K, and a curve of ink total amount to individual values on the gray axes of the dummy RGB, where an ink total amount limitation value is 237%, which corresponds to FIG. 59. FIG. 63 is a view showing individual curves of C, M, Y, and K, and a curve of ink total amount of C+M+Y+K, on the RK edge lines from the vertex of R to the vertex of K where an ink total amount limitation value is 237%, which corresponds to FIG. 60. FIG. 64 is a view showing individual a curve (solid line) of the designated K-plate restraint condition (K=K(C)) and curves (broken lines) of realized K=K(C) where an ink total amount limitation value is 237%, which corresponds to FIG. 61.

From those figures, it may be understood that an ink total amount limitation is satisfied and K-plate restraint condition is faithfully reproduced even under conditions that the ink total amount limitation value is severe.

Next, there will be explained the second link profile creating process (the step (D) of the color conversion definition creating method of FIG. 4. Here, there will be explained the technology disclosed in Japanese Patent Reference TokuKai 2001-103329.

Figure 65:
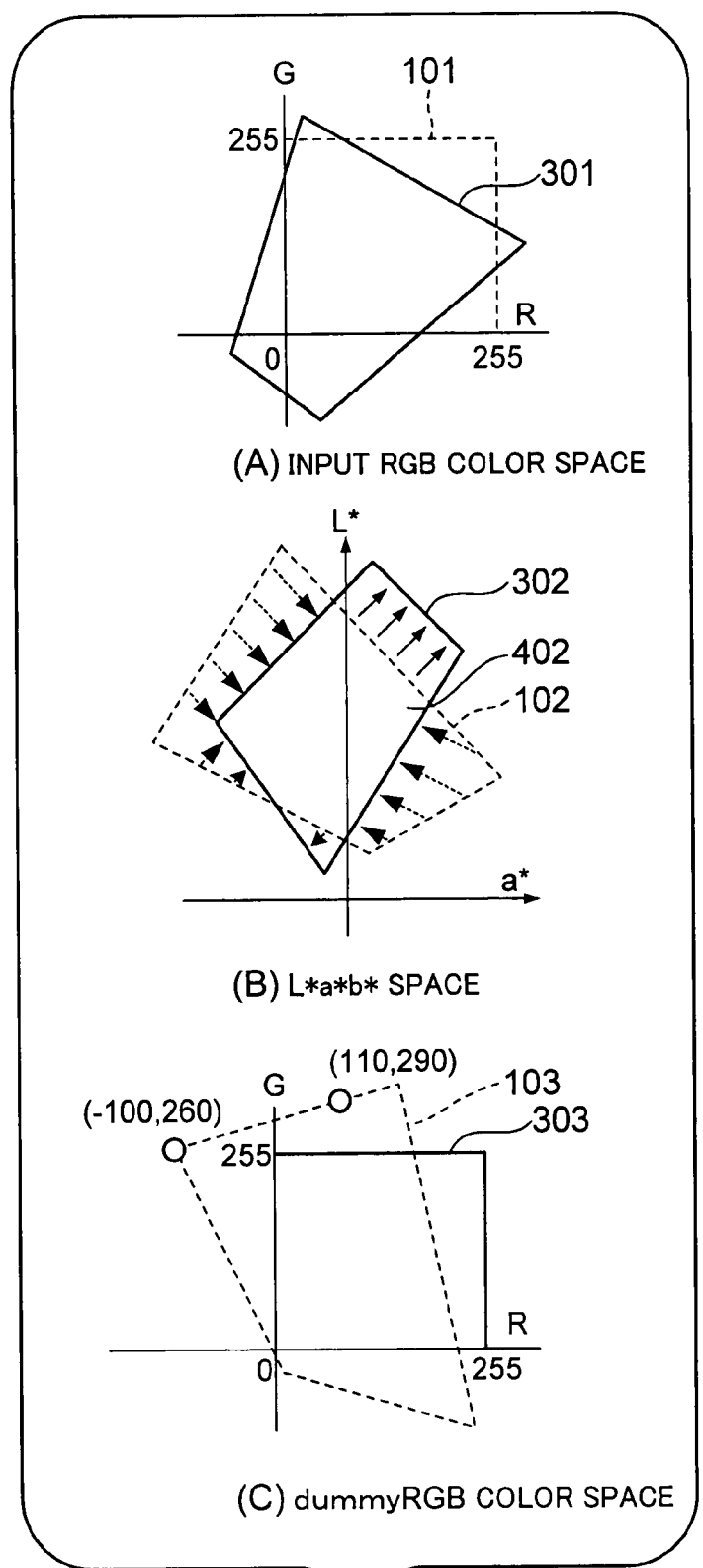
FIG. 65 is a typical illustration of color reproduction areas of the printer and the proofer, which are shown in FIG. 1.

FIG. 65 is a typical illustration of color reproduction areas of the printer 11 and the proofer 14, which are shown in FIG. 1.

A part (A) of FIG. 65 essentially shows an input RGB color space that depends on the printer 11. However, for the purpose of simplification in illustration, the part (A) of FIG. 65 simply shows an R-G plane. Similarly, a part (B) of FIG. 65 shows an L*-a* plane in the L*a*b* space, which is one of the common color spaces. And the part (C) of FIG. 65 shows an R-G plane of dummy RGB color space that depends on the proofer 14.

The printer 11 prints out the printed image 11a in accordance with image data representative of numerical values of 0-255 on R, G and B. In this case, the color reproduction area of the printer 11 is a rectangular area 101 shown in the part (A) of FIG. 65.

Now, referring to the color reproduction characteristics (the printer profile 51) of the printer 11 as shown in FIG. 13, the rectangular area 101 of the printer 11 shown in the part (A) of FIG. 65 is mapped into the L*a*b* space. As a result, the color reproduction area of the printer 11 is represented by an area 102 shown in the part (B) of FIG. 65. Further, referring to the color reproduction characteristics (the proofer profile 53 (cf. FIG. 16) of the proofer 14, the color reproduction area 102 is mapped into the dummy RGB color space that depends on the proofer 14. As a result, the color reproduction area of the printer 11 is represented by an area 103 shown in the part (C) of FIG. 65.

On the other hand, the color reproduction area (the proofer profile) of the proofer 14 shown in FIG. 1 is a cubic area represented by the numerical value range of 0 to 255 in each of R, G and B, on the dummy RGB color space of the part (C) of FIG. 65, or a rectangular area 303 on the R-G plane in the part (C) of FIG. 65. In other words, when image data representative of coordinate points within the numerical value range of 0 to 255 in each of R, G and B, of the input RGB color space that depends on the printer 11, is converted via the L*a*b* space into image data on the dummy RGB color space, it happens that the image data representative of coordinate points within the numerical value range of 0 to 255 in each of R, G and B is converted into values exceeding colors that can be expressed by the proofer 14 (the range of 0 to 255 in each of R, G and B on the image data), for example, (R, G)=(110, 290), or (R, G)=(−100, 260), as shown in the part (C) of FIG. 65. In such a situation, the image data, that is, the image data out of the color reproduction area of the proofer 14, cannot be outputted by the proofer 14, and thus it is proposed to clip the image data so that the image data is located at the boundary of the color reproduction area of the proofer 14. Specifically, (R, G)=(110, 290) is altered to (R, G)=(110, 255), and (R, G)=(−100, 260) is altered to (R, G)=(0, 255).

In case of the mapping in the color space depending the side (here the proofer 14) to be subjected to the conversion, a degree of freedom of the mapping is small, and there is performed a mapping that data out of the color reproduction area of the proofer 14 is simply clipped in the manner as mentioned above so as to move the data to the boundary of the color reproduction area. According to such a mapping, however, when a mapping is carried out from the color reproduction area of one device (e.g. the printer 11) to the color reproduction area of another device (e.g. the proofer 14), it happens that accuracy of the mapping is greatly lowered particularly in vicinity of the boundary of their color reproduction areas.

On the other hand, when the color reproduction area 303 of the proofer 14, which is represented by the rectangular area of 0 to 255 in the part (C) of FIG. 65, is mapped into the L*a*b* space using color reproduction characteristics (a proofer profile) of the proofer 14, the color reproduction area 303 is represented by an area 302 shown in the part (B) of FIG. 65. There are proposed some technologies that in the common color space represented by the L*a*b* space, data in the color reproduction area 102 of the printer 11 (the first device) is converted into data in the color reproduction area 302 of the proofer 14 (the second device).

According to the color conversion (the mapping) in the L*a*b* space, when it is intended that the color reproduction area, which can be expressed by the proofer 14, is utilized as wider as possible, generally, there are performed both processing of "compression", as shown by arrows of broken lines in the part (B) of FIG. 65, in which data out of a common area 402 of the color reproduction area 101 of the printer 11 and the color reproduction area 302 of the proofer 14 is mapped into the inside of the common area 402, and "expansion", as shown by arrows of solid lines in the part (B) of FIG. 65, in which data inside the common area 402 is expanded outside the common area 402 on condition that it is inside the color reproduction area 302 of the proofer 14.

According to the mapping in the common color space represented by the L*a*b* space, which is now proposed, a degree of freedom for the mapping is too large, and thus there is a great possibility that a tone is discontinuous and an image is unnatural.

When the color reproduction area 302 of the proofer 14, which is mapped into the L*a*b* space in the part (B) of FIG. 65, is further mapped into the input RGB color space in the part (A) of FIG. 65, the color reproduction area 302 is expressed by a "squashed" configuration of area 301, which has portions going over the rectangular area 101 that is the color reproduction area of the printer 11.

Next, there will be explained the common color space. With respect to the common color space, there has been explained the L*a*b* color space, by way of example. However, there is no need that the common color space is the L*a*b* color space, and any one is acceptable, as the common color space, that is defined not so as to depend on the specific input device or the specific output device. For example, it is acceptable that the common color space is an XYZ color space as well as the L*a*b* color space, or alternatively, it is acceptable that the common color space is a coordinate system that is clearly defined in such a manner that coordinate points on the color spaces have a one-to-one correspondence with the color spaces. As an example of such a coordinate system, there is raised a standard RGB signal defined as set forth below.

$$\begin{bmatrix} R_{sRGB} \\ G_{sRGB} \\ B_{sRGB} \end{bmatrix} = \begin{bmatrix} 3.2410 & -1.5374 & -0.4986 \\ -0.9692 & 1.8760 & 0.0416 \\ 0.0556 & -0.2040 & 1.0570 \end{bmatrix} \begin{bmatrix} X \\ Y \\ Z \end{bmatrix}$$

Now, for example, when one wherein $R_{sRGB}$ is expressed with 8 bits is referred to as $R_{8bit}$, the following equations exist.

$$R_{8bit} = 255 \times 12.92 \; R_{sRGB} \; (0 < R_{sRGB} < 0.00304)$$
$$R_{8bit} = 255 \times 1.055 \; R_{sRGB}^{(1.0/2.4)} - 0.055 \; (0.00304 \le R_{sRGB} \le 1)$$

Also with respect to $G_{8bit}$ and $B_{8bit}$, wherein $G_{sRGB}$ and $B_{sRGB}$ are expressed with 8 bits, respectively, in a similar fashion to that of $R_{8bit}$, it is possible to convert those items from $G_{sRGB}$ and $B_{sRGB}$.

Alternatively, it is acceptable that the color space, which is defined by CMY density of the reversal film, is adopted as the common color space. Determination of the common color space makes it possible to clearly define the color reproduction area in the common color space.

Figure 66:
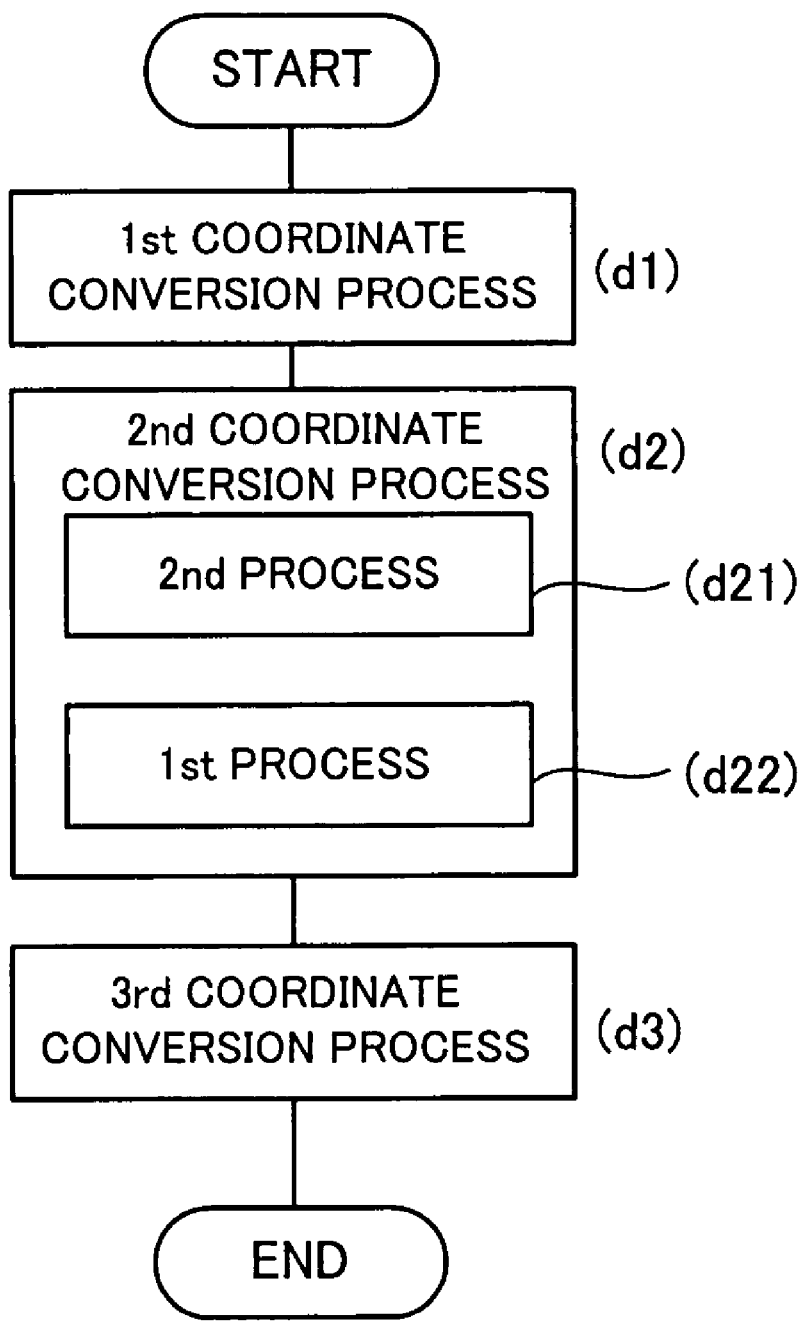
FIG. 66 is a flowchart useful for understanding a second link profile creating process of a color conversion definition creating method.

FIG. 66 is a flowchart useful for understanding a second link profile creating process of a color conversion definition creating method according to a color conversion definition creating program to be executed in the computer system shown in FIG. 2 and FIG. 3. The second link profile creating process shown in FIG. 33 corresponds to the second link profile creating process of the step (D) of FIG. 4.

Here, there is created the second link profile referred to in the present invention through a first coordinate conversion process (a step d1), a second coordinate conversion process (a step d2), a third coordinate conversion process (a step d3). According to the second coordinate conversion process (the step d2), basically, a first process (a step d22) is carried out. However, according to the present embodiment, a second process (a step b21) is placed before the first process (the step d22), so that a color conversion definition is created with greater accuracy.

Figure 67:
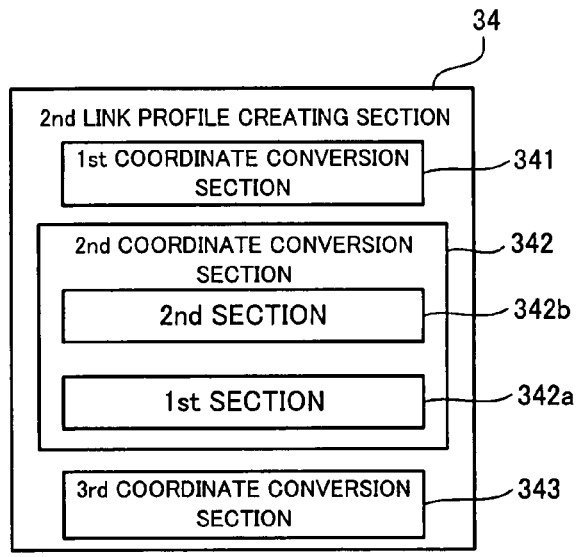
FIG. 67 is a structural view of a second link profile creating section of a color conversion definition creating program.

FIG. 67 is a structural view of the second link profile creating section 34 (c.f. FIG. 7) of a color conversion definition creating program to be executed in the computer system shown in FIG. 2 and FIG. 3.

The second link profile creating section 34 comprises a first coordinate conversion section 341, a second coordinate conversion section 342, a third coordinate conversion section 343. The second coordinate conversion section 342 comprises a first section 342a and a second section 342b that is to be carried out before the first section 342a.

Figure 68:
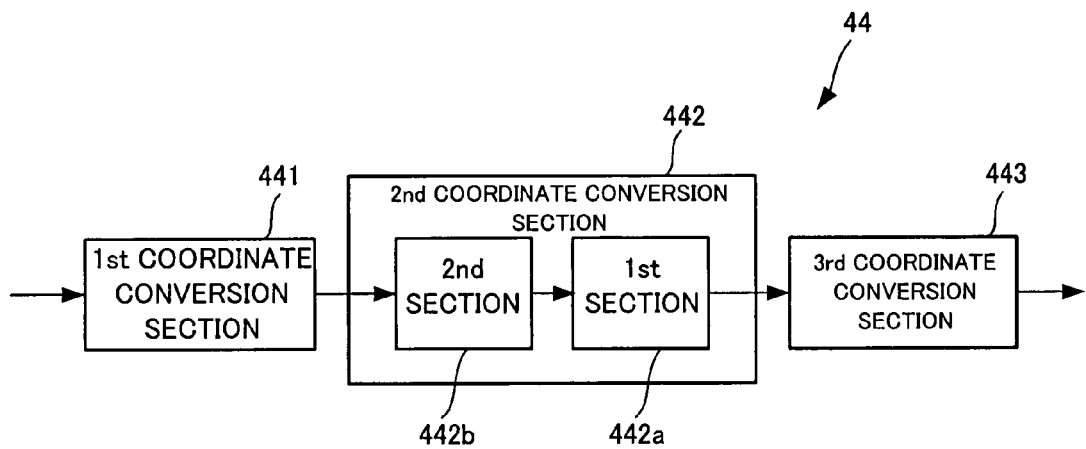
FIG. 68 is a functional block diagram of a second link profile creating section creating section of a color conversion definition creating apparatus.

FIG. 68 is a functional block diagram of the second link profile creating section 44 (c.f. FIG. 10) of the color conversion definition creating apparatus 40 that is constructed in the computer 20 shown in FIG. 2 and FIG. 3 when the color conversion definition creating program is executed in the computer 20.

The second link profile creating section 44 comprises a first coordinate conversion section 441, a second coordinate conversion section 442, a third coordinate conversion section 443. The second coordinate conversion section 442 comprises a first section 442a and a second section 442b that is displaced before the first section 442a.

Steps d1, d2 (d21, d22), and d3 of the second link profile creating process of the color conversion definition creating method shown in FIG. 66 correspond to the sections 341, 342

(342a, 342b), and 343 that constitute the second link profile creating section 34 shown in FIG. 67, respectively, and also correspond to the sections 441, 442 (442a, 442b), and 443 that constitute the second link profile creating section 44 shown in FIG. 68, respectively. Hereinafter, there will be explained the steps d1, d2 (d21, d22), and d3 of the second link profile creating process of FIG. 66. This explanation may serve as the explanation of the sections 341, 342 (342a, 342b), and 343 of the second link profile creating section 34 in FIG. 67, and the explanation of the sections 441, 442 (442a, 442b), and 443 of the second link profile creating section 44 of FIG. 68.

Hereinafter, there will be explained the steps d1, d2 (d21, d22), and d3 of the second link profile creating process shown in FIG. 66.

First, in the first coordinate conversion process of the step d1 of FIG. 66, the color reproduction quality (the printer profile) of the printer 11 is referred to, so that coordinate points in the input RGB color space, which depend on the printer 11, that is, coordinate points on the lattices set up on a discrete basis, are mapped onto the common color space (for example, the L*a*b* space) that is independent of a device.

Figure 69:
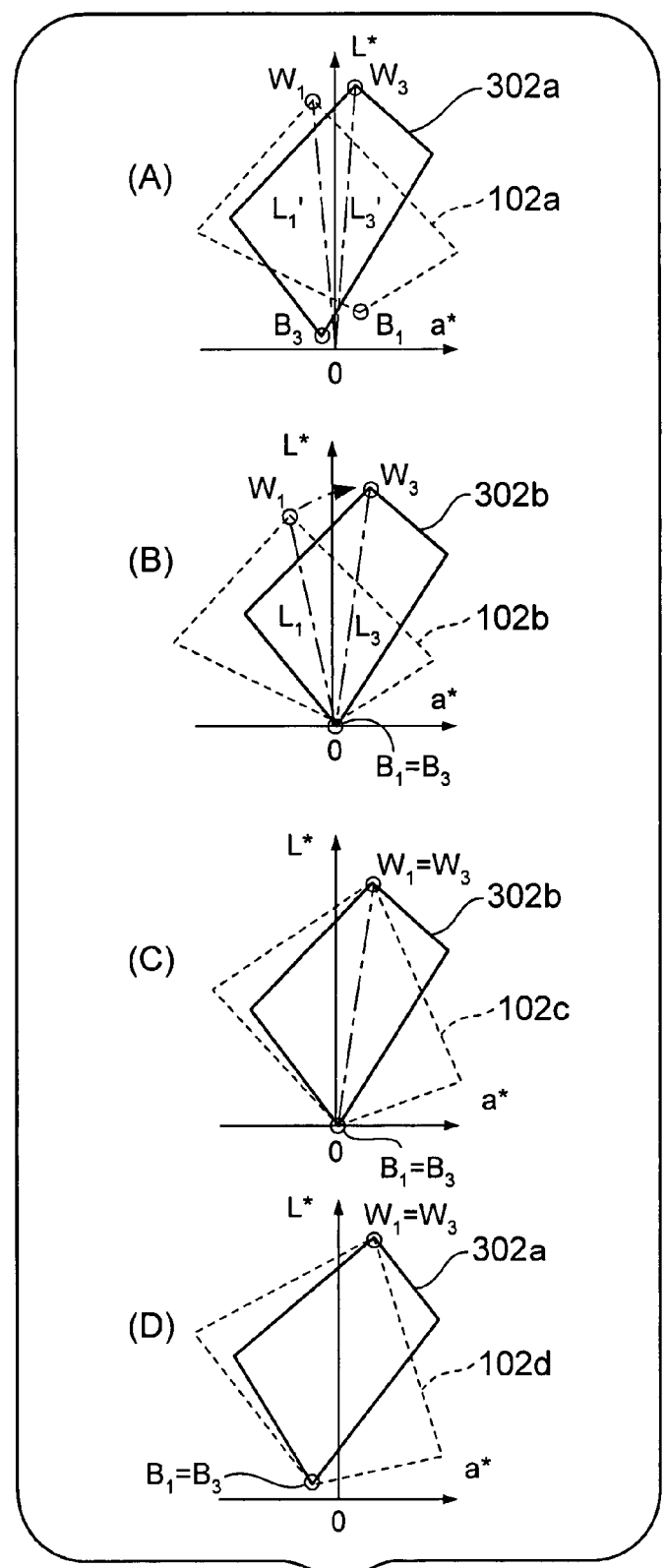
FIG. 69 is an explanatory view for the second process in the second coordinate conversion process.

FIG. 69 is an explanatory view for the second process (step d21) in the second coordinate conversion process, which is executed in the step d2 of FIG. 66. FIG. 69 shows the color reproduction area of the printer 11 in the L*a*b* space and the color reproduction area of the proofer 14.

Here, there is performed an adaptational conversion applying Von Kries conversion. More in detail, here, there is performed a coordinate conversion in such a manner that coordinate point $W_1$ corresponding to white (the color of a sheet of the printed image 11a (cf. FIG. 1)) represented by the printed image 11a printed out by the printer 11, and coordinate point $B_1$ corresponding to black (a state that the printer 11 printed out using the maximum amount of inks of R, G and B) capable of expressing in form of the printed image 11a, are coincident with coordinate point $W_3$ corresponding to white of a proof image that is virtually outputted by the proofer 14 (that is, the color of a sheet of the proof image), and coordinate point $B_3$ corresponding to black (a state that the proofer 14 printed out using the maximum amount of inks of R, G and B) capable of being outputted by the proofer 14, respectively.

FIG. 69 is illustrations useful for understanding the coordinate conversion processes. First, a color reproduction area 102a of the printer 11 and a color reproduction area 302a of the proofer 14, as shown in a part (A) of FIG. 69, are translated in parallel so that black points $B_1$ and $B_1$ are coincident with the origin 0 (the black point in theory), as shown in a part (B) of FIG. 69. Thus, first, the black point of the color reproduction area 102a of the printer 11 is coincident with the black point of the color reproduction area 302a of the proofer 14.

Next, there is performed a coordinate conversion involving rotation and expansion and contraction throughout the color reproduction area 102a of the printer 11 so that the white point $W_1$ of the color reproduction area 102a of the printer 11, after the parallel translation, is coincident with the white point $W_3$ of the color reproduction area 302a of the proofer 14, after the parallel translation, in other words, a straight line $L_1$ of the part (B) of FIG. 69 is coincident with a straight line $L_3$.

A part (C) of FIG. 69 shows a state after the coordinate conversion involving rotation and expansion and contraction is carried out, in which the color reproduction area of the printer 11 is converted from the color reproduction area 102a shown in the part (B) of FIG. 69 to a color reproduction area 102c shown in the part (C) of FIG. 69. At that time, the white point $W_1$ of the color reproduction area of the printer 11 is coincident with the white point $W_3$ of the color reproduction area of the proofer 14.

Thereafter, as shown in a part (D) of FIG. 69, the color reproduction area 102c of the printer 11, which is coincident in the white point and the black point in the manner as shown in the part (C) of FIG. 69, is translated in parallel to the original color reproduction area of the proofer 14, that is, the position in which the color reproduction area 302a of the proofer 14, which is coincident in the white point $W_3$ and the black point $B_3$, as shown in the part (A) of FIG. 69.

This feature makes it possible to obtain a color reproduction area 102d of the printer 11 in which the white point $W_1$ and the black point $B_1$ are coincident with the white point $W_3$ and the black point $B_3$ of the proofer 14, respectively.

The above-mentioned operation may be expressed in equations as follows.

While FIG. 69 shows the color reproduction areas in the L*a*b* space, it happens that Von Kries conversion and an adaptational conversion applying Von Kries conversion are carried out in the XYZ space. And thus the explanation will be made assuming the XYZ space. The XYZ space is one of the common color spaces in which coordinate points on the XYZ space have a one-to-one correspondence with coordinate points of the L*a*b* space.

A Von Kries matrix for rotation and expansion and contraction is created in such a manner that XYZ coordinates $(LXW_1', LYW_1', LZW_1')$ and $(LXW_3', LYW_3', LZW_3')$, which correspond to the white points $W_1$ and $W_3$ shown in the part (B) of FIG. 69, are determined in accordance with equations as set forth below and the white point $W_1$ $(LXW_1', LYW_1', LZW_1')$ is coincident with the white point $W_3$ $(LXW_3', LYW_3', LZW_3')$.

$$LXW_1'=LXW_1-LXB_1$$

$$LYW_1'=LYW_1-LYB_1$$

$$LZW_1'=LZW_1-LZB_1 \quad (1)$$

$$LXW_3'=LXW_3-LXB_3$$

$$LYW_3'=LYW_3-LYB_3$$

$$LZW_3'=LZW_3-LZB_3 \quad (2)$$

Where the XYZ coordinates of the white point $W_1$ and the black point $B_1$ of the color reproduction area 102a of the printer 11 shown in the part (A) of FIG. 69 are expressed by $(LXW_1, LYW_1, LZW_1)$ and $(LXB_1, LYB_1, LZB_1)$, respectively, and the XYZ coordinates of the white point $W_3$ and the black point $B_3$ of the color reproduction area 302a of the proofer 14 shown in the part (A) of FIG. 69 are expressed by $(LXW_3, LYW_3, LZW_3)$ and $(LXB_3, LYB_3, LZB_3)$, respectively.

Here, the Von Kries matrix is expressed as follows.

$$VK=[MTX_{VK}] \quad (3)$$

The Von Kries matrix is 3×3 matrix.

Next, in the step b1 of FIG. 66, coordinate points in the input RGB space that depends on the printer 11, are mapped onto the L*a*b* space. When a large number of coordinate points, which are converted into the XYZ space, or directly mapped from the input RGB space that depends on the printer 11 to the XYZ space, are represented by (X, Y, Z), with respect to this (X, Y, Z), the following processing is applied.

A black point correction (cf. the part (B) of FIG. 69) is carried out in accordance with equations (4) set forth below.

$$X1 = X - LXB_1$$
$$Y1 = Y - LYB_1$$
$$Z1 = Z - LZB_1 \quad (4)$$

Next, the Von Kries conversion (cf. the part (C) of FIG. 69) is carried out in accordance with equation (5) set forth below.

$$\begin{pmatrix} X2 \\ Y2 \\ Z2 \end{pmatrix} = (MTX_{VK}) \begin{pmatrix} X1 \\ Y1 \\ Z1 \end{pmatrix} \quad (5)$$

Next, a correction (cf. the part (D) of FIG. 69) for coincidence of the black point with the black point of the proofer 14 is carried out in accordance with equations (6) set forth below.

$$X' = X2 - LXB_3$$
$$Y' = Y2 - LYB_3$$
$$Z' = Z2 - LZB_3 \quad (6)$$

When the above-mentioned operations are carried out on all the coordinate points, the color reproduction area 102a shown in the part (A) of FIG. 69, wherein it is represented in the L*a*b* space, is converted into the color reproduction area 102d shown in the part (D) of FIG. 69 in which the white point and the black point are coincident with the white point and the black point of the color reproduction area 302a of the proofer 14, respectively.

When the above-mentioned adaptational conversion is carried out on the XYZ space, the coordinates (X, Y, Z) of the black points before the adaptational conversion, that is, the black points $B_1$ and $B_3$ of the part (A) of FIG. 69, are close to (0, 0, 0). Accordingly, it is sufficient for the correction of the black points to slightly vary the numerical values, and a short migration length of the coordinates of the white points is acceptable even if the coordinates of the white points are moved in accordance with the equations (1) and (2). Thus, it is advantageous that the adaptational conversion can be performed using the wide area of the XYZ space. The adaptational conversion is not always performed in the XYZ space. It is acceptable that the adaptational conversion is performed in the L*a*b* space, or alternatively in another common color space.

While there is explained the adaptational conversion in which both the white point and the black point are coincident, it is acceptable that the adaptational conversion is carried out in such a manner that only the white point is coincident without taking into consideration the black point, while an accuracy of the color conversion is somewhat degraded.

The adaptational conversion, in which only the white point is coincident, means such a coordinate conversion that the straight line $L_1$' shown in the part (A) of FIG. 69 is coincident with the straight line $L_3$', and the white point $W_1$ is coincident with the white point $W_3$. On a numerical expression basis, the adaptational conversion means that a Von Kries matrix for rotation and expansion and contraction is determined in such a manner that the white point $W_1$ ($LXW_1$, $LYW_1$, $LZW_1$) is coincident with the white point $W_3$ ($LXW_3$, $LYW_3$, $LZW_3$), without subtracting the coordinates of the black points as in the equations (1) and (2), and the Von Kries matrix is used to directly convert (X, Y, Z), without subtracting the coordinates of the black points as in the equation (4).

Further, the adaptational conversion is needed in case of the color conversion between devices having whites different from one another on a calorimetric basis, for example, in a case where "white" on a CRT display is white that is considerably tinged with blue and there is a need to print out an image displayed on the CRT display. However, in a case where both "whites" are substantially coincident with one another, for example, in a case where the printed image 11a, which is printed out on a white sheet by the printer 11, is compared with a proof image assuming that it is printed out on a similar white sheet by the virtual proofer 14, it is acceptable to omit the adaptational conversion, that is, the second process (the step d21) of the second coordinate conversion process in FIG. 66.

Next, there will be explained the first process (the step d22) of the second coordinate conversion process of the flowchart shown in FIG. 66, raising some examples.

Figure 70:
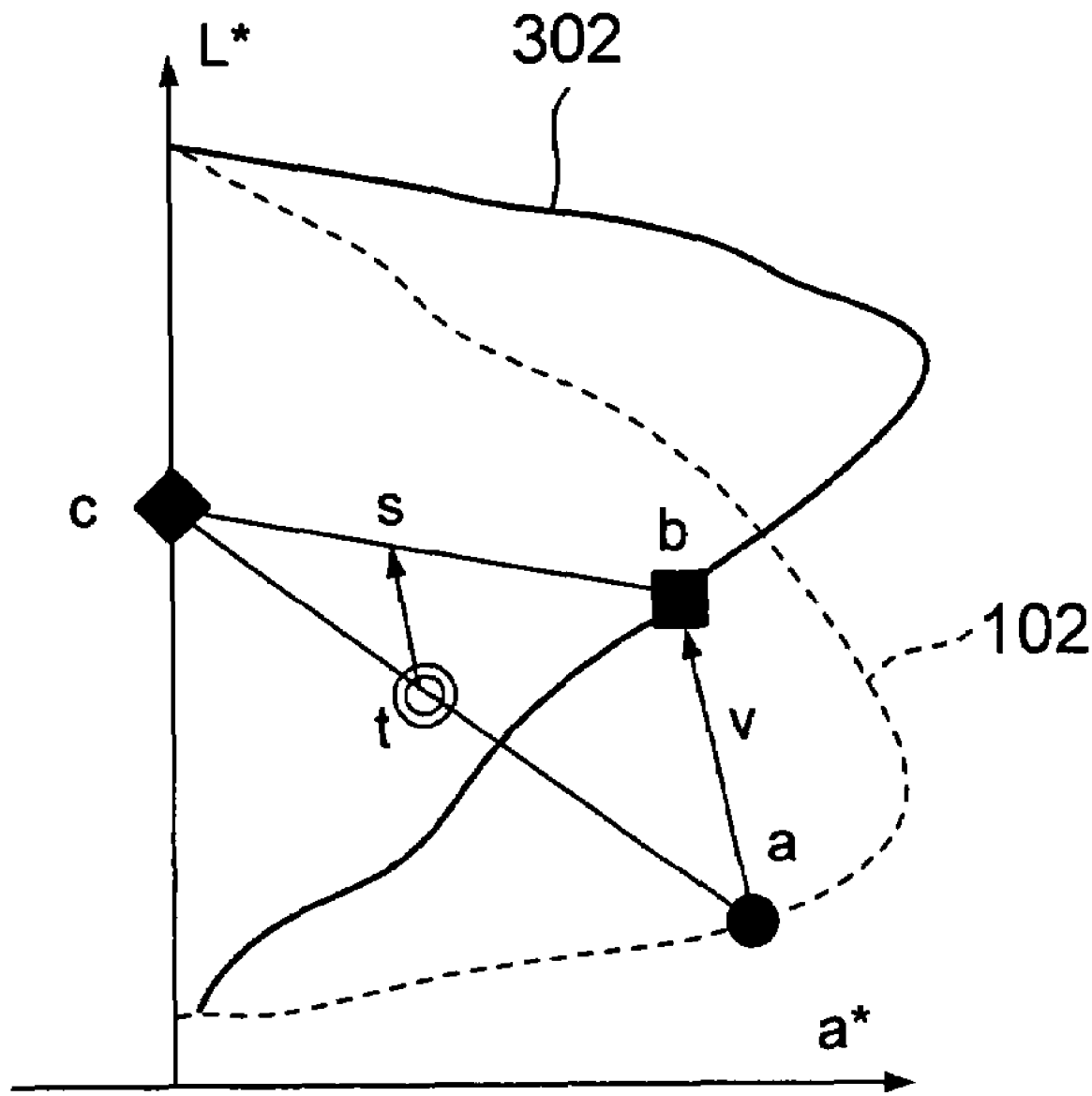
FIG. 70 is an explanatory view for a first example of the coordinate conversion in a first process of the flowchart shown in FIG. 66.
Figure 71:
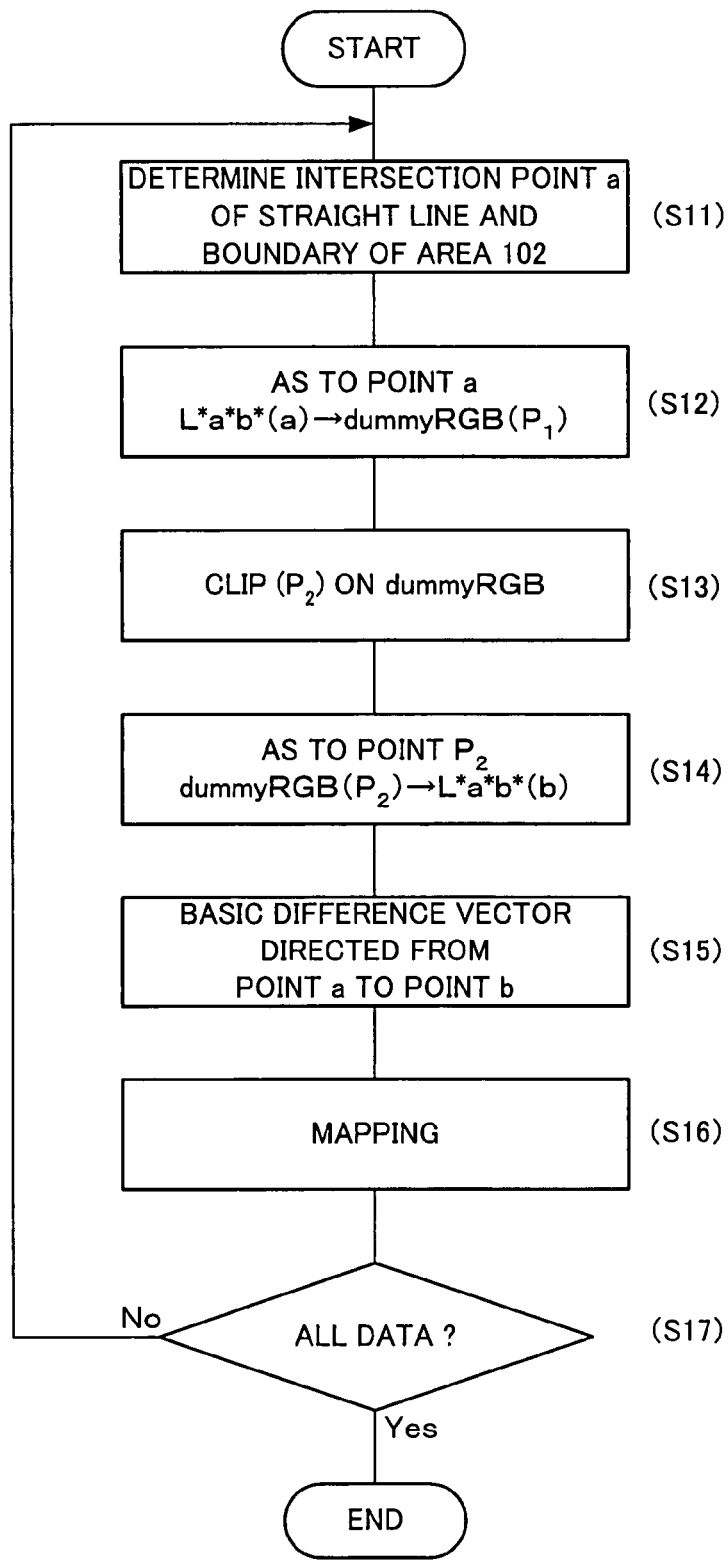
FIG. 71 is a flowchart useful for understanding the first example of the coordinate conversion in the first process.

FIG. 70 is an explanatory view for a first example of the coordinate conversion in a first process. FIG. 71 is a flowchart useful for understanding the first example of the coordinate conversion in a first process. While FIG. 70 illustrates an L*-a* plane of the L*a*b* space, this is made for the sake of convenience. Actually, a three-dimensional coordinate conversion is performed in the L*a*b* space. This is applicable to other examples, which will be explained hereinafter, as well as FIG. 70.

Here, first, there is established a coordinate conversion reference coordinate point c that is a standard of the coordinate conversion. The coordinate conversion reference coordinate point c is established somewhat arbitrarily empirically or in accordance with a predetermined set standard, and particularly, be established in the common area of the color reproduction area 102 of the printer 11 mapped into the L*a*b* space and the color reproduction area 302 of the proofer 14. More particularly, the coordinate conversion reference coordinate point c is established on the L* axis (the gray axis) in the common area. The reason why this is to do so is, as will be understood by the following explanation, that the coordinate conversion reference coordinate point c is not mapped onto another coordinate point, and thus it is easy to keep the gray balance. Here, for example, a point of (L*, a*, b*)=(50, 0, 0) is established as the coordinate conversion reference coordinate point c.

Incidentally, when the second coordinate conversion process (the step d2) in the flowchart of FIG. 66 includes the adaptational conversion (the step d21) as explained with reference to FIG. 69, the color reproduction area 102 of the printer 11 mapped into the L*a*b* space indicates the color reproduction area after the adaptational conversion.

Here, a first coordinate point t denotes the coordinate point of the color reproduction area 102 of the printer 11 on the L*a*b* space that is an object for the mapping.

Now, let us consider a straight line connecting the coordinate conversion reference coordinate point c to the first coordinate point t, and determine an intersection point of the straight line and the boundary of the color reproduction area 102 of the printer 11 (a step S11 of FIG. 71). This intersection point is referred to as the first reference coordinate point a.

The flowchart shown in FIG. 71 is a flowchart wherein the thus determined first reference coordinate point a is out of the color reproduction area 302 of the proofer 14 mapped into the L*a*b* space, as shown in FIG. 70. When this condition is satisfied, the processing is advanced as follows.

The thus determined first reference coordinate point a is mapped from the L*a*b* space into the dummy RGB color space depending on the proofer 14 (a step S12 of FIG. 71). Here, P$_1$ denotes a first reference coordinate point mapped into the second RGB color space.

Next, a coordinate value of the first reference coordinate point P$_1$ is clipped in the dummy RGB color space, so that the first reference coordinate point P$_1$ is mapped on the boundary of the color reproduction area of the proofer 14 of the dummy RGB color space (a step S13). A point P$_2$, which is obtained on the boundary of the color reproduction area of the proofer 14 by the mapping, is mapped from the second RGB color space into the L*a*b* space (a step S14). A coordinate point, which is mapped into the L*a*b* space, is denoted as a second reference coordinate point b (cf. FIG. 70).

Next, in a step S15, there is determined a basic difference vector v representative of a difference between the first reference coordinate point a and the second reference coordinate point b, as shown in FIG. 70, wherein the first reference coordinate point a is a starting point, and the second reference coordinate point b is a terminal point. In a step S16, the first coordinate point t, which is now to be mapped, is moved in the same direction as the direction of the basic difference vector v, onto the straight line connecting the coordinate conversion reference coordinate point c with the second reference coordinate point b.

In a step S17, such a coordinate conversion is carried out on all the coordinate points, in which the first reference coordinate point a that is determined in the step d1, is out of the color reproduction area 102 of the printer 11, of the coordinate points included in the color reproduction area 102 of the printer 11, mapped into the L*a*b* space.

In the manner as mentioned above, as to the coordinate conversion explained with reference to FIG. 70 and FIG. 71, when the direction of the coordinate conversion is determined, or when the basic difference vector v is determined, the dummy RGB color space is used to determine the second reference coordinate point b on the boundary of the color reproduction area of the proofer 14, which corresponds to the first reference coordinate point a on the boundary of the color reproduction area of the proofer 14, and thus the coordinate conversion is performed, and the actual mapping is performed on the L*a*b* space.

That is, according to the present embodiment of the invention mentioned above, the direction of the coordinate conversion (or the mapping) is determined in a color space matching human feeling in color addressed as the dummy RGB color space (the color space of the device-dependence). This feature makes it possible to suppress possibilities of discontinuity in tone and unnatural images, as less as possible. Further, according to the present embodiment, the actual coordinate conversion is performed in the L*a*b* space (the common color space). This feature makes it possible to perform the coordinate conversion (or the mapping) with greater accuracy in color.

For the sake of convenience of illustration, FIG. 70 illustrates the coordinate conversion (or the mapping) on the two-dimensional plane. Actually, however, as described above, the mapping is performed on a three-dimensional basis.

Figure 72:
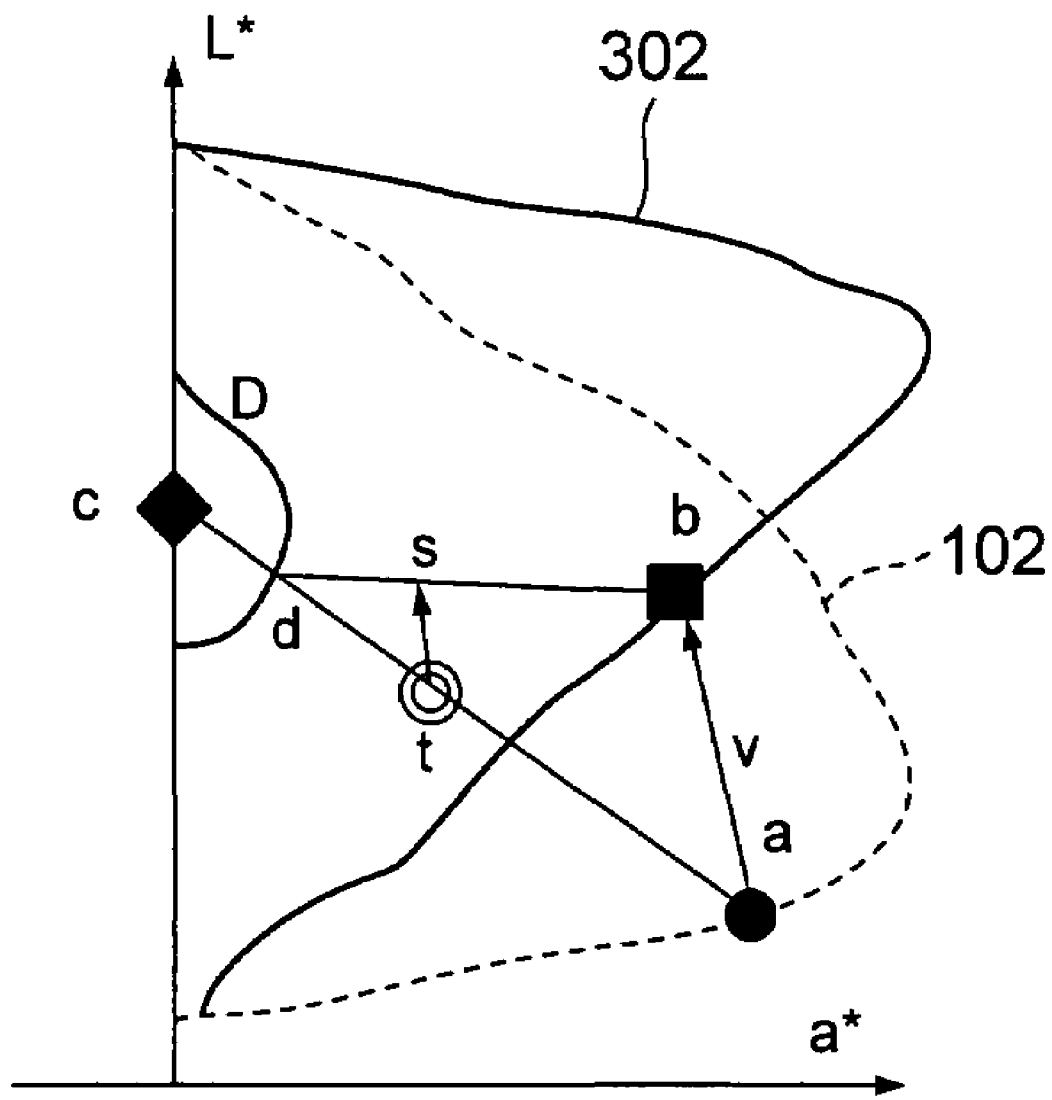
FIG. 72 is a view useful for understanding a modification of the coordinate conversion explained in conjunction with FIG. 70 and FIG. 71.

FIG. 72 is a view useful for understanding a modification of the coordinate conversion explained in conjunction with FIG. 70 and FIG. 71.

Here, there is established an area D surrounding the coordinate conversion reference coordinate point c, and there is determined an intersection point d of a straight line connecting the coordinate conversion reference coordinate point c with the first reference coordinate point a and the boundary of the area D. In mapping of the first coordinate point t, the first coordinate point t is mapped on the coordinate point s connecting the intersection point d with the second reference coordinate point d.

This feature makes it possible to establish the area in which coordinates are not moved, addressed as the area D. As mentioned above, in order to keep the gray balance, it is preferable that the coordinate on the L* axis (the gray axis) is not moved. An establishment of the area D as shown in FIG. 72 makes it possible to arbitrarily establish an area in which the coordinate is not moved.

Figure 73:
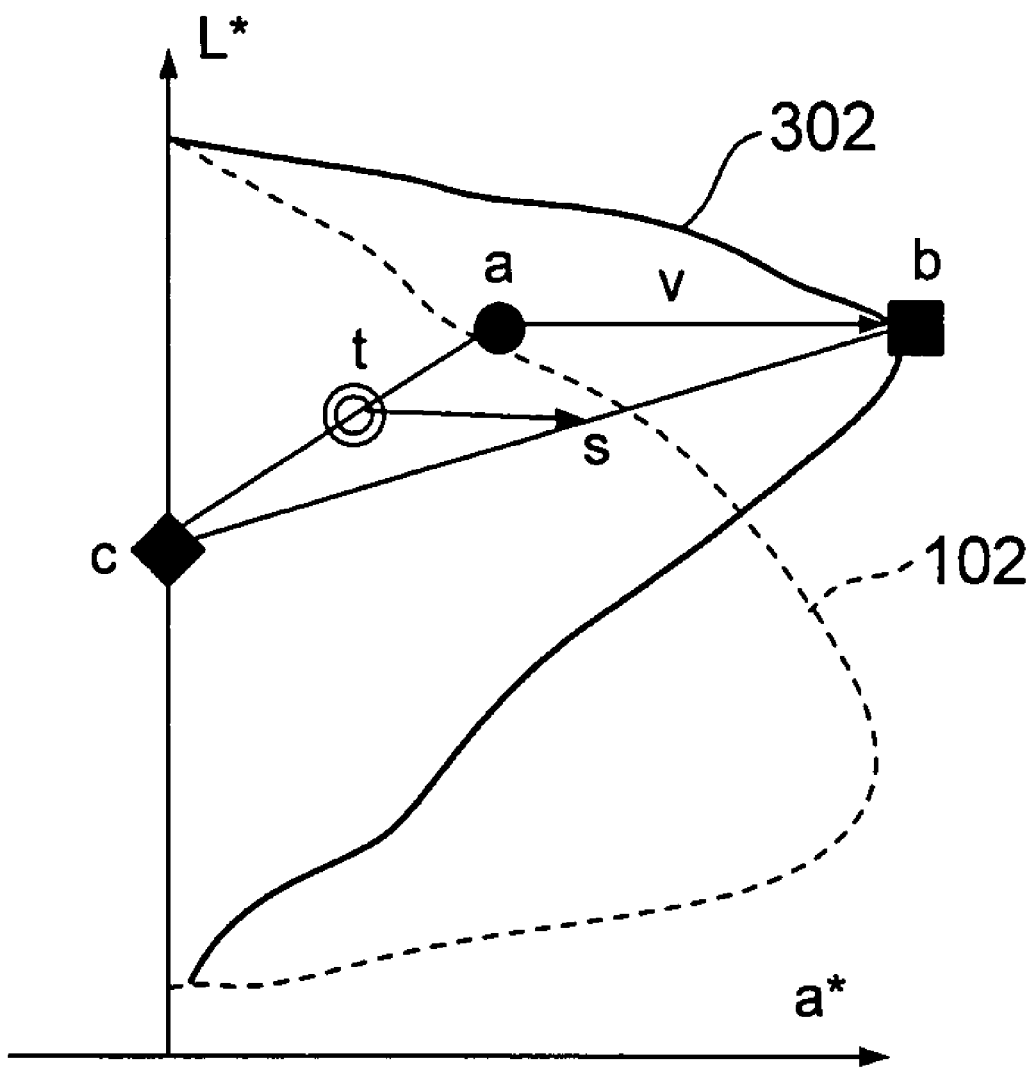
FIG. 73 is an explanatory view for a second example of the coordinate conversion in the first process of the flowchart shown in FIG. 66.
Figure 74:
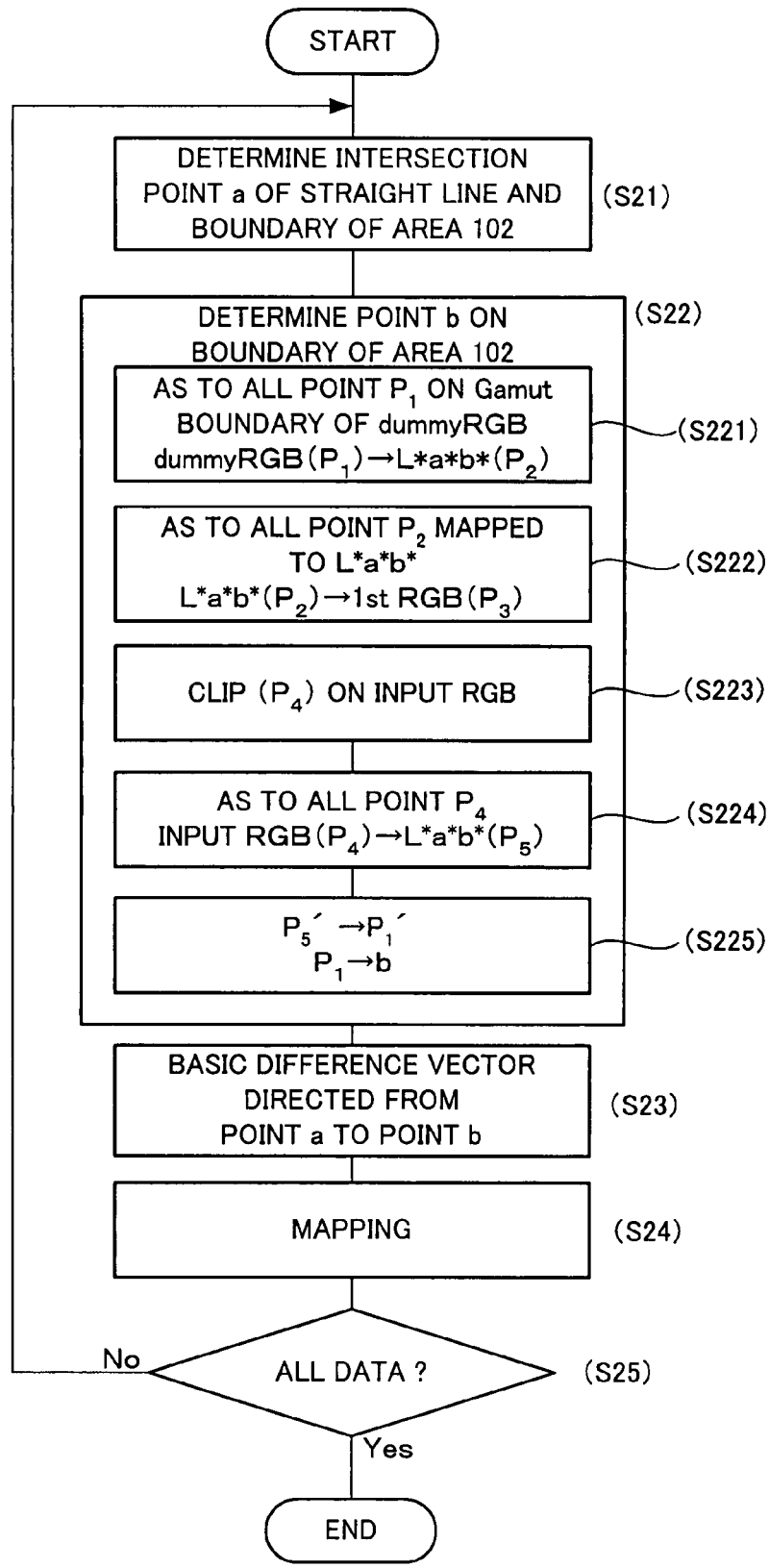
FIG. 74 is a flowchart useful for understanding the second example of the coordinate conversion in the first process of the flowchart shown in FIG. 66.

FIG. 73 is an explanatory view for a second example of the coordinate conversion in the first process of the flowchart shown in FIG. 66. FIG. 74 is a flowchart useful for understanding the second example of the coordinate conversion in the first process of the flowchart shown in FIG. 66.

Here, in a similar fashion to that of the first example explained with reference to the FIG. 71 and FIG. 72, there is established on the L* axis (the gray axis) a coordinate conversion reference coordinate point c that is a standard of the coordinate conversion.

Now, let us consider a straight line connecting the coordinate conversion reference coordinate point c to the first coordinate point t that is an object of the coordinate conversion, and determine an intersection point of the straight line and the boundary of the color reproduction area 102 of the printer 11, which is mapped into the L*a*b* space (a step S21). This intersection point is referred to as the first reference coordinate point a. Here, as mentioned above, when there is performed an adaptational conversion in the second process (the step d2) in the flowchart of FIG. 66, the color reproduction area 102 of the printer 11, which is mapped into the L*a*b* space, indicates the color reproduction area after the adaptational conversion.

The flowchart shown in FIG. 74 is different from the flowchart shown in FIG. 71, but is a flowchart in which the thus determined first reference coordinate point a exists, as shown in FIG. 73, inside the color reproduction area 302 of the proofer 14 mapped into the L*a*b* space. When this condition is satisfied, the procession is advanced as follows.

In a step S22, there is determined a second reference coordinate point b on the boundary of the color reproduction area of the proofer 14, which corresponds to the boundary of the thus determined first reference coordinate point a of the printer 11. To determine the second reference coordinate point b, it is impossible to use the technique explained with reference to FIG. 70 and FIG. 71, since the first reference coordinate point a exists inside the color reproduction area 302 of the proofer 14, as shown in FIG. 73. In other words, in a similar fashion to a case where the first reference coordinate point a exists outside the color reproduction area 302 of the proofer 14, even if the first reference coordinate point a is mapped into the dummy RGB color space, the mapped first reference coordinate point locates inside the color reproduction area of the proofer 14 in the dummy RGB color space. Thus, it is impossible to use the above-mentioned technique of clip. In view of the situation, according to the present embodiment, there is determined the first reference coordinate point b in the manner as will be explained below.

First, with respect to all the points (point P$_1$ represents the points) on the boundary of the color reproduction area (gamut) of the proofer 14 in the dummy RGB color space, the points are mapped from the dummy RGB color space to the L*a*b* space (a step S221), and all the points P$_2$ mapped onto the L*a*b* space are mapped onto the input RGB color space (a step S222). Next, of the points P$_3$ mapped onto the input RGB color space, the points, which are out of the color reproduction area of the printer 11 on the input RGB color space, are mapped on the boundary of the color reproduction area of the printer 11, as mentioned above, for example, in such a manner that as to R, G and B, values of the minus are clipped to 0 and values exceeding 255 are clipped to 255 (a step S223).

Thus obtained points $P_4$, which are mapped onto the input RGB color space and are all clipped, are mapped from the input RGB color space to the L*a*b* space (a step S224). Of points $P_5$ thus mapped onto the L*a*b* space, there is found point a point $P_5'$, which is coincident with the first reference coordinate point a, or is closest to the first reference coordinate point a, and of all the points $P_1$ on the boundary of the color reproduction area of the proofer 14 in the dummy RGB color space, there is found a point $P_1'$ of which the point $P_5'$ is obtained on the basis of. The point $P_1'$ is established as a second reference coordinate point b (a step S225).

Thus, it is possible to determine the second reference coordinate point b corresponding to the reference coordinate point shown in FIG. 73.

In case of the flowchart shown in FIG. 74, all the points $P_1$ on the boundary of the color reproduction area of the proofer 14 in the dummy RGB color space are impartially mapped onto the input RGB color space. However, it is acceptable that, of the coordinate points on the boundary of the color reproduction area 302 of the proofer 14 mapped onto the L*a*b* space, as shown in FIG. 65, only the coordinate points of the portion that juts out from the color reproduction area 102 of the printer 11 mapped onto the L*a*b* space are mapped onto the first RGB color space. Alternatively, when it is possible to narrow a coordinate position of the second reference coordinate point b down by presumption, of the jutting out portion, it is acceptable that only the coordinate points of the narrowed down area are mapped onto the input RGB color space.

In the step S22 shown in FIG. 74, when the second reference coordinate point b is detected, in a similar fashion to that of the flowchart of FIG. 71, as shown in FIG. 73, there is determined the basic difference vector v directing from the first reference coordinate point a to the second reference coordinate point b (a step S23). Further, in a similar fashion to that of the first example, of FIG. 70 and FIG. 71, there is determined the second coordinate point corresponding to the first coordinate point (a step S24).

Such a coordinate conversion is performed on all the coordinate points in which the first reference coordinate point a determined in the step S21 exists inside the color reproduction area 302 of the proofer, of the coordinate points of the color reproduction area 102 of the printer 11 mapped onto the L*a*b* space (a step S25).

Figure 75:
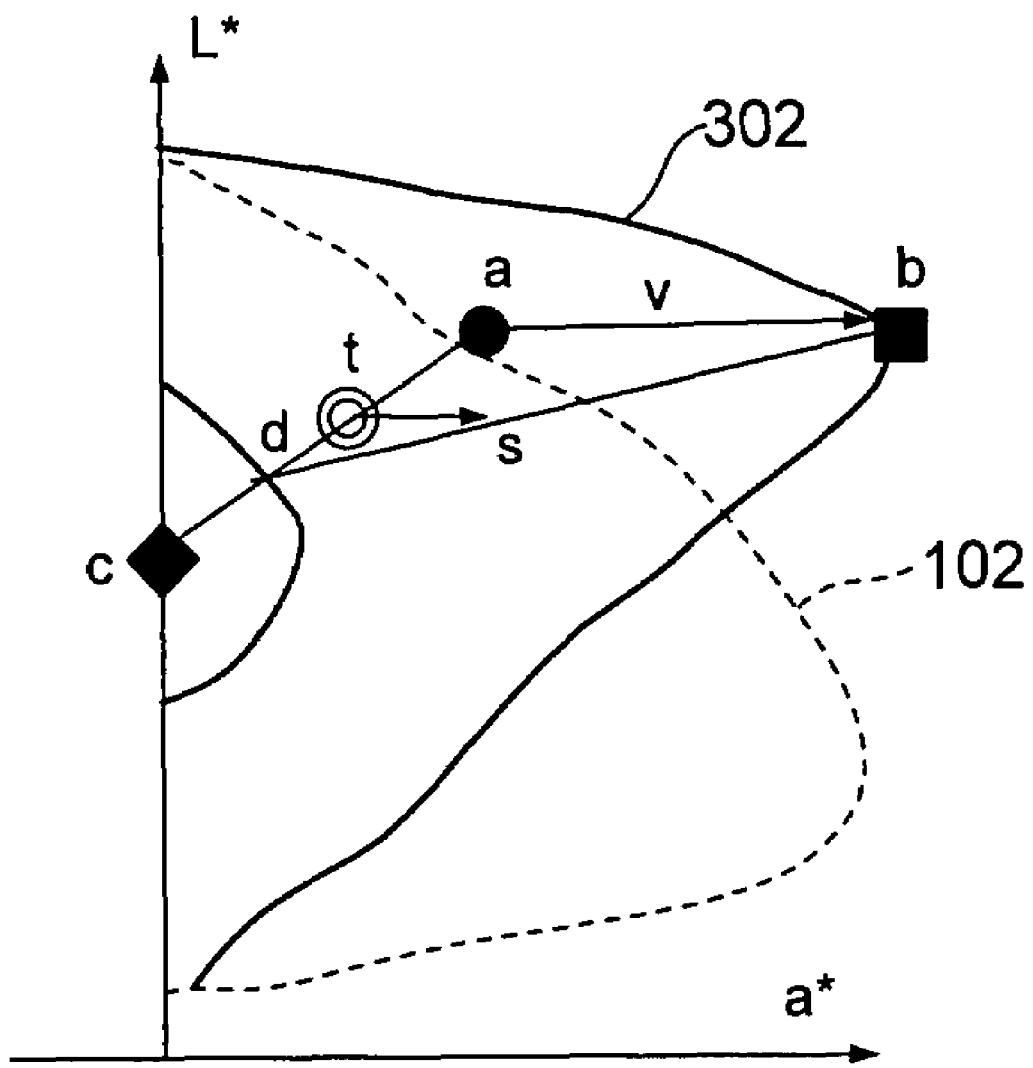
FIG. 75 is a view useful for understanding a second modification of the coordinate conversion explained in conjunction with FIG. 73 and FIG. 74.

FIG. 75 is a view useful for understanding a second modification of the coordinate conversion explained in conjunction with FIG. 73 and FIG. 74.

In a similar fashion to that of FIG. 72, there is established an area D surrounding the coordinate conversion reference coordinate point c, and there is determined an intersection point d of a straight line connecting the coordinate conversion reference coordinate point c with the first reference coordinate point a and the boundary of the area D. In mapping of the first coordinate point t, the first coordinate point t is mapped on the coordinate point s on a straight line connecting the intersection point d with the second reference coordinate point b. This feature makes it possible to establish the area in which coordinates are not moved, addressed as the area D.

Figure 76:
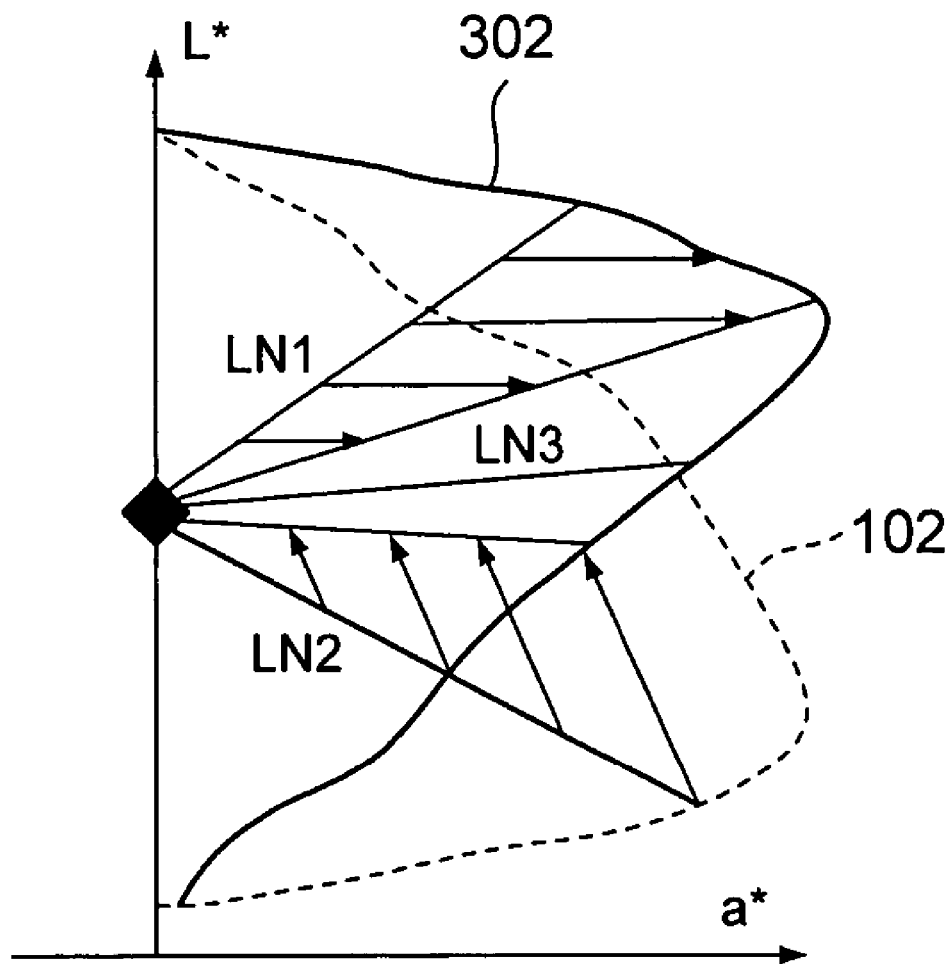
FIG. 76 is an explanatory view for effects of the mapping in combination of the "compression" explained in conjunction with FIG. 70 and FIG. 71 and the "expansion" explained in conjunction with FIG. 73 and FIG. 74.

FIG. 76 is an explanatory view for effects of the mapping in combination of the "compression" explained in conjunction with FIG. 70 and FIG. 71 and the "expansion" explained in conjunction with FIG. 73 and FIG. 74.

Coordinate points on a line LN1, in which the color reproduction area 302 of the proofer 14 on the L*a*b* space is wider than the color reproduction area 102 of the printer 11 on the L*a*b* space, are expanded in such a manner that the color reproduction area 302 of the proofer 14 is used maximum, and coordinate points on a line LN2, in which the color reproduction area 102 of the printer 11 on the L*a*b* space is wider than the color reproduction area 302 of the proofer 14 on the L*a*b* space, are compressed to such a level that the color reproduction area 302 of the proofer 14 is used maximum. The directions of those expansion and compression are determined through utilization of the RGB space depending on a device. Thus, this makes it possible to prevent discontinuity of a tone and an occurrence of a unnatural image, even if the mapping is performed on the L*a*b* space per se. And the mapping is performed on the L*a*b* space per se. This feature makes it possible to perform the mapping with greater accuracy. Further, coordinate points on a line LN3, in which areas of the color reproduction area 102 of the printer 11 and the color reproduction area 302 of the proofer 14 are coincident with one another, are not moved to keep the color.

While FIG. 76 illustrates an L*-a* plane of the L*a*b* space, this is made for the sake of convenience. Actually, a three-dimensional coordinate conversion is performed in the L*a*b* space. This is applicable to other examples, which will be explained hereinafter.

Figure 77:
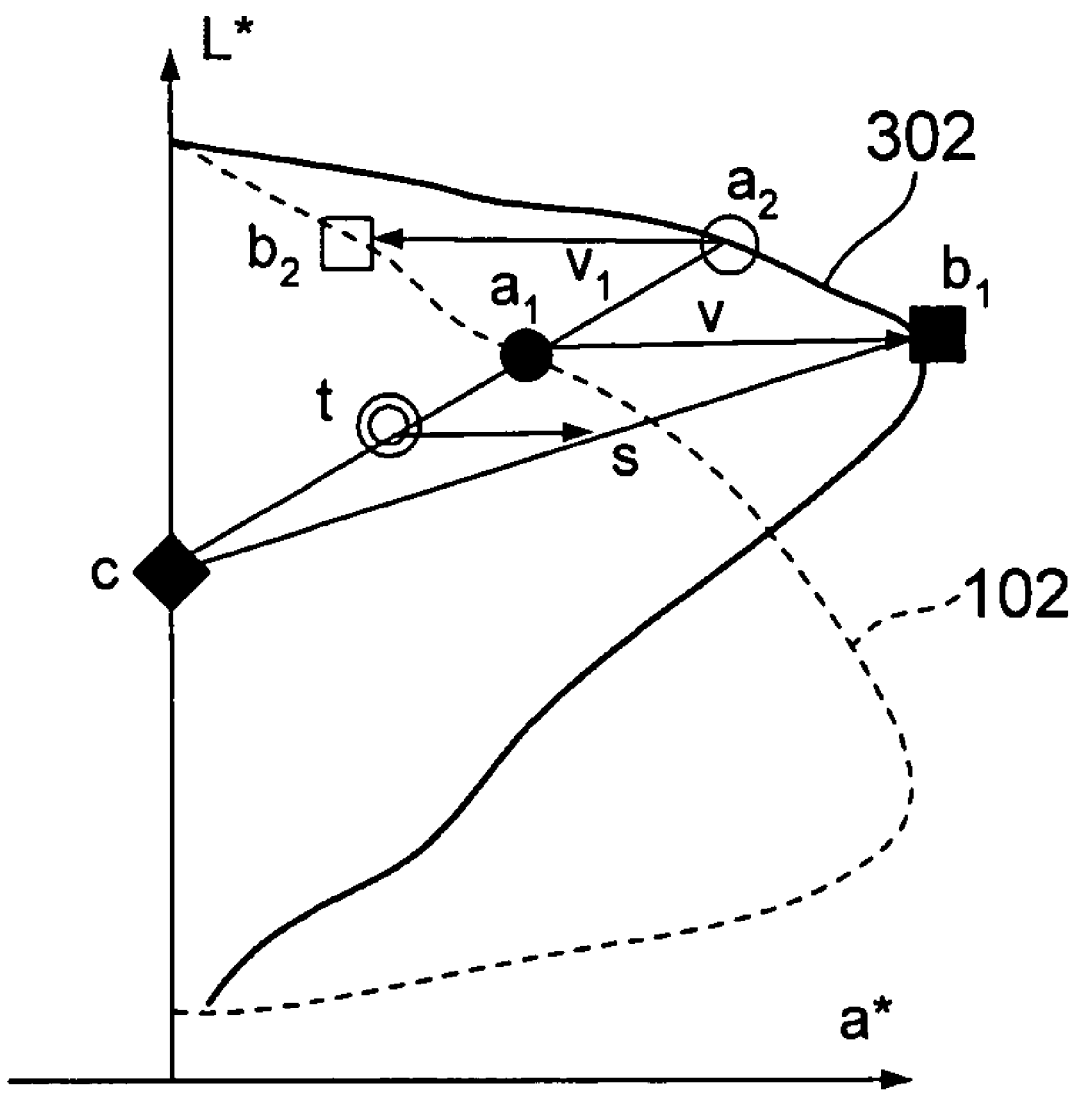
FIG. 77 is an explanatory view for a third example of the coordinate conversion in the first process of the flowchart shown in FIG. 66.
Figure 78:
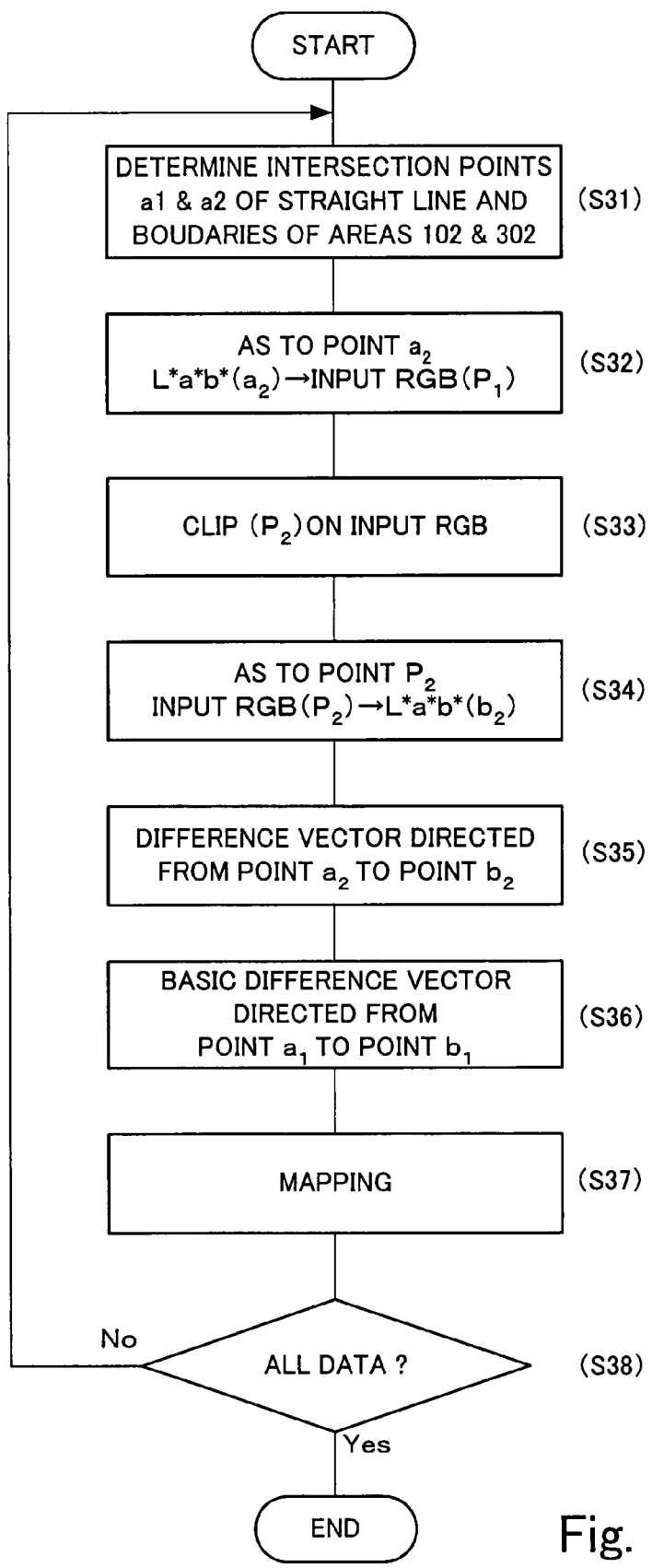
FIG. 78 is a flowchart useful for understanding the third example of the coordinate conversion in the first process of the flowchart shown in FIG. 66.

FIG. 77 is an explanatory view for a third example of the coordinate conversion in the first process of the flowchart shown in FIG. 66. FIG. 78 is a flowchart useful for understanding the third example of the coordinate conversion in the first process of the flowchart shown in FIG. 66. In a similar fashion to that of the second example, of FIG. 73 and FIG. 74, the third example is an example wherein the first reference coordinate point a1 determined in the step S31 exists inside the color reproduction area 302 of the proofer 14 mapped onto the L*a*b* space.

Also here, in a similar fashion to that of the first example and the second example as mentioned above, there is established a coordinate conversion reference coordinate point c that is a standard of the coordinate conversion, on the L* axis (gray axis). Now, let us consider a straight line connecting the coordinate conversion reference coordinate point c to the first coordinate point t, and determine an intersection point of the straight line and the boundary of the color reproduction area 102 of the printer 11 mapped onto the L*a*b* space. This intersection point is referred to as the first reference coordinate point a1. Further, there is determined an intersection point of the straight line and the boundary of the color reproduction area 302 of the proofer 14 mapped onto the L*a*b* space. This intersection point is referred to as the third reference coordinate point a2 (a step S31). Here, in a similar fashion to that of the first example and the second example as mentioned above, when there is performed an adaptational conversion in the second process (the step d21) in the flowchart of FIG. 66, the color reproduction area 102 of the printer 11, which is mapped into the L*a*b* space, indicates the color reproduction area after the adaptational conversion.

Next, in a step S32, the third reference coordinate point a2 thus determined is mapped from the L*a*b* space onto the input RGB color space depending on the printer 11. In a step S33, the point $P_1$, at which the third reference coordinate point a2 is mapped onto the input RGB color space, is clipped in the input RGB color space, so that the point $P_1$ is mapped on the boundary of the color reproduction area of the printer 11. In a step S34, the point $P_2$, which is obtained through the mapping, is mapped onto the L*a*b* space. A thus obtained point on the boundary of the color reproduction area 102 of the printer 11 in the L*a*b* space is referred to as a fourth reference coordinate point b2.

Next, there is determined a difference vector v1 directing from the third reference coordinate point a2 to the fourth reference coordinate point b2 (a step S35). Now let us consider a straight line passing through the first reference coordinate point a1 and parallel to the difference vector v1. An intersection point of the straight line and the boundary of the color reproduction area 302 of the proofer 14 in the L*a*b* space is established as the second reference coordinate point b1, and there is determined the basic difference vector v directing from the first reference coordinate point a1 to the second reference coordinate point b1 (a step S36). Hereinafter, in a similar fashion to that of the first example and the second example as mentioned above, the first coordinate point t is moved in parallel to the basic difference vector v so as to be mapped onto a coordinate point (a second coordinate point s) hitting against a straight line connecting the coordinate conversion reference coordinate point c to the second reference coordinate point b1 (a step S37).

Such a coordinate conversion is carried out on all the coordinate points in which there is determined the first reference coordinate point a1 located inside the color reproduction area 302 of the proofer 14 in the L*a*b* space, of the coordinate points in the color reproduction area of the printer 11 in the L*a*b* space (a step S38).

The third example explained with reference to FIG. 77 and FIG. 78 involves errors when there is a great discrepancy between the color reproduction area 102 of the printer 11 in the L*a*b* space and the color reproduction area 302 of the proofer 14, that is, when there is a great difference between the difference vector v1 and the basic difference vector v. However, when the difference vector v1 and the basic difference vector v are close to one another in length, so that the errors can be neglected, it is possible to adopt the third example and thereby performing a high speed operation as compared with the second example explained with reference to FIG. 73 and FIG. 74.

Figure 79:
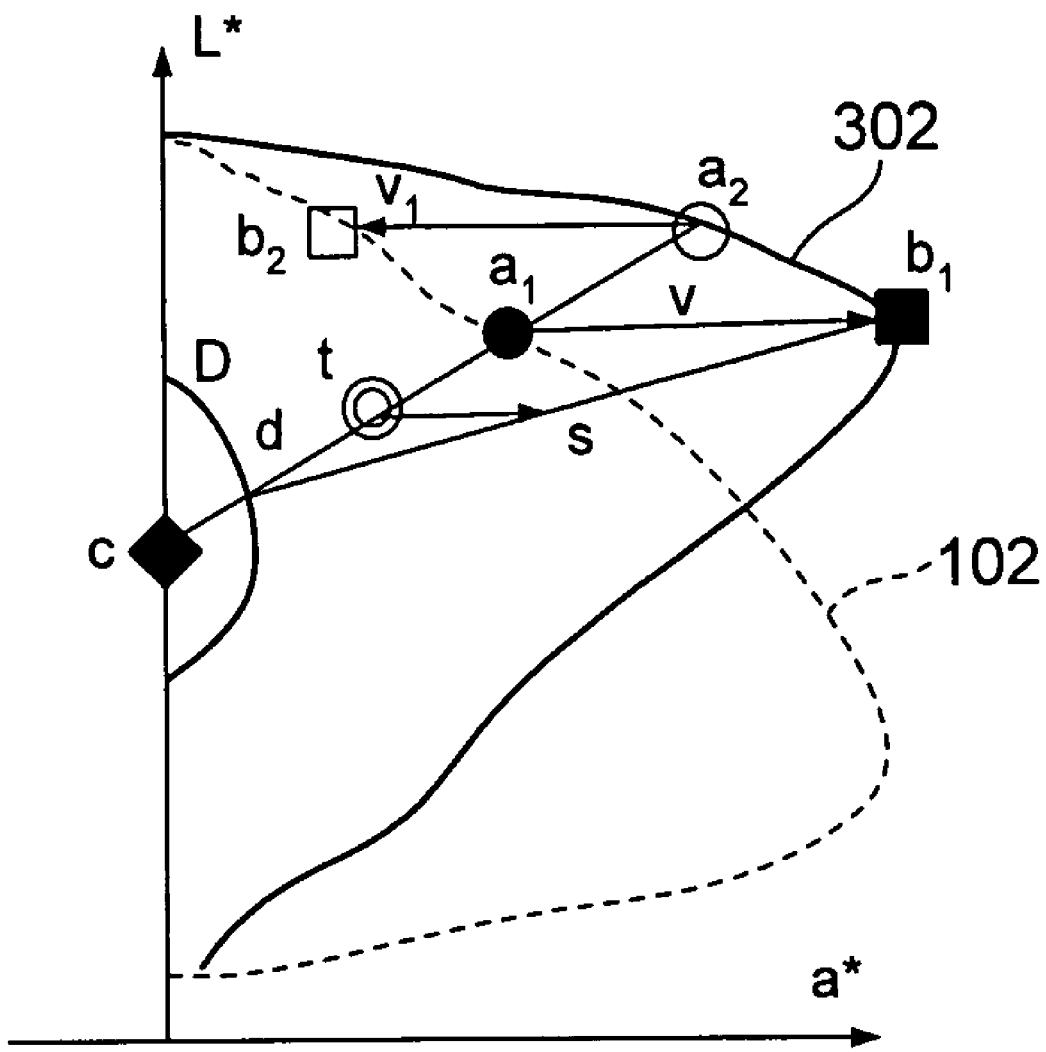
FIG. 79 is a view useful for understanding a third modification of the coordinate conversion explained in conjunction with FIG. 77 and FIG. 78.

FIG. 79 is a view useful for understanding a third modification of the coordinate conversion explained in conjunction with FIG. 77 and FIG. 78.

In a similar fashion to that of FIG. 72 and FIG. 75, there is established an area D surrounding the coordinate conversion reference coordinate point c, and there is determined an intersection point d of a straight line connecting the coordinate conversion reference coordinate point c with the first reference coordinate point a1 and the boundary of the area D. In mapping of the first coordinate point t, the first coordinate point t is mapped on the coordinate point s on a straight line connecting the intersection point d with the second reference coordinate point b1.

This feature makes it possible to establish the area in which coordinates are not moved, addressed as the area D.

Figure 80:
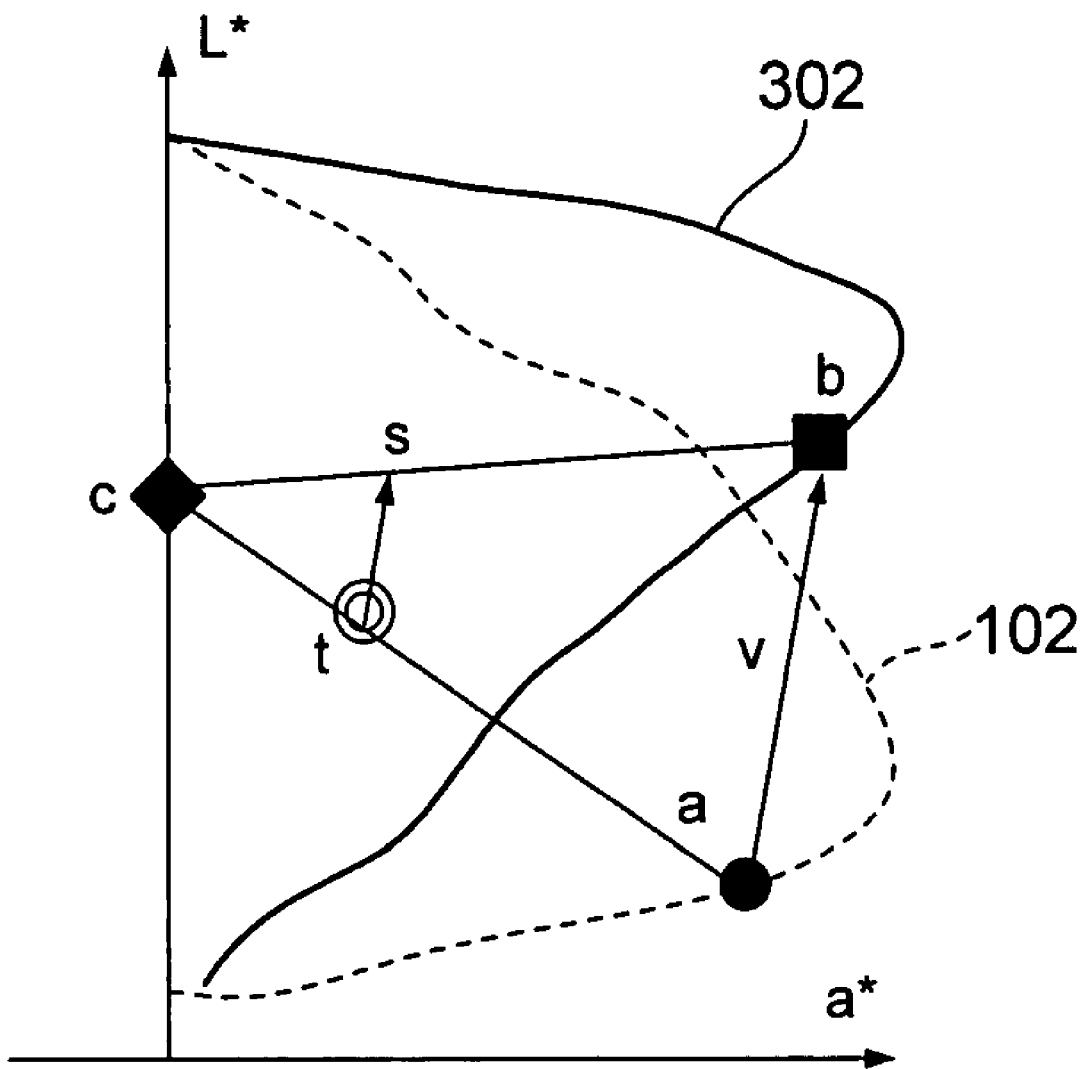
FIG. 80 is an explanatory view for a fourth example of the coordinate conversion in the first process of the flowchart shown in FIG. 66.
Figure 81:
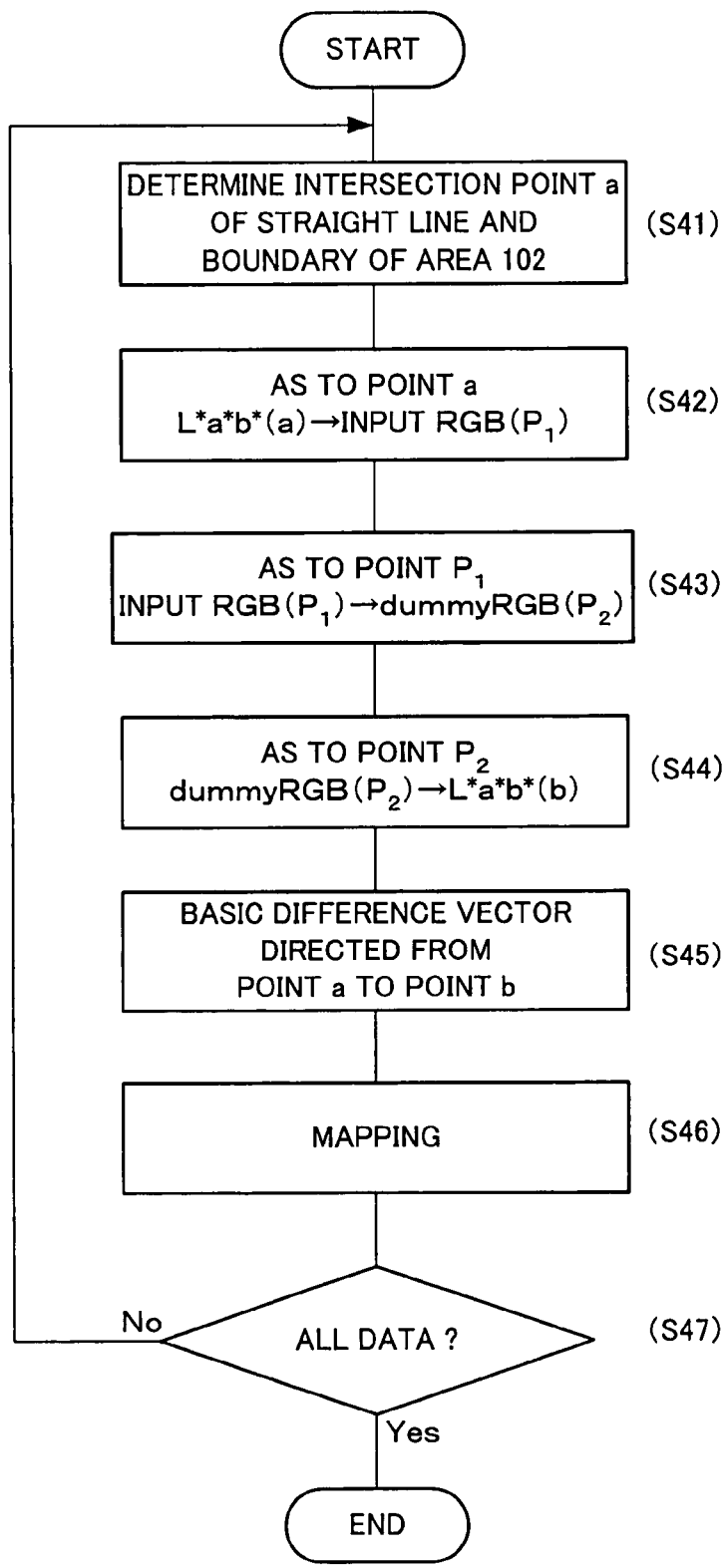
FIG. 81 is a flowchart useful for understanding the fourth example of the coordinate conversion in the first process of the flowchart shown in FIG. 66.

FIG. 80 is an explanatory view for a fourth example of the coordinate conversion in the first process of the flowchart shown in FIG. 66. FIG. 81 is a flowchart useful for understanding the fourth example of the coordinate conversion in the first process of the flowchart shown in FIG. 66.

According to the fourth example, it is possible to apply without considering as to whether a first reference coordinate point a, which is determined in a step S41, exists inside the color reproduction area 302 of the proofer 14 mapped onto the L*a*b* space, or outside the color reproduction area 302.

Also here, in a similar fashion to that of the first example to the third example as mentioned above, there is established a coordinate conversion reference coordinate point c that is a standard of the coordinate conversion, on the L* axis (gray axis). Now, let us consider a straight line connecting the coordinate conversion reference coordinate point c to the first coordinate point t that is an object of the coordinate conversion, and determine an intersection point of the straight line and the boundary of the color reproduction area 102 of the printer 11 mapped onto the L*a*b* space. This intersection point is referred to as the first reference coordinate point a (a step S41).

Next, in a step S42, the first reference coordinate point a thus determined is mapped onto the input RGB color space depending on the printer 11.

Next, in a step S43, there is determined a coordinate point $P_2$ on the dummy RGB color space that is a color space depending on the proofer 14, which has a coordinate value corresponding to the coordinate value of the point $P_1$ on the input RGB color space mapped onto the input RGB color space in the manner as mentioned above, and typically has the same coordinate value as the coordinate value of the point $P_1$. Specifically, for example, when the coordinate value of the point $P_1$, in which the first reference coordinate point a shown in FIG. 80 is mapped onto the input RGB color space, is expressed by (R, G, B)=(0, 255, 0), a point on the dummy RGB color space having the same coordinate value (R, G, B)=(0, 255, 0) is denoted as the point $P_2$.

Next, in a step S44, the point $P_2$ on the dummy RGB color space is mapped from the dummy RGB color space onto the L*a*b* space, and the mapped point is denoted as a second reference coordinate point b.

The first reference coordinate point a is a point on the boundary of the color reproduction area 102a of the printer 11 on the L*a*b* space. Accordingly, even if the first reference coordinate point a is mapped onto the input RGB color space, the first reference coordinate point a becomes a point (for example, (R, G, B)=(0, 255, 0)) on the boundary of the color reproduction area of the printer 11 in the input RGB color space.

If this point is a point on the dummy RGB color space as it is, the point becomes, on the dummy RGB color space, a point on the boundary of the color reproduction area of the proofer 14, so that the second reference coordinate point b, which is determined through mapping of the point onto the L*a*b* space, also becomes a point on the boundary of the color reproduction area 302 of the proofer 14 on the L*a*b* space.

In a step S45, there is determined a basic difference vector v directing from the first reference coordinate point a thus determined to the second reference coordinate point b. In a step S46, there is determined an intersection point of a straight line passing through the first coordinate point t and parallel to the basic difference vector v and a straight line connecting the coordinate conversion reference coordinate point c to the second reference coordinate point b. This intersection point is denoted by a second coordinate point s.

The above-mentioned coordinate conversion is sequentially carried out throughout the color reproduction area 102 of the printer 11 on the L*a*b* space (a step S47).

Figure 82:
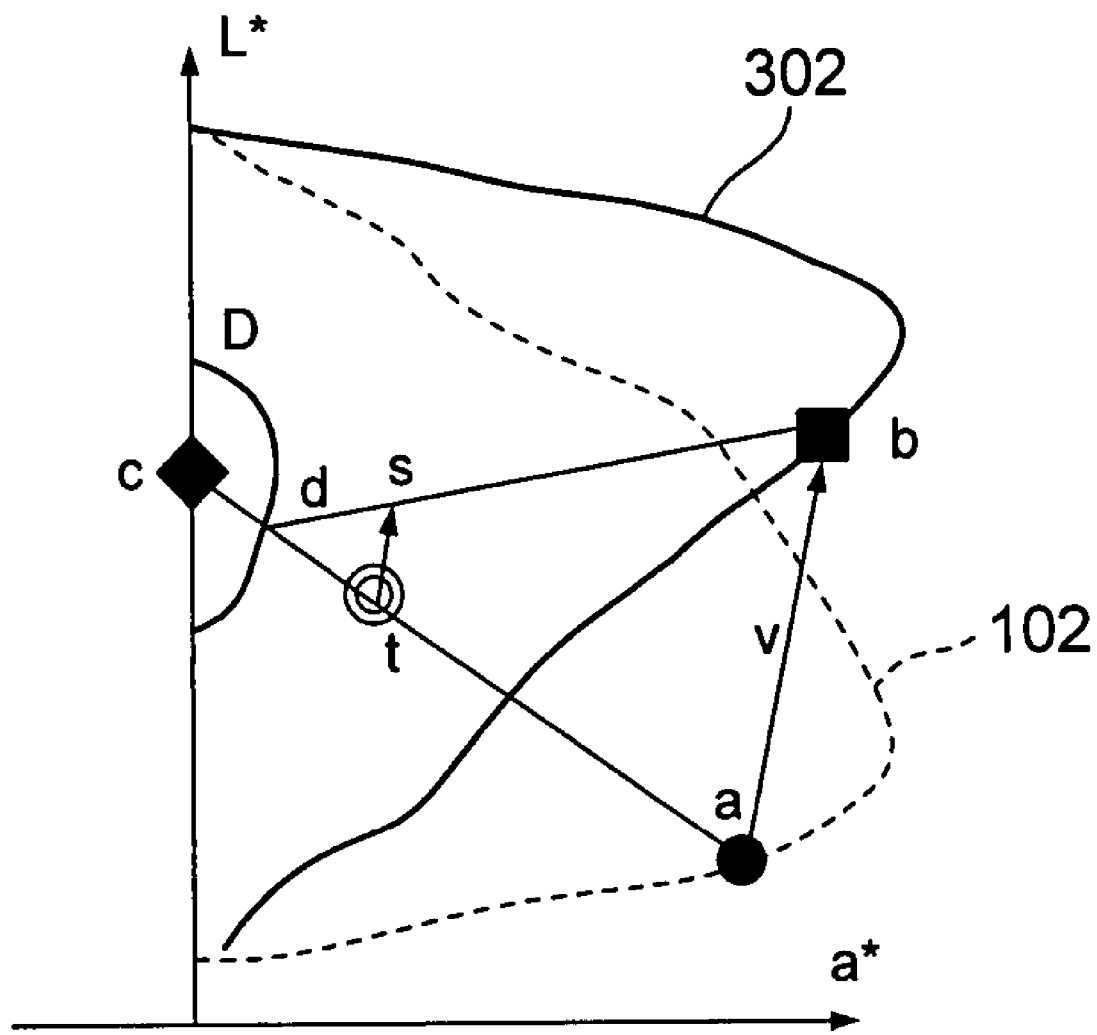
FIG. 82 is a view useful for understanding a fourth modification of the coordinate conversion explained in conjunction with FIG. 80 and FIG. 81.

FIG. 82 is a view useful for understanding a fourth modification of the coordinate conversion explained in conjunction with FIG. 80 and FIG. 81.

Here, in a similar fashion to that of FIG. 72, FIG. 75 and FIG. 79, there is established an area D surrounding the coordinate conversion reference coordinate point c, and the inside of the area D is not subjected to the mapping. Technique as to how the inside of the area D is not subjected to the mapping is the same as those of the examples in FIG. 72, FIG. 75 and FIG. 79, and thus redundant explanation will be omitted.

Now returning to FIG. 66, there will be explained the third coordinate conversion process (the step b3).

According to the third coordinate conversion process (the step b3), the coordinate points in the color reproduction area 302 of the proofer 14, after the coordinate conversion (mapping) from the color reproduction area 102 of the printer 11 to the color reproduction area 302 of the proofer 14 is carried out on the L*a*b* space, are mapped onto the dummy RGB color space in accordance with the color reproduction quality (the proofer profile) of the proofer 14.

According to the second link profile creating process (the step (D)) of the color conversion definition creating method shown in FIG. 4, in the manner as mentioned above, there is determined a second link profile for converting coordinate points in the color reproduction area 102 of the printer 11 in the input RGB color space that is a color space depending on the printer 11 into coordinate points in the color reproduction area (a color reproduction area sufficiently matched to the color reproduction area of the printing system 12) of the proofer 14 in the dummy RGB color space that is a color space depending on the virtual proofer 14 having a color reproduction area sufficiently matched to the color reproduction area of the printing system 12.

Figure 83:
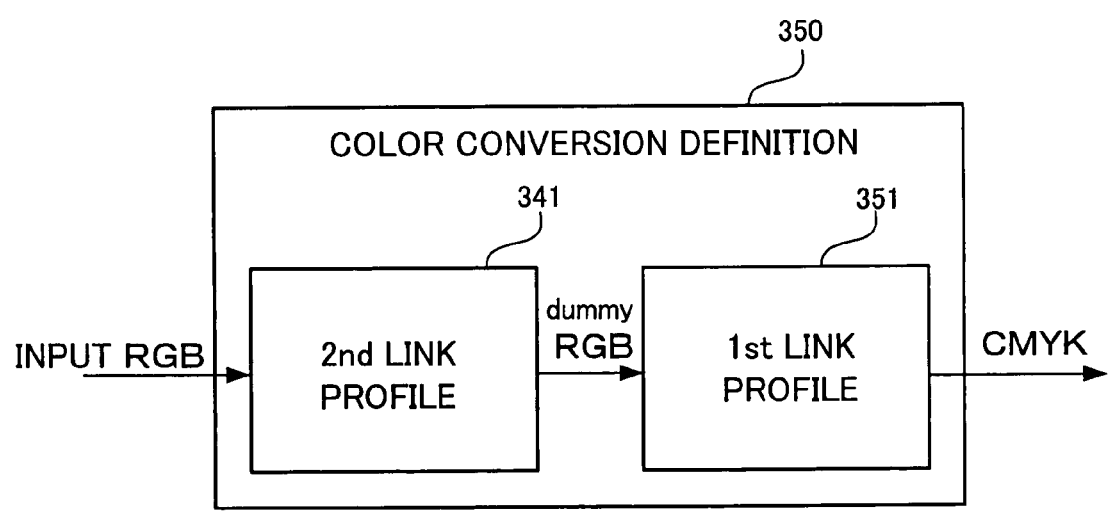
FIG. 83 is a conceptual view useful for understanding a color conversion definition consisting of a first link profile and a second link profile.

FIG. 83 is a conceptual view useful for understanding a color conversion definition consisting of a first link profile and a second link profile.

Here, a first link profile 351, which is determined in the first link profile creating process of the step (B) in FIG. 4, is combined to the second link profile 341, which is determined in the second link profile creating process of the step (D) in FIG. 4, so that there is created a color conversion definition 350 for converting RGB data for a printer, that is, data representative of coordinate points in the input RGB color space, into CMYK data for printing, that is, data representative of coordinate points in the CMYK color space suitable for the printing system (cf. FIG. 1). As mentioned above, the thus created color conversion definition 350 is established on the color conversion apparatus 10. The color conversion definition 350, which is established on the color conversion apparatus 10, is used when the color conversion apparatus 10 converts the RGB data for the printer 11, which is representative of the actual image, into CMYK data for printing.

The CMYK data, which is created through conversion using the color conversion definition 350, has values of K suitable for the printing system 12 (that is, excellent in an aptitude for printing), and absorbs "well" the difference between the color reproduction area of the printer 11 and the color reproduction area of the printing system 12, so that there is obtained the printed image 12a reproduced in color closed to the color of the printed image 11a to be printed out by the printer 11 in accordance with the RGB data for the printer 11 before the conversion.

Incidentally, according to the present embodiments, as the first device referred to in the present invention, there is adopted the printer 11 shown in FIG. 1. However, the first device referred to in the present invention is not restricted to the output device such as the printer 11. As the first device, it is acceptable to adopt an input device such as a color scanner that reads an image and outputs image data of R, G and B. The present invention is applicable in case of creating a color conversion definition for converting RGB data obtained by the input device into CMYK data having a preferable color as to an image which the RGB data is obtained in accordance with, and being excellent in an aptitude for printing.

Further, according to the present embodiments, as the second device referred to in the present invention, there is adopted the proofer 14 shown in FIG. 1. However, the proofer 14 is adopted, for the purpose of easy understanding of the invention by the replacement of the second device with the proofer in the usual printing. And thus, any one is acceptable, as the second device referred to in the present invention, which has a color reproduction area that is sufficiently coincident with the color reproduction area of the printing system 12.

As mentioned above, according to the present invention, when RGB values are converted into CMYK values, it is possible to raise a degree of freedom of designation of K-plate restraint conditions for printing and in addition widely take color reproduction area within the range of the ink total amount limitation, observing the designated K-plate restraint condition.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A color conversion definition creating method of creating a color conversion definition for converting coordinate points in a color reproduction area of a first device that mediates between an image and image data, in a first RGB color space, which depends on the first device, into coordinate points in a color reproduction area of a print in a CMYK color space for printing, the color conversion definition creating method comprising:

a virtual device profile creating process of creating a virtual device profile between a predetermined common color space and a second RGB color space depending on a virtual second device that mediates an image and image data, the virtual device profile having a color reproduction area tracing the color reproduction area for printing;

a first link profile creating process of creating a first link profile for converting coordinate points in the color reproduction area of the second device in the second RGB color space into coordinate points in the color reproduction area for printing in the CMYK color space;

a virtual device profile correcting process of correcting the virtual device profile that is created in the virtual device profile creating process by referring to the printing profile and the first link profile that is created in the first link profile creating process; and a second link profile creating process of creating a second link profile for converting coordinate points in the color reproduction area of the first device in the first RGB color space into coordinate points in the color reproduction area of the second device in the second RGB color space, using the device profile of the first device and the virtual device profile that is corrected in the virtual device profile correcting process, wherein the virtual device profile creating process comprises a color reproduction area definition process in which the color reproduction area of the second device is defined in such a manner that vertexes of W, C, M, Y, R, G, B of the color reproduction area of the second device are coincident with vertexes of associated W, C, M, Y, R, G, B of the color reproduction area for printing, respectively, and edge lines for connecting the vertexes of W, C, M, Y, R, G, B of the color reproduction area of the second device with one another are coincident with the associated edge lines of the color reproduction area for printing, respectively, and with respect to the vertex of K of the color reproduction area of the second device, the vertex of K is coincident with points (C, M, Y, K)=($C_{SH}$, $M_{SH}$, $Y_{SH}$, $K_{SH}$) of K of K-plate restraint conditions for printing, and with respect to the way between the vertex of K and the respective vertexes of R, G and B of the color reproduction area of the second device, when they start from the respective vertexes of R, G and B, up to $K_{param}$ ($K_{param}$<$K_{SH}$) of a predetermined K value in mid way, they are tracing edge lines directed to the vertexes of points (C, M, Y, K)=(0, 100, 100, 100), (C, M, Y, K)=(100, 0, 100, 100), and (C, M, Y, K)=(100, 100, 0, 100), respectively, and after they reach the value $K_{param}$, they swerve away from the respective edge lines to construct edge lines RK, GK, and BK up to (C, M, Y, K)=($C_{SH}$, $M_{SH}$, $Y_{SH}$, $K_{SH}$), which is the vertex of K, and three edge lines connecting vertexes of R, G, B of the color reproduction area of the second device with the vertex of K are associated with the edge lines RK, GK, and BK of the color reproduction area for printing, respectively, and with respect to the way between the vertex of K and the respective vertexes of R, G and B of the color reproduction area of the second device, when they start from the respective vertexes of R, G and B, up to $K_{param}$ ($K_{param}$<$K_{SH}$) of a predetermined K value in mid way, they are tracing diagonal lines directed to the vertexes of points (C, M, Y, K)=(100, 0, 0, 100), (C, M, Y, K)=(0, 100, 0, 100), and (C, M, Y, K)=(0, 0, 100, 100), respectively, and after they reach the value $K_{param}$, they swerve away from the respective diagonal lines to construct diagonal lines CK, MK, and YK up to (C, M, Y, K)=($C_{SH}$, $M_{SH}$, $Y_{SH}$, $K_{SH}$), which is the vertex of K, and three diagonal lines connecting vertexes of C, M, Y of the color reproduction area of the second device with the vertex of K are associated with the diagonal lines CK, MK, and YK of the color reproduction area for printing, respectively.

2. A color conversion definition creating method according to claim 1, wherein in the virtual device profile creating process, when the ink total amount limitation is involved in construction of edge lines RK, GK, and BK, values of M and Y, Y and C, and C and M are subtracted so that the edge lines RK, GK, and BK are within the ink total amount limitation, and thereby constructing the edge lines RK, GK, and BK keeping the ink total amount below the ink total amount limitation.

3. A color conversion definition creating method according to claim 1, wherein the virtual device profile creating process further comprises:

a segment profile creating process of creating a segment profile that associates coordinate points in the second RGB color space with coordinate points in the common color space, with respect to the segments, in such a manner that when pluralities of dots are determined at even intervals on individual segments each consisting of: nine edge lines coupling vertexes of W, C, M, Y, R, G and B on the second RGB color space representative of the color reproduction area of the second device; three diagonal lines coupling the vertex of W with vertexes of R, G and B; three edge lines coupling vertexes of R, G and B with the vertex of K; and three diagonal lines coupling vertexes of C, M and Y with vertex of K, so as to map the pluralities of dots onto the common color space, the pluralities of dots mapped on the common color space are disposed on the individual segments on the common color space associated with individual segments on the second RGB color space, of segments each consisting of the diagonal lines and the edge lines on the common color space defining the color reproduction area of the second device defined in the color reproduction area definition process, and are also disposed at even intervals;

a gray axis profile creating process of creating a gray axis profile that associates coordinate points in the second RGB color space with coordinate points in the common color space, with respect to the gray axis, in such a manner that when pluralities of dots are determined at even intervals on a gray axis connecting two vertexes of W and K with one another in the color reproduction area of the second device in the second RGB color space to map the pluralities of dots onto the common color space, the pluralities of dots mapped on the common color space are disposed on the gray axis connecting two vertexes of W and K with one another defined in the color reproduction area definition process, and are also disposed at even intervals; and a profile computing process of computing a profile of a surface other than the segment lines of the color reproduction area of the second device and a profile of the interior other than the gray axis, through an interpolation operation taking as boundary conditions both the segment profile created in the segment profile creating process and the gray axis profile created in the gray axis profile creating process.

4. A color conversion definition creating method according to claim 1, wherein the first link profile creating process comprises:

a K-value definition process of determining K-values on points on the gray axis, a WMRY plane that is encircled by edge lines sequentially coupling W-M-R-Y-W, a WYGC plane that is encircled by edge lines sequentially coupling W-Y-G-C-W, a WCBM plane that is encircled by edge lines sequentially coupling W-C-B-M-W, the RK edge line, the GK edge line, BK edge line, the CK diagonal line, the MK diagonal line, and the YK diagonal line, of the color reproduction area of the second device in such a manner that with respect to the gray axis there is adopted a K-value that is determined by K-plate restraint conditions for printing, and with respect to the WMRY plane, the WYGC plane, and the WCBM plane, there are adopted K-value of K≦0, and with respect to the RK edge line, the GK edge line, BK edge line, the CK diagonal line, the MK diagonal line, and the YK diagonal line, there are adopted the K-value of 0≦K≦$K_{SH}$;

a first CMYK values computing process of computing CMYK-values representative of coordinate points on the CMYK color spaces of individual points by referring to the printing profile taking as restraint conditions K-values of individual points with respect to individual points on the gray axis, the WMRY plane, the WYGC plane, the WCBM plane, the RK edge line, the GK edge line, BK edge line, the CK diagonal line, the MK diagonal line, and the YK diagonal line;

a first value adjustment process in which the value is adjusted so as to be within the ink total amount limitation value on points wherein a value of C+M+Y+K, which is an ink total amount, exceeds the ink total amount limitation value, of individual points wherein CMYK-values are computed in the first CMYK values computing process;

a K-value computing process of computing K-values of the points wherein K-values are not yet defined throughout the color reproduction area of the second device including its interior, through an interpolation operation taking as boundary conditions K-values of points which are defined in the K-value definition process, and with respect to points exceeding the ink total amount limitation value, K-values of points which are adjusted in the first value adjustment process;

a second CMYK values computing process of computing CMYK values representative of coordinate points on the CMYK color spaces of individual points by referring to the printing profile taking as restraint conditions K-values of individual points wherein K-values are newly computed in the K-value computing process; and a second value adjustment process in which the value is adjusted so as to be within the ink total amount limitation value on points wherein a value of C+M+Y+K, which is an ink total amount, exceeds the ink total amount limitation value, of individual points wherein CMYK-values are computed in the second CMYK values computing process.

5. A color conversion definition creating method according to claim 4, wherein in the K-value definition process, with respect to individual points on the WMRY plane, the WYGC plane, and the WCBM plane, K-value is allotted with 0 (that is, K=0), when Chroma as set forth below is the maximum value, Chroma=Max($R,G,B$)−Min($R,G,B$)

where Max (R, G, B) denotes the maximum value of individual values of R, G, and B of the associated point, and Min (R, G, B) denotes the minimum value of individual values of R, G, and B of the associated point and K-value is allotted with a negative value that is larger in the absolute value as Chroma is away from the maximum value.

6. A color conversion definition creating method according to claim 4, wherein in the K-value definition process, with respect to individual points on RK edge line, the GK edge line, BK edge line, the CK diagonal line, the MK diagonal line, and the YK diagonal line, wherein K-value is established between $K_{param}$ and $K_{SH}$, K-value is allotted with a value that is determined by an interpolation operation, and with respect to the point wherein K-value, which exceeds $K_{SH}$, is determined, K-value is allotted with a value wherein K-value of the associated point is replaced by $K_{SH}$.

7. A color conversion definition creating method according to claim 4, wherein in the first value adjustment process, on the points wherein a value of C+M+Y+K, which is an ink total amount, exceeds the ink total amount limitation value, of individual points wherein CMYK-values are computed in the first CMYK values computing process, the printing profile is referred to taking as restraint conditions K-value of the associated point, which is increased by a predetermined increment, so that CMYK-values of the associated point are determined over again.

8. A color conversion definition creating method according to claim 4, wherein in the first value adjustment process, on the points wherein a value of C+M+Y+K, which is an ink total amount, exceeds the ink total amount limitation value, of individual points wherein CMYK-values are computed in the first CMYK values computing process, coordinate points on the common color space of the associated point are shifted by a predetermined distance in a direction of low chroma saturation and high brightness, so that the coordinate points on the common color space after the translation are mapped on the CMYK color space by referring to the printing profile, and whereby the CMYK-values representative of coordinate points on the CMYK color space are determined over again.

9. A color conversion definition creating method according to claim 7, wherein in the first value adjustment process, on the points wherein a value of C+M+Y+K, which is an ink total amount, exceeds the ink total amount limitation value, of individual points wherein CMYK-values are computed in the first CMYK values computing process, coordinate points on the common color space of the associated point are shifted by a predetermined distance in a direction of low chroma saturation and high brightness, so that the coordinate points on the common color space after the translation are mapped on the CMYK color space by referring to the printing profile, and whereby the CMYK-values representative of coordinate points on the CMYK color space are determined over again.

10. A color conversion definition creating method according to claim 4, wherein in the K-value computing process, there are computed K-values of the points wherein K-values are not yet defined throughout the color reproduction area of the second device including its interior, through an interpolation operation wherein stronger weight is fixed to individual points on the gray axis as compared with individual points on the WMRY plane, the WYGC plane, the WCBM plane, the RK edge line, the GK edge line, BK edge line, the CK diagonal line, the MK diagonal line, and the YK diagonal line.

11. A color conversion definition creating method according to claim 4, wherein in the second value adjustment process, on points wherein a value of C+M+Y+K, which is an ink total amount, exceeds the ink total amount limitation value, of individual points wherein CMYK-values are computed in the second CMYK values computing process, the printing profile is referred to taking as restraint conditions K-value of the associated point, which is increased by a predetermined increment, so that CMYK-values of the associated point are determined over again.

12. A color conversion definition creating method according to claim 4, wherein in the second value adjustment process, on points wherein a value of C+M+Y+K, which is an ink total amount, exceeds the ink total amount limitation value, of individual points wherein CMYK-values are computed in the second CMYK values computing process, coordinate points on the common color space of the associated point are shifted by a predetermined distance in a direction of low chroma saturation and high brightness, so that the coordinate points on the common color space after the translation are mapped on the CMYK color space by referring to the printing profile, and whereby the CMYK-values representative of coordinate points on the CMYK color space are determined over again.

13. A color conversion definition creating method according to claim 11, wherein in the second value adjustment process, on points wherein a value of C+M+Y+K, which is an ink total amount, exceeds the ink total amount limitation value, of individual points wherein CMYK-values are computed in the second CMYK values computing process, coordinate points on the common color space of the associated point are shifted by a predetermined distance in a direction of low chroma saturation and high brightness, so that the coordinate points on the common color space after the translation are mapped on the CMYK color space by referring to the printing profile, and whereby the CMYK-values representative of coordinate points on the CMYK color space are determined over again.

14. A color conversion definition creating apparatus for creating a color conversion definition for converting coordinate points in a color reproduction area of a first device that mediates between an image and image data, in a first RGB color space, which depends on the first device, into coordinate points in a color reproduction area of a print in a CMYK color space for printing, the color conversion definition creating apparatus comprising:

a virtual device profile creating section that creates a virtual device profile between a predetermined common color space and a second RGB color space depending on a virtual second device that mediates an image and image data, the virtual device profile having a color reproduction area tracing the color reproduction area for printing;

a first link profile creating section that creates a first link profile for converting coordinate points in the color reproduction area of the second device in the second RGB color space into coordinate points in the color reproduction area for printing in the CMYK color space;

a virtual device profile correcting section that corrects the virtual device profile that is created in the virtual device profile creating process by referring to the printing profile and the first link profile that is created in the first link profile creating section; and a second link profile creating section that creates a second link profile for converting coordinate points in the color reproduction area of the first device in the first RGB color space into coordinate points in the color reproduction area of the second device in the second RGB color space, using the device profile of the first device and the virtual device profile that is corrected in the virtual device profile correcting section, wherein the virtual device profile creating section comprises a color reproduction area definition section in which the color reproduction area of the second device is defined in such a manner that vertexes of W, C, M, Y, R, G, B of the color reproduction area of the second device are coincident with vertexes of associated W, C, M, Y, R, G, B of the color reproduction area for printing, respectively, and edge lines for connecting the vertexes of W, C, M, Y, R, G, B of the color reproduction area of the second device with one another are coincident with the associated edge lines of the color reproduction area for printing, respectively, and with respect to the vertex of K of the color reproduction area of the second device, the vertex of K is coincident with points (C, M, Y, K)=($C_{SH}$, $M_{SH}$, $Y_{SH}$, $K_{SH}$) of K of K-plate restraint conditions for printing, and with respect to the way between the vertex of K and the respective vertexes of R, G and B of the color reproduction area of the second device, when they start from the respective vertexes of R, G and B, up to $K_{param}$ ($K_{param}$<$K_{SH}$) of a predetermined K value in mid way, they are tracing edge lines directed to the vertexes of points (C, M, Y, K)=(0, 100, 100, 100), (C, M, Y, K)=(100, 0, 100, 100), and (C, M, Y, K)=(100, 100, 0, 100), respectively, and after they reach the value $K_{param}$, they swerve away from the respective edge lines to construct edge lines RK, GK, and BK up to (C, M, Y, K)=($C_{SH}$, $M_{SH}$, $Y_{SH}$, $K_{SH}$), which is the vertex of K, and three edge lines connecting vertexes of R, G, B of the color reproduction area of the second device with the vertex of K are associated with the edge lines RK, GK, and BK of the color reproduction area for printing, respectively, and with respect to the way between the vertex of K and the respective vertexes of R, G and B of the color reproduction area of the second device, when they start from the respective vertexes of R, G and B, up to $K_{param}$ ($K_{param}$<$K_{SH}$) of a predetermined K value in mid way, they are tracing diagonal lines directed to the vertexes of points (C, M, Y, K)=(100, 0, 0, 100), (C, M, Y, K)=(0, 100, 0, 100), and (C, M, Y, K)=(0, 0, 100, 100), respectively, and after they reach the value $K_{param}$, they swerve away from the respective diagonal lines to construct diagonal lines CK, MK, and YK up to (C, M, Y, K)=($C_{SH}$, $M_{SH}$, $Y_{SH}$, $K_{SH}$), which is the vertex of K, and three diagonal lines connecting vertexes of C, M, Y of the color reproduction area of the second device with the vertex of K are associated with the diagonal lines CK, MK, and YK of the color reproduction area for printing, respectively.

15. A color conversion definition creating apparatus according to claim 14, wherein in the virtual device profile creating section, when the ink total amount limitation is involved in construction of edge lines RK, GK, and BK, values of M and Y, Y and C, and C and M are subtracted so that the edge lines RK, GK, and BK are within the ink total amount limitation, and thereby constructing the edge lines RK, GK, and BK keeping the ink total amount below the ink total amount limitation.

16. A color conversion definition creating apparatus according to claim 14, wherein the virtual device profile creating section further comprises:

a segment profile creating section that creates a segment profile that associates coordinate points in the second RGB color space with coordinate points in the common color space, with respect to the segments, in such a manner that when pluralities of dots are determined at even intervals on individual segments each consisting of: nine edge lines coupling vertexes of W, C, M, Y, R, G and B on the second RGB color space representative of the color reproduction area of the second device; three diagonal lines coupling the vertex of W with vertexes of R, G and B; three edge lines coupling vertexes of R, G and B with the vertex of K; and three diagonal lines coupling vertexes of C, M and Y with vertex of K, so as to map the pluralities of dots onto the common color space, the pluralities of dots mapped on the common color space are disposed on the individual segments on the common color space associated with individual segments on the second RGB color space, of segments each consisting of the diagonal lines and the edge lines on the common color space defining the color reproduction area of the second device defined in the color reproduction area definition section, and are also disposed at even intervals;

a gray axis profile creating section that creates a gray axis profile that associates coordinate points in the second RGB color space with coordinate points in the common color space, with respect to the gray axis, in such a manner that when pluralities of dots are determined at even intervals on a gray axis connecting two vertexes of W and K with one another in the color reproduction area of the second device in the second RGB color space to map the pluralities of dots onto the common color space, the pluralities of dots mapped on the common color space are disposed on the gray axis connecting two vertexes of W and K with one another defined in the color reproduction area definition section, and are also disposed at even intervals; and a profile computing section that computes a profile of a surface other than the segment lines of the color reproduction area of the second device and a profile of the interior other than the gray axis, through an interpolation operation taking as boundary conditions both the segment profile created in the segment profile creating section and the gray axis profile created in the gray axis profile creating section.

17. A color conversion definition creating apparatus according to claim 14, wherein the first link profile creating section comprises:

a K-value definition section that determines K-values on points on the gray axis, a WMRY plane that is encircled by edge lines sequentially coupling W-M-R-Y-W, a WYGC plane that is encircled by edge lines sequentially coupling W-Y-G-C-W, a WCBM plane that is encircled by edge lines sequentially coupling W-C-B-M-W, the RK edge line, the GK edge line, BK edge line, the CK diagonal line, the MK diagonal line, and the YK diagonal line, of the color reproduction area of the second device in such a manner that with respect to the gray axis there is adopted a K-value that is determined by K-plate restraint conditions for printing, and with respect to the WMRY plane, the WYGC plane, and the WCBM plane, there are adopted K-value of K≦0, and with respect to the RK edge line, the GK edge line, BK edge line, the CK diagonal line, the MK diagonal line, and the YK diagonal line, there are adopted the K-value of $0 \leq K \leq K_{SH}$;

a first CMYK values computing section that computes CMYK-values representative of coordinate points on the CMYK color spaces of individual points by referring to the printing profile taking as restraint conditions K-values of individual points with respect to individual points on the gray axis, the WMRY plane, the WYGC plane, the WCBM plane, the RK edge line, the GK edge line, BK edge line, the CK diagonal line, the MK diagonal line, and the YK diagonal line;

a first value adjustment section in which the value is adjusted so as to be within the ink total amount limitation value on points wherein a value of C+M+Y+K, which is an ink total amount, exceeds the ink total amount limitation value, of individual points wherein CMYK-values are computed in the first CMYK values computing section;

a K-value computing section that computes K-values of the points wherein K-values are not yet defined throughout the color reproduction area of the second device including its interior, through an interpolation operation taking as boundary conditions K-values of points which are defined in the K-value definition section, and with respect to points exceeding the ink total amount limitation value, K-values of points which are adjusted in the first value adjustment section;

a second CMYK values computing section that computes CMYK values representative of coordinate points on the CMYK color spaces of individual points by referring to the printing profile taking as restraint conditions K-values of individual points wherein K-values are newly computed in the K-value computing section; and a second value adjustment section in which the value is adjusted so as to be within the ink total amount limitation value on points wherein a value of C+M+Y+K, which is an ink total amount, exceeds the ink total amount limitation value, of individual points wherein CMYK-values are computed in the second CMYK values computing section.

18. A color conversion definition creating apparatus according to claim 17, wherein in the K-value definition section, with respect to individual points on the WMRY plane, the WYGC plane, and the WCBM plane, K-value is allotted with 0 (that is, K=0), when Chroma as set forth below is the maximum value, Chroma=Max(R,G,B)−Min(R,G,B)

where Max (R, G, B) denotes the maximum value of individual values of R, G, and B of the associated point, and Min (R, G, B) denotes the minimum value of individual values of R, G, and B of the associated point and K-value is allotted with a negative value that is larger in the absolute value as Chroma is away from the maximum value.

19. A color conversion definition creating apparatus according to claim 17, wherein in the K-value definition section, with respect to individual points on RK edge line, the GK edge line, BK edge line, the CK diagonal line, the MK diagonal line, and the YK diagonal line, wherein K-value is established between $K_{param}$ and $K_{SH}$, K-value is allotted with a value that is determined by an interpolation operation, and with respect to the point wherein K-value, which exceeds $K_{SH}$, is determined, K-value is allotted with a value wherein K-value of the associated point is replaced by $K_{SH}$.

20. A color conversion definition creating apparatus according to claim 17, wherein in the first value adjustment section, on the points wherein a value of C+M+Y+K, which is an ink total amount, exceeds the ink total amount limitation value, of individual points wherein CMYK-values are computed in the first CMYK values computing section, the printing profile is referred to taking as restraint conditions K-value of the associated point, which is increased by a predetermined increment, so that CMYK-values of the associated point are determined over again.

21. A color conversion definition creating apparatus according to claim 17, wherein in the first value adjustment section, on the points wherein a value of C+M+Y+K, which is an ink total amount, exceeds the ink total amount limitation value, of individual points wherein CMYK-values are computed in the first CMYK values computing section, coordinate points on the common color space of the associated point are shifted by a predetermined distance in a direction of low chroma saturation and high brightness, so that the coordinate points on the common color space after the translation are mapped on the CMYK color space by referring to the printing profile, and whereby the CMYK-values representative of coordinate points on the CMYK color space are determined over again.

22. A color conversion definition creating apparatus according to claim 20, wherein in the first value adjustment section, on the points wherein a value of C+M+Y+K, which is an ink total amount, exceeds the ink total amount limitation value, of individual points wherein CMYK-values are computed in the first CMYK values computing section, coordinate points on the common color space of the associated point are shifted by a predetermined distance in a direction of low chroma saturation and high brightness, so that the coordinate points on the common color space after the translation are mapped on the CMYK color space by referring to the printing profile, and whereby the CMYK-values representative of coordinate points on the CMYK color space are determined over again.

23. A color conversion definition creating apparatus according to claim 17, wherein in the K-value computing section, there are computed K-values of the points wherein K-values are not yet defined throughout the color reproduction area of the second device including its interior, through an interpolation operation wherein stronger weight is fixed to individual points on the gray axis as compared with individual points on the WMRY plane, the WYGC plane, the WCBM plane, the RK edge line, the GK edge line, BK edge line, the CK diagonal line, the MK diagonal line, and the YK diagonal line.

24. A color conversion definition creating apparatus according to claim 17, wherein in the second value adjustment section, on points wherein a value of C+M+Y+K, which is an ink total amount, exceeds the ink total amount limitation value, of individual points wherein CMYK-values are computed in the second CMYK values computing section, the printing profile is referred to taking as restraint conditions K-value of the associated point, which is increased by a predetermined increment, so that CMYK-values of the associated point are determined over again.

25. A color conversion definition creating apparatus according to claim 17, wherein in the second value adjustment section, on points wherein a value of C+M+Y+K, which is an ink total amount, exceeds the ink total amount limitation value, of individual points wherein CMYK-values are computed in the second CMYK values computing section, coordinate points on the common color space of the associated point are shifted by a predetermined distance in a direction of low chroma saturation and high brightness, so that the coordinate points on the common color space after the translation are mapped on the CMYK color space by referring to the printing profile, and whereby the CMYK-values representative of coordinate points on the CMYK color space are determined over again.

26. A color conversion definition creating apparatus according to claim 24, wherein in the second value adjustment section, on points wherein a value of C+M+Y+K, which is an ink total amount, exceeds the ink total amount limitation value, of individual points wherein CMYK-values are computed in the second CMYK values computing section, coordinate points on the common color space of the associated point are shifted by a predetermined distance in a direction of low chroma saturation and high brightness, so that the coordinate points on the common color space after the translation are mapped on the CMYK color space by referring to the printing profile, and whereby the CMYK-values representative of coordinate points on the CMYK color space are determined over again.

27. A color conversion definition creating program storage medium storing a color conversion definition creating program which causes an information processing apparatus to operate as a color conversion definition creating apparatus, when the color conversion definition creating program is executed in the information processing apparatus, wherein the color conversion definition creating apparatus creates a color conversion definition for converting coordinate points in a color reproduction area of a first device that mediates between an image and image data, in a first RGB color space, which depends on the first device, into coordinate points in a color reproduction area of a print in a CMYK color space for printing, the color conversion definition creating apparatus comprising:
  a virtual device profile creating section that creates a virtual device profile between a predetermined common color space and a second RGB color space depending on a virtual second device that mediates an image and image data, the virtual device profile having a color reproduction area tracing the color reproduction area for printing;
  a first link profile creating section that creates a first link profile for converting coordinate points in the color reproduction area of the second device in the second RGB color space into coordinate points in the color reproduction area for printing in the CMYK color space;
  a virtual device profile correcting section that corrects the virtual device profile that is created in the virtual device profile creating process by referring to the printing profile and the first link profile that is created in the first link profile creating section; and
  a second link profile creating section that creates a second link profile for converting coordinate points in the color reproduction area of the first device in the first RGB color space into coordinate points in the color reproduction area of the second device in the second RGB color space, using the device profile of the first device and the virtual device profile that is corrected in the virtual device profile correcting section, wherein the virtual device profile creating section comprises a color reproduction area definition section in which the color reproduction area of the second device is defined in such a manner that vertexes of W, C, M, Y, R, G, B of the color reproduction area of the second device are coincident with vertexes of associated W, C, M, Y, R, G, B of the color reproduction area for printing, respectively, and edge lines for connecting the vertexes of W, C, M, Y, R, G, B of the color reproduction area of the second device with one another are coincident with the associated edge lines of the color reproduction area for printing, respectively, and with respect to the vertex of K of the color reproduction area of the second device, the vertex of K is coincident with points $(C, M, Y, K)=(C_{SH}, M_{SH}, Y_{SH}, K_{SH})$ of K of K-plate restraint conditions for printing, and with respect to the way between the vertex of K and the respective vertexes of R, G and B of the color reproduction area of the second device, when they start from the respective vertexes of R, G and B, up to $K_{param}(K_{param}<K_{SH})$ of a predetermined K value in mid way, they are tracing edge lines directed to the vertexes of points $(C, M, Y, K)=(0, 100, 100, 100)$, $(C, M, Y, K)=(100, 0, 100, 100)$, and $(C, M, Y, K)=(100, 100, 0, 100)$, respectively, and after they reach the value $K_{param}$, they swerve away from the respective edge lines to construct edge lines RK, GK, and BK up to $(C, M, Y, K)=(C_{SH}, M_{SH}, Y_{SH}, K_{SH})$, which is the vertex of K, and three edge lines connecting vertexes of R, G, B of the color reproduction area of the second device with the vertex of K are associated with the edge lines RK, GK, and BK of the color reproduction area for printing, respectively, and with respect to the way between the vertex of K and the respective vertexes of R, G and B of the color reproduction area of the second device, when they start from the respective vertexes of R, G and B, up to $K_{param}$ $(K_{param}<K_{SH})$ of a predetermined K value in mid way, they are tracing diagonal lines directed to the vertexes of points $(C, M, Y, K)=(100, 0, 0, 100)$, $(C, M, Y, K)=(0, 100, 0, 100)$, and $(C, M, Y, K)=(0, 0, 100, 100)$, respectively, and after they reach the value $K_{param}$, they swerve away from the respective diagonal lines to construct diagonal lines CK, MK, and YK up to $(C, M, Y, K)=(C_{SH}, M_{SH}, Y_{SH}, K_{SH})$, which is the vertex of K, and three diagonal lines connecting vertexes of C, M, Y of the color reproduction area of the second device with the vertex of K are associated with the diagonal lines CK, MK, and YK of the color reproduction area for printing, respectively.

28. A color conversion definition creating program storage medium according to claim 27, wherein in the virtual device profile creating section, when the ink total amount limitation is involved in construction of edge lines RK, GK, and BK, values of M and Y, Y and C, and C and M are subtracted so that the edge lines RK, GK, and BK are within the ink total amount limitation, and thereby constructing the edge lines RK, GK, and BK keeping the ink total amount below the ink total amount limitation.

29. A color conversion definition creating program storage medium according to claim 27, wherein the virtual device profile creating section further comprises:
  a segment profile creating section that creates a segment profile that associates coordinate points in the second RGB color space with coordinate points in the common color space, with respect to the segments, in such a manner that when pluralities of dots are determined at even intervals on individual segments each consisting of: nine edge lines coupling vertexes of W, C, M, Y, R, G and B on the second RGB color space representative of the color reproduction area of the second device; three diagonal lines coupling the vertex of W with vertexes of R, G and B; three edge lines coupling vertexes of R, G and B with the vertex of K; and three diagonal lines coupling vertexes of C, M and Y with vertex of K, so as to map the pluralities of dots onto the common color space, the pluralities of dots mapped on the common color space are disposed on the individual segments on the common color space associated with individual segments on the second RGB color space, of segments each consisting of the diagonal lines and the edge lines on the common color space defining the color reproduction area of the second device defined in the color reproduction area definition section, and are also disposed at even intervals;

a gray axis profile creating section that creates a gray axis profile that associates coordinate points in the second RGB color space with coordinate points in the common color space, with respect to the gray axis, in such a manner that when pluralities of dots are determined at even intervals on a gray axis connecting two vertexes of W and K with one another in the color reproduction area of the second device in the second RGB color space to map the pluralities of dots onto the common color space, the pluralities of dots mapped on the common color space are disposed on the gray axis connecting two vertexes of W and K with one another defined in the color reproduction area definition section, and are also disposed at even intervals; and a profile computing section that computes a profile of a surface other than the segment lines of the color reproduction area of the second device and a profile of the interior other than the gray axis, through an interpolation operation taking as boundary conditions both the segment profile created in the segment profile creating section and the gray axis profile created in the gray axis profile creating section.

30. A color conversion definition creating program storage medium according to claim 27, wherein the first link profile creating section comprises:

a K-value definition section that determines K-values on points on the gray axis, a WMRY plane that is encircled by edge lines sequentially coupling W-M-R-Y-W, a WYGC plane that is encircled by edge lines sequentially coupling W-Y-G-C-W, a WCBM plane that is encircled by edge lines sequentially coupling W-C-B-M-W, the RK edge line, the GK edge line, BK edge line, the CK diagonal line, the MK diagonal line, and the YK diagonal line, of the color reproduction area of the second device in such a manner that with respect to the gray axis there is adopted a K-value that is determined by K-plate restraint conditions for printing, and with respect to the WMRY plane, the WYGC plane, and the WCBM plane, there are adopted K-value of K≦0, and with respect to the RK edge line, the GK edge line, BK edge line, the CK diagonal line, the MK diagonal line, and the YK diagonal line, there are adopted the K-value of $0 \leq K \leq K_{SH}$;

a first CMYK values computing section that computes CMYK-values representative of coordinate points on the CMYK color spaces of individual points by referring to the printing profile taking as restraint conditions K-values of individual points with respect to individual points on the gray axis, the WMRY plane, the WYGC plane, the WCBM plane, the RK edge line, the GK edge line, BK edge line, the CK diagonal line, the MK diagonal line, and the YK diagonal line;

a first value adjustment section in which the value is adjusted so as to be within the ink total amount limitation value on points wherein a value of C+M+Y+K, which is an ink total amount, exceeds the ink total amount limitation value, of individual points wherein CMYK-values are computed in the first CMYK values computing section;

a K-value computing section that computes K-values of the points wherein K-values are not yet defined throughout the color reproduction area of the second device including its interior, through an interpolation operation taking as boundary conditions K-values of points which are defined in the K-value definition section, and with respect to points exceeding the ink total amount limitation value, K-values of points which are adjusted in the first value adjustment section;

a second CMYK values computing section that computes CMYK values representative of coordinate points on the CMYK color spaces of individual points by referring to the printing profile taking as restraint conditions K-values of individual points wherein K-values are newly computed in the K-value computing section; and a second value adjustment section in which the value is adjusted so as to be within the ink total amount limitation value on points wherein a value of C+M+Y+K, which is an ink total amount, exceeds the ink total amount limitation value, of individual points wherein CMYK-values are computed in the second CMYK values computing section.

31. A color conversion definition creating program storage medium according to claim 30, wherein in the K-value definition section, with respect to individual points on the WMRY plane, the WYGC plane, and the WCBM plane, K-value is allotted with 0 (that is, K=0), when Chroma as set forth below is the maximum value, Chroma=Max(R, G,B)−Min(R, G,B)

where Max (R, G, B) denotes the maximum value of individual values of R, G, and B of the associated point, and Min (R, G, B) denotes the minimum value of individual values of R, G, and B of the associated point and K-value is allotted with a negative value that is larger in the absolute value as Chroma is away from the maximum value.

32. A color conversion definition creating program storage medium according to claim 30, wherein in the K-value definition section, with respect to individual points on RK edge line, the GK edge line, BK edge line, the CK diagonal line, the MK diagonal line, and the YK diagonal line, wherein K-value is established between $K_{param}$ and $K_{SH}$, K-value is allotted with a value that is determined by an interpolation operation, and with respect to the point wherein K-value, which exceeds $K_{SH}$, is determined, K-value is allotted with a value wherein K-value of the associated point is replaced by $K_{SH}$.

33. A color conversion definition creating program storage medium according to claim 30, wherein in the first value adjustment section, on the points wherein a value of C+M+Y+K, which is an ink total amount, exceeds the ink total amount limitation value, of individual points wherein CMYK-values are computed in the first CMYK values computing section, the printing profile is referred to taking as restraint conditions K-value of the associated point, which is increased by a predetermined increment, so that CMYK-values of the associated point are determined over again.

34. A color conversion definition creating apparatus according to claim 30, wherein in the first value adjustment section, on the points wherein a value of C+M+Y+K, which is an ink total amount, exceeds the ink total amount limitation value, of individual points wherein CMYK-values are computed in the first CMYK values computing section, coordinate points on the common color space of the associated point are shifted by a predetermined distance in a direction of low chroma saturation and high brightness, so that the coordinate points on the common color space after the translation are mapped on the CMYK color space by referring to the printing profile, and whereby the CMYK-values representative of coordinate points on the CMYK color space are determined over again.

35. A color conversion definition creating apparatus according to claim 33, wherein in the first value adjustment section, on the points wherein a value of C+M+Y+K, which is an ink total amount, exceeds the ink total amount limitation value, of individual points wherein CMYK-values are computed in the first CMYK values computing section, coordinate points on the common color space of the associated point are shifted by a predetermined distance in a direction of low chroma saturation and high brightness, so that the coordinate points on the common color space after the translation are mapped on the CMYK color space by referring to the printing profile, and whereby the CMYK-values representative of coordinate points on the CMYK color space are determined over again.

36. A color conversion definition creating program storage medium according to claim 30, wherein in the K-value computing section, there are computed K-values of the points wherein K-values are not yet defined throughout the color reproduction area of the second device including its interior, through an interpolation operation wherein stronger weight is fixed to individual points on the gray axis as compared with individual points on the WMRY plane, the WYGC plane, the WCBM plane, the RK edge line, the GK edge line, BK edge line, the CK diagonal line, the MK diagonal line, and the YK diagonal line.

37. A color conversion definition creating program storage medium according to claim 30, wherein in the second value adjustment section, on points wherein a value of C+M+Y+K, which is an ink total amount, exceeds the ink total amount limitation value, of individual points wherein CMYK-values are computed in the second CMYK values computing section, the printing profile is referred to taking as restraint conditions K-value of the associated point, which is increased by a predetermined increment, so that CMYK-values of the associated point are determined over again.

38. A color conversion definition creating program storage medium according to claim 30, wherein in the second value adjustment section, on points wherein a value of C+M+Y+K, which is an ink total amount, exceeds the ink total amount limitation value, of individual points wherein CMYK-values are computed in the second CMYK values computing section, coordinate points on the common color space of the associated point are shifted by a predetermined distance in a direction of low chroma saturation and high brightness, so that the coordinate points on the common color space after the translation are mapped on the CMYK color space by referring to the printing profile, and whereby the CMYK-values representative of coordinate points on the CMYK color space are determined over again.

39. A color conversion definition creating apparatus according to claim 37, wherein in the second value adjustment section, on points wherein a value of C+M+Y+K, which is an ink total amount, exceeds the ink total amount limitation value, of individual points wherein CMYK-values are computed in the second CMYK values computing section, coordinate points on the common color space of the associated point are shifted by a predetermined distance in a direction of low chroma saturation and high brightness, so that the coordinate points on the common color space after the translation are mapped on the CMYK color space by referring to the printing profile, and whereby the CMYK-values representative of coordinate points on the CMYK color space are determined over again.

* * * * *